US012771762B2

(12) United States Patent
Huang

(10) Patent No.: US 12,771,762 B2
(45) Date of Patent: Oct. 20, 2026

(54) DATA TRANSMISSION METHOD AND SYSTEM, FIRST END, INTERMEDIATE NETWORK DEVICE, AND CONTROL DEVICE

(71) Applicant: Jianbang Huang, Guangzhou City (CN)

(72) Inventor: Jianbang Huang, Guangzhou City (CN)

( * ) Notice: Subject to any disclaimer, the term of this patent is extended or adjusted under 35 U.S.C. 154(b) by 0 days.

(21) Appl. No.: 19/134,646

(22) PCT Filed: Nov. 30, 2023

(86) PCT No.: PCT/CN2023/135531
§ 371 (c)(1),
(2) Date: Aug. 5, 2025

(87) PCT Pub. No.: WO2024/114747
PCT Pub. Date: Jun. 6, 2024

(65) Prior Publication Data

US 2026/0122149 A1 Apr. 30, 2026

(30) Foreign Application Priority Data

Dec. 1, 2022 (WO) ................ PCT/CN2022/136012
May 9, 2023 (CN) .......................... 202310522087.8

(Continued)

(51) Int. Cl.
*H04L 67/141* (2022.01)
*H04L 69/16* (2022.01)

(52) U.S. Cl.
CPC ............ *H04L 69/16* (2013.01); *H04L 67/141* (2013.01)

(58) Field of Classification Search
CPC .. H04L 69/16; H04L 67/141; H04W 28/0278; H04W 72/569

(Continued)

(56) References Cited

U.S. PATENT DOCUMENTS 5,948,136 A 9/1999 Smyers
6,438,145 B1 8/2002 Movshovich et al.

(Continued)

FOREIGN PATENT DOCUMENTS

CN 101262416 A 9/2008
CN 101340616 A 1/2009

(Continued)

OTHER PUBLICATIONS

CN Office Action mailed on Jun. 14, 2025 for application 202310801511.2.

(Continued)

*Primary Examiner* — Glenford J Madamba
(74) *Attorney, Agent, or Firm* — Maschoff Brennan

(57) ABSTRACT

A data transmission method, a data transmission control method, a system, a first end, an intermediate network apparatus, a control apparatus, and a computer-readable storage medium are provided in the embodiments of the present application. One data transmission method comprises: determining first transaction information of a first transmission transaction corresponding to a first data stream of the first application; when a first data block of the first data stream needs to be transmitted to a second end, determining first target header information for the first data block on the basis of the first transaction information; generating a first message to be sent according to the first data block and the first target header information; sending the first message (Continued)

to the second end; wherein the first target header information is used for verifying whether the first message meets requirements.

34 Claims, 34 Drawing Sheets

(30) Foreign Application Priority Data

May 9, 2023 (CN) ......................... 202310522095.2
Jun. 30, 2023 (CN) ......................... 202310801511.2

(58) Field of Classification Search
USPC .......................................................... 709/227
See application file for complete search history.

(56) References Cited

U.S. PATENT DOCUMENTS

| | | | | |
|---|---|---|---|---|
| 2002/0087641 | A1 | 7/2002 | Levosky | |
| 2008/0235336 | A1 | 9/2008 | Stern et al. | |
| 2008/0263666 | A1 | 10/2008 | Keohane et al. | |
| 2011/0141905 | A1 | 6/2011 | Jiang et al. | |
| 2011/0307606 | A1 | 12/2011 | Cobb | |
| 2016/0119840 | A1* | 4/2016 | Loehr | H04L 1/1822 370/331 |
| 2016/0308662 | A1* | 10/2016 | Li | H04L 5/16 |
| 2016/0344701 | A1 | 11/2016 | Martens | |
| 2019/0089624 | A1 | 3/2019 | Berchanskiy et al. | |
| 2019/0173888 | A1 | 6/2019 | Li et al. | |
| 2020/0226298 | A1 | 7/2020 | Appleboum et al. | |
| 2021/0152432 | A1* | 5/2021 | Kelley | H04L 43/0894 |
| 2024/0107369 | A1* | 3/2024 | Verma | H04W 28/0278 |

FOREIGN PATENT DOCUMENTS

| | | | |
|---|---|---|---|
| CN | 101682396 | A | 3/2010 |
| CN | 102150456 | A | 8/2011 |
| CN | 102611531 | A | 7/2012 |
| CN | 103763374 | A | 4/2014 |
| CN | 108777681 | A | 11/2018 |
| CN | 109245982 | A | 1/2019 |
| CN | 109451084 | A | 3/2019 |
| CN | 110312254 | A | 10/2019 |
| CN | 110611671 | A | 12/2019 |
| CN | 111510440 | A | 8/2020 |
| CN | 111711710 | A | 9/2020 |
| CN | 113347198 | A | 9/2021 |
| CN | 114244610 | A | 3/2022 |
| CN | 114499920 | A | 5/2022 |
| CN | 114615082 | A | 6/2022 |
| CN | 114844729 | A | 8/2022 |
| CN | 114844842 | A | 8/2022 |
| CN | 115361166 | A | 11/2022 |
| CN | 115408707 | A | 11/2022 |
| CN | 116708416 | A | 9/2023 |
| JP | H1051494 | A | 2/1998 |
| TW | I667899 | B | 8/2019 |
| WO | 2006003069 | A1 | 1/2006 |
| WO | 2008113081 | A1 | 9/2008 |
| WO | 2022124524 | A1 | 6/2022 |
| WO | 2022127938 | A1 | 6/2022 |
| WO | 2022166464 | A1 | 8/2022 |
| WO | 2023151354 | A2 | 8/2023 |

OTHER PUBLICATIONS

CN Notification to Grant Patent Rights for Invention mailed on Jul. 15, 2024 for application 202310801511.2.
CN Official Examination Notice dated May 30, 2024 in application No. 202310801511.2.
CN Official Examination Notice dated Jan. 4, 2024 in application No. 202310801511.2.
International Search Report dated Aug. 11, 2023 in application No. PCT/CN2022/136012.
International Search Report dated Oct. 12, 2024 in application No. PCT/CN2024/102779.
CN Notice of Grant of Invention Patent dated Feb. 7, 2024 in application No. 202310522087.8.
CN Notice of Grant of Invention Patent dated Jun. 18, 2024 in application No. 202310522095.2.
TW Office Action dated Jul. 17, 2024 in application No. 112146946.
TW Office Action dated Aug. 18, 2025 in application No. 114106990.
CN Office Action dated Aug. 24, 2023 in application No. 202310522087.8.
CN Office Action dated Nov. 13, 2023 in application No. 202310522095.2.
CN Office Action dated Nov. 17, 2023 in application No. 202310522087.8.
CN Office Action dated Jan. 31, 2024 in application No. 202310522095.2.
CN Office Action dated Apr. 18, 2024 in application No. 202310522095.2.
Extended European Search Report dated Apr. 13, 2026 in application No. 24774296.8.

* cited by examiner

DATA TRANSMISSION METHOD AND SYSTEM, FIRST END, INTERMEDIATE NETWORK DEVICE, AND CONTROL DEVICE

CROSS-REFERENCE TO RELATED APPLICATIONS

The present application makes reference to Chinese patent applications in the following table, the entire contents of which applications are hereby incorporated by reference.

| Filing Date | Application Number | Title of Application for Patent |
|---|---|---|
| Dec. 1, 2022 | PCT/CN2022/136012 | DATA TRANSMISSION METHOD, SYSTEM, FIRST END, INTERMEDIATE NETWORK APPARATUS, AND CONTROL APPARATUS |
| May 9, 2023 | 202310522095.2 | DATA TRANSMISSION METHOD, SYSTEM, FIRST END, INTERMEDIATE NETWORK APPARATUS, AND CONTROL APPARATUS |
| May 9, 2023 | 202310522087.8 | DATA TRANSMISSION METHOD, SYSTEM, FIRST END, AND CONTROL APPARATUS |
| Jun. 30, 2023 | 202310801511.2 | DATA TRANSMISSION CONTROL METHOD, SYSTEM, CONTROL APPARATUS, AND READABLE STORAGE MEDIUM |

TECHNICAL FIELD

The present application pertains to the computer field, and particularly relates to a data transmission method, a data transmission control method, a system, a first end, an intermediate network apparatus, a control apparatus, and a computer-readable storage medium.

BACKGROUND ART

With the development of communication technology, it is an important way of information exchange for people to transmit data information through a network. At present, data transmission between different ends such as clients and servers in the network is mostly realized by using TCP/IP (Transmission Control Protocol/Internet Protocol (also known as Network Communication Protocol). However, due to the lack of consideration for transmission security in the design of TCP/IP, there exists the problem of failing to perform security management on transmitted data content; moreover, since it is open and bidirectional, there also exists the problem that apparatuses in the network are vulnerable to malicious attacks and data leakage.

Contents of the Invention

In view of the above problems, a data transmission method, a data transmission control method, a system, a first end, an intermediate network apparatus, a control apparatus, and a computer-readable storage medium, which can at least partially ameliorate or solve the existing problems, are provided in the embodiments of the present application.

In one embodiment of the present application, there is provided a data transmission method, applicable to a first control module inside a first application on a first end, which method comprises:

determining first transaction information of a first transmission transaction corresponding to a first data stream of the first application;

when a first data block of the first data stream needs to be transmitted to a second end, determining first target header information for the first data block on the basis of the first transaction information;

generating a first message to be sent according to the first data block and the first target header information;

sending the first message to the second end;

wherein the first target header information is used for verifying whether the first message meets requirements.

In another embodiment of the present application, there is further provided a data transmission method, applicable to a second control module that is external to a first application on a first end, which method comprises:

in response to a first data block that is sent by the first application and needs to be transmitted to a second end, determining first transaction information of a first transmission transaction to which the first data block belongs;

determining first target header information for the first data block on the basis of the first transaction information;

generating a first message to be sent according to the first data block and the first target header information;

sending the first message to the second end;

wherein the first target header information is used for verifying whether the first message meets requirements.

In another embodiment of the present application, there is further provided a data transmission method, applicable to a fourth control module on an intermediate network apparatus, which method comprises:

in response to a first data block that is sent by a first end and needs to be transmitted to a second end, determining first transaction information of a first transmission transaction to which the first data block belongs;

determining first target header information for the first data block on the basis of the first transaction information;

generating a first message to be sent according to the first data block and the first target header information;

sending the first message to the second end;

wherein the first target header information is used for verifying whether the first message meets requirements.

In another embodiment of the present application, there is further provided a data transmission method, applicable to a control apparatus that is connected to a first end, which method comprises:

in response to a first data block that is sent by the first end and needs to be transmitted to a second end, obtaining a first preset string corresponding to the second end, wherein the first preset string is used for hiding address information of the second end;

obtaining the address information of the second end according to the first preset string;

sending the first data block to the second end according to the address information of the second end.

In one embodiment of the present application, there is further provided a data transmission system, which comprises:

a first end, on which a first control module is arranged inside a first application, and used for: determining first transaction information of a first transmission transaction corresponding to a first data stream of the first application; when a first data block of the first data stream needs to be transmitted to a second end, determining first target header information for the first data block on the basis of the first transaction information; generating a first message to be sent according to the first data block and the first target header information; sending the first message to the second end; wherein the first target header information is used for verifying whether the first message meets requirements;

the second end, on which a third control module is arranged, and used for: verifying the first target header information included in the first message received by the second end; obtaining and caching the first data from the first message after the verification is passed.

In another embodiment of the present application, there is further provided a data transmission system, which comprises:

a first end, on which a second control module is arranged to be external to a first application, and used for: determining first transaction information of a first transmission transaction to which a first data block belongs in response to the first data block that is sent by the first application and needs to be transmitted to a second end; determining first target header information for the first data block on the basis of the first transaction information; generating a first message to be sent according to the first data block and the first target header information; sending the first message to the second end; wherein the first target header information is used for verifying whether the first message meets requirements;

the second end, on which a third control module is arranged, and used for: verifying the first target header information included in the first message received by the second end; obtaining the first data from the first message after the verification is passed.

In another embodiment of the present application, there is further provided a data transmission system, which comprises:

a first end for sending to an intermediate network apparatus a first data block that needs to be transmitted to a second end;

the intermediate network apparatus, on which a fourth control module is arranged and used for: receiving the first data block and determining first transaction information of a first transmission transaction to which the first data block belongs; determining first target header information for the first data block on the basis of the first transaction information; generating a first message to be sent according to the first data block and the first target header information; sending the first message to the second end; wherein the first target header information is used for verifying whether the first message meets requirements;

the second end, on which a third control module is arranged and used for: verifying the first target header information included in the first message received by the second end; obtaining the first data from the first message after the verification is passed.

In another embodiment of the present application, there is further provided a data transmission system, which comprises:

a first end, which is used for: determining first transaction information of a first transmission transaction corresponding to a first data stream; when a first data block of the first data stream needs to be transmitted to a second end, determining first target header information for the first data block on the basis of the first transaction information; generating a first message to be sent according to the first data block and the first target header information; sending the first message to the second end; wherein the first target header information is used for verifying whether the first message meets requirements;

the second end, which is used for: verifying the target header information included in the first message as received and determining whether the first message meets the requirements; if yes, obtaining and caching the first data block from the first message.

In another embodiment of the present application, there is further provided a data transmission system, which comprises:

a first end, which is used for, when a first data block of a first data stream needs to be transmitted to a second end, sending the first data block to a first control apparatus;

the first control apparatus, which is used for: determining first transaction information of a first transmission transaction corresponding to the first data stream; determining first target header information for the first data block as received on the basis of the first transaction information; generating a first message to be sent according to the first data block and the first target header information; sending the first message to the second end; wherein the first target header information is used for verifying whether the first message meets requirements;

the second end, which is used for: verifying the first target header information included in the first message as received, and determining whether the first message meets the requirements; if yes, obtaining and caching the first data block from the first message.

In another embodiment of the present application, there is further provided a data transmission system, which comprises:

a first end, which is used for, when a first data block of a first data stream needs to be transmitted to a second end, sending the first data block to a first control apparatus;

the first control apparatus, which is in communication connection with a first end, and used for: determining first transaction information of a first transmission transaction corresponding to the first data stream; determining first target header information for the first data block as received on the basis of the first transaction information; generating a first message to be sent according to the first data block and the first target header information; sending the first message to a second control apparatus; wherein the first target header information is used for verifying whether the first message meets requirements;

the second control apparatus, which is in communication connection with the first control apparatus and the second end, and used for: verifying the first target header information included in the first message as received, and determining whether the first message meets the requirements; if yes, caching the first message locally to await obtainment by the second end;

the second end, which is used for: sending a retrieval request to the second control apparatus; receiving the first message fed back by the second control apparatus in response to the retrieval request.

In another embodiment of the present application, there is further provided a data transmission system, which comprises:

a second end;

a first end, which is used for sending to a first control apparatus a first data block that needs to be transmitted to the second end;

a first control apparatus, which is used for: obtaining a first preset string corresponding to the second end in response to the first data block sent by the first end, wherein the first preset string is used for hiding address information of the second end; obtaining the address information of the second end according to the first preset string; sending the first data block to the second end according to the address information of the second end.

In another embodiment of the present application, there is also provided a data transmission system, which comprises:

a target apparatus;

a first end, which is used for: obtaining a first preset string corresponding to a second end when a first data block needs to be transmitted to a second end; generating a first message to be sent according to the first preset string and the first data block; sending the first message to a first control apparatus; wherein the first preset string is used for hiding address information of the target apparatus;

the first control apparatus, which is used for: determining the address information of the target apparatus according to the first preset string obtained from the first message; sending the first message to the target apparatus according to the address information of the target apparatus.

In another embodiment of the present application, there is further provided a data transmission system, which comprises:

a first end, which is used for: obtaining a first preset string corresponding to a second end when a first data block needs to be transmitted to a second end; generating a first message to be sent on the basis of the first preset string and the first data block; sending the first message to a first control apparatus; wherein the first preset string is used for hiding address information of the second end;

the first control apparatus, which is used for: determining the address information of the second end according to the first preset string obtained from the first message; sending the first message to a second control apparatus according to the address information of the second end;

the second control apparatus, which is used for caching the first message as received to await retrieval by the second end;

the second end, which is used for: sending a retrieval request to the second control apparatus; receiving the first message fed back by the second control apparatus in response to the retrieval request.

In another embodiment of the present application, there is further provided a data transmission system, which comprises:

a first end, which is used for: obtaining a first preset string corresponding to a second end and a second preset string corresponding to the first end when a first data block needs to be transmitted to the second end; sending the first preset string, the second preset string, and the first data block to a first control apparatus; wherein preset strings are used for hiding address information of corresponding ends;

the first control apparatus, which is used for: determining first transaction information of a first transmission transaction corresponding to a first data stream to which the first data block belongs; determining first target header information for the first data block; generating a first message to be sent according to the first target header information and the first data block; and sending the first message to the second end according to the address information of the second end as obtained from the first preset string.

the second end, which is used for: verifying the first message as received; obtaining and caching the first data from the first message after the verification is passed.

In one embodiment of the present application, there is further provided a first end, which comprises:

a first application that is installed on the first end;

a first control module, which is located inside the first application and used for implementing the data transmission method provided in the first embodiment of the present application.

In another embodiment of the present application, there is further provided a first end, which comprises:

a first application that is installed on the first end;

a second control module, which is external to the first application and used for implementing the data transmission method provided in the second embodiment of the present application.

In one embodiment of the present application, there is further provided an intermediate network apparatus, which comprises a fourth control module and a memory, wherein:

the memory is used for storing one or more computer programs;

the fourth control module is used for executing said one or more computer programs to implement the data transmission method provided in the third embodiment of the present application.

In one embodiment of the present application, there is further provided a control apparatus, which comprises a processor and a memory, wherein:

the memory is used for storing one or more computer instructions;

the processor, coupled with the memory, is used for executing said one or more computer instructions to implement the data transmission method provided in the fourth embodiment of the present application.

In another embodiment of the present application, there is further provided a data transmission method, applicable to a control apparatus that is connected to a first end, which method comprises:

receiving a first data block in a first data stream, which is sent by the first end and needs to be transmitted to a second end;

determining that the first data stream corresponds to first transaction information of a first transmission transaction;

determining first target header information for the first data block on the basis of the first transaction information;

generating a first message to be sent according to the first data block and the first target header information;

sending the first message to the second end;

wherein the first target header information is used for verifying whether the first message meets requirements.

In another embodiment of the present application, there is further provided a data transmission method, applicable to a first end, which method comprises:

obtaining a first preset identification corresponding to a second end when a first data block needs to be transmitted to the second end, wherein the first preset identification is used for hiding address information of the second end;

generating a first message to be sent on the basis of the first preset identification and the first data block;

sending the first message to the second end through a control apparatus.

In another embodiment of the present application, there is further provided a data transmission control method, applicable to a control apparatus in communication connection with a first end on the basis of a first communication protocol, which has multiple communication nodes, including some unidirectional communication nodes, which method comprises:

determining first configuration information in response to an operation of configuring communication nodes on the control apparatus as triggered on account of the first end, wherein communication nodes included in the first configuration information are the communication nodes in the first communication protocol;

in the process of data transmission in non-handshake connection with the first end, activating at least one first communication node on account of the first end according to the first configuration information, wherein: the first communication node is a communication node in the communication protocol, and is used for data exchange with the first end in the non-handshake connection process; the first communication node is of a node type that can reflect a data transmission function, which the first communication node enables the first end to perform;

according to the node type of each first communication node, controlling the data transmission capability that the first end can have through each first communication node.

In another embodiment of the present application, there is further provided a data transmission control system, which comprises:

a first end;

a first control apparatus in communication connection with the first end on the basis of a first communication protocol, which has multiple communication nodes, including some unidirectional communication nodes; the first control apparatus being used for: determining first configuration information in response to an operation of configuring communication nodes on a control apparatus as triggered on account of the first end, wherein communication nodes included in the first configuration information are the communication nodes in the first communication protocol; in the process of data transmission in non-handshake connection with the first end, activating at least one first communication node on account of the first end according to the first configuration information, wherein the first communication node is of a node type that can reflect a data transmission function, which the first communication node enables the first end to perform; controlling the data transmission capability that the first end can have through each first communication node according to the node type of each first communication node.

In another embodiment of the present application, there is further provided a data transmission control system, which comprises:

a first end;

a first control apparatus in communication connection with the first end through a first communication protocol, which has multiple communication nodes, including some unidirectional communication nodes; the first control apparatus being used for: determining first configuration information in response to an operation of configuring communication nodes on a control apparatus triggered on account of the first end, wherein communication nodes included in the first configuration information are the communication nodes in the first communication protocol; in the process of data transmission in non-handshake connection with the first end, activating at least one first communication node on account of the first end according to the first configuration information, wherein the first communication node is of a node type that can reflect a data transmission function, which the first communication node enables the first end to perform; controlling the data transmission capability that the first end can have through each first communication node according to the node type of each first communication node;

a second control apparatus, which is in communication connection with the first control apparatus and the second end, and used for: verifying data sent by the first control apparatus when the data is received; sending the data to the second end after the verification is passed;

the second end, which is used for receiving the data sent by the second control apparatus.

In another embodiment of the present application, there is further provided a control apparatus, which comprises a processor and a memory, wherein: the memory is used for storing one or more computer instructions; the processor, coupled with the memory, is used for executing said one or more computer instructions to implement steps in the data transmission control method provided in the embodiments of the present application.

In another embodiment of the present application, there is further provided a computer-readable storage medium, which comprises computer programs or instructions, wherein steps of the data transmission control method provided in the embodiments of the present application can be implemented when the computer programs or instructions are executed by a processor.

Based on all the embodiments provided in the present application, it can be seen that:

in one technical solution provided in the embodiments of the present application, when the first end needs to transmit the first data block in the first data stream of the application to the second end, the first target header information is determined for the first data block on the basis of the determined first transaction information of the first transmission transaction corresponding to the first data stream; further, the first message to be sent is generated according to the first data block and the first target header information, and the first message is sent to the second end; in the above content, the first target header information is used for verifying whether the message meets the requirements, which enables this solution to realize security management of transmitted data content at relatively low costs;

in another technical solution provided by the embodiments of the present application, after the control apparatus connected to the first end obtains the first preset string (used for hiding the address information of the second end) corresponding to the second end in response to the first data block that is sent by the first end and needs to be transmitted to the second end, the address information of the second end can be obtained according to the first preset string, and the first data block is sent to the second end according to the address information of the second end; alternatively, when the first end needs to transmit the first data block to the second end, the first message to be sent can be generated according to both the obtained first preset identification (used for hiding the address information of the second end) corresponding to the second end and the first data block, and then the first message is sent to the second end through the corresponding control apparatus; the present solution uses the preset string (or the preset identification) to hide the address information of the corresponding end, so that the data initiating end cannot know the address of the target end, which can protect the address information of the target end; moreover, even if the initiating end is under malicious control, it is impossible to scan or detect other devices in the network, which can effectively prevent malicious attacks;

in another technical solution provided in the embodiments of the present application, the control apparatus is in communication connection with the first end on the basis of the first communication protocol, which has multiple communication nodes, including some unidirectional communication nodes; the control apparatus in communication connection with the first end will first determine the first configuration information in response to an operation of configuring the communication nodes on the control apparatus as triggered on account of the first end, and the communication nodes included in the first configuration information are the communication nodes in the first communication protocol; then, at least one first communication node will be activated on account of the first end according to the first configuration information, and the first communication node is of a node type that can reflect a data transmission function, which the first communication node enables the first end to perform; further, the data transmission capability that the first end can have through each first communication node can be controlled according to the node type of each first communication node; based on constraints of the communication protocol, the present solution realizes the activation control of the communication nodes on account of the first end by means of software control, thereby realizing the control of the data transmission capability of the first end by virtue of the communication nodes, e.g., controlling the first end to be able to uplink data unidirectionally, downlink data unidirectionally, or uplink and downlink data; the construction is simple, the implementation cost is low, and it is conducive to flexibly configuring the uplink and downlink data transmission capabilities of the first end according to different application service needs on the first end, without optical gates among others in the existing solutions, in which corresponding physical interfaces need to be further arranged to realize the transmission control according to needs.

DESCRIPTION OF FIGURES

For the sake of providing a clearer explanation of the technical solutions in the embodiments of the present application or in the prior art, a brief introduction will be given below to the FIGURES that need using to describe the embodiments or the prior art. It is obvious that the FIGURES described below relate to some embodiments of the present application. Without creative labor, those skilled in the art can further obtain other drawings according to these FIGURES.

FIG. 3*a*-1 to FIG. 5*e* are structure diagrams of data transmission systems provided in the embodiments of the present application;

MODE OF CARRYING OUT THE INVENTION

Figure 1:
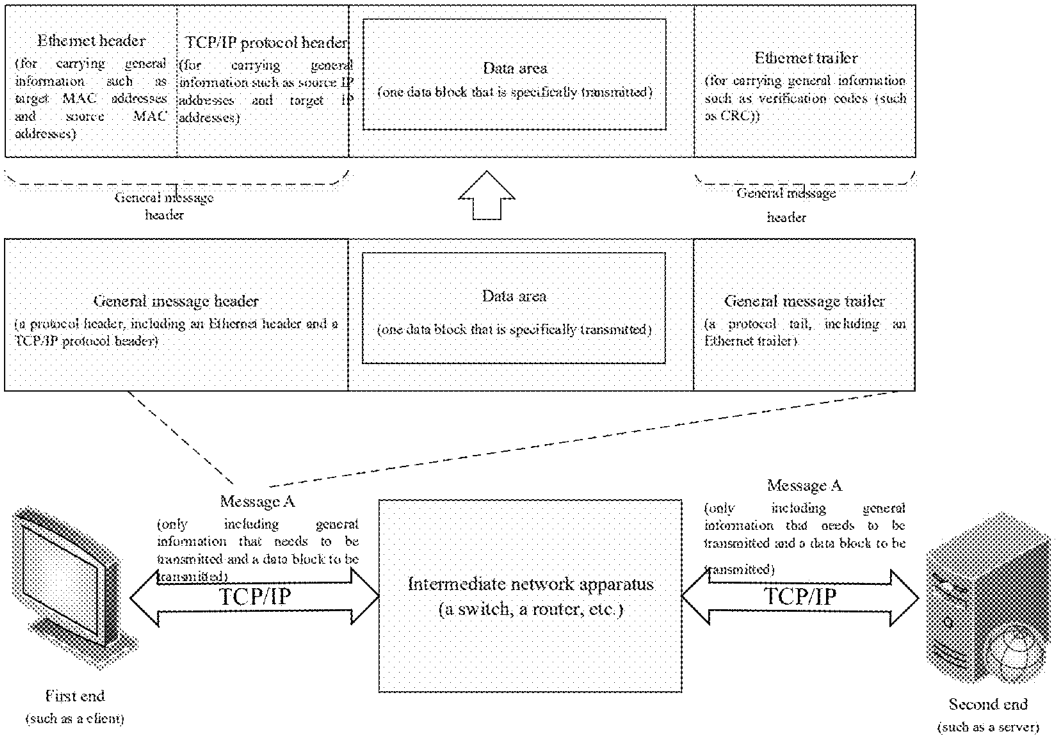
FIG. 1 is a principle diagram of the existing data transmission between different ends as provided in one embodiment of the present application.

At present, when data information is transmitted between different ends through a network, TCP/IP protocol, as well as network apparatuses (such as switches and routers) deployed between different ends, is mostly utilized for implementation. For example, referring to FIG. 1, the process of transmitting data between a first end and a second end by using the TCP/IP protocol is as follows: taking the first end as a client, the second end as a server, and the client requesting data resources on the server as an example, the client inputs the domain name of a website deployed on the server, www.####.com, and for the domain name www.####.com, sends a request to DNS (Domain Name System) (not shown in the FIGURE); the DNS resolves the domain name www.####.com into an IP address (which is a target IP address) of the server and feeds the IP address back to the client; the client generates a request message according to the IP address (which is a source IP address) of its own, the target IP address, and request parameters (i.e., a specific data block to be transmitted); since the request message needs to be sent to another subnet (which is a target subnet) where the server is located so as to be sent the server, the request message is often first sent to a switch; the switch writes a MAC (Medium/Media Access Control) address of its own and a MAC address of a corresponding gateway into a request packet; upon the completion of writing, the switch further sends the request message to the gateway (which is a special type of router) according to the MAC address of the gateway; then, through routing algorithms, the request message is continuously forwarded by routers until it is sent to the target subnet and arrives at the server. As can be seen from the above example, at present, direct employment of the TCP/IP protocol for data transmission between different ends merely relates to simply combining some general information such as the source IP address, target IP address, source MAC address, and target MAC address that need to be used in the data transmission with data to be transmitted, and generating a corresponding message to realize the data transmission, without considering problems on the data transmission security. For the specific content included in the message, see the specific content of the message A shown in FIG. 1. In summary, from the perspective of network communication protocols, due to lack of consideration for security problems in the design of the TCP/IP protocol, the above solution of directly using the TCP/IP protocol for data transmission between different ends suffers from the following defects.

1. It is Impossible to Perform Security Management on Transmitted Data Content.

The TCP/IP protocol is a protocol family for realizing data information transmission between multiple different networks. It tends to take responsibility for data transmission alone, and is not responsible for results of the data transmission, nor can it recognize the content or type of transmitted data. As a result, malicious applications can launch network attack traffic, and data security cannot be guaranteed. For example, referring to FIG. 1 again, the client and the server that use the TCP/IP protocol are in direct communication connection with each other, and if one end, either the client or the server, sends malicious instruction data, the other end will automatically receive and execute (or process) the instruction data.

2. It is Impossible to Block Malicious Attacks and Difficult to Manage Network Services.

Since the TCP/IP protocol is open, different apparatuses in the same network can access each other. Consequently, malicious attacking ends (hackers) can launch malicious behaviors, such as scanning and attacking other apparatuses in the network, by controlling one apparatus in the network and using the apparatus as a jump server. In addition, as long as one apparatus in the network enables a network service port, it can be accessed by other apparatuses in the network, which makes it difficult to manage network services. For example, referring to FIG. 1 again, if the server enables a network service port, it can be accessed by the client, and further, there may exist cases, e.g., there may exist unauthorized setups of services such as FTP (File Transfer Protocol) and file sharing, or the open server may be accessed or attacked by a malicious client, or a server exhibiting malicious behaviors may attack or access the client.

3. The Driver Program of the TCP/IP Protocol is Universal, Making it Easy to have Apparatuses Controlled.

The driver program of the TCP/IP protocol is generally a common public interface (network access API) program for network communication of an operating system of a computer apparatus. The common public interface program is generally unrestricted, and can be called by any program (such as network interfaces of a computer), which makes it easy to have apparatuses in the network controlled. For example, if one computer apparatus in the network is controlled by malicious software such as Trojan horses and viruses, the network card interface of the computer apparatus can be directly used for communication, which causes the computer apparatus to be controlled; even worse, the computer apparatus may be controlled to launch malicious attacks on other apparatuses in the network.

4. There Exists a Risk of Data Leakage.

Since the TCP/IP protocol is bidirectional, different ends in direct communication connection by using the TCP/IP protocol can receive and send data. Therefore, an apparatus side that only needs to receive data can also send data to the outside world, which may pose a risk of data leakage. For example, referring to FIG. 1 again, both the client and the server in direct communication connection by using the TCP/IP protocol can receive and send data; if it is assumed that the server only needs to receive data, then when the client accesses the server to obtain data on the server, the server can also respond to the access of the client and send corresponding data to the client; accordingly, if the server is controlled by a malicious program, it will also cause data leakage on the client.

To solve or partially solve some problems existing in directly using the TCP/IP protocol for data transmission between different ends as mentioned above, currently, there exist several main solutions as follows.

The first one is a solution of protection through communication hardware. To be specific, it is to deploy a network security firewall within the network. Various types of existing network security firewalls are mainly divided into two categories: access control firewall and content security firewall. The access control firewall is to make arrangement whether to carry out communication between different apparatus in the network in a manner of policies, e.g., setting blacklists and white lists (such as source IP address and source port, target IP address (also known as destination IP address) and destination port). The arrangement manner of the access control firewall as mentioned above makes it difficult for maintenance technicians to fully implement access control in large network environments. It is inevitable that oversights may occur, leaving vulnerabilities in policy settings, thereby easily causing malicious individuals to gain unauthorized access to apparatuses within the network. The content security firewall is a type of firewall that detects the communication content in possession (such as source IP address and source port, target IP address (also known as destination IP address) and target port, and communication data content) in a manner of recognition with sample databases of malicious programs such as Trojans and viruses, threat IP databases, suspicious behavior databases, and the like, so as to prevent malicious communication access. The problems existing in the above content security firewall are as follows: since sample libraries of malicious programs and threat IPs among others tend to be results of analyzing past attack behaviors, the discovery is relatively delayed and needs to be updated; as a consequence, malicious individuals can launch attacks by using corresponding time differences before updates; in addition, it is also impossible to detect and discover unknown malicious behaviors; moreover, since firewalls are generally sold or downloaded publicly, malicious individuals can make analysis on the basis of the sample libraries of the firewalls, and bypass the firewalls (by "anti-detection" technology) and launch attacks in a manner of modifying program characteristics and data traffic characteristics among other characteristics of the malicious programs; in addition, transmission protocols between applications in a network system are proprietary, and developers are free to agree thereon; since the developers are large in number and the network system is complex and ever-changing, there are difficulties in the firewalls analyzing the protocols one by one, which makes it almost impossible to perform effective resolution, audit, or interception on the communication content.

The second one is a solution of security protection for apparatuses. To be specific, security protection software can be installed on the apparatuses. For example, referring to FIG. 1 again, such manners as installing antivirus software, deploying security control management systems, and making domain control configuration on the server or the client can be used to ensure the security of the server or the client. The problems existing in the manner of using the antivirus software as mentioned above are similar to those existing in the content security firewall: the antivirus software can only scan and remove the existing viruses or malicious behaviors, and malicious individuals can also bypass the antivirus software in a manner of modifying the program characteristics and data traffic characteristics among others of the malicious programs, to launch attacks. Such manners as deploying security control management systems, and making domain control configuration are to delegate the operational permissions of ordinary apparatuses within the network to a main control apparatus, so as to realize access control of the ordinary apparatuses, resource access control thereof, or software update package distribution thereto, etc. However, when the main control apparatus is attacked and controlled by malicious individuals, there is a risk that all the ordinary apparatuses may be maliciously controlled.

The third one is an apparatus that meets the unidirectional data transmission requirement within the network in a control manner of physical isolation. For example, in some data transmission application scenarios with relatively high requirements on the network security, unidirectional transmission of network data is often required. For these scenarios, the control manner of physical isolation is often used to control the implementation of unidirectional transmission of network data at present. However, this manner needs to use unidirectional transmission control apparatuses on the physical plane, such as unidirectional optical gates and optical codes (QR codes), which will involve modifications to communication on the physical plane. In addition, there exist several problems as follows.

1) When using unidirectional transmission control apparatuses (such as optical gates and optical codes (QR codes)) among others to achieve unidirectional data transmission control, since unidirectional transmission of data is realized in the control manner of physical isolation, physically, unidirectional reception or unidirectional sending of data can be controlled and realized only in a unitary manner, and it is impossible to make flexible configurations such as unidirectional sending, unidirectional reception, and bidirectional transmission of data according to different service requirements. For example, unidirectional optical gates tend to be equipped with corresponding physical interfaces according to data transmission control requirements, so as to achieve unidirectional transmission control through the physical interfaces. The physical limitation makes it difficult to change functions of the unidirectional optical gates and the like after leaving the factory. Therefore, it is difficult to flexibly control the data transmission capability that the first end can perform according to actual data transmission control requirements through the unidirectional optical gates and the like.

2) As the above unidirectional transmission control apparatuses tend to have a relatively complex structure (e.g., the apparatuses need to have optical modules, optical splitter modules, or image displaying or receiving modules), the apparatuses are high in manufacturing cost, large in volume, complex in configuration, and limited in range of application (the range of application is relatively small). Meanwhile, it is further necessary to provide multiple servers for cooperation, and in general, the apparatuses are only deployed at switch access boundaries of large networks (network-level deployment). For example, it is necessary to transmit data out of an intranet and transmit data from an external network, and it is also necessary to deploy two sets of transmission systems comprising external network servers, unidirectional optical gateway apparatuses, and intranet exchange servers, thus the deployment cost is high; in the meantime, due to the network-level deployment, it is relatively complex to adjust requirements of data exchange; moreover, the network-level deployment is only responsible for data exchange between the internal network and the external network, and does not play a role in data security control of a single terminal apparatus within the network. Further, limited by factors such as cost and apparatus volume, basically, the unidirectional transmission control apparatuses (such as office computers of employees and application servers) are not equipped in usage scenarios of a single client or server (standalone deployment), which often makes it difficult to perform effective control management on the security of data in a single terminal.

The above unidirectional optical gate is an apparatus that can transmit data information from a low-density network (public network) to a high-density network (intranet/private network) reliably and unidirectionally.

Based on the above analysis, to solve the problems in the existing network communication protocols (TCP/IP protocol), network security protection measures, and security protection software among others, the embodiments of the present application provide new technical solutions of data transmission. Specifically, the technical solutions are put as follows.

One technical solution is to use target header information determined for the data to be transmitted on the basis of transaction information of a transmission transaction to which data to be transmitted belongs to structure the data to be transmitted, and use the structured data to be transmitted in the network to carry out transmission. In the above solution, it can be ensured that only data that meets requirements in given structured rules are allowed to be transmitted and exchanged in the network, which can achieve security management of transmitted data content in a relatively simple and low-cost way, and effectively enhance the protection and control capabilities of data security in the data transmission process.

Another technical solution is to use preset strings (or preset identifications) to hide address information of corresponding ends, so that the data initiator cannot know the address of the target end, which can protect the address information of the target end. Moreover, even if the initiator is maliciously controlled, it is impossible to scan or detect other apparatuses on the network, which can effectively prevent malicious attacks.

Another technical solution is that on the basis of a communication protocol with a certain end, a control apparatus realizes control over the data transmission capability that said certain end can perform on another target end, e.g., controlling to only have the capability of unidirectional uplink data transmission, only have the capability of unidirectional downlink data transmission, or have the capability of bidirectional uplink and downlink data transmission. Compared with the existing control manner of using physical isolation to realize unidirectional data transmission between different ends, the solution provided by the present application is simple in construction and low in implementation cost when serving to achieve functions such as unidirectional data transmission. Moreover, the direction of the communication between different ends (i.e., data transmission direction) can be further adjusted flexibly. In other words, the solution can make flexible configurations such as unidirectional sending, unidirectional reception, and bidirectional transmission of data according to different service requirements, and can be applied in scenarios featured with unidirectional data transmission and relatively high security requirements.

It should be added that on the basis of the concept of the present invention, various embodiments of the three technical solutions as mentioned above can be used individually, in combination, or by incorporation into each other, and they can also be split up and used in recombination. The present application does not impose any limitations thereon. Additionally, the solution of the present application realizes low-cost security control and has a wide range of application. In addition to the TCP/IP protocol, it can also be applied to various types of data transmission protocols.

In order that persons skilled in the art have a better understanding of the technical solutions of the present application, the technical solutions in the embodiments of the present application will be clearly and completely described below in combination with the drawings.

Before introducing the solutions of the present application, some terms involved in the present application as a whole will be explained and declared first.

Both "preset identification" and "preset string" are a communication identifier, but the "communication identifier" has different expressions in different embodiments. They are mainly used for indicating target address information. According to different embodiments, the specific form of expression thereof can be a string, a binary value, etc., and the generation manner thereof can be a random value or a given rule value, or can directly be target address information. Herein, limitations are not imposed thereon. The main function thereof is to hide the target address. If there is no need to hide the target address, they can also be relevant information of the target address. As such, the "preset identification" and the "preset string" are equivalent to each other; regarding the content relevant to the two, reference can be made to each other. To avoid redundancy, in general, the present application does not give expression to them simultaneously. Additionally, in some embodiments, circumstances based on the "preset identification" are also equivalent to those based on transmission transaction attribute (which has the indicated target address information). For example, in some embodiments of the solution based on a communication protocol between a control apparatus and a certain end, even though the expression is based on the "preset identification", it can also be based on equivalents such as the "transmission transaction attribute" in practice. To avoid redundancy, instead of them, the "preset identification" is used for description.

Before introducing the method embodiments provided in the present application, the system architectures on which the technical solutions provided in the present application can be based are explained first.

Figures 1, 3A:
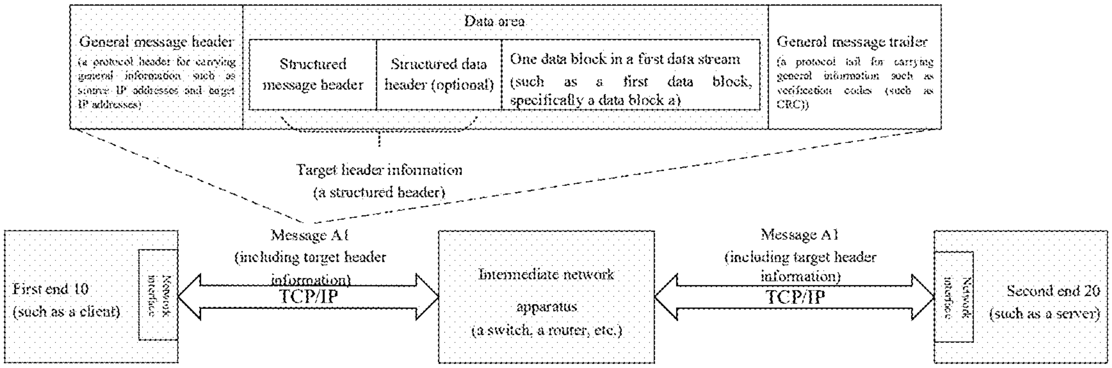
Figure 5A:
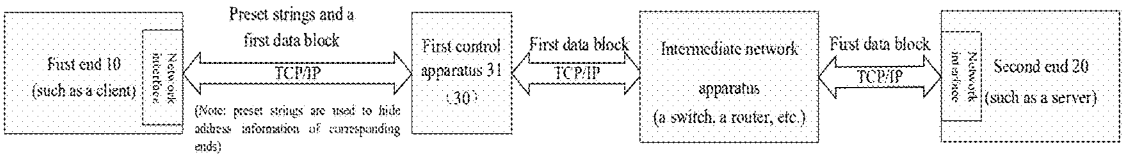
Figure 5B:
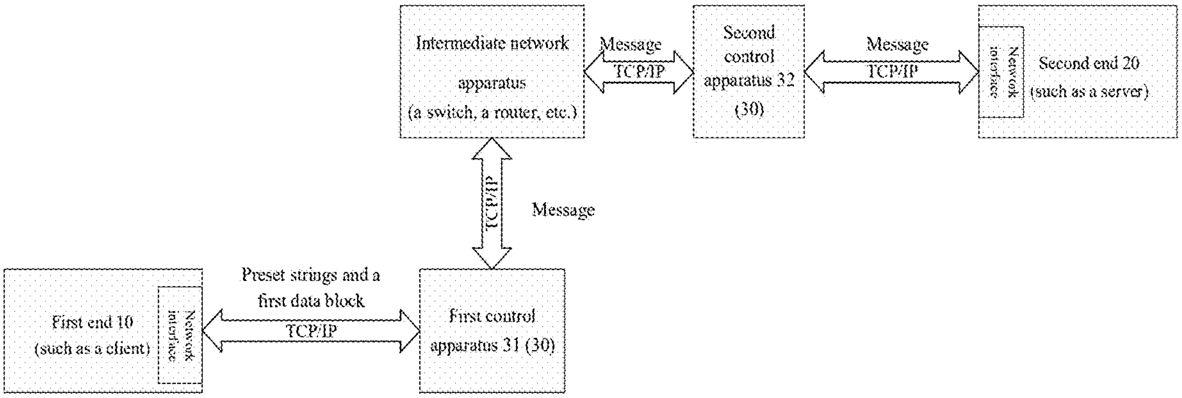
Figure 5C:
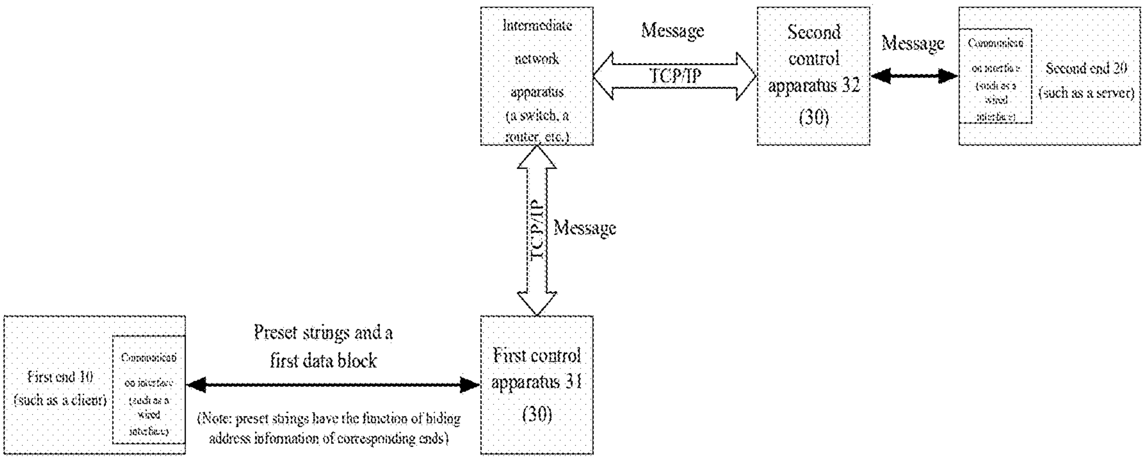
Figure 5D:
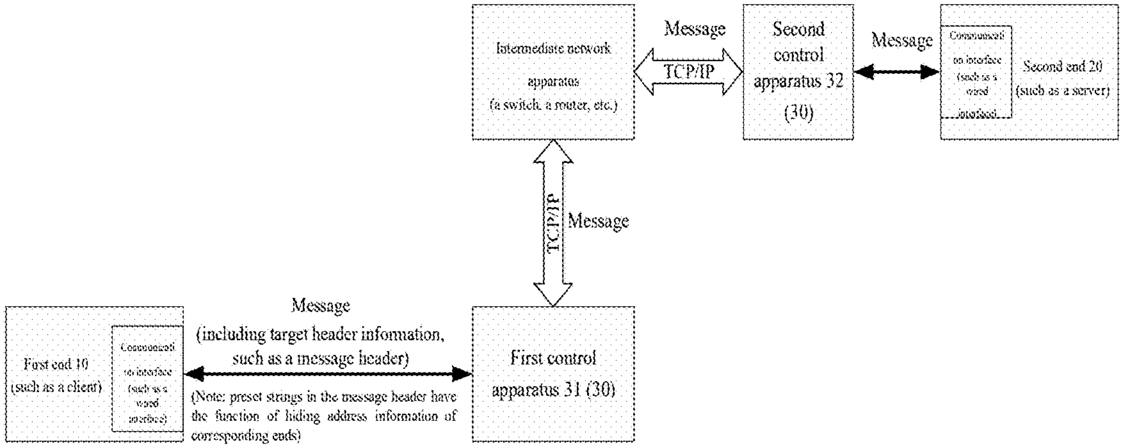
Figure 5E:
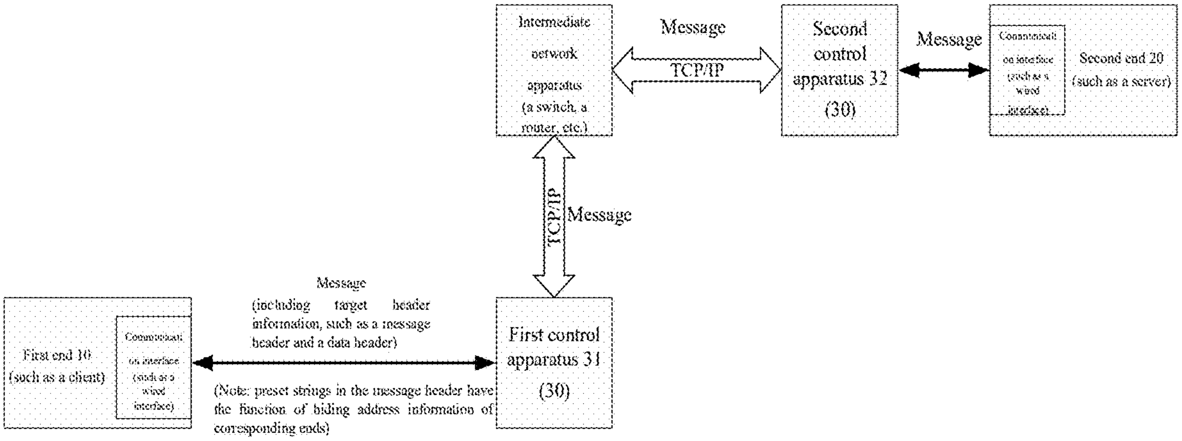

Specifically, the methods provided in the embodiments of the present application can be implemented on the basis of the system architectures shown in FIG. 3a-1 to FIG. 5e. In the structure diagram of a data transmission system provided in an embodiment of the present application as shown in FIG. 3a-1, the data transmission system comprises a first end 10 and a second end 20, wherein, the first end 10 is used for: determining that a first data stream corresponds to first transaction information of a first transmission transaction; when a first data block of the first data stream needs to be transmitted to a second end 20, determining first target header information for the first data block on the basis of the first transaction information; generating a first message to be sent according to the first data block and the first target header information; sending the first message to the second end 20; wherein the first target header information is used for verifying whether the first message meets requirements;

the second end 20 is used for: verifying the target header information included in the first message as received and determining whether the first message meets the requirements; if yes, obtaining and caching the first data block from the first message.

In specific implementation, the first end 10 and the second end 20 as mentioned above are data ends that need to conduct data exchange, and the types thereof can be identical or different. For example, one of the first end 10 and the second end 20 can be a client, and the other can be a server; alternatively, both the first end 10 and the second end 20 are clients; alternatively, both the first end 10 and the second end 20 are servers. Herein, limitations are not imposed thereon. The diagram in FIG. 3*a*-1 schematically shows an example where the first end 10 is a client and the second end 20 is a server. Wherein the above client can be any apparatus such as desktop computers with (or without) operating systems, smartphones, laptops, tablets, industrial control apparatuses, embedded apparatuses, smart wearable apparatuses (such as smartwatches), and smart Internet-of-Things (IoT) apparatuses. The smart IoT apparatuses can include, but are not limited to: smart household appliances (such as smart speakers and smart refrigerators), autonomous vehicles, etc. The above server can be a physical server, a virtual server, a container server, a cloud service platform, etc. In the present embodiment, limitations are not specifically imposed thereon.

As shown in FIG. 3*a*-1, in the first implementable technical solution, TCP/IP protocol is still used between the first end 10 and the second end 20, and they are in direct communication connection through intermediate network apparatuses such as switches and routers. Specifically, the first end 10 and the second end 20 each can use network interfaces of their own to be in communicate connection with corresponding intermediate network apparatuses by using TCP/IP protocol, thereby realizing the communication connection therebetween. Wherein the network interfaces can be, but are not limited to, Ethernet interfaces. However, different from the existing manner of, when using the TCP/IP protocol to transmit data, simply generating a corresponding message according to some general information that need to be used in data transmission, such as source IP address, target IP address, source MAC address, and target MAC address, and a data block to be transmitted (for details, see the relevant content in FIG. 1) to realize data transmission, the present embodiment ensures data transmission security in a manner of, when a data block a needs to be transmitted to the second end 20, determining corresponding target header information for the data block a on the basis of transaction information of a transmission transaction to which the data block a belongs, and generating a corresponding message to be sent on the basis of the target header information and the data block a, so as to realize the transmission of the data block a. In the above content, the transmission transaction to which the data block a belongs, refers to a transmission transaction corresponding to a data stream to which the data block a belongs. The position of the above target header information in the message can be any one of the following positions: a position between the message header (general message header as shown in FIG. 3*a*-1) and the message trailer (general message trailer as shown in FIG. 3*a*-1), a position in the message header, or a position in the message trailer. The above target header information located between the message header and the message trailer more specifically means the target header information located at a position in a data area in the message (as shown in FIG. 3*a*-1). Alternatively, from the perspective of the transmission protocol, the target header information is located at a position in a data area of the transmission protocol. The position of the data block a in the message is not specifically limited in the embodiment of the present application. In general, the data block a is located at a position in the data area in the message.

Wherein in addition that the above message header comprises the general message header (such as Ethernet headers and TCP/IP protocol headers), it can also comprise a custom header in some other embodiments; and/or, in addition that the above message trailer comprises the general message trailer (such as Ethernet trailers), it can also comprise a custom trailer in some other embodiments. The custom header and the custom trailer can be customized by users according to actual needs.

FIG. 3*a*-1 shows one example where the data block a and the corresponding target header information are both located between the message header and the message trailer (i.e., both are located at positions in the data area). Moreover, in the example shown in FIG. 3*a*-1, the target header information is close to the message header and on the left side of the data block a. Of course, in other examples, the target header information can also be close to the message trailer and on the right side of the data block a.

As can be learned in combination with FIG. 1, the general message header comprises an Ethernet header and a TCP/IP protocol header. Wherein the format of the TCP/IP protocol header is shown in Table 0 as follows:

TABLE 0

| Format of TCP/IP Protocol Header | | | | | | | |
|---|---|---|---|---|---|---|---|
| | Source Port | | | | | | Destination Port |
| | | | | Serial Number | | | |
| | | | | Confirmation Number | | | |
| Data Offset | Reservation | URG | ACK | PSH | SYN | FIN | Window |
| | Checksum | | | | | | Urgent Pointer |
| | Selectable Option (Variable Length) | | | | | | Filling of Selectable Option |

The above reserved fields are mainly used by new features or extensions in the future, and usually set to 0. When the TCP protocol needs to be extended to add new features, the reserved setting is not 0.

The above selectable option fields are mainly used when the sender and receiver negotiate the maximum message length or when acting upon adjustment factors in high-speed network environments. They can also be used to store other data, such as timestamps.

For a detailed description of the contents included in the TCP/IP protocol header except reserved bits and selectable options, see the existing relevant content.

Figures 2, 3A:
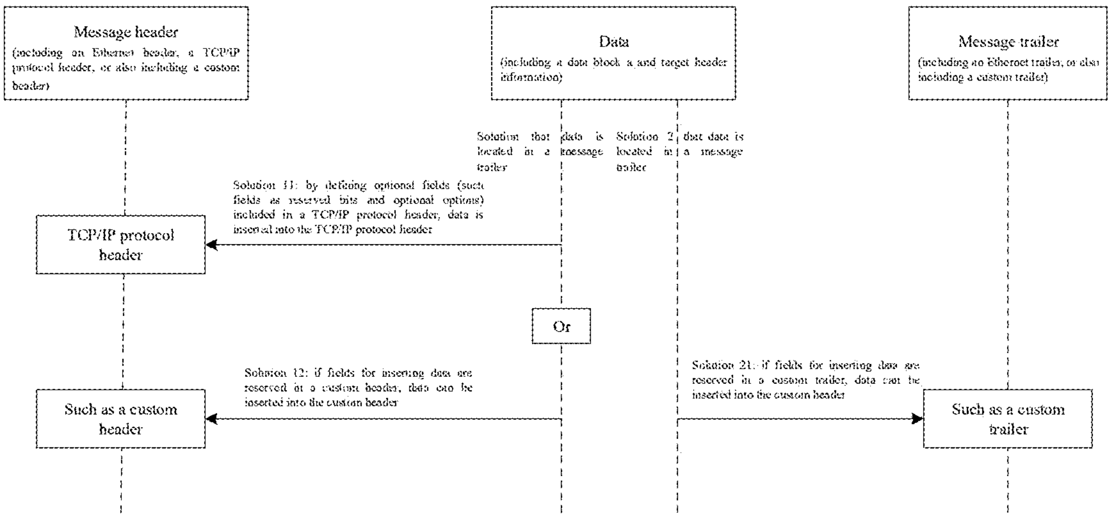

Based on the content, in combination with the contents that can be included in the message header and the message trailer as described above and the disclosure shown in FIG. 3*a*-2, several examples are given to explain why the target header information can be located in the message header and the message trailer in the message. Specifically:

Example 0A1: The target header information of the data block a can be inserted into the message header by applying protocol definition to some customizable fields included in the TCP/IP protocol header. For example, the reserved field in the TCP/IP protocol header can be set to non-zero, so as to extend and obtain one new function, thus the target header information of the data block a can be inserted at the position of the reserved field. For example, the selectable option field included in the TCP/IP protocol header can be defined according to the data length of the target header information of the data block a, so that the target header of the data block a can be inserted at the data filling position of the selectable option. In this way, the target header information of the data block a can be located in the TCP/IP protocol header, so as to achieve the purpose of being located in the message header.

Example 0A2: If the message header comprises a custom header and a field for inserting the target header information of the data block a is reserved in the custom header, the target header information of the data block a can be inserted into the custom header, so as to achieve the purpose that the target header information of the data block a is located in the message header. Of course, for the same reason, and/or the data block a can also be inserted into the custom header, so as to achieve the purpose that the data block a and/or the corresponding target header information are/is located in the message header.

Example 0A3: If the message trailer comprises a custom trailer and a field for inserting the target header information of the data block a is reserved in the custom trailer, the target header information of the data block a can be inserted into the custom trailer, so as to achieve the purpose that the target header information of the data block a is located in the message trailer. Of course, for the same reason, and/or the data block a can also be inserted into the custom trailer, so as to achieve the purpose that the data block a and/or the corresponding target header information are/is located in the message trailer.

It should be added that through the same principle of inserting the target header information into the message header or the message trailer as described in the above examples 0A1 to 0A3, the data block a can also be inserted into the message header or the message trailer. For example, in the above example 0A1, the reserved field and the selectable option field included in the above TCP/IP protocol header can also be defined simultaneously, thus it can be realized that one is used for inserting the data block a and the other is used for inserting the target header information corresponding to the data block a; in this way, it can also be realized that the data block a is located in the message header. For another example, by defining the reserved field or the selectable option field in the TCP/IP protocol header, it can be realized that the target header information of the data block a is inserted into the TCP/IP protocol header; moreover, if the message trailer comprises a custom trailer and a field for inserting the data block a is reserved in the custom trailer, the data block a can be inserted into the custom trailer, so as to achieve the purpose that one of the data block a and the corresponding target header information is located in the message header and the other is located in the message trailer; if the message trailer only comprises an Ethernet trailer, or if it further comprises a custom trailer but a field for inserting the data block a is not reserved in the custom trailer, then the data block a is located between the message header and the message trailer (i.e., located at a position in the data area of the message), so as to achieve the purpose that one of the data block a and the corresponding target header information is located in the message header and the other is located between the message header and the message trailer.

As can be seen from the above examples, as long as there are optional vacancies (which can be customized or compatible with relevant protocols (such as the reserved field or the selectable option field in the TCP/IP protocol header) in the message header and/or the message trailer, it can be realized that data (such as the data block a to be transmitted and/or the corresponding target header information) can be inserted into the corresponding message header or message trailer.

A data stream represents one data sequence, which comprises one or more data blocks. For example, when data such as a relatively large file, an audio or video stream, and a multimedia stream with a non-specific length needs to be transmitted, the file data tends to be divided into several data blocks, and these data blocks are combined into one data sequence, so as to realize the transmission of the file, the audio or video stream, the multimedia stream with a non-specific length or the like in a streaming manner.

In the present embodiment, a transmission transaction is a unidirectional communication transmission behavior, and is indicative of and useful for completion of one specific transmission task. Specifically, the transmission transaction can be understood as a set of logically interrelated transmission operations, and the execution of one transmission operation serves to transmit one data block to be transmitted. Wherein during the transmission of one data block to be transmitted, the solution provided in the present embodiment will be used to generate a corresponding message for the data block to be transmitted, so as to carry out the transmission. The specific structure and format of the generated message will be described below in detail. For example, referring to FIG. 3*a*-1, the first end 10 needs to transmit one file data stream (such as a data stream corresponding to a file, "financial statements .xls") to the second end 20, and the transmission of the file data stream corresponds to one transmission transaction, and the execution of one transmission operation in the transmission transaction can only lead to the transmission of one data block in the file data stream; further, after it finishes receiving the file data stream, the second end 20 returns a response message of successful receiving the file data stream to the first end 10, which is another transmission transaction. As can be seen from the above example, transmission transactions are different at different ends (such as clients and servers).

Of course, optionally, in some other embodiments, the transmission transaction can also be a bidirectional communication transmission behavior, without differences at a client, a server, and the like. Herein, limitations are not imposed thereon.

Figure 2A:
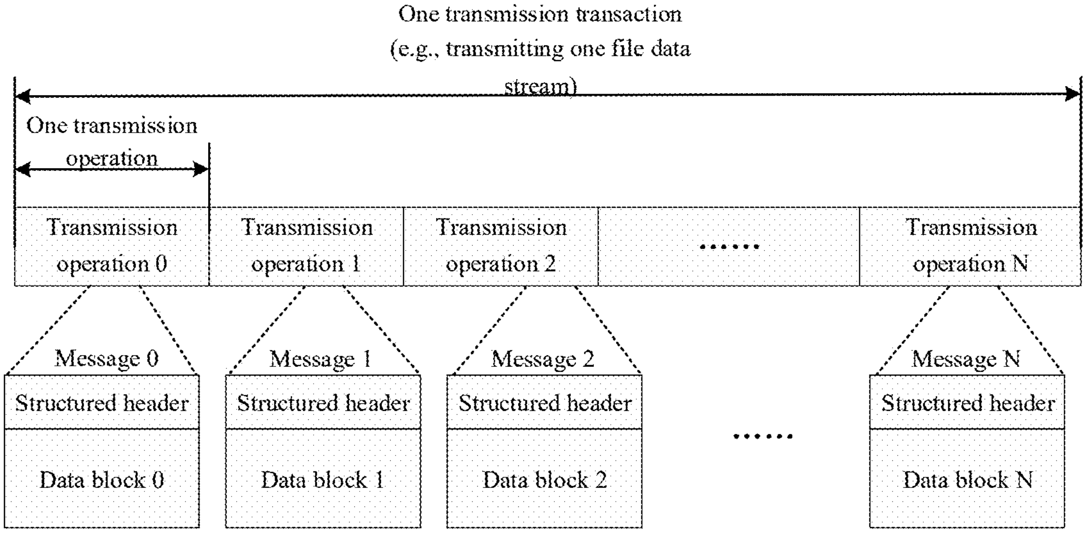
FIG. 2*a* is a principle diagram of a transmission transaction provided in one embodiment of the present application.
Figure 2B:
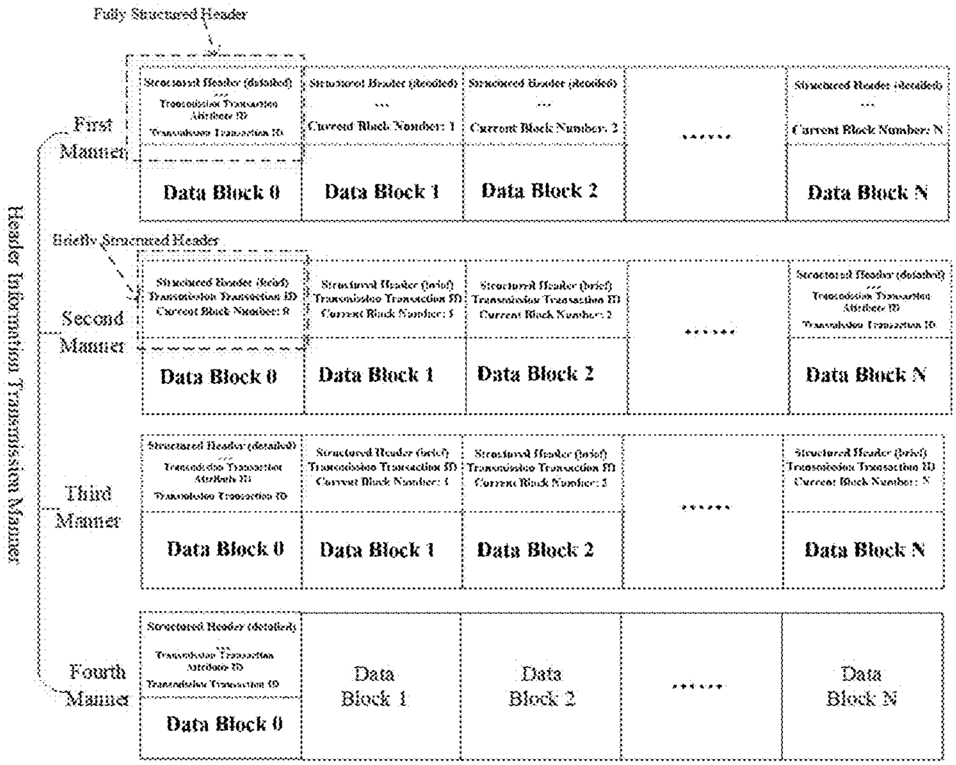
FIG. 2*b* is a principle diagram of a transmission manner corresponding to FIG. 2*a* as provided in one embodiment of the present application.

FIG. 2*a* is a principle diagram of a transmitting transaction, wherein the structured headers included in the message as shown therein are the target header information determined for the corresponding data blocks to be transmitted in the context of the present embodiment, but different ways of expression are used in different description scenarios. FIG. 2*b* shows three different transmission modes (a first mode, a second mode, and a third mode) for FIG. 2*a*. The specific introduction of the three transmission modes and the contents that can be included in the structured headers will be expanded in detail when "target header information" is described below.

When configurations are made for the data transmission and exchange between the first end 10 and the second end 20 in the present embodiment, relevant information of the corresponding transmission transaction will also be configured for the data transmission and exchange between the first end 10 and the second end 20, such as transmission transaction attribute information of the transmission transaction and the correspondence between the transaction type and the transaction attribute identification (also known as the transaction attribute unique identification). Wherein the transmission transaction attribute information of one transmission transaction comprises the following contents as shown in Table 1a. Table 1b shows an example of a collection of preset transmission transaction attribute information provided in the embodiments of the present application.

TABLE 1a

Transmission transaction attribute information

| Attribute field: | | Field value type: |
|---|---|---|
| Transaction attribute name | | String |
| Transaction annotation | | String |
| Transaction-associated preset string (also known as communication identifier) | | 32 |
| Transaction attribute identification (also known as transaction attribute unique identification) | | 32 |
| Transaction usage role (also known as identity information of transaction creator) | | 16 |
| Transaction attribute type | | 16 |
| Grouping code | First-class code | 16 |
| | Second-class code | 16 |
| | Third-class code | 16 |
| Verification information (such as verification code) | | String |

TABLE 1b

Collection of transmission transaction attribute information of multiple transmission transactions

| Group number | Group remarks | Transaction attribute name | Transaction annotated information | Associated preset string (communication identifier) | Transaction unique identification | Transaction usage role |
|---|---|---|---|---|---|---|
| 1 | File exchange | Requesting network resources | Client request | 0x47 0xec 0x47 0xf4 | 0x36 0xe1 0x31 0xf1 | 0x00 0x01 |
| | | Uploading JPG files | Server response | 0x47 0xec 0x47 0xf4 | 0x36 0xe1 0x31 0xf2 | 0x00 0x00 |
| 2 | Web browsing | Requesting hypertext resources | Client request | 0x47 0xec 0x47 0xf5 | 0x36 0xe1 0x31 0xf3 | 0x00 0x01 |
| | | Uploading HTML data | Server response | 0x47 0xec 0x47 0xf5 | 0x36 0xe1 0x31 0xf4 | 0x00 0x00 |
| 3 | Database operation | Database operation request | Client request | 0x47 0xec 0x47 0xf6 | 0x36 0xe1 0x31 0xf5 | 0x00 0x01 |
| | | Database response | Server response | 0x47 0xec 0x47 0xf6 | 0x36 0xe1 0x31 0xf6 | 0x00 0x00 |
| 4 | http API operation | API operation request | Client request | 0x47 0xec 0x47 0xf7 | 0x36 0xe1 0x31 0xf7 | 0x00 0x01 |
| | | Server response | Server response | 0x47 0xec 0x47 0xf7 | 0x36 0xe1 0x31 0xf8 | 0x00 0x00 |
| 5 | E-mail exchange for sending e-mail | Sending e-mail | Client request | 0x47 0xec 0x47 0xf8 | 0x36 0xe1 0x31 0xf9 | 0x00 0x01 |
| | | Returning e-mail status | Server response | 0x47 0xec 0x47 0xf8 | 0x36 0xe1 0x31 0xfA | 0x00 0x00 |

TABLE 1b-continued

| Collection of transmission transaction attribute information of multiple transmission transactions | | | | | | |
|---|---|---|---|---|---|---|
| 6 | E-mail exchange for obtaining e-mail list | Requesting e-mail list | Client request | 0x47 0xec 0x47 0xf8 | 0x36 0xe1 0x31 0xfB | 0x00 0x01 |
| | | Server return | Server response | 0x47 0xec 0x47 0xf8 | 0x36 0xe1 0x31 0xfC | 0x00 0x00 |
| 7 | E-mail exchange for e-mail reception | Requesting e-mail file body | Client request | 0x47 0xec 0x47 0xf8 | 0x36 0xe1 0x31 0xfD | 0x00 0x01 |
| | | Server return | Server response | 0x47 0xec 0x47 0xf8 | 0x36 0xe1 0x31 0xfE | 0x00 0x00 |
| 8 | Instant messaging for obtaining friends list | Requesting friend list | Client request | 0x47 0xec 0x47 0xf9 | 0x36 0xe1 0x31 0xf0 | 0x00 0x01 |
| | | Returning friends list | Server response | 0x47 0xec 0x47 0xf9 | 0x36 0xe1 0x31 0xf1 | 0x00 0x00 |
| 9 | Instant messaging for obtaining new message | Requesting new message list | Client request | 0x47 0xec 0x47 0xf9 | 0x36 0xe1 0x31 0xf2 | 0x00 0x01 |
| | | Returning new message list | Server response | 0x47 0xec 0x47 0xf9 | 0x36 0xe1 0x31 0xf3 | 0x00 0x00 |
| 10 | Instant messaging for sending text message | Sending text message | Client request | 0x47 0xec 0x47 0xf9 | 0x36 0xe1 0x31 0xf4 | 0x00 0x01 |
| | | Returning sending status | Server response | 0x47 0xec 0x47 0xf9 | 0x36 0xe1 0x31 0xf5 | 0x00 0x00 |
| 11 | Instant messaging for account login | Requesting login | Client request | 0x47 0xec 0x47 0xf9 | 0x36 0xe1 0x31 0xf6 | 0x00 0x01 |
| | | Returning login status | Server response | 0x47 0xec 0x47 0xf9 | 0x36 0xe1 0x31 0xf7 | 0x00 0x00 |
| 12 | Instant messaging for account logout | Requesting logout | Client request | 0x47 0xec 0x47 0xf9 | 0x36 0xe1 0x31 0xf8 | 0x00 0x01 |
| | | Returning logout status | Server response | 0x47 0xec 0x47 0xf9 | 0x36 0xe1 0x31 0xf9 | 0x00 0x00 |
| 13 | Network Testing | Returning network testing data | Client request | 0x47 0xec 0x47 0xfa | 0x36 0xe1 0x31 0xfA | 0x00 0x01 |
| | | Responding to network testing data | Server response | 0x47 0xec 0x47 0xfa | 0x36 0xe1 0x31 0xfB | 0x00 0x00 |
| 14 | Binary data structure | Sending binary data | Client request | 0x47 0xec 0x47 0xfb | 0x36 0xe1 0x31 0xfC | 0x00 0x01 |
| | | Responding to binary data | Server response | 0x47 0xec 0x47 0xfb | 0x36 0xe1 0x31 0xfD | 0x00 0x00 |
| 15 | Unidirectional transmission of data | Sending binary data | Unidirectional sending | 0x47 0xec 0x47 0xfc | 0x36 0xe1 0x31 0xfE | 0x00 0x01 |

TABLE 1b-continued

Collection of transmission transaction attribute information of multiple transmission transactions

| | | | | | | |
|---|---|---|---|---|---|---|
| 16 | Unidirectional reception of data | Receiving binary data | Unidirectional reception | 0x47 0xec<br>0x47 0xfb | 0x36<br>0xe1<br>0x31<br>0xfF | 0x00<br>0x00 |

| Group number | Transaction attribute type | First-class code | Second-class code | Third-class code | Verification information (such as verification code) | Extended data header unique identification |
|---|---|---|---|---|---|---|
| 1 | 0x01<br>0x01 | 0x00 | 0x00 | 0x00 | GETFILE | Null |
| | 0x02<br>0x10 | 0x00 | 0x00 | 0x00 | 0xFF<br>0xDB<br>0xFF<br>0xE0 | Null |
| 2 | 0x00<br>0x01 | 0x00 | 0x00 | 0x00 | GETHTML | Null |
| | 0x00<br>0x00 | 0x00 | 0x00 | 0x00 | <html> | Null |
| 3 | 0x04<br>0x01 | 0x00 | 0x00 | 0x00 | SQL | Null |
| | 0x01<br>0x00 | 0x00 | 0x00 | 0x00 | JSONSQL | Null |
| 4 | 0x00<br>0x01 | 0x00 | 0x00 | 0x00 | HTTPAPI | Null |
| | 0x00<br>0x00 | 0x00 | 0x00 | 0x00 | JSONAPI | Null |
| 5 | 0x03<br>0x11 | 0x00 | 0x00 | 0x00 | EMLNew | Null |
| | 0x00<br>0x00 | 0x00 | 0x00 | 0x00 | JSONEMLNew | Null |
| 6 | 0x00<br>0x01 | 0x00 | 0x00 | 0x00 | GETMaiLList | Null |
| | 0x00<br>0x00 | 0x00 | 0x00 | 0x00 | JSONEMLList | Null |
| 7 | 0x00<br>0x01 | 0x00 | 0x00 | 0x00 | GETEML | Null |
| | 0x03<br>0x10 | 0x00 | 0x00 | 0x00 | EMLDump | Null |
| 8 | 0x00<br>0x01 | 0x00 | 0x00 | 0x00 | GETMessageFriends | Null |
| | 0x00<br>0x00 | 0x00 | 0x00 | 0x00 | JSONMessageFriends | Null |
| 9 | 0x00<br>0x01 | 0x00 | 0x00 | 0x00 | GETMessageNew | Null |
| | 0x00<br>0x00 | 0x00 | 0x00 | 0x00 | JSONMessageNew | Null |
| 10 | 0x00<br>0x01 | 0x00 | 0x00 | 0x00 | MessageNew | Null |
| | 0xFF<br>0x00 | 0x00 | 0x00 | 0x00 | JSONMsgNewStatus | 0x01<br>0x00<br>0x00<br>0x01 |
| 11 | 0x00<br>0x01 | 0x00 | 0x00 | 0x00 | Login | Null |
| | 0x00<br>0x00 | 0x00 | 0x00 | 0x00 | JSONLoginStatus | Null |
| 12 | 0x00<br>0x01 | 0x00 | 0x00 | 0x00 | Exit | Null |
| | 0x00<br>0x00 | 0x00 | 0x00 | 0x00 | JSONExitStatus | Null |
| 13 | 0x00<br>0x01 | 0x00 | 0x00 | 0x00 | GETNetTest | Null |
| | 0x00<br>0x00 | 0x00 | 0x00 | 0x00 | JSONNetStatus | Null |
| 14 | 0x00<br>0x01 | 0x00 | 0x00 | 0x00 | 0x00<br>0x00 | Null |
| | 0x00<br>0x00 | 0x00 | 0x00 | 0x00 | 0x11<br>0x11 | Null |
| 15 | 0x00<br>0x01 | 0x00 | 0x00 | 0x00 | 0x00<br>0x00 | Null |
| 16 | 0x00<br>0x00 | 0x00 | 0x00 | 0x00 | 0x11<br>0x11 | Null |

In Table 1a, the field value types of such fields in the transmission transaction attribute information as transaction attribute name, transaction annotation, and verification information are String (representing a string, which is a character or a string with an uncertain data length, and the length varies according to actual needs), the field value types of such fields as the transaction-associated preset string (or the preset identifier) and the transaction attribute identification are 32 bits (representing a binary number, which is a binary value with a length of 32 bits), and the field value types of such fields as transaction usage role, transaction attribute type information, and verification information are 16 bits (representing a binary number, which is a binary value with a length of 16 bits). Specifically, they are put as follows.

The transaction attribute name field is used for indicating the transaction attribute name of a transmission transaction. For example, referring to FIG. 2*a*, the first end 10 needs to request network file resources from the second end 20; for the transmission transaction of "Requesting network file resources", the field value of the transaction attribute name field can be configured as "Requesting network file resources". For another example, if the first end 10 needs to upload a JPG file to the second end, for the transmission transaction of "Uploading JPG file", the field value of the transaction attribute name field can be configured as "Uploading JPG file". Such examples abound. When the transmission of one data block is executed, the transaction attribute name of the transmission transaction to which the data block belongs can be displayed, so that users can clearly understand the currently ongoing data transmission through the displayed transaction attribute name.

It should be added that when the transaction attribute name is configured for the transmission transaction, the configuration can be made on the basis of the type of the transmission transaction, so that the transaction attribute name can tell the transaction type of the corresponding transmission transaction. Of course, the configuration can also be made in other manners, and limitations are imposed thereon in the present embodiment.

The transaction annotation field is used for indicating the remark information (or annotated information, i.e., first annotated information involved in other embodiments as below) of a transmission transaction. For example, in the same example of the transaction attribute name field, for the transmission transaction of "requesting network resources", the field value of the transaction annotation field can be configured as "first end request"; for the transmission transaction of "Uploading JPG File", the field value of the transaction annotation field can be configured as "second end response". The list goes on.

The transaction-associated preset string (also known as communication identifier) field is used for indicating the preset string associated with a transmission transaction. In some embodiments, the preset string is a string corresponding to the address information of a corresponding end (such as a string corresponding to the IP address and has regularity), i.e., the preset string does not have the function of hiding the address information of the corresponding end; alternatively, in some other embodiments, the preset string has the function of hiding the address information of the corresponding end. For example, the preset string is a random string that is generated randomly and does not have regularity, and correlation information associated therewith comprises the address information of the corresponding end. The description relevant to the preset string will be specifically introduced as below.

The transaction attribute identification field is used for indicating the unique identification of the transmission transaction attribute information of a transmission transaction (such as the transaction unique identification provided in the above Table 1b, which is transmission transaction attribute information ID), and abbreviated as transaction attribute identification in the present embodiment. In general, it is a random string or binary value. A string is generally composed of at least one of numbers, letters, and underscores. Preferably, in the present embodiment, the transaction attribute identification and the transaction-associated preset string are composed of at least one of numbers and letters.

The transaction usage role field is used for indicating the identity information of the creator (a data end, such as the first end or the second end) who can use (or create) the transmission transaction. In specific implementation, the field value corresponding to the transaction usage role field is a 16-bit binary number. Different bits have different representation meanings. Specifically, taking a 16-bit binary number that has lower eight bits at the first to eighth bits from a right-to-left perspective as an example, the first to fourth bits among the lower eight bits can be used for representing the role of the transmission transaction creator. For example, when the lower eight bits of the 16-bit binary number are represented in hexadecimal, if the lower eight bits are 0x01, it indicates that the transmission transaction needs to be created by the first end (such as clients); if the lower eight bits are 0x00, it indicates that the transmission transaction needs to be created by the second end (such as servers). The remaining bits are used for representing more specific roles of the transmission transaction creator, e.g., they can represent that the transmission transaction can only be created and executed by clients of Class A (advanced members) or Class B (ordinary members), or can only be created and executed by servers of Class A or Class B. In the same example of the transmission transaction corresponding to "Requesting network file resources", one example is specifically given: assuming that the value corresponding to the transaction usage role of the transmission transaction corresponding to "Requesting network file resources" is 0x00 0x01, it can represent that the transmission transaction corresponding to "Requesting network file resources" can be created and executed by clients of Class B.

The transaction attribute type field is used for indicating the transaction attribute type information of a transmission transaction, including some basic operation types such as control transmission transaction (generally relevant to the operation of an application system, such as sending network tests and initiating heartbeat packets), download transmission transaction (such as reading network data resources), and upload transmission transaction (such as sending network data). In specific implementation, the field value corresponding to the transaction attribute type field can be a 16-bit binary number, and different bits have different representational meanings. Specifically, again, taking a 16-bit binary number that has lower eight bits at the first to eighth bits from a right-to-left perspective as an example:

the first to fourth bits in the lower eight bits can be used for representing the transmission direction of data to be transmitted, i.e., for representing the transmission direction of a data stream to which the data to be transmitted belongs; for example, if the first to fourth bits are "0001", it can represent that the data is transmitted from the first end (such as clients) to the second end (such as servers); if they are "0000", it can represent that the data is transmitted from the second end to the first end; moreover, the fifth to eighth bits in the lower eight bits can be used for representing the type of the data, i.e., for representing the type of the data stream to which the data to be transmitted belongs; for example, if the fifth to eighth bits are "0001", it indicates that the data stream is a file data stream; if they are "0000", it indicates that the data stream is a regular data stream; as can be learned from the above example, if the lower eight bits of the 16-bit binary number are represented in hexadecimal and the lower eight bits are 0x01, it represents that the data stream to which the data to be transmitted belongs is a regular data stream, and the data stream is transmitted from the first end (such as clients) to the second end (such as servers); if the lower eight bits are 0x10, it represents that the data stream to which the data to be transmitted belongs is a file data stream, and the data stream is transmitted from the second end to the first end;

the remaining high eight bits (the nineth to sixteenth bits) can be used for indicating whether a data header needs to be added to data when data transmission is executed and what format type of data header needs to be added to the data; for example, on the premise that the lower eight bits are the same as mentioned above and the upper eight bits of the 16-bit binary number are represented in hexadecimal, if the upper eight bits are 0x00, it can represent that there is no need to add a data header to the data (i.e., there is no need to use a data header); if the upper eight bits are 0x01, it can indicate that a regular data header in a regular data header format needs to be added to the data; if the upper eight bits are 0x02, it can indicate that a file data header in a file data header format needs to be added to the data; if the upper eight bits are 0x03, it can indicate that an e-mail data header in an e-mail data header format needs to be added to the data; if they are 0x04, it can indicate that a database operation data header format needs to be added to the data; the list goes on; as such, the above upper eight bits can be understood as the format identification of the data header that needs to be added to the data, so that when it is determined that a data header needs to be added to the data, a corresponding data header template can be called according to the corresponding data header format identification, and then multiple fields included in the called data header template can be configured to add the data header to the data; considering that the number of data header formats that can be represented by the above upper eight bits is relatively highly limited (e.g., only about 253 data header formats can be represented at most), to accommodate more data header formats that are obtained through custom extension, in the present embodiment, when the upper eight bits are 0xFF, it indicates that an extended data header format that needs to be added to the data; accordingly, the transmission transaction attribute information can further comprise a unique identification field of the extended data header format (not shown in the above Table 1a), which is used for indicating the extended data header format unique identification (such as serial numbers); when it is determined that a data header in an extended data header format needs to be added to the data, further, a corresponding extended data header format template can be called according to the field value corresponding to the extended data header format unique identification field; for example, referring to Table 1b, in the service scenario of "Instant messaging for sending text message", the server needs to return the corresponding sending status for the text message sent by the client; in the transmission transaction attribute information configured for the transmission transaction of "Returning sending status", the field value of the transaction attribute type field is "0xFF 0x00", and the extended data header format unique identification of is "0x01 0x00 0x00 0x01"; when the server initiates the transmission transaction of "Returning sending status" to return the corresponding sending status data to the client, it will be first determined that the data header that needs to be added to the sending status data is in the extended data header format on the basis of the transaction attribute type information in the transmission transaction attribute information of the transmission transaction of "Returning sending status"; further, according to the extended data header format unique identification "0x00 0x00 0x00 0x01", a corresponding extended data header format template can be called from multiple preset data header formats, and the field values of multiple fields included in the called data header format template can be configured on the basis of the data information of the sending status data, so as to add the data header to the sending status data; the data type of the extended data header format unique identification can be changed according to actual needs; it is 4-byte in the above content, and can also be single byte, double-byte, 8-byte, etc.

In summary, the transaction attribute type information of the transmission transaction as indicated by the transaction attribute type field can include, but is not limited to, at least one of the following items: data transmission direction, data type, and data header usage information.

Tables 2a to 2d as provided below respectively show the specific header formats of the above ordinary data header, file data header, e-mail data header, and database operation data header, and Table 2e shows the specific data header format of one extended data header.

TABLE 2a

Data Header Format of Regular Data Header

| Fields included in data header: | Field value type: |
|---|---|
| Data header length | 32 |
| Annotated information | String |

Wherein the above data header length field is used for indicating the byte length of the data header (which is a sum of 32 bits and the byte number of the annotated information). The annotated information field is used for indicating the annotation of recognition and judgment made by ends such as servers and clients or the control apparatuses described in other embodiments as below, or for reading strings, such as creation time, modification time, update time, and data integrity check value (hash value).

TABLE 2b

Data Header Format of File Data Header

| Fields included in data header: | Field value type: |
|---|---|
| File header length | 32 |
| File size | 32 |
| Sender Information | 32 |
| Sending time | 32 |
| File attribute | 16 |
| Extension Name | 16 |

TABLE 2b-continued

| Data Header Format of File Data Header | |
|---|---|
| Fields included in data header: | Field value type: |
| File name length | 16 |
| File name | String |
| Annotated information length | 16 |
| Annotated information | String |

Wherein the above file header length field is used for indicating the total byte length of a file header, and can be used for distinguishing the file header from file data. The file size field is used for indicating the total byte length of the file data. The sender information field is used for indicating the information of a sender who sends a file, such as user ID and user nickname. The send time field is used for indicating the timestamp of sending the file. The file attribute field is used for indicating the attribute of the file. The extension name field is used for indicating the file type, e.g., the field value of the extension name field can be a file suffix. The file name field is used for indicating the name of the file (such as test). The file name length field is used for indicating the byte length of the file name (i.e., the byte number, e.g., test is 4 bytes, and it is compatible with a long file name). The annotated information field is used for indicating the annotation (i.e., annotation (remark) information) of recognition and judgment made by ends such as servers and clients or the control apparatuses described in other embodiments as below, or for reading strings, such as creation time, modification time, and update time. The annotated information length field is used for recording the byte number of the annotated information.

TABLE 2c

| data Header Format of E-mail File Data Header | |
|---|---|
| Fields included in data header: | Field value type: |
| File header length | 32 |
| Subject | String |
| Sender address | String |
| Recipient address | String |
| Sending time | 32 |
| Attached file type | String |
| Annotated information | String |

Wherein the file header length field is use or indicating the total length of an e-mail file header. The subject field is used for indicating the subject of an e-mail. The sender address field is used for indicating the address of a sender, such as the e-mail address of the sender. The recipient address field is used for indicating the address of a recipient, such as the e-mail address of the recipient. The sending time field is used for indicating the timestamp of sending the e-mail. The attached file type field is used for indicating the type of an attached file carried in the e-mail, such as a compressed package. For the annotated information field, see the relevant content described in the above introduction of Table 2a or Table 2b.

TABLE 2d

| data header format of database operation data header | |
|---|---|
| Fields included in data header: | Field value type: |
| File header length | 32 |
| Operation type | 16 |
| Operated database address identifier | String |

TABLE 2d-continued

| data header format of database operation data header | |
|---|---|
| Fields included in data header: | Field value type: |
| Operated database identifier | String |
| Operated table identifier | String |
| Operation influence | String |
| Annotated information | String |

Wherein the operation type field is used for indicating operations performed on a database, such as deletion, addition, modification, and query. The operated database address identifier field is used for indicating the address of the database, such as IP address corresponding to the database. The operated database identifier field is used for indicating the name of the operated database. The operated table identifier field is used for indicating the name of a data table in the operated database. The operation influence field is used for indicating fields in the data table influenced by the operations, e.g., if the corresponding field value is *, it can indicate that all fields in the data table are influenced. For the file header length field and the annotated information field, see the relevant content described in the above introduction of Table 2a or Table 2b.

TABLE 2e

| Data header format of instant messaging message content characteristics | |
|---|---|
| Fields included in data header: | Field value type: |
| File header length | 32 |
| Message type | 16 |
| Message keyword | String |

In the above Table 2e, the message type field can be used for indicating the importance of a message. For example, if the field value corresponding to the message type field is 0x01, it indicates that the message is a regular message; if the field value corresponding to the message type field is 0x02, it indicates that the message is an important message. The message keyword field is used for indicating that the message hits one or more preset keywords or tokenized words, etc. For the file header length field, see the relevant content described in the above introduction of Table 2a or Table 2b.

Referring to Table 1a again, the grouping code (a type of dictionary) field in Table 1a can be specifically divided into the first-class encode field, the second-class encode field, and the third-class encode field, and is used for indicating data transmission operations in different scenarios. When the field values of the first-class encode field, the second-class encode field, and the third-class encode field are all the same set value (e.g., they are all "0x00 0x00"), it indicates that classification is not performed temporarily. The grouping code field is arranged herein to correspond to the grouping function to be implemented, similar to the friend grouping function in social software, so that transmission transactions can be grouped and distinguished under the circumstances that there are a relatively great number of transmission transactions the need to be managed (e.g., if a client, as an upper-layer application, is a complex system or multiple complex systems, there may be a relatively great number of transmission transactions that need to be managed). When the field values of the first-class encode field, the second-class encode field, and the third-class encode field are used to group and divide transmission transactions, a top-down division manner, similar to that of provinces, cities, and counties, can be adopted. The first-class encode field is used for indicating the first-level classification, the second-class encode field is used for indicating the second-level classification on the basis of the first-level classification, and the third-class encode field is used for indicating the third-level classification on the basis of the second level classification, which facilitates managing the transmission transactions. For example, the field value of the first-class encode field can be the company code A of a certain company, the field value of the second-level classification can be an upper-layer application a1 and an upper layer application a2 developed by the company, and the field value of the third-class encode field on the basis of the upper-layer application a1 can be specific operation actions (such as HTTP request, instant messaging sending data, receiving data, and uploading data), which facilitates maintenance personnel performing various kinds of management on the transmission transactions, such as view, edition, and authorization, and also facilitates presetting a corresponding control apparatus to permit/prohibit the transmission of the field value of a certain code field at the same time, thereby directly acting upon the transmission transaction associated with the field value of the code field. The above content is an introduction to the first-class encode field, the second-class encode field, and the third-class encode field from the perspective of affiliation association. Of course, the first-class encode field, the second-class encode field, and the third-class encode field can also be divided from other perspectives, e.g., the division can be done according to the protocol type, application type, transmission direction, importance degree of such data ends as clients or servers, importance degree of data, etc. In the present embodiment, limitations are not imposed thereon.

The verification information field indicates verification information for verifying data. The verification information can be, but is not limited to, a verification code, which can be used for verifying whether the specific transmitted data meets requirements of a corresponding transmission transaction (e.g., verifying whether the data format or data content meets the requirements). For example, referring to FIG. **3*a*-1**, in the same example where the transaction attribute names are listed as mentioned above, for the transmission transaction of "Requesting network file resources", the field value of the data verification code field can be configured as, but not limited to, GET (or GETFIL); for the transmission transaction of "Uploading JPG File", the field value of the data verification code field can be configured as, but not limited to, 0xFF 0xD8 0xFF 0xE0. The list goes on. Verifying whether the transmitted data content is a limited value is used for secure control of data transmission. The introduction of using data verification codes to verify transmitted data will be detailed in the specific embodiments listed below in the present application, and will not be elaborated herein.

Figure 8:
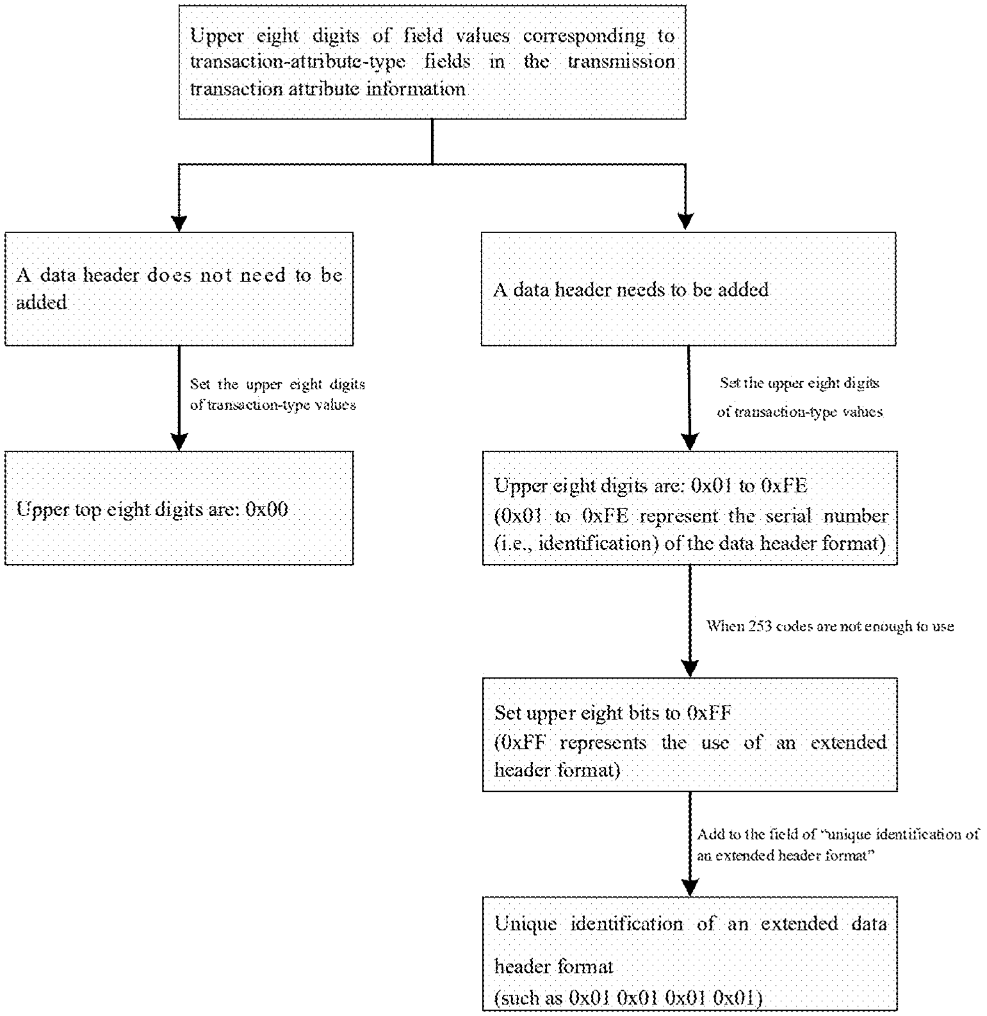
FIG. 8 is a principle flow diagram of the upper eight bits configuration of the field value of the transaction attribute type field in the transmission transaction attribute information as provided in the present embodiment of the application.

Table 1b shows an example of the transmission transaction attribute information of multiple preset data transmissions for data transmission and exchange between the first end 10 as a client and the second end 20 as a server from the perspective of the first end 10 in the present embodiment. FIG. 8 is a principle flow diagram of the upper eight bits configuration of the field value of the transaction attribute type field in the transmission transaction attribute information as shown.

It should be added that the value type and length magnitude among others that correspond to the field values in the tables in the present application (such as Table 1a or Tables 2a to 2e as mentioned above, or Table 3 as mentioned below) can be flexibly adjusted according to actual needs. For example, the data header length (or the file header length) can be 32 bytes or 32 bits. According to actual needs, it can also be 8, 16, 64, 128, 256 bytes or bits, and can be in data types with an unspecified length, such as String. Herein, limitations are not imposed thereon.

In the technical solution provided in the present embodiment, when the data to be transmitted is processed to generate structured data (i.e., the messages as described below (such as the first message and the second message)) that meets requirements in the structural rules, the data transmission security is ensured by using the transmission transaction attribute information of the transmission transaction to which the data block to be transmitted belongs. In addition, the transaction identification of the transmission transaction may also be utilized, wherein the transaction identification can be generated autonomously. Based on this in combination with the previous content, in a specifically implementable solution, when the first end 10 can be used for determining that a first data stream corresponds to first transaction information of a first transmission transaction, it can be specifically used for:

S10. generating a transaction identification for the first transmission transaction;

S11. obtaining transmission transaction attribute information of the first transmission transaction.

That is to say, the first transaction information of the first transmission transaction comprises the transaction identification of the first transmission transaction and the transmission transaction attribute information of the first transmission transaction. Wherein the transaction identification is autonomously generated by the first end for the first transmission transaction, and can be a sequential number, a random string or binary value (such as a random number) or the like. In one embodiment, the above S11 of "obtaining transmission transaction attribute information of the first transmission transaction" can comprise the following steps:

S111. determining a transaction attribute identification of the first transmission transaction;

S112. querying the transmission transaction attribute information of the first transmission transaction from multiple pieces of preset transmission transaction attribute information on the basis of the transaction attribute identification of the first transmission transaction.

In specific implementation, the first data stream can be a data stream of a first application (such as browser applications, social applications, and office applications) on the first end 10. More specifically, the first data stream can be a file data stream (such as JPG file binary data and Excel form file binary data (such as "financial statements .xls")), a request data stream (such as requesting network resources), an e-mail sending and receiving data stream (such as sending or receiving emails), etc. Herein, limitations are not imposed thereon. The transaction type of the first transmission transaction corresponding to the first data stream can be determined according to transmission demand information of the first data stream, wherein the transmission demand information can include, but is not limited to, the direction of data transmission, data type, and transmission purpose (e.g., storing data, querying data, operating databases), etc. Then, the transaction attribute identification of the first transmission transaction corresponding to the first data stream can be determined according to the preset correspondence between the transaction type and the transaction attribute identification. That is to say, regarding the above S111 of "determining a transaction attribute identification of the first transmission transaction", one implementable solution thereof is as follows:

S1111. determining the transaction type of the first transmission transaction according the transmission demand information of the first data stream;

S1112. determining the transaction attribute identification that has a correspondence with the transaction type of the first transmission transaction according to the preset correspondence (e.g., see the relevant content in Table 5 below) between the transaction type and the transaction attribute identification.

In specific implementation, if it is determined according to the preset correspondence between the transaction type and the transaction attribute identification that there is no transaction attribute identification that has a correspondence with the transaction type of the first transmission transaction corresponding to the first data stream, then it means that the transaction attribute information of the first transmission transaction corresponding to the first data stream cannot be found in multiple pieces of preset transmission transaction attribute information. In this case, it indicates that according to the security control information on data transmission between the first end and the second end as configured in the present embodiment, it is not allowed to transmit data blocks in the first data stream, and the data transmission fails. The specific introduction to the configured security control over data transmission between the first end and the second end will be elaborated below.

In the above step S112, the transaction attribute information of the first transmission transaction can comprise: transaction attribute name, transaction annotated information (first identification information), a transaction attribute identification, a first preset string corresponding to the second end, transaction attribute type information, and verification information. The first preset string can be a string corresponding to address information of the second end. Alternatively, the first preset string is a string for hiding the address information of the second end. The transaction attribute type information comprises at least one of the following pieces of information: data transmission direction (more specifically, the transmission direction of the first data stream, e.g., sending the first data stream (specifically, the data in the first data stream) from the first end to the second end), data type (more specifically, the data type of the first data stream, such as a file data stream), and data header usage information (e.g., a data header among others needs to be added to the data during data transmission). The introduction to the first preset string will be elaborated in other embodiments of the present application. In addition, the transaction attribute information can further comprise other contents besides the above ones. For the introduction about the specific contents that can be included in the transaction attribute information, see the relevant content as mentioned above.

Further, to effectively provide security protection for data transmission at low cost and prevent malicious attacks and the like, when the first end 10 needs to transmit a first data block of the first data stream to the second end 20, in the present embodiment, first target header information that needs to be added, such as a message header in conformity with a preset message header format, is determined for the first data block on the basis of the transaction information of the first transmission transaction corresponding to the first data stream, and then, the first target header information is integrated with the first data block to generate a structured first data block (i.e., the message as described below) in conformity with preset data structure rules. Based on this, in a specifically implementable solution, the first end 10, when used to determine the first target header information for the first data block on the basis of the transaction information of the first transmission transaction corresponding to the first data stream, can be specifically used for:

S20. obtaining a header information transmission manner of data blocks in the first data stream;

S21. determining target header fields for the first data block from multiple header fields included in a preset message header format on the basis of the header information transmission manner and relevant information of the first data block;

S22. configuring field values of the target header fields on the basis of at least one of the first transaction information and the relevant information of the first data block, and obtaining the message header that is determined for the first data block.

In Step S20, the header information transmission manner refers to any one of four header information transmission manners (a first manner, a second manner, a third manner, and a fourth manner) shown in FIG. 2*b*. Wherein the first manner is a transmission scheme of fully structured headers, the second manner and the third manner are transmission schemes of a combination of fully structured headers and briefly structured headers, and the fourth manner is to retain only one fully structured head. Take a structured header (i.e., the target header information (such as the first target header information) involved in the present embodiment) that comprises a structured message header for example, as the structured message header is generated on the basis of a preset message header format, the fully structured header means that all parameters in the preset header format (i.e., all the parameters shown in Table 3 below) are included, and the briefly structured header means that some of the parameters in the preset message header format (e.g., with reference to Table 3 below, the block number (i.e., the current block number shown in FIG. 2*b*) of a data block that currently needs to be transmitted and the transaction identification (i.e., the transmission transaction ID shown in FIG. 2*b*) of the transmission transaction can be included) are included, wherein the transmission transaction attribute ID shown in FIG. 2*b* refers to the transaction attribute identification involved in the following text.

Under normal circumstances (e.g., the network is normal, without adverse phenomena such as congestion) of reliable transmission and sequential transmission of data blocks in a data stream, the data block first received by the receiver tends to be the one ranked first in the data stream. Based on this, in both the first manner and the third manner, when the data block (such as Data Block 0 shown in FIG. 2*b*) ranked first in a data stream needs to be transmitted, a fully structured header is used to structure Data Block 0 (i.e., the message involved in the present application is generated for Data Block 0). In this way, upon receiving the first structured data block (Structured Data Block 0 corresponding to Data Block 0) corresponding to the data stream, a receiver can perform processing on the data stream without waiting, such as verification. In the second manner, the receiver needs to wait until it receives a structured data block that has a fully structured header, and then it can perform processing, such as verification.

In addition, in the first manner, by applying the transmission scheme of fully structured headers to each data block in the data stream, the receiver is enabled to perform processing such as verification on the basis of any structured data block corresponding to the received data stream, which is beneficial for handling adverse phenomena such as network congestion, and improving the transmission reliability.

In practice, the second manner is well appliable to non-sequential or unreliable transmission in some cases. For example, referring to FIG. 2*b* again, suppose one data stream comprises three data blocks, i.e., Data Block 0, Data Block 1, and Data Block 2, wherein Data Block 0 and Data Block 3 are the first data block and the last data block of the data stream, respectively; in the second manner, a sender (such as a client) sequentially sends to the receiver structured data blocks that correspond to Data Block 0 to Data Block 2, respectively; Structured Data Block 2 corresponding to Data Block 2 as the third to be sent has a fully structured header; however, for network-related reasons (such as network congestion and network jitter), the actual sequence of the structured data blocks received by the receiver is different from the sending sequence of the sender, e.g., the actual sequence of the structured data blocks received by the receiver is: Structured Data Block 2 corresponding to Data Block 2, Structured Data Block 1 corresponding to Data Block 1, and Structured Data Block 0 corresponding to Data Block 0; in this case, after receiving the structured data block (i.e., Structured Data Block 2) for the first time, the receiver can perform processing such as verification without waiting. As can be seen from the above, the second manner can actually be understood as a practical application extension of the third manner, and used to improve the reliability and solve problems such as congestion.

In the fourth manner, only the data block ranked first in the data stream (Data Block 0 shown in FIG. 2*b*) is structured by using a fully structured header to carry out transmission; subsequently, other data blocks (such as Data Block 1, Data Block 2, . . . , Data Block N) are not structured during transmission, but directly packaged into messages in a normal manner (the manner shown in FIG. 1) to carry out transmission. In other words, during the transmission of the data blocks in the data stream, only what is transmitted first is a structured data block (i.e., the structured data block obtained by structuring the data block ranked first by using a fully structured header); subsequently, the other data blocks are not structured, but transmitted in the usual manner; however, during the subsequent transmission of the other data blocks, they can be automatically associated with the structured header of the structured data block that is transmitted first, and the association can be terminated when association termination conditions are met to determine the completion of the transmission. Wherein the association termination conditions include: if the data stream is a stream with a known total number of data blocks, i.e., if the data stream is data in a specific size (such as a file), the number of transmitted data blocks can be counted in the transmission process, and the association termination conditions are met when the number reaches the total number of the data blocks in the data stream; if the data stream is a stream with an unknown total number of data blocks, i.e., if the data stream is data without a specific size (such as a real-time audio and video stream), it can be determined that the association termination conditions are met when particular instruction data (such as an instruction indicating that all the data blocks have been sent) are received, or when a message that comprises a transmission termination transaction flag (e.g., in a received message that comprises Data Block N, the message header thereof comprises a transmission termination transaction flag) is received, or when no data block is received within a set period of time.

Regarding the fourth manner, there exist some extension schemes, which are specifically put as follows.

The first extension scheme is: before starting to transmit data blocks in a data stream, an initial message (excluding the data blocks in the data stream) that only comprises a fully structured header is just sent to a corresponding end (such as a second end); subsequently, during the transmission of all the data blocks in the data stream, they can be directly packaged into messages in a normal manner (the manner shown in FIG. 1) to carry out transmission to the corresponding end; the corresponding end can associate the data blocks included in the subsequently received messages with the fully structured header included in the initial message that is received first; wherein the fully structured header included in the initial message is determined according to the stream information of the data stream and the corresponding transmission transaction, and the field value of the current block number field included in the fully structured header can be a preset value or directly a null value.

The second extension scheme is: after the data block ranked first in the data stream (such as Data Block 0 shown in FIG. 2*b*) is structured by using a fully structured header, Structured Data Block 0 (comprising a fully structured header) can be transmitted to a first communication interface of a corresponding end (such as a second end); subsequently, during the transmission of other data blocks in the data stream, they are sent to a second communication interface of the corresponding end; the corresponding end can associate the data blocks received through the second communication interface with the fully structured header (obtained from the received Structured Data Block 0) received through the first communication interface; the first communication interface and the second communication interface can be understood as different network communication services of the corresponding end, e.g., the first communication interface is a network communication service that is exclusively used for receiving the data block ranked first in the data stream on the corresponding end, while the second communication interface is a network communication service that is used for subsequently receiving the other data blocks (the data blocks except the data block ranked first) in the data stream.

The benefit of adopting the fourth manner is that the network traffic can be saved.

It should be added that the "current block number" shown in FIG. 2*b* is optional, and under the circumstances of reliable transmission or sequential transmission of multiple data blocks in the data stream or insensitivity to data integrity, the block number may not be used. The reliable transmission refers to the use of a series of technologies for ensuring accurate and precise transmission of information (data blocks) between the sender and the receiver.

In Step S21, the relevant information of the first data block can include, but is not limited to, the first data stream to which the first data block belongs, the stream information (such as stream type and stream size) of the first data stream, the size of the first data block, the sequence of the first data block in the first data stream, etc. The preset message header format is shown in Table 3 below:

TABLE 3

Preset Message Header Format

| Header fields included in the message header: | Field value type: |
|---|---|
| The second preset string corresponding to the sender | 32 |
| The first preset string corresponding to the receiver | 32 |
| Transaction attribute identification | 32 |

TABLE 3-continued

| Preset Message Header Format | |
|---|---|
| Header fields included in the message header: | Field value type: |
| Transaction identification (unique identification of transmitting transactions) | 32 |
| Message size | 16 |
| Total number of blocks | 16 |
| Current block number | 16 |
| Annotated information (which can be referred to as second annotated information) | 16 |

Wherein the second preset string field corresponding to the sender is optional, and used for indicating the second preset string corresponding to the sender. It can be a string (such as strings that correspond to public IP addresses, private IP addresses, MAC addresses, or host names) that represents the address information of the sender, and is used in a control apparatus or a network intermediate apparatus for carrying out monitoring, auditing, or interception; alternatively, it can be a string for hiding the address information of the sender. The first preset string field corresponding to the receiver is optional, and used for indicating the first preset string corresponding to the receiver. It can be a string that represents the address information of the receiver, or a string for hiding the address information of the receiver. In the present embodiment, since the first end 10 needs to send data to the second end 20, the first end 10 is the sender and the second end 20 is the receiver. The preset strings, also known as communication identifications, are identifiers for communication between different ends. The specific introduction to the preset strings will be elaborated below in the other embodiments provided in the present application.

For the description of the field of the transaction attribute identification, see the relevant content as mentioned above.

The field of the transaction identification is used for indicating the transaction identification of a transmission transaction (such as the ID of a transmission transaction); wherein the transaction identification can be a random string or a serial number, etc. For example, with reference to FIG. 3*a*-1, if the first end 10 currently needs to initiate a transmission transaction for a data stream of an application thereon, a string can be randomly generated as the transaction identification of the initiated transmission transaction.

The field of the message size is preferably used for indicating the size (or byte length) of a structured data that is currently transmitted (such as the first message to be sent as described below, which is generated for the first data block). Take the first data block for example, under the circumstances that a corresponding message header only needs to be determined for the first data block, the field value of the message size field is the total size of the message header and the first data block (i.e., the size of the message header plus the size of the first data block). Of course, in the other embodiments, the message size field can also be just used for indicating the size of the current data block to be transmitted (such as the first data block). In the present embodiment, limitation is not imposed thereon. It should be added that the "message size" in Table 3 is also referred to as "data packet size" in the other embodiments of the present application (e.g., reference can be made to Table 6, Table 72, or the like in the following text).

The field of the total number of blocks is used for indicating the total number of data blocks in a data stream corresponding to a transmission transaction; wherein when the total number is a set value, it indicates that the data stream is a stream with an unknown number of data blocks; for example, if the first data stream in the present embodiment consists of multiple data blocks that are obtained by dividing file data or hypertext data in a fixed size, then the field value of the field of the total number of blocks is the total number (greater than 0) of the multiple data blocks accordingly; on the contrary, the field value of the field of the total number of blocks is a set value; for example, when the field value is 0, it indicates that the first data stream is a stream that is infinite in size, e.g., the first data stream is such a data stream as a monitoring video of a monitoring apparatus, and live streaming audio and video; for another example, when the field value is −1, it indicates that the first data stream is finite in size but the number of the data blocks included therein is temporarily unknown. It should be noted that: since one data block corresponds to one message, it can also be understood that the field of the total number of blocks herein is used for indicating the total number of messages that need to be transmitted in a transmission transaction. Take the transmission transaction shown in FIG. 2*a* for example, the field of the total number of blocks can also be understood as the total number (i.e., N+1) of Message 0 to Message N. Accordingly, it can also be understood that the field of the current block number is used for indicating the message number of the currently transmitted message.

The field of the current block number (also known as data block serial number) is used for indicating the block number (i.e., serial number) of the currently transmitted data block.

The field of the annotated information is optional, and used for indicating the annotated information (remark information) corresponding to a transmission transaction, such as the remark information of a data stream corresponding to a transmission transaction. For example, the remark is "important"; a data stream is remarked as a file stream, a regular data stream, or the like; alternatively, a hash value for verifying the data integrity of the transmitted data or file is annotated to facilitate various ends such as the second end (such as a server) and the control apparatuses in the other embodiments as described below performing recognition, reading, parsing, security control, or the like.

On the basis of the introduction about the header information transmission manner in Step S21, in one embodiment, said "determining target header fields for the first data block from multiple header fields included in a preset message header format on the basis of the header information transmission manner and relevant information of the first data block" in Step S21 can comprise:

- S211. determining the ranking of the first data block in the first data stream according to the block number of the first data block as included in the relevant information;
- S212. determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;
- S213. determining that some header fields in the multiple header fields are the target header fields if the header information transmission manner is the second manner and the data block is not ranked last in the first data stream, or if the header information transmission manner is the third manner and the data block is not ranked first in the first data stream.

Under the circumstances described in Step S212, i.e., all the header fields (multiple header fields) included in the preset message header format shown in Table 3 are the target header fields determined for the first data block, then said "configuring field values of the target header fields on the basis of at least one of the first transaction information and the relevant information of the first data block and obtaining the message header that is determined for the first data block" in Step S22 can specifically comprise the following steps:

S221. determining a second preset string corresponding to the first end for the first transmission transaction;

S222. configuring field values of the target header fields according to the second preset string, the first transaction information, and the relevant information of the first data block and obtaining a first message header determined for the first data block;

Wherein on the basis of the above description of the preset message header format, the first message header determined for the first data can comprise the following content: the second preset string corresponding to the first end, the first preset string corresponding to the second end, the transaction attribute identification of the transmission transaction, the transaction identification of the transmission transaction, the total number of the data blocks in the first data stream, the block number of the first data block, the total size of the first target header information and the first data block, and the annotated information.

The second preset string corresponding to the first end is a second preset string that is determined on the basis of the preset correspondence (see Table 5 shown below) between the preset second preset string and the transaction type and has a correspondence with the transaction type of the transmission transaction corresponding to the first data stream. The second preset string corresponding to the first end can be a string corresponding to the address information of the first end. Alternatively, the second preset string corresponding to the first end can be a string for hiding the address information of the second end.

The first preset string corresponding to the second end can be directly obtained from the transmission transaction attribute information of the first transmission transaction corresponding to the first data stream.

Further, if data headers that need to be added to data blocks during the transmission of the data blocks in the first data stream is determined on the basis of the transmission transaction attribute information of the first transmission transaction corresponding to the first data stream, more specifically, on the basis of the transaction attribute type information in the transmission transaction attribute information, a data header can only be added to the first data block in the first data stream. If the first data stream comprises multiple data blocks, data headers do not need to be added to the other data blocks located after the first data block in the multiple data blocks. Based on this, when the first data block is ranked first or last in the first data stream, the step S22 can further comprise the following steps:

S223. determining whether there is a need to add a data header to the first data block according to transmission transaction attribute information of the first transmission transaction in the first transaction information;

S224. when determining that there is a need to do so, determining a corresponding data header for the first data block according to stream information of the first data stream; wherein the data header is adapted to the first data stream and meets preset data header format requirements.

Specifically, the step S223 is determining whether there is a need to add a data header to the first data block according to the transaction attribute type information in the transmission transaction attribute information. Wherein the transaction attribute type information includes, but is not limited to, the following content: data header usage information, transmission direction of the first data stream, data type of the first data stream, etc. The data header usage information includes the header format identification of the used data header. For the specific introduction about the content included in the transaction attribute type information, see the relevant content in the preceding text. More specifically, whether there is a need to add a data header to the first data block is determined according to the header usage information in the transaction attribute type information.

In Step S224, when it is determined that a data header needs to be added to the first data block, an adaptive data header format can further be selected from multiple preset header formats according to the header usage information in the transaction attribute type information, so that a corresponding data header is generated in the selected data header format for the first data block on the basis of the stream information of the first data stream. In other words, a specifically implementable solution of "determining a corresponding data header for the first data block according to stream information of the first data stream" in Step S224 can comprise the following steps:

S2241. selecting an adaptive data header format from multiple preset data header formats on the basis of the data header usage information included in the transmission transaction attribute information;

S2242. generating the data header in the selected data header format according to the stream information of the first data stream.

For the description of the data header format, see the preset data header formats shown in Tables 2a to 2e in the preceding text, and for the specific implementation of the step S2241, see the relevant content involved in the description of the transaction attribute type information in the preceding text, which will not be elaborated herein.

In Step S2422, the stream information of the first data stream can include, but is not limited to, the following content: the sending time of the first data stream, the attribute information (such as the data type, the size of the first data stream, and the name of the first data stream) of the first data stream, the address of the sender, the address of the receiver, etc. On the basis of the stream information of the first data stream, corresponding field values can be configured for multiple fields included in the selected data header format; in this way, the generation of a corresponding data header for the first data block is realized.

After the first target header information (e.g., a message header, or both a message header and a data header) is determined for the first data block according to the above content, the first end 10 can integrate the first target header information with the first data block to generate a first message to be sent in conformity with preset data structure rules. During the specific integration, with reference to an example that FIG. 3*a*-1 shows a Message A1 to be sent as generated through the present embodiment, if the first target header information comprises a message header, the message header (i.e., the structured message header shown in the FIGURE) can be added between the TCP/IP message header and the first datablock; if the first target header information further comprises a data header, the data header can be added between the message header and the first data block.

The first target header information can be used for verifying whether the first message meets requirements.

Regarding Message A1 shown in FIG. 3*a*-1, an example of the message structure format thereof is shown in Table 41 as below:

TABLE 41

Message structure format of Message A1 (i.e., the first message)

| | | |
|---|---|---|
| Structured message header | The second preset string corresponding to the first end | 32 |
| | The first preset string corresponding to the second end | 32 |
| | Transaction attribute identification | 32 |
| | Transaction identification | 32 |
| | Message size (the total size of a data block and target header information that corresponds thereto) | 16 |
| | Total number of blocks | 16 |
| | Current block number | 16 |
| | Annotated information | 16 |
| Data volume | Data header (optional) | |
| | A data block to be transmitted specifically (such as the first data block) | |

It should be noted that in addition to the above content shown in Table 41, the message structure format of Message A1 can further comprise a TCP/IP message header, a TCP/IP message tailer, etc., which are shown in FIG. 3*a*-1 and are not shown in Table 41.

Under the circumstances in Step S213, i.e., if some message header fields (such as the field of the transaction identification) of all the message header fields (multiple message header fields) included in the preset message header format shown in Table 3 are the target header fields determined for the first data block, then said "configuring field values of the target header fields on the basis of at least one of the first transaction information and the relevant information of the first data block and obtaining the message header that is determined for the first data block" in Step S22 can specifically comprise the following steps:

S221'. configuring field values of the target header fields according to transaction identification of the first transmission transaction in the first transaction information, and obtaining a second message header determined for the first data block;

wherein the second message header comprises the transaction identification.

In specific implementation, the target header fields determined for the first data block can comprise not only the transaction identification field in the preset message format, but also other header fields such as the current block number field. In this case, the field values of the target header fields can be configured according to the transaction identification of the first transmission transaction and the relevant information (specifically, the block number of the first data block) of the first data block; accordingly, it is obtained that the second header determined for the first data block comprises the transaction identification of the first transmission transaction and the block number of the first data block. Additionally, under the circumstances in this example, the operation of adding a data header to the first data block may not be executed.

According to the above content, in this example, the first end 10 integrates the first target header information (the message header (comprising the transaction identification and block number of the first data block (optional)) determined for the first data block with the first data block to generate the first message. For the message format of the first message, see Table 42 below.

TABLE 42

Message structure format of the first message

| | | |
|---|---|---|
| Structured message header | Transaction identification | 32 |
| | Current block number (optional) | 16 |
| Data volume | A data block to be transmitted specifically (such as the first data block) | |

After generating the first message to be sent, the first end 10 can send the first message to the second end 20 according to the address information of the second end as determined by the first preset string corresponding to the second end. After receiving the first message sent by the first end 10, the second end 20 can verify the received first message on the basis of the security control information on data transmission between the first end and the second end as configured in the present embodiment. During verification, it specifically verifies whether the target header information (such as a message header and a data header) included in the first message meets predetermined requirements, e.g., whether the format of the message header of the first message meets the predetermined requirements, whether the transaction attribute identification in the message header has been registered, etc. The security control information on data transmission and the specific implementation of verifying the message according to the security control information on data transmission will be elaborated in the other embodiments provided in the present application, and will not be described herein. When the second end 20 determines that the received message meets the requirements through the verification, the operation of obtaining and caching the first data block from the first message can be executed.

In the solution as described above, in the scenario where the first end 10 and the second end 20 communicate directly by using the TCP/IP protocol as shown in FIG. 3*a*-1, the data security protection is mainly realized from the perspective of structuring the data that needs to be transmitted. Compared with the existing solution of carrying out data transmission by using the TCP/IP protocol, the above solution realizes the security management of transmitted data content.

In order that the first end 10 can realize the above solution and further improve the security management of transmitted data content and in order to prevent the first application on the first end 10 from arbitrarily calling the network interface on the first end and further sending data to the second end 20 arbitrarily and directly, in the scenario shown in FIG. 3*a*-1, the further desired effect can be achieved by adopting the following two technical solutions.

One specifically implementable technical solution is to install "control software" (which has functions similar to those of the control apparatus in the second solution as described below) on the first end 10. In specific implementation, different types of "control software" can be installed on the first end 10 in two cases of the preset strings as mentioned above, which are specifically put as follows.

Case 11: the preset strings (such as the first preset string corresponding to the second end and the second preset string corresponding to the first end 10) do not have the function of hiding the address information (e.g., the preset strings are IP addresses of corresponding ends) of corresponding ends.

Figure 3B:
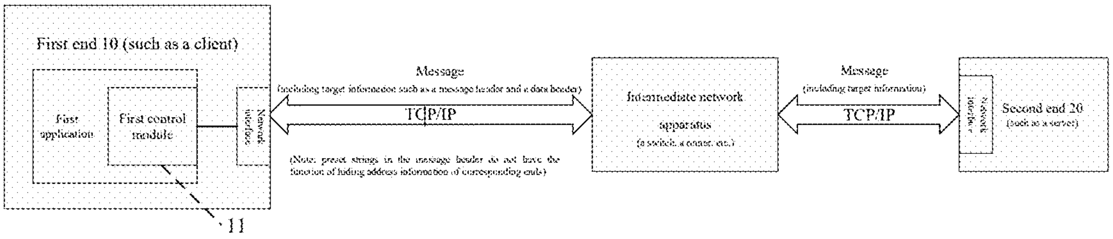

As shown in FIG. 3*b*, in Case 11, a first control module 11 can be installed in the application on the first end 10 to achieve various control functions, e.g., generating a first message to be transmitted for the data that needs to be transmitted from the application to the second end 20, sending the first message, identifying and verifying (auditing) the received message (such as the second message sent from the second end 20), etc. In the first control module 11, various kinds of preset information, such as multiple pieces of transmission transaction attribute information as mentioned above (as shown in Table 1b), preset message header formats, and preset data header formats are preset in advance. When the first end 10 transmits the first data block in the first data stream (which is the data stream of the first application on the first end) to the second end 20, the first data block will be first sent to the first control module 11 in the first application. The first control module 11 generates the first message to be sent for the first data block and sends the first message to the second end 20 through an intermediate network apparatus according to the address information of the second end 20. For the specific implementation of the first control module 11 generating the first message, see the relevant content in the context of the present application.

Further, a fourth control module (not shown in the FIGURE) can also be installed on the intermediate network apparatus (such as a switch, a router, and a firewall) at the same time, so as to further identify, verify (or monitor and intercept) the first message. The fourth control module can be similar to the first control module 11 as mentioned above or the second control module 12 as described below in terms of the preset information therein and the achievable functions thereof. In specific implementation, after the first control module 11 in the first application generates the first message to be sent, the network interface on the first end 10 can be called, and the first message will be first sent to the intermediate network apparatus according to the TCP/IP protocol on the basis of the address information (the first preset string corresponding to the second end) of the second end. The fourth control module in the intermediate network apparatus verifies the first target header information included in the first message according to the preset information (such as multiple pieces of transmission transaction attribute information and message header format) stored therein, determines whether the first message meets requirements, and if yes, executes the operation of sending the first message to the second end 20 according to the address information of the second end.

Alternatively, the fourth control module on the intermediate network apparatus may not have the functions of generating a message, verifying, intercepting among others as the first control module 11 does, but only has the function of log audit, and it is used for recording and analyzing the received message to generate log information of the corresponding transmission transaction. For example, after receiving the first message sent by the first end, the intermediate network apparatus can use the fourth control module therein to parse the first message, so as to generate a log corresponding to the first data block according to the parsed first data block and the first target header information of the first data block, and record the log in the log table of the first transmission transaction. Wherein the log content of each log in the log table can include, but is not limited to: a message header of a corresponding data block, a data header (optional), the transmission transaction attribute information of the first transmission transaction, etc. By using the log table of the first transmission transaction, the network data traffic related to the first transmission transaction can be analyzed visually.

According to the above content, under the circumstances shown in FIG. 3*b*, when the first control module 11 on the first end 10 is used for sending the first message as generated to the second end 20 according to the address information of the second end, it can be specifically used for:

sending the first message to an intermediate network apparatus according to the address information of the second end to send it to the second end through the intermediate network apparatus;

wherein before sending the first message to the second end, the intermediate network apparatus further executes any one of the following operations: verifying the first target header information included in the first message; generating log information of the first transmission transaction according to the first message.

For the description of the log information, see the narrative of the log table in the preceding text. For the specific implementation of verifying the first target header information, see the relevant content in the other embodiments in the context of the present application, which will not be repeated herein.

It should be added that the first control module 11 needs to be developed by developers of applications to achieve the functions, and in the scenario shown in FIG. 3*b*, only the application participates in communication activities independently.

In Case 12: the preset strings are used for hiding the address information of corresponding ends (for example, the preset strings are random strings that are generated at random, and correlation information associated therewith includes the address information of the corresponding ends).

Figure 3C:
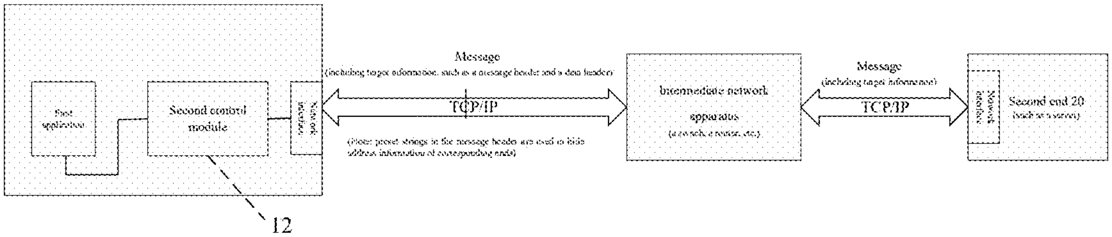

In the above case, as shown in FIG. 3*c*, an independent second control module 12 can be installed externally on the application of the first end 10 to achieve various control functions, e.g., generating a message to be transmitted for the data that needs to be transmitted to the second end 20, sending the message, identifying and verifying (auditing) the received message (such as the second message sent from the second end 20), etc. In this way, communication with the application on the first end 10 needs to be carried out through the second control module 12, and preset strings (such as random strings) can be used for hiding the address information (such as IP addresses) of corresponding ends and preset in the second control module 12. For example, the first preset string corresponding to the second end and is included in the multiple pieces of transmission transaction attribute information preset in the second control module 12 is used for hiding the address information of the second end. When the first end 10 needs to transmit the first data block of the first data stream of the application to the second end 20, the first data block will be sent to the second control module 12 first. The second control module 12 generates a message to be sent for the first data block as received according to the preset information (such as multiple pieces of transmission transaction attribute information, and message header format) stored therein, and sends the generated message to the second end. For the specific implementation of the first control module 12 generating the message, see the relevant content in the context of the present application.

Figure 3D:
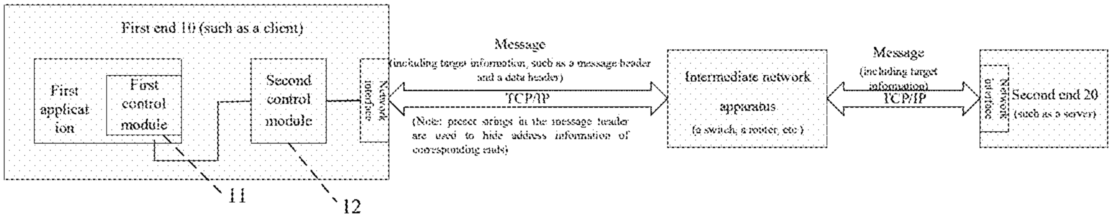

Alternatively, as shown in FIG. 3*d*, while the first control module 11 is installed in the application on the first end 10, the second control module 12 can also be installed externally on the application. When the first end 10 needs to transmit the first data block of the first data stream of the application to the second end 20, the first control module 11 can be used for determining the transaction attribute identification of the transmission transaction corresponding to the first data stream according to the preset information stored therein, and sending the transaction attribute identification and the first data block to the second control module 12; according to the transaction attribute identification and the first data block, the second control module 12 generates a first message to be sent, and sends the first message to the second end 20. For the specific implementation of the second control module 12 generating the first message, see the relevant content in the context of the present application.

It should be added that Case 12 can further share the two solutions described in FIG. 3*c* and FIG. 3*d* with Case 11. The fourth control module can also be installed on the intermediate network apparatus (such as a switch, a router, and a firewall) to further identify and verify (or monitor and intercept) the first message. For specific implementation, see the relevant content in Case 11. Alternatively, the intermediate network apparatus may not have the function of verification, but only has the function of log audit (as a software application for analyzing transmission transaction data).

In addition, the second control module 12 as an independent control program that can obtain the first preset string corresponding to the second end according to the preset information stored therein, and obtain the real address information of the second end according to the first preset string; then, it calls a network interface of the first end 10, and forwards the first message to the second end 20 through the TCP/IP protocol according to the real address information of the second end. For the specific implementation principle of the second control module 12 sending the first message to the second end 20, see the principle of the first control apparatus 31 sending the first message to the second end 20 in the other embodiments as described below in combination with FIG. 4*a*. With a function similar to the network control function of software firewall and antivirus software among others, the second control module 12 can have network traffic control over applications with normal permissions, so that the applications with normal permissions cannot directly call the network interface of the first end to access the network, but must access the network through the interface provided by the second control module 12.

Figure 7A:
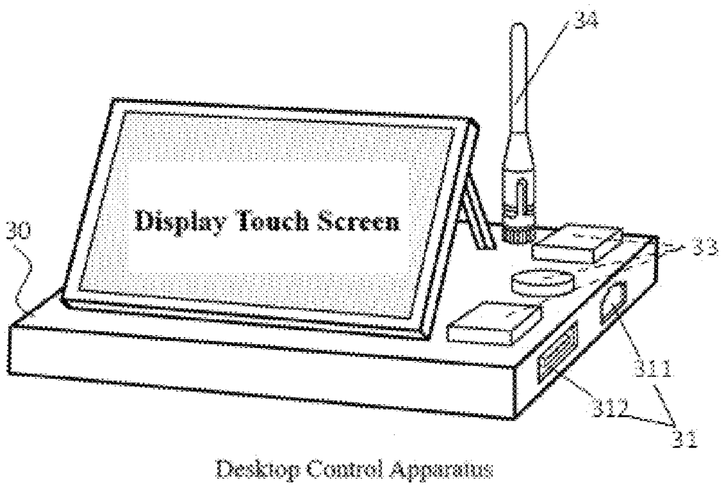
FIG. 7*a* to FIG. 7*c* are diagrams of the specific forms of control apparatuses provided in the embodiments of the present application.
Figure 7B:
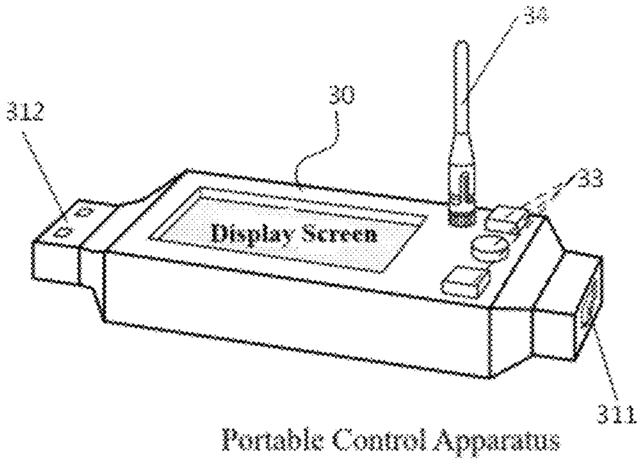

The other specifically implementable technical solution is to add a control apparatus between the first end 10 and the second end 20, and further improve the protection and control capabilities of data security in a way such as physical special control. Wherein in some embodiments, the control apparatus can be an apparatus external to the first end 10 and the second end 20. In this case, as shown in FIGS. 7*a* and 7*b*, the specific form of the control apparatus 30 can be a desktop form as shown in FIG. 7*a* or a portable form as shown in FIG. 7*b*. Herein, limitation is not imposed thereon. In specific implementation, as shown in FIG. 7*a* or FIG. 7*b*, the control apparatus 30 can comprise, but is not limited to, the following structural components: a display touch screen (or a display screen), a wireless module (such as a WiFi (Wireless Fidelity, a wireless network technology) module deployed on the physical layer, a mobile cellular network (3G, 4G, 5G) module, a Bluetooth module, a LoRa (a long-distance wireless transmission technology based on the spread spectrum technology) module, etc.; while the wireless module is not shown in FIGS. 7*a* and 7*b*, reference can be made to the wireless module 32 shown in FIG. 7*c*), an operation button 33, an antenna 34, and a peripheral interface 31. The antenna 34 is used for receiving and sending network signals in wireless communication of Bluetooth, WiFi, mobile cellular networks (such as 3G, 4G, and 5G), etc. The peripheral interface 31 is a wired transmission interface for connecting a control apparatus to other apparatuses through data cables. As such, the peripheral interface 31 can also be referred to as a wired interface. In specific implementation, the peripheral interface 31 can comprise a network cable interface 311 (also known as a local area network interface, such as an Ethernet interface, a fiber optic interface, and a twisted pair interface) for connection with a network and a bus interface 312 (such as a USB (Universal Serial Bus) interface and an SPI (Serial Peripheral Interface) interface) for communication with a bus. For specific functions of the structural components included in the control apparatus 30, see the relevant content in the following text.

Figure 7C:
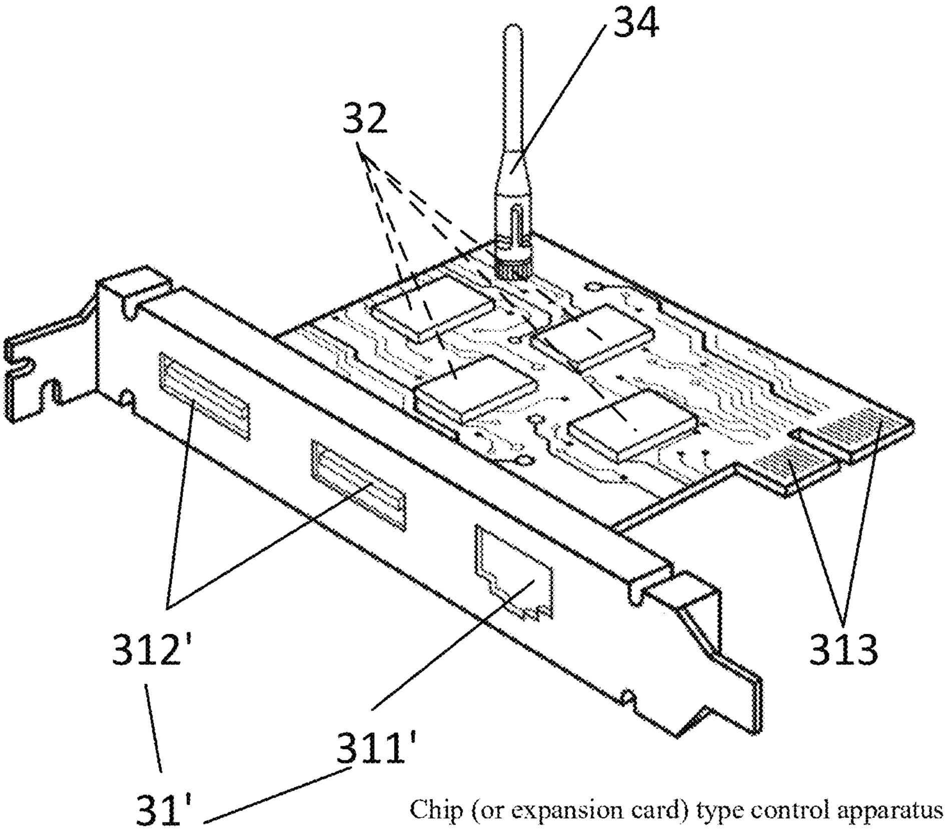

In some other embodiments, the control apparatus can also be an apparatus that can be integrated into the first end 10 and/or the second end 20. In this case, the specific form of the control apparatus can be a single chip or an expansion card, which is similar to an integrated graphics card, and can be integrated into a motherboard of the first end 10 or the second end 20; alternatively, the specific form of the control apparatus can also be similar to a discrete graphics card, which can be integrated into the motherboard of the first end 10 or the second end 20; herein, limitations are not imposed thereon. In specific implementation, as shown in FIG. 7*c*, in the case that the control apparatus takes the form of a chip or an expansion card, the control apparatus 30 can specifically comprise, but is not limited to, the following structural components: a wireless module 32, a board-to-board interface 313, an antenna 34, and a peripheral interface 31'. The board-to-board interface 313 can be, but is not limited to, a PCIE (Peripheral Component Interconnect Express) interface, which is a high-speed serial computer expansion bus standard interface. In the present embodiment, the control apparatus 30 can be connected to the motherboard of, e.g., the first end 10 through the PCIE interface. The peripheral interface 31' can comprise a first-type peripheral interface 311' and a second-type peripheral interface 312'. The first-type peripheral interface 311' can be a USB composite apparatus interface, through which the control apparatus can be connected to the display screen of, e.g., the first end and perform control operations to display some content (such as inquiry information and names of transmission transactions) through the display screen of, e.g., the first end, and perform operations. By executing independent display and operation on the control apparatus, effective isolation from a driver program of a computer can be realized, so as to avoid executing important operations on the computer (which may be maliciously controlled). A second-type peripheral interface 312' can be, but is not limited to, a USB interface, a network cable interface, etc. For the specific introduction about the wireless module 32, the antenna 34, and the network interface, see the relevant content in the preceding text.

When the other specifically implementable technical solution provided in the present embodiment is introduced below, the present solution is elaborated by taking the control apparatus 30 as an apparatus external to the first end 10 and the second end 20 for example.

Figure 6A:
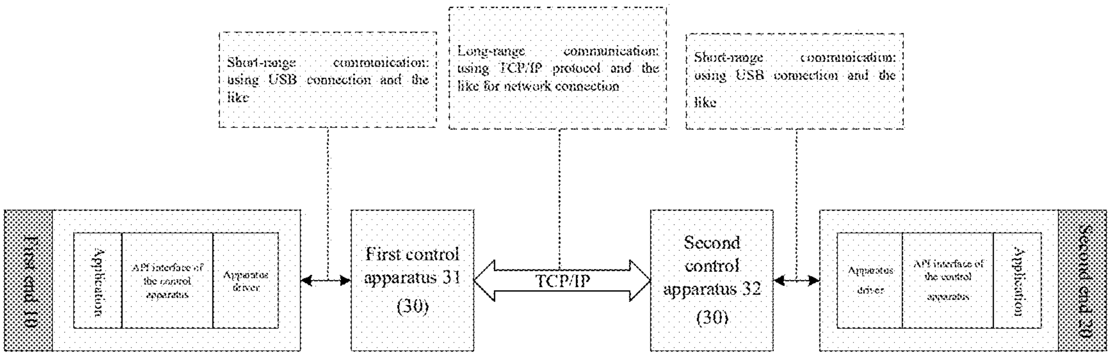
FIG. 6*a* to FIG. 6*b* show examples of apparatus drivers and API interfaces of corresponding control apparatuses that are respectively arranged on a first end and a second end as provided in the embodiments of the present application.

Herein, It should be added that in the case of adding control apparatuses to improve the protection and control of security on data transmission between different ends, apparatus drivers (also known as apparatus drive programs) of the control apparatuses, API (Application Programming Interface) interfaces, or SDKs (Software Development Kit) are deployed on different ends. Through APIs (or SDKs), applications on the ends can access the apparatus drivers of the control apparatuses. FIG. 6*a* shows an example of the apparatus drivers and API interfaces of the control apparatuses that are deployed on the first end 10 and the second end 20, respectively. The example is directed to a second possible embodiment (i.e., adding two control apparatuses between the first end 10 and the second end 20) as described below.

Based on the above content, in a first possible embodiment, one first control apparatus can be added between the first end and the second end, and the first end 10 can send the first message to the second end 20 through the first control apparatus. In other words, as shown in FIGS. 4*a* to 4*c*, the system provided in the present embodiment can further comprise a first control apparatus 31, which is in communication connection with both the first end 10 and the second end 20.

Figure 4A:
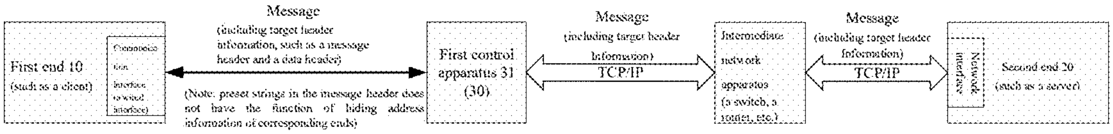
Figure 4B:
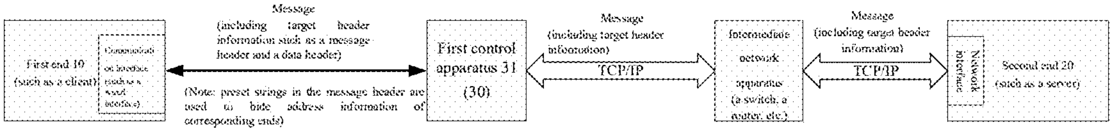
Figure 4C:
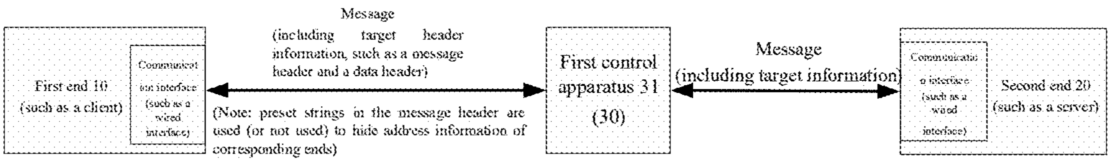

In specific implementation, the scenarios where the first control apparatus 31 is in communication connection with the first end 10 and the second end 20 can include, but are not limited to, several relatively specific scenarios as follows:

Scenario 11: as shown in FIGS. 4*a* and 4*b*, suppose that the first end 10 and the second end 20 serve as remote ends to each other and the first control apparatus 31 is deployed at the site where the first end 10 is located, the first end 10 can be connected to the first control apparatus 31 through a non-network-connected communication interface to carry out near-field communication; wherein the non-network-connected communication interface can be a bus interface (such as a USB interface and an SPI interface) or a wireless interface (such as an interface implemented through a WiFi module, a Bluetooth modules, and the like). To reduce the cost of remote communication, the second end 20 can be connected to the first control apparatus 31 through a network interface with the assistance of an intermediate network apparatus (such as a switch and a router) still by using the TCP/IP protocol to carry out remote communication. The network interface can be a wired interface, e.g., it is a network interface such as a twisted pair Ethernet interface and a fiber optic interface; alternatively, it can also be a wireless interface, e.g., it is an interface implemented through a 3G module, a 4G module, a 5G module, or a satellite communication module.

In Scenario 11, the first end can completely avoid using network communication (avoid using a network card); of course, it can also use the network to carry out normal network communication with other ends (such as a third end). In this regard, a scenario supplementary to Scenario 11 is described as follows: as shown in FIG. 4*e*, while the first end is in a non-network connection with the control apparatus, it can establish a normal network connection with the third end (while using a network card), so that the first end can not only hide the communication with the second end through the non-network connection and the control apparatus, but also communicate with the third end through the network connection, without affecting normal network communication.

Figure 6B:
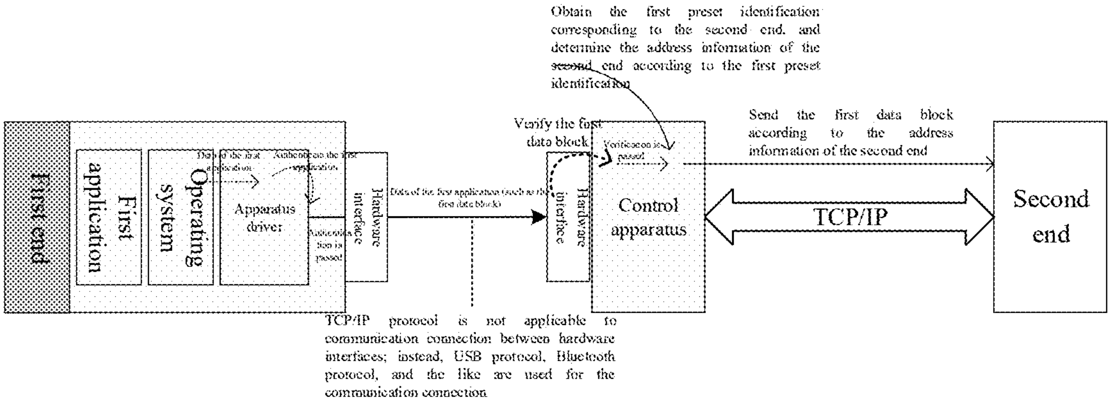

For a detailed description of the benefits of Scenario 11, see the relevant content described below in combination with FIG. 6*a* and FIG. 6*b*.

Scenario 12: as shown in FIG. 4*c*, suppose that the first end 10 and the second end 20 serve as near ends to each other, e.g., both are in the same site, and the first control apparatus 31 is deployed in the site where the first end 10 and the second end 20 are located, then the wired interfaces (e.g., bus interfaces such as USB interfaces, and network interfaces such as twisted pair Ethernet interfaces) on the first end 10, the first control apparatus 31, and the second end 20 can be used to enable the first control apparatus 31 to establish communication connections with the first end 10 and the second end 20 in a wired manner, respectively. Of course, in the other embodiments, wireless modules on the first end 10, the first control apparatus 31, and the second end 20 can be used to enable the first control apparatus 31 to establish communication connections with the first end 10 and the second end 20 in a wireless manner of near-field communication such as WiFi and Bluetooth, respectively.

Figure 4D:
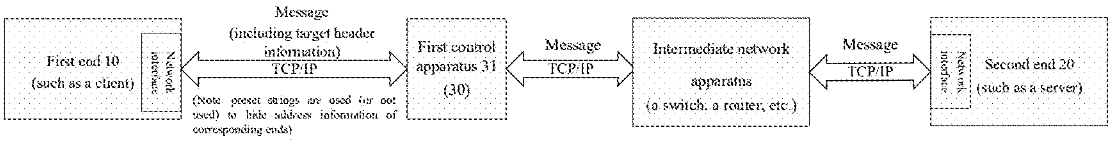
Figure 4E:
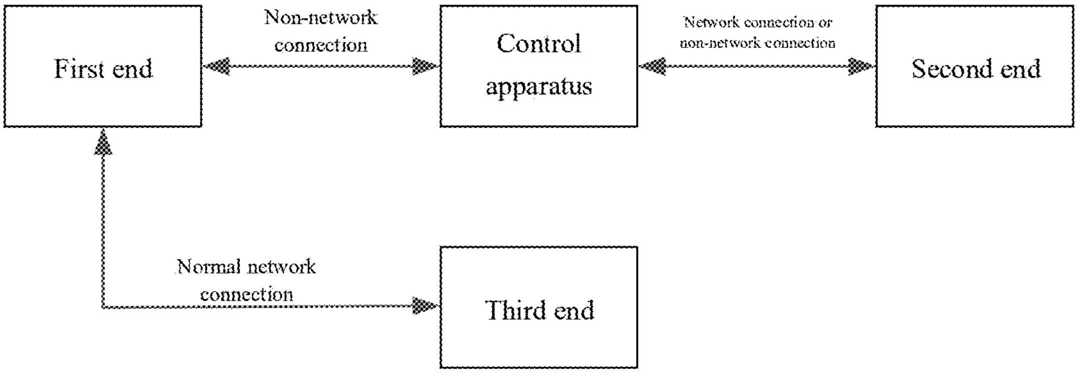

Scenario 13: as shown in FIG. 4*d* or FIG. 5*a*, suppose that the first end 10 and the second end 20 serve as remote ends to each other and the first control apparatus 31 is deployed in a site that is relatively far away from the first end 10 and the second end 20, then the first control apparatus 31 establishes network connections with the first end 10 and the second end 20 by using the TCP/IP protocol, respectively.

The first end 10 in connection with the first control apparatus 31 through a USB interface is taken as an example as below to elaborate the specific implementation of connecting the first end 10 to the first control apparatus 31.

Figure 9:
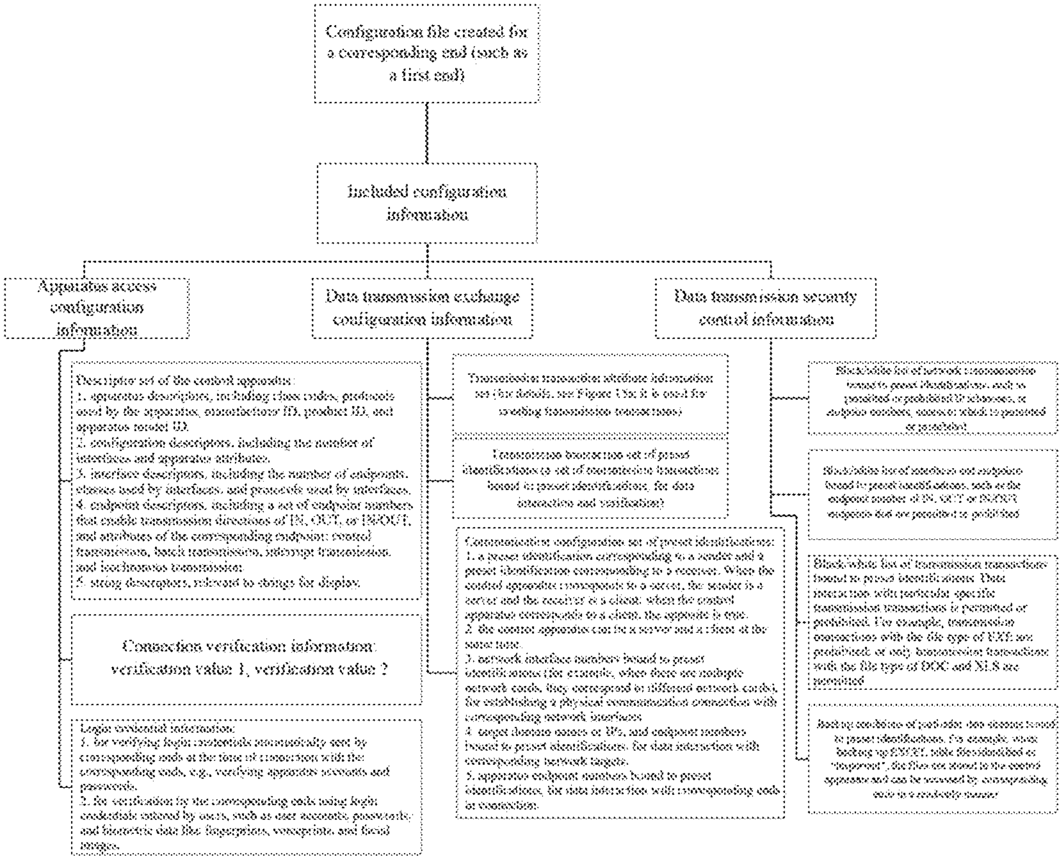
FIG. 9 is a diagram of configuration information included in a configuration file as provided in the embodiments of the present application.

Before introducing the specific implementation of connecting the first end 10 to the first control apparatus 31, a configuration file that needs to be created in advance for the first end 10 is explained. As shown in FIG. 9, the configuration file created in advance for the first end 10 includes at least the following information: apparatus access configuration information, data transmission and exchange configuration information, and data transmission security control information.

I. The Apparatus Access Configuration Information can Include, but is not Limited to, the Following Items:

1) a set of descriptors of the control apparatus, wherein the set of descriptors include, but are not limited to, the following content:

① apparatus descriptors, e.g., class codes and protocols (such as TCP/IP protocol, USB protocol, and Bluetooth protocol) used by the control apparatus, and manufacturer ID, apparatus ID, and product model ID of the control apparatus;

② configuration descriptors, e.g., the number of interfaces of the control apparatus, and attributes (such as current demand) of the control apparatus;

③ interface descriptors, e.g., interface type and the protocols used by the interfaces (for example, the USB interface uses the USB protocol, and the network interface uses the TCP/IP protocol);

④ endpoint descriptors, e.g., a set of endpoints that enable a transmission direction of IN, OUT, or IN/OUT, attribute information (or configuration information, such as endpoint number and endpoint type) and transmission manner (which can include control transmission, bulk transmission, interrupt transmission, isochronous transmission and the like in the case of the USB protocol) of each endpoint; it should be noted that one control apparatus can have multiple sets of IN/OUT endpoints; for example, it has 5 sets, which are 5 IN endpoints (input endpoints) and 5 OUT endpoints (output endpoints), or 3 IN endpoints and 7 OUT endpoints in an asymmetric case, for high-speed data transmission; moreover, it can have IN endpoints alone or OUT endpoints alone for unidirectional data transmission; herein, limitations are not imposed thereon;

⑤ string descriptors, which are relevant strings for display, e.g., they display the manufacturer name, apparatus name, apparatus product name and the like of the control apparatus.

2) connection verification information (or access verification information)

the connection verification information includes a first verification value (Verification Value 1) and a second verification value (Verification Value 2) for interactive verification when an end (such as the first end) is connected to a corresponding control apparatus. For example, referring to FIG. 4*a*, in the process of establishing a communication connection between the first end 10 and the first control apparatus 31, the first end 10 sends to the first control apparatus 31 a first verification value, which is used for verifying the match; accordingly, when the first control apparatus 31 determines that the first verification value as received meets predetermined requirements, it will feed a second verification value back to the first end 10.

3) login credential information, which includes the following items:

verification information of the apparatus driver of the control apparatus, such as the account number and password of the apparatus driver, wherein the verification information is used in such a way that when an end establishes a communication connection with a corresponding control apparatus, login credentials (i.e., the verification information of the apparatus driver) automatically sent from the end are verified;

verification information relevant to a user's access to the application program of the control apparatus, such as the account number and password of the user, or the biometric data of the user, including fingerprint, voiceprint, portrait, etc., wherein the verification information facilitates verifying the login credentials entered by the user on the corresponding end.

II. The Data Transmission and Exchange Configuration Information can Include, but is not Limited to, the Following Items:

1) a set of transmission transaction attribute information of multiple transmission transactions as supported, for creating transmission transactions when an end needs to transmit data to another end; for the set of transmission transaction attribute information, see Table 1b;

2) a set of transmission transactions of preset strings, which can be understood as a set of transmission transactions associated with (or bound to) preset strings; in other words, the correspondence between the preset strings and the transmission transactions is that one preset string can correspond to one or more (two or more) transmission transactions for interaction and verification of data transmission; wherein the preset strings are strings that are pre-set for pre-registered services (or available services) on corresponding ends.

In an example, the preset strings can be random strings or binary values that are generated at random and lack regularity (or specific rules), and have the function of hiding the address information of the corresponding ends or making it impossible to infer the manner of accessing the target address. For example, referring to FIG. 4*b* and taking the communication connection between the first end 10 and the first control apparatus 31 through a USB interface as an example, suppose that a file exchange service is pre-registered on the first end 10 and directed to the first control apparatus 31 with a network address of 192.*.1.2 and an endpoint number 1, and grants access permissions to the second end 20, then one second preset string C corresponding to the first end 10 can be preset for the service pre-registered on the first end 10; the correlation information associated with the second preset string C can include, but is not limited to, the address information of the first end 10, the file exchange service, and permitted access information (e.g., the IP address of the second end), wherein the address information of the first end 10 is directed to the IP address (192.*.1.2:1) of the first control apparatus 31. Further, if the data interaction permitted under the file exchange service includes requesting network file resources from the second end and uploading a jpg file to the second end, i.e., it can be understood that the file exchange service includes a transmission transaction of "requesting network file resources" and a transmission transaction of "uploading a jpg file", then the transmission transactions bound to the second preset string C corresponding to the first end 10 are the transmission transaction of "requesting network file resources" and the transmission transaction of "uploading a jpg file"; in other words, the preset string C corresponding to the first end 10 has a correspondence with the transmission transaction of "requesting network file resources" and the transmission transaction of "uploading a jpg file".

In another example, as shown in FIG. 4*a*, the preset strings may not have the function of hiding the address information of the corresponding ends, but directly represent the address information (such as IP address) of the corresponding ends. In the same example in the above item 2), the second preset string C corresponding to the first end 10 can also refer to 192.***.1.2:1. As a preferred example, in the present embodiment, it is a preferable selection that the preset strings are random string that are generated at random, and can be used for hiding the address information of the corresponding ends.

To sum up, the preset string corresponding to the first end is referred to as the second preset string. Taking the first end as an example, regarding the first end, for a set of transmission transactions of the second preset string (or the correspondence between the second preset string and the transmission transactions), see the following example in Table 5:

TABLE 5

A set of transmission transactions of the second preset string

| The second preset string: | Name of transmission transaction (or transaction type): | Remark information: |
|---|---|---|
| The second preset string C21 | Transmission transaction D11<br>Transmission transaction D12 | Transmission transaction under the service 1 |
| The second preset string C21 | Transmission transaction D13 | Transmission transaction under the service 2 |
| | . . . | |

It should be added that to facilitate the query of the transmission transaction attribute information, the set of transmission transactions of the second preset string shown in Table 5 can further include the transaction attribute identification of the transmission transaction, i.e., the data storage format in the set of transmission transactions of the second preset string can be, but is not limited to, the following format:

[the second preset string: the name of the transmission transaction (or the transaction type): the transaction attribute identification]

Through this format, the correspondence between the second preset string and the preset transaction type, as well as the correspondence between the transaction type and the transaction attribute identification, can be represented together.

3) A set of communication configurations of the pre-set strings,

When communication configuration is applied to a preset string, the configured information includes, but is not limited to, the following content:

① the network interface number of a corresponding end, which number is bound to the preset string (if the corresponding end has multiple network cards, the network interface numbers of multiple network cards can be bound thereto), and used for establishing a physical communication connection with a network interface of the corresponding end; in the same example in the above item 2), the network interface number bound to one second preset string C can be the network interface number of the network card of the first end;

② the target address information (such as domain name or IP, port number, MAC address, and host name) bound to the preset string, which information is used for data exchange with the corresponding network target; in the same example in the above item 2), one second preset string C can further be bound to the IP address of the second end, the target domain name www.####.com of the target website deployed on the second end, etc.

③ the apparatus endpoint number among others bound to the preset string, which number is used for data exchange with the connected end (such as a client or a server); in the same example in the above item 2), referring to FIG. 4*b*, one second preset string C can be bound to the endpoint number of, e.g., one OUT endpoint of the first control apparatus 31, such as the endpoint number 1 in the example in the above item 2).

The preset string can be bound to not only the above communication information, but also other information, such as communication capability information (also known as data transmission direction control capability information (abbreviated as data transmission direction control information)), string alias information of the preset string, and preset string remark information. The above data transmission direction control information is used for indicating any of the following items: only allowing the control apparatus to forward messages to the target end (such as the second end), prohibiting the control apparatus from forwarding messages to the target end, allowing the control apparatus to forward messages to the target end, and allowing the control apparatus to forward messages sent by the target apparatus. The string alias information of the preset string is used for hiding the real preset string and can be used when encrypting messages.

An example of the communication configuration information of the second preset string corresponding to the first end is provided as below by taking the first end as a client and the second end as a server for example (note: the content after the symbol "//" is the explanation of the corresponding configuration item).

Example 11

"remarks of the second preset string": "unidirectional upload (uplink) from the client"

"the second preset string": "0x0A"/in reality, it is a long byte string or binary value that is generated at random or according to specific rules "target address": "192.###0.1.1:8000" I/it is the target IP address and port for communication, such as the IP address and port number of the server "Communication capability information": "TX"/it represents only sending data; in other words, only the control apparatus connected to the client is allowed to forward (or upload) the received data sent by the first end to the server; if the server returns the corresponding data, the control apparatus connected to the client will not send the data returned by the server to the client.

"submitted parameters": [{"token": "Control****=###1"//parameter data (optional) uploaded by the control apparatus connected to the client to the server, including the received data sent by the client and some data of the control apparatus}];

"string alias information": ["0x1A", "0x2A", "0x3A"]// alias of the second preset string; it is used for hiding the real string 0x0A, and 0x1A sent by the client or the control apparatus connected to the client is equal to 0x0A Example 12

"remarks of the second preset string": "unidirectional download (downlink) to the client, i.e., the client receives data"

"the second preset string": "0x0B"

"target address": "192.###0.1.2:8001"

"communication capability information": "RX"//it represents only receiving data (i.e., unidirectional transmission for downloading data); the control apparatus connected to the client can periodically request data from the server through preset request manners and relevant parameters, and store the received data locally (e.g., in a memory buffer or in an external storage area), waiting for the client to request data; even if the client actively sends request parameter data, the control apparatus connected to the client will not forward the received request parameter data sent by the client to the server, i.e., the control apparatus connected to the client is prohibited from forwarding the received request parameter data (such as messages) sent by the client to the server.

"submitted parameters": [

{"token": "Control****=###1",

"query": "getDataID=1"//it is a preset query parameter for obtaining data from the server; when using unidirectional transmission to download data, the client cannot upload data (including parameters of query data), or even if the client actively uploads the parameters of query data, the control apparatus connected to the client will not forward them to the server; therefore, in order to obtain data from the server, corresponding query parameters will be preset in the control apparatus connected to the client, and the control apparatus connected to the client will automatically submit them to the server; herein, getDataID=1 means sending a request to query the getDataID parameter value of 1.

"setTime": "1000"//it is the time of automatically submitting query parameters, in milliseconds}]

"string alias information": ["0x1B", "0x2B", "0x3B"]/ they are aliases of the second preset string Example 13

"remarks of the second preset string": "bidirectional transmission of the client"

"the second preset string": "0x0C"

"target address": "192.168.1.3:8002"

"communication capability information": "RXTX"/it represents the capabilities of receiving and sending data, i.e., the control apparatus connected to the client is allowed to forward data (or messages) to the target end (such as the server), and the control apparatus connected to the client is allowed to forward the received data sent by the target end to the client.

"submitted parameters": [{"token": "Control*****=###1"/the query and setTime can be absent in the cases of bidirectional transmission and unidirectional download}]

"string alias information": ["0x1C", "0x2C", "0x3C"]

III. Data Transmission Security Control Information can Include, but is not Limited to, the Following Content Items:

1) a blacklist/whitelist of network communication bound to (or associated with) a preset string: e.g., IP addresses or port numbers, access to which is allowed or prohibited;
2) a blacklist/whitelist of interfaces and endpoint numbers bound to a preset string: e.g., under the preset string, endpoint numbers that allow or prohibit operations on IN endpoints, OUT endpoints, or IN/OUT endpoints of a corresponding control apparatus;
3) a blacklist/whitelist of transmission transactions bound to a preset string: for example, under the preset string, data interaction of a specific transmission transaction is allowed or prohibited, e.g., prohibiting transmission transactions in the file type .exe, or only allowing transmission transactions in the file types DOC and XLS;
3) data backup conditions on which a data stream corresponding to a transmission transaction is backed up in a control apparatus: e.g., "important", Excel files;
4) information on types of data, transmission of which is allowed or prohibited, transmitted messages in structures that comply with preset rules, such contents included in transmitted messages as transmission transaction attribute, each in conformity with preset rules, preset strings in conformity with preset rules, etc.

It should be added that the configuration file that is pre-created for the first end 10 can be: a file in any format, such as JSON (Java Script Object Notation, a lightweight data exchange format), HSON, XML (Extensible Markup Language), YAML (a data description language similar to the subset XML of Standard Generalized Markup Language), binary data structure, and PROPERTIES; or a executable script, etc. In the present embodiment, limitations are not imposed on the format of the configuration file. The generation of the configuration file can be done by users with administrative privileges by means of editing software (such as a configuration file editor) in the manner of static manual editing; alternatively, the configuration file can also be generated automatically by means of a corresponding configuration interface in the manner of clicking and the like. Herein, limitations are not imposed thereon.

Referring to the configuration file pre-created for the first end 10 as mentioned above, likewise, a corresponding configuration file can also be pre-created for the second end. For the specific content that can be included in the configuration file pre-created for the second end, see the content included in the configuration file pre-created for the first end 10 as mentioned above, which will not be repeated herein.

An example of the communication configuration information of the first preset string corresponding to the second end is provided as below by taking the first end as a client and the second end as a server for example (note: the content after the symbol "//" is the explanation of the corresponding configuration item).

Example 21

"remarks of the first preset string": "8000"//8000 unidirectional sending (uplink) of data from the server "the first preset string": "0x0A"//Note: although the first preset string corresponding to the server herein is the same as the second preset string (including the string alias information) corresponding to the client in Example 11 as provided above, it is actually different; the first preset string only acts in the communication between the server and the control apparatus connected thereto, and the second preset string only acts in the communication between the client and the control apparatus connected thereto; therefore, it is safe to say that the first preset string and the second preset string can be the same, and can also be different.

"listening port number": "8000"//the port number (such as the port number corresponding to the control apparatus connected thereto), on which the server listens, and which is used for network services "communication capability information": "TX"//representative of only sending data "submitted parameters": [{"token": "Control****=###t2", "Check": "getDataID=1"/the control apparatus connected to the server is used for verifying parameter data (optional); during the use of unidirectional upload from the server, the server cannot receive data after the client is connected; therefore, the judgment logic of the server after receiving data from the client is preset in the control apparatus connected to the server; after the control apparatus connected thereto makes judgement, the data in the data buffer is extracted and uploaded to the client (the data in the buffer is sent in advance by the server to a corresponding control apparatus connected thereto); herein, it is judged whether getDataID is equal to 1; it can also be used as a parameter for data query in a database or a data buffer;

"string alias information": ["0x1A", "0x2A", "0x3A"]

Example 22

"remarks of the first preset string": "8001 unidirectional reception (downlink) at the server"

"the first preset string": "0x0B"

"listening port number": "8001"

"communication capability information": "TX"//representative of only sending data "submitted parameters": [{"token": "Control****=###t2", "answer": "ACK"/the data (optional) that is answered automatically after the server receives data from the client; during the use of unidirectional download to the server, the server cannot send data after the client is connected; therefore, the data that needs to be answered is preset in the control apparatus connected thereto.}]

"string alias information": ["0x1B", "0x2B", "0x3B"]

Example 23

"remarks of the first preset string": "8002 bidirectional transmission of the server"

"the first preset string": "0x0C"

"listening port number": "8002"

"communication capability information": "RXTX"//representative of the capabilities of receiving and sending data "submitted parameters": [{"token":"Control*****=###2"//since the upload or download from or to the server depends on the connection with the client, automatic sending at the setTime is optional herein} string alias information: ["0x1C", "0x2C", "0x3C"]

For the content that is not elaborated in Examples 21 to 23, see the corresponding content in Examples 11 to 13. In addition, the configuration file pre-configured for the first end 10 and the configuration file pre-configured for the second end 20 can be integrated into the same configuration file. Herein, limitations are not imposed thereon.

Upon the completion of creating the configuration file, it can be sent to the corresponding control apparatus in three manners as follows. Specifically, they are put as follows.

Manner 1 is offline distribution (copying manually). Specifically, the configuration file can be encrypted (stored in, e.g., a distributor (a physical device similar to a USB flash disk)), and then access a corresponding control apparatus in the manner of offline distribution (copying manually) to carry out distribution. Wherein the configuration file can be a collection of configuration files for the first end and the second end, e.g., it can specifically be a collection of configuration files for a server and all clients. In specific implementation, for example, a normal copying manner can be used: after a distributor gets access to (i.e., is connected to) a corresponding control apparatus, the corresponding configuration file can be manually selected and copied to the corresponding control apparatus, e.g., the configuration file configured for the first end 10 as mentioned above can be copied to the control apparatus connected to the first end 10. For another example, automatic distribution can be carried out through a distributor: specifically, as shown in FIG. 4*b*, when the distributor (not shown in the FIGURE) accesses, e.g., the first control apparatus 31 connected to the first end 10, it can perform matching operations according to the apparatus hardware feature identifier (such as apparatus ID) sent by the first control apparatus 31, and return the configuration file (such as the configuration file pre-created for the first end 10 and the configuration file pre-created for the second end 20) corresponding to the first control apparatus 31; after receiving the corresponding configuration file, the first control apparatus 31 performs verification and decryption; after confirming the authenticity and validity, the first control apparatus 31 is configured according to the configuration file. Based on the above, it can be ensured that after the configuration file is generated and before it is recognized by the control apparatus, the configuration file is encrypted and signed with a certificate, and therefore cannot be stolen or tampered with; even the user of the distributor cannot obtain information on the configuration file, thus the security of the configuration file can be ensured.

Manner 2 is online distribution. The configuration file can be stored with encryption in a configuration server (such as a TFTP (Trivial File Transfer Protocol) server, which is a file download server), and distributed with encryption by using the existing network configuration or establishing a second network physical interface (a secure control network). Specifically, in an example, a network distribution manner of full-scale distribution can be adopted, e.g., after receiving single-time configuration data request parameters sent by the control apparatus connected to the first end, the configuration server can send all the corresponding configuration files to the control apparatus connected to the first end at one time. In another example, a network distribution manner of on-demand distribution can be used, i.e., through the network, required configuration data, which are important data including connection verification information, such as the first verification value and the second verification value, and login credentials in the corresponding configuration file, can be distributed in real-time according to the received request parameters sent by the corresponding control apparatus.

Manner 3 is wireless distribution by other means. The configuration data is encrypted by a distribution terminal or a control apparatus, and shared on the basis of wireless signals, such as Bluetooth, LORA, and WiFi.

Further, the control apparatus can synchronize some configuration data in the configuration file to a corresponding end connected thereto. For example, referring to FIG. 4*b*, taking the first end 10 as a client for example, the first control apparatus 31 connected to the client completes the configuration according to the corresponding configuration file; afterward, when the client requests to update the configuration status, the first control apparatus 31 can send the name of the client, the access credential (such as a 2048-byte random number) corresponding to the client, the preset string corresponding to the client, the correspondence among the preset string, the transaction attribute name (or transaction type), and the transaction attribute identification, and the like to the client to facilitate the client carrying out registration in the apparatus driver (which is the apparatus driver of the first control apparatus 31, as shown in FIG. 6*a*) installed thereon; subsequently, the application thereon can be called through the API (Application Programming Interface) interface of the apparatus driver. There can be multiple access credentials (e.g., Credential 1 is used for data encryption and decryption, while Credential 2 is used for communication verification), such as passwords for subsequent communication between the client and the first control apparatus 31. The credentials are recorded by the apparatus driver, and encrypted or decrypted when the first control apparatus sends or receives data, to prevent other applications from bypassing the apparatus driver to send or receive data to the first control apparatus 31.

Upon the completion of the distribution of the configuration file, the control apparatus and the corresponding end can establish a communication connection on the basis of the configuration data (such as configuration file data) stored therein.

Figure 10:
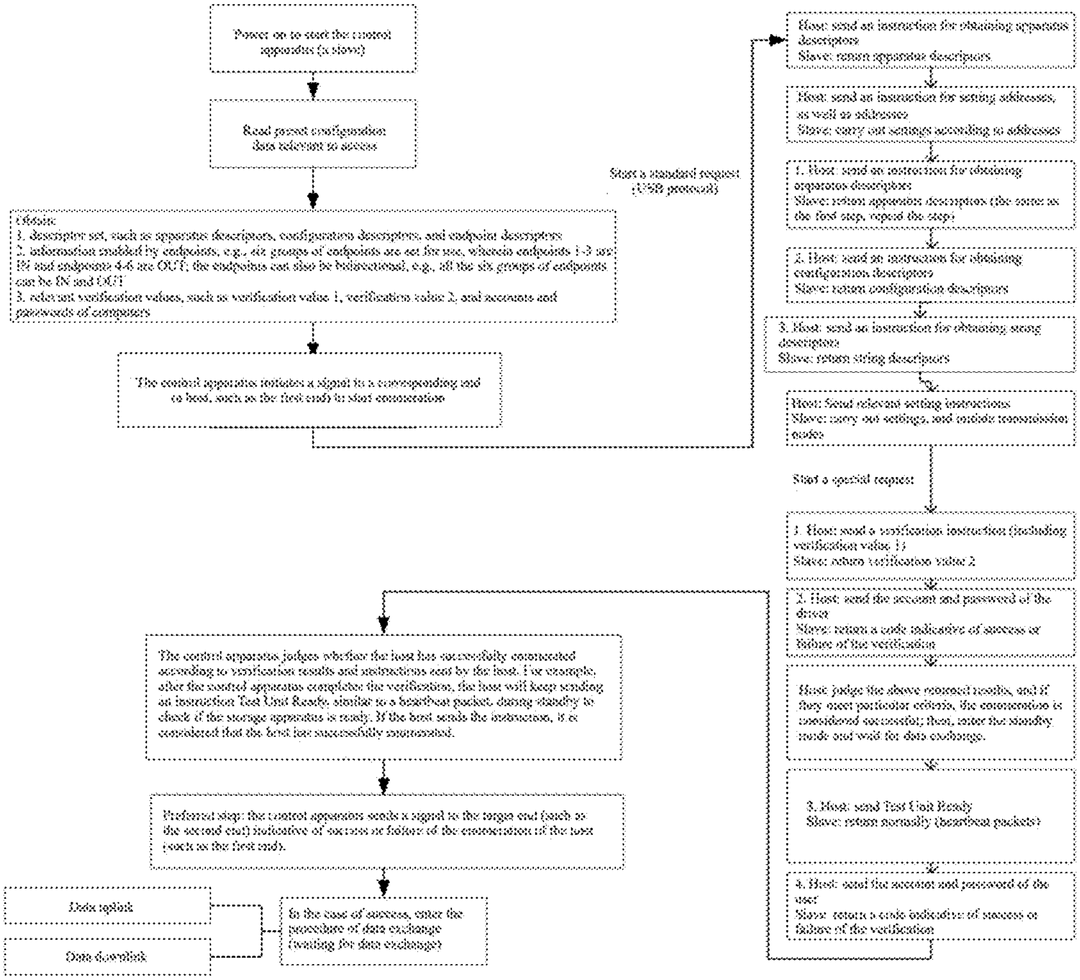
FIG. 10 is a principle diagram of establishment of communication connection between a control apparatus and a corresponding end as provided in the embodiments of the present application.

Example 1, referring to FIG. 4*b* again, suppose that the first end 10 is connected to the first control apparatus 31 through a USB interface and the first end 10 and the first control apparatus 31 are in a master-slave mode, i.e., the first end 10 is the host and the first control apparatus 31 is the slave, then referring to the principle diagram of the communication connection established between a control apparatus and a corresponding end as shown in FIG. 10, the specific process of establishing a communication connection between the first control apparatus 31 and the first end 10 (or the first control apparatus 31 accessing the first end 10) can be as follows:

after the first control apparatus 31 (slave) is powered on and started, it will first read the relevant configuration data (which are the apparatus access configuration information as mentioned above) used to establish the connection, such as a descriptor set (such as the apparatus descriptor, configuration descriptor, endpoint descriptor, string descriptor among others of the first control apparatus), endpoint activation information (for example, six endpoints are arranged for use, i.e., Endpoint 1 to Endpoint 6, wherein all the six endpoints can be unidirectional endpoints (e.g., Endpoints 1 to 3 are OUT endpoints, and Endpoints 4 to 6 are IN endpoints), or all the six endpoints are bidirectional endpoints (i.e., IN/OUT endpoints)), and relevant verification information (such as connection verification information (such as the first verification value and the second verification value), verification information (such as account and password of the apparatus driver) of the apparatus driver, user account and password of the user who corresponds to the first end);

after the relevant configuration data are read, the first control apparatus 31 sends a signal for starting enumeration to the first end 10 (a host), so as to enter the enumeration process of standard requests under rules of the USB protocol; specifically, the enumeration process of standard requests comprises the following steps:

Step 11: the first end 10 (a host) sends an apparatus descriptor acquisition instruction to the first control apparatus 31 (a slave); accordingly, the first control apparatus 31 returns a corresponding apparatus descriptor (such as the ID and manufacturer ID of the first control apparatus 31) to the first end 10;

Step 12: the first end 10 sends to the first control apparatus 31 an address setting instruction, which carries a corresponding address; in response to the address setting instruction, the first control apparatus 31 makes a setting according to the corresponding address;

Step 13: the first end 10 sends the apparatus descriptor acquisition instruction again; accordingly, the first control apparatus 31 returns the apparatus descriptor to the first end 10;

Step 14: the first end 10 sends a configuration descriptor acquisition instruction to the first control apparatus 31; accordingly, the first control apparatus 31 returns a configuration descriptor to the first end 10 in response to the configuration descriptor acquisition instruction;

Step 15: the first end 10 sends a string descriptor acquisition instruction to the first control apparatus 31; accordingly, the first control apparatus 31 returns a string descriptor to the first end 10 in response to the string descriptor acquisition instruction;

Step 16: the first end 10 sends relevant setting instructions to the first control apparatus 31; accordingly, the first control apparatus makes settings in response to the setting instructions, and activates transmission endpoints.

It should be added that the order of Steps 11 to 15 as described above may not be followed in the enumeration process of standard requests. According to different operating systems of the first end, the order can be changed, e.g., the order of Steps 13 to 15 can be changed. For the specific introduction to the apparatus descriptor, the configuration descriptor, and the string descriptor that are returned, see the relevant content in the preceding text.

Upon the completion of the enumeration process of standard requests, the enumeration process of special requests with regards to the first control apparatus will be further entered. The enumeration process of special requests can comprise the following steps:

Step 21: the first end 10 (a host) sends a verification instruction (carrying, e.g., the first verification value) to the first control apparatus 31 (a slave); accordingly, the first control apparatus 31 returns the second verification value to the first end 10;

Step 22: the first end 10 sends the account and password of the apparatus driver to the first control apparatus 31; accordingly, the first control apparatus 31 returns a code indicative of success or failure of verification to the first end 10;

Step 23: the first end 10 judges the result returned by the first control apparatus 31 in Step 22; if a specific result is met (e.g., the verification is successful), it is considered that the enumeration is successful; the first control apparatus 31 enters the standby state, and awaits data interaction with the first end 10;

Step 24: the first end 10 sends test data packets or heartbeat packets, such as TEST strings or binary data; accordingly, the first control apparatus 31 returns results normally to the first end 10;

Step 25: the first end 10 sends the user account and password entered by the user to the first control apparatus 31; accordingly, the first control apparatus 31 returns the code indicative of success or failure of verification to the first end 10.

It should be added that after the first control apparatus 31 receives the account and password of the apparatus driver sent by the first end 10, the user account and password entered by the user, and the like, the first control apparatus 31 can perform verification locally according to preset information or use a remote server to carry out verification. Herein, limitations are not imposed thereon.

Further, the first control apparatus 31 can determine whether the first end has succeeded in the enumeration according to verification results and instructions sent by the first end 10. For example, after the first control apparatus 31 completes the verification in Step 25, the first end 10 will send heartbeat packets regularly while in the standby state, to query if the first control apparatus 31 is ready for data interaction. If the first control apparatus 31 receives the heartbeat packets, it can be considered that the first end 10 has succeeded in the enumeration.

Further, the first control apparatus 31 can also send a signal indicative of success (or failure) of enumeration at the first end 10 to the second end 20 (such as a server), so as to inform the second end 20 that the first end 10 can set about data interaction.

Based on the above content, if a communication connection is successfully established between the first end 10 and the first control apparatus 31, the process of data exchange (i.e., data transmission) will be entered, i.e., the state of awaiting data exchange will be entered. Wherein in the course of data exchange, data transmission is under instructions of token packets (such as OUT token packets and IN token packets). For the introduction to the token packets, see the relevant content in the following text.

For the specific implementation of establishing a communication connection between the first end 10 and the first control apparatus 31 through other types of interfaces, it is similar to establishing a communication connection with the first control apparatus through the USB interface as mentioned above. The difference is that in the case of establishing a communication connection with the first control apparatus through other types of interfaces, such as a Bluetooth interface (or the TCP/IP protocol), a PCIE interface, and a SATA interface, the enumeration process of standard requests under rules of the USB protocol as shown in FIG. 10 needs to be replaced with the standard communication handshake process under interface protocol rules of a corresponding type of interface.

Example 2, referring to FIG. **4*b* again, assuming that the first end 10 establishes a communication connection with the first control apparatus 31 through a Bluetooth interface, the process of establishing the communication connection can be as follows: the first end 10 can first read the relevant configuration data that needs to be used for establishing the connection, such as pairing connection parameters; the pairing connection parameters can include Bluetooth-related parameters of the first control apparatus 31, such as Bluetooth apparatus name (the apparatus name of the first control apparatus 31**), Mac address, pairing verification information (such as pre-configured pairing password credentials, which can be the verification values (the first verification value, the second verification value) as mentioned above), etc.; then, as the standard communication handshake process of the Bluetooth protocol moves on, the first control apparatus is automatically scanned according to the pairing connection parameters (which specifically are Bluetooth apparatus name, Mac address, etc.); when the first control apparatus was scanned, pairing verification can be carried out by sending the first verification value or the like to the first control apparatus; if it is determined that the verification passes according to the feedback information returned by the first control apparatus, the pairing is considered successful and a communication link is successfully established with the first control apparatus.

Examples 1 and 2 as mentioned above both take the perspective of the first control apparatus 31 as an apparatus external to the first end 10 to introduce and explain the implementation of establishing a communication connection between them. If the first control apparatus 31 is an internal apparatus of the first end 10, Example 3 is given: assuming that the first end 10 is connected to the first control apparatus 31 through a PCIE interface, the implementation course of establishing a communication connection between them can be as follows: the first end 10 scans the first control apparatus 31 according to pre-configured feature parameters of the PCIE interface of the first control apparatus 31, or the like as read, such as VID (Vendor Identification); after scanning the first control apparatus 31, it can perform connection verification on the first control apparatus 31 according to the pre-configured connection verification information (such as password credentials) as read; after verification, a communication link is successfully established with the first control apparatus 31.

For the specific implementation of establishing a communication connection between the first control apparatus 31 and the second end 20, adaptive reference can be made to the course of establishing a communication connection between the first end 10 and the first control apparatus 31 as mentioned above.

In summary, under the circumstances that the system provided in the present embodiment further comprises the first control apparatus 31 and the first control apparatus 31 is an external apparatus of the first end 10, if the first end 10 communicates with the first control apparatus in a first communication manner that uses an external wired communication protocol (such as the USB protocol, where the signaling is a token packet), featured with transmission under instructions of signaling, then the first end 10 can also be used for sending connection verification information to the first control apparatus 31 when a communication connection needs to be established with the first control apparatus 31, wherein the connection verification information includes at least one of the following pieces of information: a verification instruction carrying a verification value, and verification data relevant to the apparatus driver of the first control apparatus;

the first control apparatus 31 is used for feeding back corresponding verification results to the first end in response to the connection verification information;

the first end 10 is also used for determining whether to establish a communication link with the first control apparatus according to the verification results.

In specific embodiments, the verification value carried in the verification instruction can be the first verification value (or the second verification value) as mentioned above, such verification data relevant to the apparatus driver as the account and password of the apparatus driver, etc. For the specific implementation of establishing a communication connection between the first end 10 and the first control apparatus 31, see the content relevant to Example 1 as described above.

After the communication link is successfully established, the first end 10 can use the communication link established with the first control apparatus 31 to send the generated first message to be sent to the first end 10 through the first control apparatus 31. Based on this, the first end 10, when used to send the first message to the second end 20, can be specifically used for: obtaining a first signaling, which is used for instructing the first control apparatus 31 to receive the message; sending the first signaling and the first message to the first control apparatus 31 through the communication link with the first control apparatus 31;

Accordingly, the first control apparatus 31 is used for: receiving the first message in response to the first signaling; sending the first message to the second end 20.

In specific implementation, the signaling is initiated by the first end 10 to notify the first control apparatus 31 of what to do next, e.g., sending or receiving a message. The type of the signaling is relevant to the communication protocol used between the first end 10 and the first control apparatus 31. For example, if it is a USB protocol, the signaling takes the form of a token packet (issued by the host (such as the first end) to initiate a segment of USB transmission). In this example, the first signaling can be an OUT token packet (also known as an OUT output data packet), which is used to notify the first control apparatus 31 that the first end 10 will send a data packet to it and it should get ready for reception. When the first end 10 needs to send an OUT token packet and the first message that corresponds thereto to the first control apparatus 31, the second preset string that has a correspondence with the transmission transaction to which the first data stream belongs is first determined on the basis of the preset correspondence (as shown in Table 5) between the second preset string and the transmission transaction; then, the endpoint number of the first control apparatus 31, which number is bound to the second preset character, is determined according to the correlation information associated with the second preset string; finally, according to the determined endpoint number, the OUT token packet and the first message that corresponds thereto are sent to the corresponding endpoint of the first control apparatus 31. Again, in the above-mentioned example of providing the endpoint activation information of the first control apparatus 31 when establishing a communication connection between the first end 10 and the first control apparatus 31, the determined endpoint can be Endpoint 1 (an OUT endpoint or an IN/OUT endpoint) or the like; the first control apparatus 31 can obtain data such as the OUT token packet and the first message that reach Endpoint 1 by listening on Endpoint 1, and in response to the obtained OUT token packet, execute the operation of forwarding the first message to the second end 20.

If the first end 10 communicates with the first control apparatus 31 in a second communication manner that uses a wireless communication protocol (such as Bluetooth protocol) featured with pairing connection, then the first end 10 can also be used for: when a communication connection needs to be established with the first control apparatus 31, searching for the first control apparatus 31 according to preset control apparatus pairing and connection parameters; when the first control apparatus 31 is found, perform pairing verification on the first control apparatus 31; after passing the pairing verification, establishing a communication link with the first control apparatus 31. For the specific implementation of establishing a communication link between the first end 10 and the first control apparatus 31 in this situation, see the relevant content in Example 2 in the preceding text.

Likewise, the first end 10 can use the communication link established with the first control apparatus 31 to send the generated first message to be sent to the first end 10 through the first control apparatus 31. For the specific implementation of the sending, see the relevant content in the above-mentioned description that the first end 10 communicates with the first control apparatus 31 in the first communication manner.

If the system provided in the present embodiment further comprises the first control apparatus 31 and the first control apparatus 31 is an internal apparatus of the first end 10, then the first end 10 communicates with the first control apparatus 31 in a third communication manner that uses an internal wired communication protocol (such as a PCIE protocol corresponding to a PCIE interface); and, under these circumstances, the first end 10 can also be used for: when a communication connection needs to be established with the first control apparatus 31, scanning the first control apparatus 31 according to preset control apparatus feature information; when the first control apparatus 31 is scanned, establishing a communication link with the first control apparatus 31. For the specific implementation of establishing a communication link between the first end 10 and the first control apparatus 31 in this situation, see the relevant content in Example 3 in the preceding text.

Likewise, the first end 10 can use the communication link established with the first control apparatus 31 to send the generated first message to be sent to the first end 10 through the first control apparatus 31. For the specific implementation of the sending, see the relevant content in the above-mentioned description that the first end 10 communicates with the first control apparatus 31 in the first communication manner.

To ensure the data security, the first control apparatus 31 can use the data transmission security control information in a corresponding configuration file (which is the configuration file created for the first end 10 in the preceding text) as stored to verify the first message before executing the operation of forwarding the received first message to the second end 20; after the verification is passed, it executes operation of forwarding the first message. Based on this, the first control apparatus 31 can also be used for executing the following steps:

S11. obtaining preset data transmission security control information;

S12. verifying the first message according to the data transmission security control information;

S13. if the verification is passed, triggering the operation of sending the first message to the second end 20;

S14. if the verification is not passed, skipping sending the first message, or outputting an inquiry message to inquire whether the user allows transmission of the first message.

For the specific content that can be included in the data transmission security control information in Step S11, see the relevant content in the preceding text.

In Step S12, what can be verified according to the data transmission security control information can include, but is not limited to, at least one of the following items:

whether the endpoint (such as Endpoint 1 in the above example) that sends the first message meets predetermined requirements of the first preset string corresponding to the first end 10: an example is whether the endpoint number of Endpoint 1 is in the whitelist of endpoint numbers bound to the first preset string; if yes, then it is judged that the predetermined requirements are met; if not, then the predetermined requirements are not met;

whether the structure format of the first message meets requirements: an example is whether the format such as message header and data header meets preset format requirements;

whether the content in the first message meets requirements: an example is whether the second preset string corresponding to the first end 10 and the first preset string (which can be obtained from the transmission transaction attribute information of the first data stream corresponding to the first transmission transaction) corresponding to the second end 20, both included in the message header, meet predetermined requirements; one exemplary case is whether a predefined set of corresponding preset strings comprises the second preset string and the first preset string; if yes, it indicates that the first preset string and the second preset string are registered preset strings and meet the predetermined requirements; if not, it indicates that the first preset string and the second preset string are unregistered preset strings and do not meet the predetermined requirements; another example is whether the transaction unique identification included in the message header meets predetermined requirements; one exemplary case is whether a preset set of corresponding transmission transaction attribute information comprises the transaction unique identification in the message header; if yes, it indicates that the transaction unique identification in the message header has been registered and meets the requirements; if not, the transaction unique identification included in the message header is unregistered and does not meet the requirements; another example is whether the data in the message are of the data type that is defined by the corresponding transmission transaction attribute; one exemplary case is that if the transmission transaction corresponding to the first data stream is a transmission transaction of "requesting network resources", then it is determined whether the first three bytes of the data in the message are GET defined in the transmission transaction attribute information of the transmission transaction of "requesting network resources".

It should be added that the transmission transactions involved in the embodiments of the present application can be understood as transparent transmission indications of data in essence. For example, among the transmission attribute name, transaction usage role, and transaction attribute type information among others as included in the transmission transaction attribute information of the transmission transaction, the transmission attribute name can pass through the type of data that are allowed to be transmitted, the transaction usage role can pass through the identity information of the creator that is allowed to use the transmission transaction (e.g., allowing the server to be created or allowing the client to be created), and the transaction attribute type information can pass through the direction of the allowed data transmission, the data header used in the allowed data transmission, the type of data that are allowed to be transmitted, etc. The transparent transmission indication of data by the transmission transaction can be expressed in a simple and easy-to-understand way, i.e., the specific function of the transmission transaction. As such, based on the transparent transmission indication of data by the transmission transaction, the verification of the first message as involved in the embodiments of the present application, such as the verification of the first message by the first control apparatus (the second control apparatus, the first control module, the second control module, the intermediate network apparatus, or the like), from the perspective of the transmission transaction, can include, but is not limited to, the following items.

1) Whether the transmission transaction corresponding to the first message is a registered transmission transaction is verified, so as to determine whether the transmission transaction corresponding to the first message meets requirements according to the verification result. Specifically, the transaction attribute identification (which is the unique identification of the transmission transaction) can be parsed from the target header information included in the first message, and then whether there exists the transaction attribute identification included in the target header information is determined by searching the set of transmission transaction attribute information. If yes, it indicates that the transmission transaction corresponding to the first message has been registered, and meets the requirements. In this case, the first message can be forwarded (or stored) directly, or can be further verified. If not, it indicates that the transmission transaction corresponding to the first message is not registered, and does not meet the requirements. In this case, the first message will not be forwarded (or stored).

2) If it is verified in Item 1) that the transmission transaction corresponding to the first message is a registered transmission transaction, it can be further verified whether the format of the target header information meets predetermined format requirements, e.g., whether the message header format (and the data header format) in the target header information meet predetermined format requirements. If yes, the first message can be forwarded (or stored) directly, or can be further verified. If not, the first message will not be forwarded (or stored).

3) If it is verified in Item 2) that the target header information included in the first message meets the preset format requirements, it can be further verified whether the current transmission meets requirements of the corresponding transmission transaction attribute. If yes, the first message can be forwarded (or stored) directly. If not, the first message will not be forwarded (or stored). The above verification can be achieved according to the transaction attribute type information obtained from the transmission transaction attribute information of the transmission transaction corresponding to the first message.

For example, it is verified whether the current transmission direction conforms to the data transmission direction specified by the transmission transaction attribute. Specifically, assuming that the current transmission direction relates to sending data from the first end to the second end, then: if the data transmission direction included in the transaction attribute type information represents that the first end can uplink data (i.e., it can send data outward), the current transmission direction conforms to the data transmission direction specified by the transmission transaction attribute; on the contrary, if the data transmission direction included in the transaction attribute type information represents that the first end can only downlink data (i.e., it can only receive data), the current transmission direction does not conform to the data transmission direction specified by the transmission transaction attribute.

For another example, it is verified whether the data type of the currently transmitted data conforms to the data type specified by the transmission transaction attribute. Specifically, assuming that the data type of the currently transmitted data is a JPG file, then: if the data type included in the transaction attribute type information is an image, the data type of the currently transmitted data conforms to the data type specified by the transmission transaction attribute; on the contrary, if the data type included in the transaction attribute type information is a text, the data type of the currently transmitted data does not conform to the data type specified by the transmission transaction attribute.

For another example, it is verified whether the header information included in the currently transmitted message meets the requirements specified by the transmission attribute. Specifically, assuming that the currently transmitted message comprises a data header and the format of the data header is a regular data header format, then: if the data header usage information included in the transaction attribute type information indicates that a regular data header needs to be used, the header information included in the currently transmitted message meets the requirements specified by the transmission transaction attribute; on the contrary, if the header information included in the transaction attribute type information indicates that there is no need for a data header or the data header format is a file data header format, the header information included in the currently transmitted message does not meet the requirements specified by the transmitting transaction attribute.

In addition to verifying a message, the functions of the transmission transaction on the basis of the transparent transmission indication of data include, but are not limited to, the following aspects.

It is used for data backup (important data backup). Specifically, if the transmission transaction passes through the type of data that are allowed to be transmitted is an important type (such as file type), the control apparatus or the like can back up the data in the message.

It is used for transparent transmission display, log retention, log analysis, etc. For example, the control apparatus can display the transaction attribute name of the transmission transaction, so that the user can clearly understand the current data transmission through the displayed transaction attribute name. For another example, the control apparatus can record and analyze the received message to generate the log information of the corresponding transmission transaction.

In Step S12, the first message is verified. In Step S13, if the verification is passed, it indicates that the message meets predetermined requirements, and the first control apparatus 31 then triggers the operation of sending the first message to the second end 20. In Step S14, if the verification is not passed, it indicates that the first message does not meet the predetermined requirements; in this case, in one embodiment, the first message may not be sent, but log retention and the like can still be carried out; alternatively, in another embodiment, an inquiry message can be output to inquire whether the user permits the transmission of the first message. For example, if the data type of the data in the first message is an executable program file (such as a .exe program) that is prohibited from transmission, the first control apparatus 31 will not execute the transmission operation automatically; instead, it will output an inquiry message on the display screen thereof (as shown in FIG. 7*a* or 7*b*) or the display screen of the first end to inquire whether the user permits the transmission; after receiving a transmission confirmation instruction on the inquiry message from the user, the first message will be sent to the second end 20. The manner of confirmation through manual intervention can prevent the spread of viruses and Trojans.

In specific implementation, as shown in FIG. 4*b*, when the first control apparatus 31 triggers the transmission of the first message to the second end 20, the address information of the second end is determined according to the first preset string corresponding to the second end and is obtained from the first message (more specifically, the message header of the first message); the first message is sent to the second end 20 according to the address information of the second end 20. The more specific implementation principles can be divided into two cases as follows.

Case 21, if the first preset string is directly the address information of the second end (i.e., the preset strings as mentioned above do not have the function of hiding the address information of the corresponding ends), then the first control apparatus 31 directly sends the message that passes the verification to the second end 20 according to the first preset string by using the TCP/IP protocol or other corresponding protocols.

Case 22, if the first preset string is a preset random string for hiding the address information of the second end, in the present embodiment, the first end 10 is considered as an untrusted apparatus, the first control apparatus 31 is considered as a trusted apparatus, and the first preset string serves to hide the real address information (such as IP address) of the second end 20 in the first end 10. In this way, even if the first end 10 is attacked by a malicious person, the malicious person cannot initiate scanning, detection, or the like on apparatuses such as the second end 20 in the network through the first end 10, which makes it difficult to attack the second end 20. As such, the first control apparatus 31 can have all the data that are needed in the data transmission, including the real address information (such as IP address) of the second end 20. In other words, both the configuration file created for the first end 10 and that created for the second end 20 in the preceding text are preset in the first control apparatus 31. Based on the data information preset therein, the first control apparatus 31 can directly obtain the real address information of the second end 20 according to the first preset string. Alternatively, in other embodiments, the first control apparatus 31 can also send a parsing request for the first preset string to a corresponding parsing server (such as the configuration server in the preceding text), so as to obtain the real IP address of the second end 20 from the parsing server. Herein, specific limitations are not imposed thereto.

After obtaining the real IP address of the second end 20 according to the first preset string, the first control apparatus 31 can use the TCP/IP protocol to send the real IP address of the second end and a corresponding message to the intermediate network apparatus (as shown in FIG. 4*b*), so as to send the first message that passes the verification to the second end 20 through the intermediate network apparatus. In general, since the first control apparatus 31 has completed the conversion from the first preset string to the real address information of the second end 20, the forwarded first message may not carry the preset string when using the TCP/IP protocol to forward the first message to the second end 20 according to the address information of the second end. However, in the present embodiment, the first message is kept carrying the preset string, for the purpose of enabling the second end 20 to verify such information included in the first message as the preset string. Alternatively, in other embodiments in the following text, e.g., in the case (as shown in FIG. 5*e*) that there are a first control apparatus 31 and a second control apparatus 32 between the first end 10 and the second end 20 as described in the other embodiments, when the first control apparatus 31 forwards the first message, the first message is still kept carrying a corresponding preset string, so that the second control apparatus 32 can verify such information as the preset identifier included in the first message. Alternatively, in the case that multiple second ends 20 are connected to the second control apparatus 32, this practice facilitates the second control apparatus 32 obtaining the address information of the corresponding second ends 20 according to the corresponding preset string (the first preset string). Alternatively, this practice facilitates the recognition or the like by particular programs at the second end 20.

It should be added that to further ensure the data transmission security, the intermediate network apparatus can also have functions of a control apparatus to verify the received first message again, and after the verification is passed, send the first message to the second end. Alternatively, the intermediate network apparatus can only have the function of log audit, so that it can generate the log information of the first transmission transaction according to the received first message and send the first message to the second end. In specific implementation, the above functions can be achieved by deploying a fourth control module in the intermediate network apparatus. For the specific introduction to the fourth control module and the specific implementation of the above functions of the intermediate network apparatus, see the relevant content in the preceding text.

Further, in addition that the first message is verified, corresponding data transmission direction control information can also be obtained from the correlation information associated with the second preset string corresponding to the first end, so as to determine whether the first message needs to be forwarded to the second end 20 or whether the data fed back by the second end 20 on the basis of the received first message need to be forwarded to the first end 10 according to the data transmission direction control information. Taking the first transmission transaction corresponding to the first data stream as the transmission transaction of "requesting network resources", assuming that the transmission direction control information included in the correlation information associated with the second preset string corresponding to the first end is "RX" (which represents only receiving data, i.e., prohibiting the first control apparatus 31 from forwarding the received message sent by the first end to the second end 20, as shown in Example 12 in the preceding text). In this case, although the first end 10 receives the message sent by the first end 10 for "requesting network resources", it will not execute the operation of sending the received message to the second end 20 (i.e., it will not actively send the request parameters sent by the first end 10 to the second end 20); instead, it obtains preset request parameter information (including request manners and relevant parameters) from the correlation information associated with the second preset string, generates a new message on the basis of the obtained preset request parameters, and sends the new message to the second end 20. For the specific implementation of generating the new message as mentioned above, see the course of the first end 10 generating the first message to be sent, which corresponds to the first data stream. Based on the above example, before the first control apparatus 31 triggers the operation of sending the first message to the second end 20, there can also exist the following steps:

S131. obtaining data transmission direction control information from correlation information associated with the second preset string that correspond to the first end;

S132. obtaining the preset request parameters from the correlation information if the data transmission direction control information instructs that the first control apparatus 31 is prohibited from sending the first message as received to the second end and the message type of the first message is a request message, and generating a new message to be sent on the basis of the first target header information obtained from the first message and the preset request parameters, so as to trigger the operation of sending the first message to the second end 20 on the basis of the new message.

For the specific description of the data transmission direction control information, see the relevant content of Examples 11 to 13 in the preceding text. Based on the above content and in combination with the relevant content of Examples 11 to 13 in the preceding text, the transmission direction control manner provided in the present embodiment for achieving the unidirectional transmission function of data or the like has the following benefits as compared with the existing manner of using a unidirectional transmission apparatus to achieve the unidirectional transmission function: although bidirectional transmission can be isolated completely and physically by using a unidirectional transmission apparatus (such as an optical gate and an optical code (QR code)) to achieve the unidirectional transmission function, the apparatus tends to be relatively complex; for example, the apparatus requires an optical module, an optical splitting module, or a module for displaying or receiving images, etc.; the apparatus is high in manufacturing cost, large in size, and limited in scope of application; moreover, by using a unidirectional transmission apparatus, flexible configurations for unidirectional sending of data, unidirectional reception of data, or bidirectional transmission of data cannot be physically realized according to different service needs; however, the manner provided in the present embodiment can achieve unidirectional data transmission function or the like without any external apparatus; the construction is simple, and the manufacturing cost of the control apparatus is relatively low; in addition, the control apparatus can also adjust the communication direction (i.e., the data transmission direction) of different preset strings flexibly according to the transmission direction control information associated with different preset strings.

Further, after the verification of the first message is passed, if the data included in the first message are relatively important, the first control apparatus 31 can also back up the first message to prevent the first end 10 from accidentally deleting data or being encrypted by ransomware. Based on this, in the system provided in the present embodiment, the first control apparatus 31 can also be used for:

after the verification is passed, determining whether the first message meets data backup conditions in the data transmission security control information according to the annotated information included in the first message;

backing up the first message if the data backup conditions are met.

For example, if the annotated information included in the header and/or data header of the first message marks the data included in the first message as "important" (e.g., the data is financial statements .xls), the first control apparatus can back up the first message.

In the second possible embodiment, as shown in FIGS. 5*c* and 5*d*, in addition to adding the first control apparatus 31 directly to the first end 10 and the second end 20, a second control apparatus 32 can also be added. The second control apparatus 32 is in communication connection with the second end 20 and the first control apparatus 31. For the specific implementation of establishing a communication connection between the second control apparatus 32 and the second end 20, see the course of establishing a communication connection between the first end 10 and the first control apparatus 31 as described in the preceding text.

Accordingly, the above-mentioned address information of the second end as determined by the first control apparatus 31 according to the first preset string corresponding to the second end is directed to the second control apparatus. Based on this, when used for sending the first message to the second end 20, the first control apparatus 31 is specifically used for sending the first message to the second control apparatus 32.

The second control apparatus 32 is used for: verifying the first message as received; and after the verification is passed, sending the first message to the second end in response to an acquisition request sent by the second end.

In specific implementation, taking the second end 20 connected to the second control apparatus 32 through a USB interface as an example, when the second end 20 needs to obtain data, the acquisition request sent to the second end can be a second signaling. The second signaling is used for instructing the second control apparatus to send data to the second end 20. Specifically, the second signaling can be an IN token packet (also known as an IN input data packet), which can be understood as an instruction packet used by the host (such as the second end 20) to notify that the slave (such as the second control apparatus 32) should send a data packet thereto. In the present embodiment, the second control apparatus 32 will not actively send the message that passes the verification to the second end, and only after the second end 20 makes a request, sends the message adapted to the request of the second end 20 to the second end 20.

It should be added that the communication connection between the first control apparatus 31 and the second control apparatus 32 can be established by using a protocol, which is, but not limited to, the TCP/IP protocol. In this case, as shown in FIG. 5*d*, there can exist an intermediate network apparatus between the first control apparatus 31 and the second control apparatus 32. Specifically, the first control apparatus 31 sends the first message to the second control apparatus 32 through the intermediate network apparatus. For the functions that the intermediate network apparatus can have, see the relevant content described in the first possible embodiment.

In addition, the above content mainly makes an explanation by taking the first end needing to send data to the second end as an example. Of course, the second end can also send data to the first end. In this case, the first end 10 can also be used for:

receiving a second message sent by the second end;

wherein on the second end, on the basis of second transaction information of a second transmission transaction corresponding to a second data stream, second target header information is determined for a second data block of the second data stream; the second message is generated according to the second data block and the second target header information; the second target header information is used for verifying whether the second message meets requirements.

The second data stream is data generated by a second application on the second end. For the description of the second application and the second data stream, as well as the implementation of generating the second message on the second end and sending the second message to the second end, see the specific description of the first application and the first data stream, as well as the specific implementation of generating the first message on the first end and sending the first message to the second end, which will not be repeated herein.

It should be added that the generation of the second message can be specifically implemented by a third control module on the second end, and the third control module can be located inside or outside the second application. When the third control module is located inside the second application, a fifth control module can also be arranged outside the second application on the second end; alternatively, when the third control module is located outside the second application, a fifth control module can also be arranged inside the second application on the second end. Regarding how the third control module and the fifth control module collaborate to process the second data block and generate the second message when they coexist, reference can be made to the relevant content of the first control module and the second control module collaborating with each other on the first end to process the first data block and generate the first message in other embodiments of the present application in the preceding text.

Based on the relevant content of the data transmission system provided in one embodiment of the present application as introduced above, several other embodiments of the present application also provide a data transmission system. Specifically, FIG. 3*b* shows a structure diagram of a data transmission system provided by another embodiment of the present application. As shown in FIG. 3*b*, the data transmission system comprises a first end 10 and a second end 20, wherein, a first control module 11 is arranged in a first application on the first end 10, and used for: determining first transaction information of a first transmission transaction corresponding to the first data stream of the first application; when a first data block of the first data stream needs to be transmitted to the second end, determining first target header information for the first data block on the basis of the first transaction information; generating a first message to be sent according to the first data block and the first target header information; sending the first message to the second end; wherein the first target header information is used for verifying whether the first message meets requirements;

a third control module (not shown in the FIGURE) is arranged on the second end 20, and used for: verifying the first target header information included in the first message received by the second end; obtaining and caching the first data block from the first message after the verification is passed.

Further, the system provided in the present embodiment can further comprise: an intermediate network apparatus that is in communication connection with the first end and the second end;

the first control module 11, which is specifically used for sending the first message to the intermediate network apparatus;

the intermediate network apparatus, which is used for: generating log information of the first transmission transaction according to the first message as received; sending the first message to the second end.

FIG. 3*c* shows a structure diagram of a data transmission system provided in another embodiment of the present application. As shown in FIG. 3*c*, the data transmission system comprises a first end 10 and a second end 20, wherein, a second control module 12 is arranged outside a first application on the first end 10, and used for: determining first transaction information of a first transmission transaction to which a first data block belongs in response to the first data block that is sent by the first application and needs to be transmitted to the second end; determining first target header information for the first data block on the basis of the first transaction information; generating a first message to be sent according to the first data block and the first target header information; sending the first message to the second end; wherein the first target header information is used for verifying whether the first message meets requirements;

a third control module (not shown in the FIGURE) is arranged on the second end 20, and used for: verifying the first target header information included in the first message received by the second end; obtaining the first data block from the first message after the verification is passed.

Further, the system provided in the present embodiment can also comprise: an intermediate network apparatus that is communication connection with the first end and the second end;

the second control module, which is specifically used for sending the first message to the intermediate network apparatus;

the intermediate network apparatus, which is used for: generating log information of the first transmission transaction according to the first message as received; sending the first message to the second end.

In a structure diagram of a data transmission system provided in another embodiment of the present application, the system architecture of the data transmission system is similar to the architecture shown in FIGS. 3*a*-1. Specifically, the data transmission system comprises a first end and a second end, wherein, the first end is used for sending to an intermediate network apparatus a first data block that needs to be transmitted to a second end;

a fourth control module is arranged on the intermediate network apparatus, and used for: receiving the first data block and determining first transaction information of a first transmission transaction to which the first data block belongs; determining first target header information for the first data block on the basis of the first transaction information; generating a first message to be sent according to the first data block and the first target header information; sending the first message to the second end; wherein the first target header information is used for verifying whether the first message meets requirements;

a third control module is arranged on the second end, and used for: verifying the first target header information included in the first message received by the second end; obtaining the first data from the first message after the verification is passed.

Further, a first control module is arranged inside a first application on the first end or a second control module is arranged outside the first application;

the first control module or the second control module is used for sending the first data block that needs to be transmitted by the first application to the first end, as well as transaction attribute information of the first transmission transaction to which the first data block belongs, to the intermediate network apparatus;

the intermediate network apparatus, when used for determining the first transaction information of the first transmission transaction to which the first data block belongs, is specifically used for: generating transaction identification for the first transmission transaction; inquiring transmission transaction attribute information of the first transmission transaction from multiple pieces of preset transmission transaction attribute information on the basis of the transaction attribute identification as received.

It should be added that in addition to the functions as described above, the ends, the apparatuses, the modules, and the like in the above data transmission systems can also achieve the relevant functions in the other embodiments of the present application. For the specific introduction to the functions that the ends, the apparatuses, the modules, and the like in the above data transmission systems can achieve, see the relevant content in the preceding text.

FIGS. 4*a* to 4*c* show a structure diagram of a data transmission system provided in another embodiment of the present application. As shown in FIGS. 4*a* to 4*c*, the data transmission system comprises a first end 10, a first control apparatus 31, and a second end 20, wherein, the first end 10 is used for sending a first data block of a first data stream to the first control apparatus when the first data block needs to be transmitted to the second end;

the first control apparatus 31 is used for: determining first transaction information of a first transmission transaction corresponding to a first data stream; determining first target header information for the first data block as received on the basis of the first transaction information; generating a first message to be sent according to the first data block and the first target header information; sending the first message to the second end; wherein the first target header information is used for verifying whether the first message meets requirements.

the second end 20 is used for: verifying the target header information included in the first message as received and determining whether the first message meets requirements; obtaining and caching the first data block from the first message.

For the specific introduction to the first end 10, the first control apparatus 31, and the second end 20, as well as the specific implementation of the functions thereof, see the relevant content in the preceding text.

FIGS. 5*d* and 5*e* show a structure diagram of a data transmission system provided in another embodiment of the present application. As shown in FIGS. 5*d* to 5*e*, the data transmission system comprises a first end 10, a first control apparatus 31, a second control apparatus 32, and a second end 20, wherein, the first end 10 is used for sending a first data block of a first data stream to the first control apparatus when the first data block needs to be transmitted to the second end;

the first control apparatus 31 in communication connection with the first end is used for: determining first transaction information of a first transmission transaction corresponding to the first data stream; determining first target header information for the first data block as received on the basis of the first transaction information; generating a first message to be sent according to the first data block and the first target header information; sending the first message to the second control apparatus; wherein the first target header information is used for verifying whether the first message meets requirements;

the second control apparatus 32 in communication connection with the first control apparatus and the second end is used for: verifying the first target header information included in the first message as received and determining whether the first message meets the requirements; if yes, caching the first message locally, so as to wait for the second end to retrieve the first message;

the second end 20 is used for: sending a retrieval request to the second control apparatus; receiving the first message fed back by the second control apparatus in response to the retrieval request.

For the specific introduction to the first end 10, the first control apparatus 31, the second control apparatus 22, and the second end 20, as well as the specific implementation of the functions thereof, see the relevant content in the preceding text.

Some data transmission methods are provided in the other embodiments of the present application, and specifically put as follows.

Figure 11A:
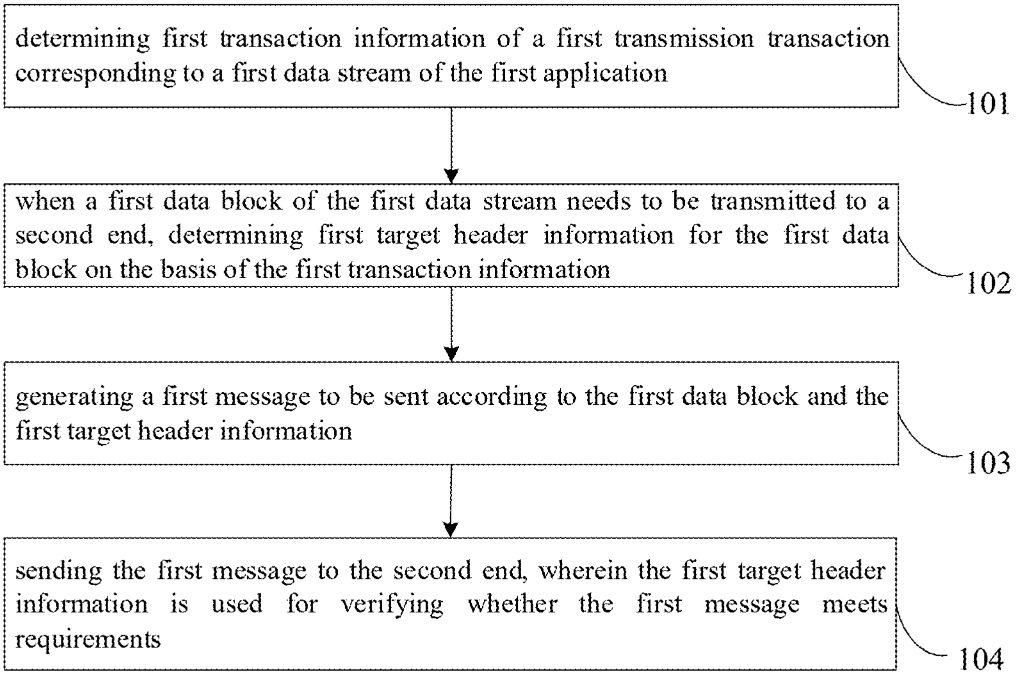
FIG. 11*a* to FIG. 13 are flow diagrams of data transmission methods provided in the embodiments of the present application.

FIG. 11*a* shows a flow diagram of a data transmission method provided in an embodiment of the present application. The data transmission method is applicable to the first end 10 shown in FIG. 3*b*, and more specifically, to the first control module 11 inside the first application on the first end 10. The preset information, which is preset in the first control module 11, includes the configuration file created for the first end 10 as described above, and can further include the configuration file created for the second end 20. Taking the configuration file created for the first end as an example, the configuration file can include, but is not limited to, at least one of the following configuration data: data exchange configuration data, data transmission security control information, etc. Wherein the data exchange configuration data can include, but is not limited to: transmission transaction attribute information of multiple transmission transactions; the correspondence among the transaction type of the transmission transaction, the second preset string corresponding to the first end, and the transaction attribute identification of the transmission transaction, wherein the transaction attribute identification is the unique identification of the transmission transaction attribute information of the transmission transaction; message header format, multiple data header formats, etc. Wherein in the present embodiment, the involved preset strings are strings corresponding to the address information of ends. For example, the second preset string i corresponding to the first end is a string corresponding to the address information (such as IP address) of the second end. For the convenience of description, the address information of corresponding ends is directly used to describe the preset strings in the present embodiment. For the specific introduction to the first control module 11 and the preset information that is preset inside the first control module 11, see the relevant content in the preceding text, which will not be repeated herein. As shown in FIG. 11*a*, the data transmission method provided in the present embodiment comprises the following steps:

101. determining first transaction information of a first transmission transaction corresponding to a first data stream of a first application;

102. determining first target header information for the first data block on the basis of the first transaction information when the first data block of the first data stream needs to be transmitted to the second end;

103. generating a first message to be sent according to the first data block and the first target header information;

104. sending the first message to the second end;

wherein the first target header information is used for verifying whether the first message meets requirements.

In Step 101, as shown in FIG. 3*b*, the first application on the first end 10 can refer to, but is not limited to, a business platform system application, a browser application, a social application, a video application, an office application, etc. Different types of first data streams will be generated during the use of different types of first applications. For example, if the first application is a browser application (which is modified by secure access control and has a first control module therein), and the browser application needs to retrieve resources on the second end; accordingly, the first data stream of the browser application can be, but is not limited to, a request data stream (such as a network resource request data stream). To ensure the data transmission security and prevent the first application from calling the network interface on the first end directly and arbitrarily to send data arbitrarily, the first application cannot call the network interface on the first end 10 or send data without the first control module 11 therein. In other words, the first data stream of the first application must be processed by the first control module 11 inside the first application before it can be sent. In specific implementation, regarding the first data stream of the first application, the first control module 11 can determine the first transaction information of the first transmission transaction corresponding to the first data stream, and process the first data block in the first data stream, which block needs to be transmitted to the second end 20, on the basis of the first transaction information, so as to achieve the transmission of the first data block. The first transaction information can include the transaction identification and transmission transaction attribute information of the first transmission transaction. The transmission transaction attribute information includes, but is not limited to: transaction attribute name, first annotated information, address information of the second end, transaction attribute identification, and transaction attribute type information; wherein the transaction attribute type information includes at least one of the following items: the transmission direction of the first data stream, the data type of the first data stream, and the data header usage information. For the specific introduction to transmission transaction attribute information, see the relevant content in the other embodiments in the preceding text.

In an implementable technical solution, said "determining first transaction information of a first transmission transaction corresponding to a first data stream of a first application" in Step 101 can specifically comprise:

1010. generating transaction identification for the first transmission transaction;

1011. obtaining transmission transaction attribute information of the first transmission transaction.

Said "obtaining transmission transaction attribute information of the first transmission transaction" in Step 1011 can comprise:

10111. determining transaction attribute identification of the first transmission transaction;

10112. inquiring the transmission transaction attribute information of the first transmission transaction from multiple pieces of preset transmission transaction attribute information on the basis of the transaction attribute identification.

In Step 10111, the transaction attribute identification of the first transmission transaction can be determined on the basis of the preset correspondence between the transaction type of the transmission transaction and the transaction attribute identification thereof. In other words, in a specifically implementable solution, said "obtaining transmission transaction attribute information of the first transmission transaction" in Step 10111 can be specifically implemented in the following steps:

101111. determining the transaction type of the first transmission transaction according to transmission demand information of the first data stream;

101112. determining the transaction attribute identification that has a correspondence with the transaction type of the first transmission transaction on the basis of a second correspondence between the transaction type and the transaction attribute identification.

For the specific implementation of Steps 101111 to 101112, see the relevant content in the other embodiments in the preceding text.

For the multiple pieces of preset transmission transaction attribute information in Step 10112, see the example of the set of the transmission transaction attribute information of multiple transmission transactions shown in FIG. 4*a*. If the transmission transaction attribute information of the first transmission transaction corresponding to the first data stream cannot be queried from the multiple pieces of preset transmission transaction attribute information on the basis of the transaction attribute identification of the first transmission transaction corresponding to the first data stream, it indicates that the security control information on data transmission between the first end and the second end as configured in the present embodiment does not permit the transmission of data blocks in the first data stream, and the data transmission fails and terminates.

In an implementable technical solution, said "determining first target header information for the first data block on the basis of the first transaction information" in Step 102 can specifically comprise:

1021. obtaining a header information transmission manner corresponding to data blocks in the first data stream;

1022. determining target header fields for the first data block from multiple header fields included in a preset message header format according to the header information transmission manner and relevant information of the first data block;

1023. configuring field values of the target header fields according to at least one of the first transaction information and the relevant information of the first data block, and obtaining a message header determined for the first data block.

For the introduction to the header information transmission manner in Step 1021, see the relevant content in the preceding text.

In an implementable solution, said "determining target header fields for the first data block from multiple header fields included in a preset message header format according to the header information transmission manner and relevant information of the first data block" in Step 1022 can specifically comprise:

10221. determining the ranking of the first data block in the first data stream according to the block number of the first data block as included in the relevant information;

10222. determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;

10223. determining that some header fields in the multiple header fields are the target header fields if the header information transmission manner is a second manner and the data block is not ranked last in the first data stream, or the header information transmission manner is the third manner and the data block is not ranked first in the first data stream.

In the case described in Step 10222, i.e., when the multiple header fields are the target header fields, said "configuring field values of the target header fields according to at least one of the first transaction information and the relevant information of the first data block, and obtaining a message header determined for the first data block" in Step 1023 can comprise:

10231. determining address information of the first end for the first transmission transaction;

10232. configuring field values of the target header fields according to the address information of the first end, the first transaction information, and the relevant information of the first data block, and obtaining a first message header that is determined for the first data block;

wherein the first message header comprises: the address information of the first end, the address information of the second end, transaction attribute identification of the first transmission transaction, transaction identification of the first transmission transaction, total number of the data blocks in the first data stream, the block number of the first data block, total size of the first target header information and the first data block, and annotated information;

when the total number is a set value, it indicates that the first data stream is a stream with an unknown number of data blocks.

In a specifically implementable solution, said "determining address information of the first end for the first transmission transaction" in Step 10231 can be specifically implemented in the following steps:

102311: obtaining a first correspondence between the address information of the first end and transaction type;

102312. determining the address information of the first end, which information has a correspondence with the transaction type of the first transmission transaction according to the first correspondence.

For the specific implementation of Steps 102311 to 102312, see the relevant content in the other embodiments in the preceding text.

Further, if the first data block is ranked first or last in the first data stream, Step 102 can further comprise the following steps:

1024. determining whether a data header needs to be added to the first data block according to transmission transaction attribute information of the first transmission transaction in the first transaction information;

1025. if yes, determining a data header for the first data block according to stream information of the first data stream; wherein the data header is adapted to the first data stream and meets preset data header format requirements.

For the specific implementation of Step 1024, see the relevant content in the other embodiments as described above.

In a specifically implementable solution, said "determining a data header for the first data block according to stream information of the first data stream" in Step 1025 comprises:

10251. selecting an adapted data header format from multiple preset data header formats on the basis of data header usage information included in the transmission transaction attribute information;

10252. generating the data header in the selected data header format according to the stream information of the first data stream.

In the case described in Step 10223, i.e., when some header fields in the multiple header fields are the target header fields, said "configuring field values of the target header fields according to at least one of the first transaction information and the relevant information of the first data block, and obtaining a message header determined for the first data block" in Step 1023 can comprise:

10231'. configuring field values of the target header fields according to transaction identification of the first transmission transaction in the first transaction information, and obtaining a second message header that is determined for the first data block;

wherein the second message header comprises the transaction identification.

In an implementable technical solution, said "sending the first message to the second end" in Step 104 can comprise the following steps:

1041. sending the first message to a second control module, verifying the first target header information included in a second message through the second control module, and when it is verified that the first message meets the requirements, sending the first message to the second end;

wherein the second control module is a module (the second control module 12 shown in FIG. 3*d*) that is external to the first application on the first end.

For the specific description of the second control module in Step 1041 and the specific implementation of Step 1041, see the relevant content in the previous text.

Further, the solution provided in the present embodiment can further comprise:

105. receiving a second message sent by the second end;

Wherein the second message is generated according to a second data block and second target header information, which is determined for the second data block of a second data stream by a third control module on the second end according to second transaction information of a second transmission transaction corresponding to the second data stream of a second application on the second end; the second target header information is used for verifying whether the second message meets the requirements;

the third control module is located inside or outside the second application.

For the specific introduction to the third control module, see the relevant content in the other embodiments of the present application. For the second application and the generation of the second message, see the specific introduction to the first application and the generation of the first message, respectively.

It should be added that when the third control module is located inside the second application, a fifth control module can further be arranged outside the second application on the second end; alternatively, when the third control module is located outside the second application, a fifth control module can further be arranged inside the second application on the second end. Regarding how the third control module and the fifth control module collaborate to process the second data block when they coexist, see the relevant content on how the first control module and the second control module on the first end collaborate to process the first data block in the other embodiments of the present application in the previous text.

In the technical solution provided in the present embodiment, when the first end needs to transmit the first data block in the first data stream of the application thereon to the second end, the first control module 11 in the first application on the first end determines the first target header information for the first data block on the basis of the determined first transaction information of the first transmission transaction corresponding to the first data stream; then, the first message to be sent is generated according to the first data block and the first target header information, and the first message is sent to the second end. In the above content, the first target header information is used for verifying whether the message meets the requirements, which enables the present solution to realize the security management of transmitted data content at relatively low costs.

It should be added that for the content that is not elaborated in the steps in the data transmission method provided in the embodiments of the present application, see the corresponding content in the other embodiments provided in the present application, which content will not be repeated herein. In addition, the method provided in the embodiments of the present application can further comprise some or all steps in the above embodiments, in addition to the above steps. For details, see the corresponding content in the above embodiments, which content will not be repeated herein.

Figure 11B:
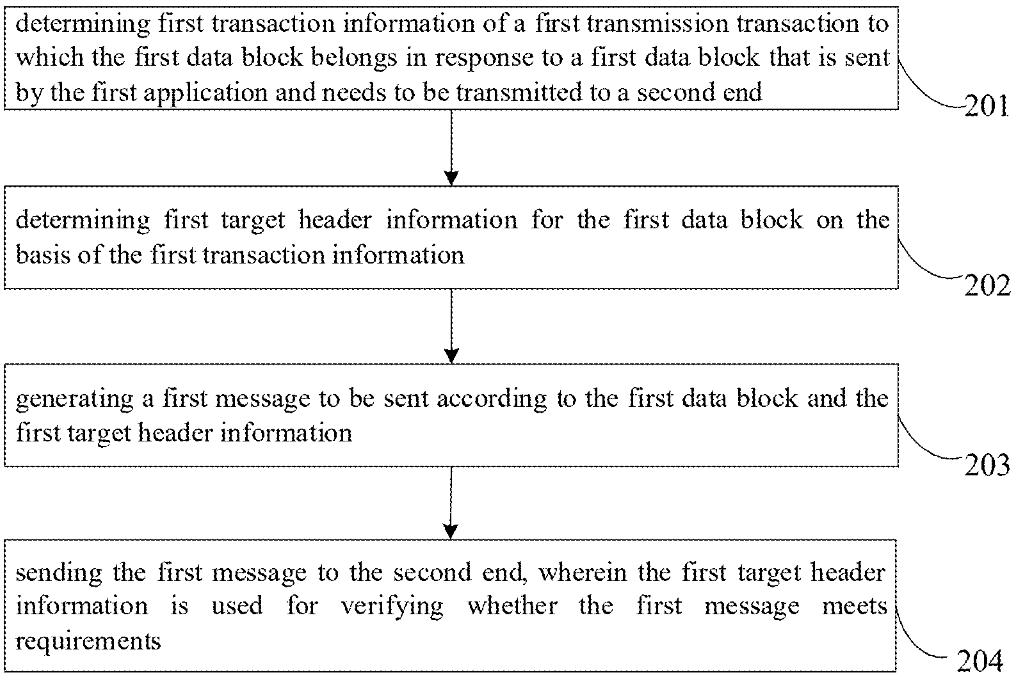

FIG. 11*b* shows a flow diagram of a data transmission method provided in another embodiment of the present application. The data transmission method is applicable to the first end 10 shown in FIG. 3*c*, and more specifically, to the second control module 12 external to the first application on the first end 10. Preset information will be arranged in the second control module 12 in advance. The preset information refers to information that needs to be used to implement the data transmission method provided in the present embodiment. For the preset information in the second control module 12, see the description of the preset information in the first control module 11 in the previous text. For the specific introduction to the second control module 12, see the relevant content in the other embodiments in the previous text. Neither will be repeated herein. As shown in FIG. 11*b*, the data transmission method provided in the present embodiment can comprise the following steps:

201. determining first transaction information of a first transmission transaction to which the first data block belongs in response to a first data block that is sent by the first application and needs to be transmitted to a second end;

202. determining first target header information for the first data block on the basis of the first transaction information;

203. generating a first message to be sent according to the first data block and the first target header information;

204. sending the first message to the second end;

wherein the first target header information is used for verifying whether the first message meets requirements.

In Step 201, as shown in FIG. 3*d*, the first control module 11 can also be deployed in the first application. For the specific introduction to the first control module 11 and the preset information that can be preset therein, see the relevant content in other embodiments in the previous text. By using the first control module 11, a pre-audit (or pre-verification) can be performed on the first data block to determine whether the first data block is allowed to be transmitted. For example, as for the first data block as received, the first control module 11 can first carry out an audit on whether the data type and the transmission transaction among others, to which the first data block belongs, meet the requirements; specifically, the first control module 11 can carry out an audit on whether the data type to which the first data block belongs is a type of data that is allowed to be transmitted according to the data transmission security control information included in the preset information that is preset therein, such as information on the type of data that is allowed/blocked to be transmitted or from transmission; if yes, the requirements are met; alternatively, the second preset string corresponding to the first end can be determined for the transmission transaction to which the first data block belongs first; then, what is included in the preset data transmission security control information is the transmission transaction blacklist/whitelist or the like bound to the second preset string corresponding to the first end, and whether the transmission transaction to which the first data block belongs is in the blacklist/whitelist is analyzed; if yes, the requirements are met. For the specific implementation of determining the second preset string corresponding to the first end for the transmission transaction to which the first data block belongs, see the relevant content in the previous text. When the first control module 11 determines in the audit that the first data block meets the requirements and is a data block that is allowed to be transmitted, it can send the first data block and the determined transaction attribute identification of the transmission transaction to which the first data block belongs to the second control module 12; according to the transaction attribute identification, the second control module 12 obtains the attribute information of the transmission transaction to which the first data block belongs, and processes the first data block on the basis of the obtained transmission transaction attribute information to carry out transmission. Based on this, in an implementable technical solution, said "determining first transaction information of a first transmission transaction to which the first data block belongs in response to a first data block that is sent by the first application and needs to be transmitted to a second end" in Step 201 can comprise:

2010. generating transaction identification for the first transmission transaction;

2011. receiving the first data block sent by the first control module in the first application, as well as transaction attribute identification of the first transmission transaction to which the first data block belongs;

2012. inquiring transmission transaction attribute information of the first transmission transaction from multiple pieces of preset transmission transaction attribute information on the basis of the transaction attribute identification In Step 2011, the first transmission transaction to which the first data block belongs specifically refers to the transmission transaction corresponding to the first data stream to which the first data block belongs. For the specific implementation of the first control module determining the transaction attribute identification of the first transmission transaction to which the first data block belongs, see the relevant content in other embodiments in the previous text.

In Step 2012, the transmission transaction attribute information includes, but is not limited to: the transaction attribute name, the first annotated information, the first preset string corresponding to the second end, the transaction attribute identification, and the transaction attribute type information. Wherein the transaction attribute type information includes: the transmission direction of the first data stream to which the first data block belongs, the data type of the first data stream, and the data header usage information. For the specific introduction to the transmission transaction attribute information and the specific implementation of Step 2012, see the relevant content in other embodiments in the preceding text.

In an implementable technical solution, said "determining first target header information for the first data block on the basis of the first transaction information" in Step 202 can specifically comprise:

2021. obtaining a header information transmission manner corresponding to data blocks in the first data stream to which the first data block belongs;

2022. determining target header fields for the first data block from multiple header fields included in a preset message header format according to the header information transmission manner and relevant information of the first data block;

2023. configuring field values of the target header fields according to at least one of the first transaction information and the relevant information of the first data block and obtaining a message header determined for the first data block.

In a specifically implementable solution, said "determining target header fields for the first data block from multiple header fields included in a preset message header format according to the header information transmission manner and relevant information of the first data block" in Step 2022 can specifically comprise:

20221. determining the ranking of the first data block in the first data stream according to the block number of the first data block as included in the relevant information;

20222. determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;

20223. determining that some header fields in the multiple header fields are the target header fields if the header information transmission manner is the second manner and the data block is not ranked last in the first data stream, or the header information transmission manner is the third manner and the data block is not ranked first in the first data stream.

Under the circumstances provided in Step 20222, i.e., when the multiple header fields are the target header fields, said "configuring field values of the target header fields according to at least one of the first transaction information and the relevant information of the first data block and obtaining a message header determined for the first data block" in Step 2023 can specifically comprise:

20231: determining a second preset string corresponding to the first end for the first transmission transaction;

20232. configuring field values of the target header fields according to the second preset string, the first transaction information, and the relevant information of the first data block and obtaining a first message header determined for the first data block;

wherein the first message header comprises: a first preset string corresponding to the second end, the second preset string, a transaction attribute identification of the first transmission transaction, a transaction identification of the first transmission transaction, the total number of the data blocks in the first data stream, the block number of the first data block, the total size of the first target header information and the first data block, and annotated information; when the total number is a set value, it indicates that the first data stream is a stream with an unknown number of data blocks.

For the specific implementation of "generating a first message to be sent according to the first data block and the first target header information" in Step 203, see the relevant content in other embodiments in the previous text.

In the present embodiment, the preset strings (such as the first preset character and the second preset string) serve to indicate the address information of the corresponding ends. Herein, "indicate" has two meanings as follows: the preset strings are directly strings that correspond to the address information of the corresponding ends; alternatively, the preset strings are used for hiding the address information of the corresponding ends, e.g., the hiding manner can be making the correlation information associated with the preset strings include the address information of the corresponding ends. In the case that the preset strings are used for hiding the address information of the corresponding ends, in an implementable solution, said "sending the first message to the second end" in Step 204 can comprise the following steps:

2041. obtaining the first preset string corresponding to the second end from transmission transaction attribute information of the first transmission transaction as included in the first transaction information;

2042. obtaining the address information of the second end according to the first preset string;

2043. sending the first message to the second end according to the address information of the second end.

For the specific implementation of Steps 2041-2042, see the relevant content in other embodiments in the previous text.

In a specifically implementable technical solution, "sending the first message to the second end according to the address information of the second terminal" in Step 2043 can be implemented in the following steps:

20431. sending the first message to an intermediate network apparatus according to the address information of the second end, so as to send the first message to the second end through the intermediate network apparatus;

wherein the intermediate network apparatus further executes any one of steps as follows before sending the first message to the second end: verifying the first target header information included in the first message; generating log information of the first transmission transaction according to the first message.

Under the circumstance provided in Step 20223, i.e., when some header fields in the multiple header fields are the target header fields, "configuring field values of the target header fields according to at least one of the first transaction information and the relevant information of the first data block and obtaining a message header determined for the first data block" in Step 2023 can specifically comprise:

20231'. configuring field values of the target header fields according to transaction identification of the first transmission transaction in the first transaction information, and obtaining a second message header determined for the first data block:

wherein the second message header comprises the transaction identification the first transmission transaction.

Further, the method provided in the present embodiment can further comprise:

205. receiving a second message sent by the second end;

wherein the second message is generated according to a second data block and second target header information, which is determined for the second data block of a second data stream by a third control module on the second end according to second transaction information of a second transmission transaction corresponding to the second data stream of a second application on the second end; the second target header information is used for verifying whether the second message meets the requirements;

the third control module is located inside or outside the second application.

In the technical solution provided in the present embodiment, when the first end needs to transmit the first data block in the first data stream of the application to the second end, the first target header information is determined for the first data block on the basis of the determined first transaction information of the first transmission transaction corresponding to the first data stream; then, the first message to be sent is generated according to the first data block and the first target header information, and the first message is sent to the second end. In the above content, the first target header information is used for verifying whether the message meets requirements, which enables the present solution to realize the security management of transmitted data content at relatively low costs.

It should be noted that for the content that is not elaborated in the steps of the data transmission method provided in the embodiment of the present application, reference can be made to the corresponding content in the other embodiments provided in the present application, which will not be repeated herein. In addition, apart from the above steps, the method provided in the embodiment of the present application can also comprise some or all steps in the other embodiments. For details, see the corresponding content of the other embodiments, which will not be repeated herein.

Figure 12:
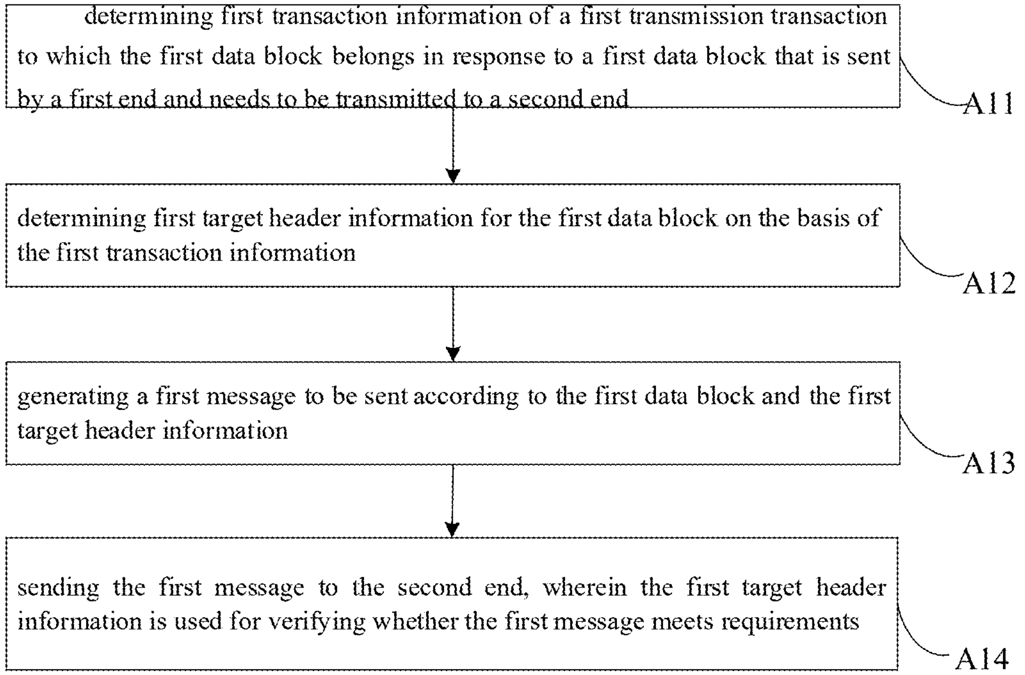

FIG. 12 shows a flow diagram of a data transmission method provided in another embodiment of the present application. The data transmission method is applicable to a fourth control module (not shown in the FIGURE) on the intermediate network apparatus as shown in FIG. 3*c*. Preset information will be preset in the fourth control module, and it is the information that needs to be used to implement the data transmission method provided in the present embodiment. For the preset information in the fourth control module, see the description of the preset information preset in the first control module 11 in the previous text. For the specific introduction to the fourth control module 12, see the relevant content in the other embodiments in the previous text, which will not be repeated herein. Specifically, as shown in FIG. 12, the data transmission method provided in the present embodiment can comprise the following steps:

A11. determining first transaction information of a first transmission transaction to which the first data block belongs in response to a first data block that is sent by a first end and needs to be transmitted to a second end;

A12. determining first target header information for the first data block on the basis of the first transaction information;

A13. generating a first message to be sent according to the first data block and the first target header information;

A14. sending the first message to the second end;

wherein the first target header information is used for verifying whether the first message meets requirements.

In an implementable solution, said "determining first transaction information of a first transmission transaction to which the first data block belongs in response to a first data block that is sent by a first end and needs to be transmitted to a second end" in Step A11 can specifically comprise:

A111. generating a corresponding transaction identification for the first transmission transaction;

A112. receiving the first data block sent by a first control module within a first application on the first end or by a second control module external to the first application on the first end, as well as a transaction attribute identification of the first transmission transaction to which the first data block belongs;

A113. inquiring transmission transaction attribute information of the first transmission transaction from multiple pieces of preset transmission transaction attribute information on the basis of the transaction attribute identification.

In an implementable solution, said "determining first target header information for the first data block on the basis of the first transaction information" in Step A12 can specifically comprise:

A121. obtaining a header information transmission manner corresponding to data blocks in the first data stream to which the first data block belongs;

A122. determining target header fields for the first data block from multiple header fields included in a preset message header format according to the header information transmission manner and relevant information of the first data block;

A123. configuring field values of the target header fields according to at least one of the first transaction information and the relevant information of the first data block and obtaining a message header determined for the first data block.

In a specifically implementable solution, said " " in Step A122 can comprise:

A1221. determining the ranking of the first data block in the first data stream according to the block number of the first data block as included in the relevant information;

A1222. determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;

A1223. determining that some header fields in the multiple header fields are the target header fields if the header information transmission manner is the second manner and the data block is not ranked last in the first data stream, or the header information transmission manner is the third manner and the data block is not ranked first in the first data stream.

Under the circumstances provided in Step A1222, i.e., when the multiple header fields are the target header fields, said "configuring field values of the target header fields according to at least one of the first transaction information and the relevant information of the first data block and obtaining a message header determined for the first data block" in Step A123 can specifically comprise:

A1231. determining a second preset string corresponding to the first end for the first transmission transaction;

A1232. configuring field values of the target header fields according to the second preset string, the first transaction information, and the relevant information of the first data block and obtaining a first message header determined for the first data block;

wherein the first message header comprises: a first preset string corresponding to the second end, the second preset string, a transaction attribute identification of the first transmission transaction, a transaction identification of the first transmission transaction, the total number of the data blocks in the first data stream, the block number of the first data block, the total size of the first target header information and the first data block, and annotated information;

when the total number is a set value, it indicates that the first data stream is a stream with an unknown number of data blocks; a preset string is address information of a corresponding end, or the preset string is used for hiding the address information of the corresponding end.

Further, when the preset strings are used for hiding the address information of the corresponding ends, said "sending the first message to the second end" in Step A14 comprises:

A141. obtaining the first preset string corresponding to the second end from transmission transaction attribute information of the first transmission transaction as included in the first transaction information;

A142. obtaining the address information of the second end according to the first preset string;

A143. sending the first message to the second end according to the address information of the second end.

Under the circumstances provided in Step A 1223, i.e., when some header fields in the multiple header fields are the target header fields, said "configuring field values of the target header fields according to at least one of the first transaction information and the relevant information of the first data block and obtaining a message header determined for the first data block" in Step A123 can specifically comprise:

A1231'. configuring field values of the target header fields according to transaction identification of the first transmission transaction in the first transaction information, and obtaining a second message header determined for the first data block;

wherein the second message header comprises the transaction identification of the first transmission transaction.

Further, the method provided in the present embodiment further comprises:

A15. receiving a second data block that is sent by the second end and needs to be transmitted to the first end, and determining second transaction information of a second transmission transaction to which the second data block belongs;

A16. determining corresponding second target header information for the second data block on the basis of the second transaction information;

A17. generating a second message to be sent according to the second data block and the second target header information;

A18. sending the second message to the first end;

wherein the second target header information is used for verifying whether the second message meets the requirements.

It should be noted that for the content that is not elaborated in the steps of the data transmission method provided in the embodiment of the present application, reference can be made to the corresponding content in the other embodiments provided in the present application, which will not be repeated herein. In addition, apart from the above steps, the method provided in the embodiment of the present application can also comprise some or all steps in the other embodiments. For details, see the corresponding content of the other embodiments, which will not be repeated herein.

Another embodiment of the present application further provides a data transmission method. The data transmission method is applicable to a control apparatus (such as the first control apparatus) that is connected to the first end. Preset information will be preset in the control apparatus, and it is the information that needs to be used to implement the data transmission method provided in the present embodiment. For the preset information in the control apparatus, see the description of the preset information preset in the first control module 11 in the previous text. For the specific introduction to the control apparatus, see the relevant content in the other embodiments in the previous text, which will not be repeated herein. Specifically, the data transmission method provided in the present embodiment can comprise the following steps:

A21. receiving a first data block in a first data stream, which is sent by the first end and needs to be transmitted to a second end;

A22. determining that the first data stream corresponds to first transaction information of a first transmission transaction;

A23. determining first target header information for the first data block on the basis of the first transaction information;

A24. generating a first message to be sent according to the first data block and the first target header information;

A25. sending the first message to the second end;

wherein the first target header information is used for verifying whether the first message meets requirements.

It should be noted that for the content that is not elaborated in the steps of the data transmission method provided in the embodiment of the present application, see the corresponding content in the other embodiments provided in the present application, which will not be repeated herein. Furthermore, in addition to the above steps, the method provided in the embodiment of the present application can also comprise some or all steps in the other embodiments provided in the present application. For details, see the corresponding content of the above embodiments, which will not be repeated herein.

The technical solution provided in the present application will be introduced below from the perspective of the "preset strings" having the function of hiding the address information of the corresponding ends. Before introducing the data transmission method provided in the present application from the perspective of the "preset strings", the specific system architecture on which the method can be based will be first introduced and explained.

Specifically, from the perspective of the "preset strings", the data transmission method provided in the present application can be based on the system architecture shown in FIGS. 5*a* to 5*c*. FIG. 5*a* shows a structure diagram of a data transmission system provided in an embodiment of the present application. The data transmission system comprises: a first end 10, a first control apparatus 31, and a second end 20, wherein, the first end 10 is used for sending a first data block that needs to be transmitted to the second end 20 to the first control apparatus 31;

the first control apparatus 31 is used for: obtaining a first preset string corresponding to the second end 20 in response to the first data block sent by the first end 10, wherein the first preset string is used for hiding the address information of the second end 20; obtaining the address information of the second end 20 according to the first preset string; sending the first data block to the second end 20 according to the address information of the second end 20.

For the specific introduction of the first end 10, the first control apparatus 31, and the second end 20, as well as the manner of communication connection between the three, see the relevant content in the previous text, which will not be repeated herein.

The first data block sent by the first end 10 to the first control apparatus 31 is one data block in the first data stream of the first application thereon. For the specific introduction to the first application and the first data stream, see the relevant content in the previous text. When the first end 10 needs to transmit the first data block to the second end 20, it can call the apparatus driver of the first control apparatus 31 deployed therein, and use the configuration data pre-registered in the apparatus driver to determine the first preset string corresponding to the second end for the first data block. In addition, it can also determine the second preset string corresponding to the first end for the first data block, so as to send the first preset string and the second preset string together with the first data block to the first control apparatus 31. Wherein the configuration data pre-registered in the apparatus driver can include, but is not limited to: multiple second preset strings corresponding to the first end, the correspondence among the second preset strings, the transaction type of the transmission transaction, and the transaction attribute identification of the transmission transaction, the name of the second end, the access credential, the transmission transaction attribute information of multiple transmission transactions, etc. By calling the apparatus driver of the first control apparatus 31 deployed therein, the first end 10 can obtain the first preset string corresponding to the second end (i.e., determine the first preset string corresponding to the second end for the first data block) from the transmission transaction attribute information of the determined first transmission transaction corresponding to the first data stream to which the first data block belongs; and, it can determine the second preset string corresponding to the first end that has a correspondence with the transaction type of the transmission transaction corresponding to the first data stream (i.e., determine the second preset string corresponding to the first end for the first data block). For the specific implementation of determining the transaction type and the transmission transaction attribute information among others of the transmission transaction corresponding to the first data stream, see the relevant content in the other embodiments in the previous text.

Alternatively, the first end 10 can only send the first data block to the first control apparatus, while sending neither the first preset string corresponding to the second end nor the second preset string corresponding to the first end to the first control apparatus 31. This can be determined by the first control apparatus 31 on its own.

Based on the above content, when used for obtaining the first preset string corresponding to the second end, the first control apparatus 31 can be specifically used for any one of the following items:

11) receiving the first preset string corresponding to the second end and is sent by the first end.

12) determining transmission transaction attribute information of the first transmission transaction corresponding to the first data stream to which the first data block belongs; obtaining the first preset string corresponding to the second end from the transmission transaction attribute information.

For the specific implementation of determining the transmission transaction attribute information of the first data stream corresponding to the first transmission transaction, as well as the specific introduction to the transmission transaction attribute information, see the relevant content in the other embodiments in the previous text.

In the present embodiment, the first preset string is used for hiding the address information of the second end. For the purpose of doing so, see the content relevant to "Case 22" described in the other embodiments in the previous text. The specific implementation manner of hiding can include, but is not limited to: the correlation information associated with the first preset string includes the address information of the second end.

Based on this, the first control apparatus 31, when used for "obtaining the address information of the second end according to the first preset string corresponding to the second end", can be specifically used for: obtaining correlation information associated with the first preset string; obtaining the address information of the second end from the associated information.

After obtaining the address information of the second end, as shown in FIG. 5*a*, the first control apparatus 31 can directly send the first data block to the second end according to the address information of the second end. Alternatively, as shown in FIGS. 5*b* and 5*c*, to further improve the security control of data transmission, a message to be transmitted can be generated for the first data block on the basis of the transaction information (including transaction identification, transmission transaction attribute information), the first preset string, the second preset string among others of the first transmission transaction corresponding to the first data stream, and the generated message is sent to the second end according to the address information of the second end. Based on this, in an implementable technical solution, when used for "sending the first data block to the second end according to the address information of the second end", the first control apparatus 31 can be specifically used for:

S41. determining first transaction information of a first transmission transaction corresponding to the first data stream to which the first data block belongs;

S42. determining first target header information for the first data according to the first transaction information;

S43. generating a first message to be sent according to the first target header information and the first data block;

S44. sending the first message to the second end according to the address information of the second end;

wherein the first target header information is used for verifying whether the first message meets requirements, and if yes, the second end retrieves and caches the first data from the first message.

For the specific implementation of Step S41, see the relevant content in the other embodiments in the previous text.

In an implementable technical solution, said "determining first target header information for the first data according to the first transaction information" in Step S42 can specifically comprise:

S421. obtaining a header information transmission manner corresponding to data blocks in the first data stream;

S422. determining target header fields for the first data block from multiple header fields included in a preset message header format according to the header information transmission manner and relevant information of the first data block;

S423. configuring field values of the target header fields according to at least one of the first transaction information and the relevant information of the data block, and obtaining a message header determined for the first data block.

For the specific introduction to the header information transmission manner in Step S421, see the relevant content in the other embodiments in the previous text.

In Step S422, said "determining target header fields for the first data block from multiple header fields included in a preset message header format according to the header information transmission manner and relevant information of the first data block" can comprise:

S4221. determining the ranking of the first data block in the first data stream according to the block number of the first data block as included in the relevant information;

S4222. determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;

S4223. determining that some header fields in the multiple header fields are the target header fields if the header information transmission manner is the second manner and the first data block is not ranked last in the first data stream, or the header information transmission manner is the third manner and the first data block is not ranked first in the first data stream.

Under the circumstances provided in Step S4222, i.e., when the multiple header fields are the target header fields, said "configuring field values of the target header fields according to at least one of the first transaction information and the relevant information of the data block, and obtaining a message header determined for the first data block" in Step S423 can specifically comprise:

S4231. obtaining a second preset string corresponding to the first end, wherein the second preset string is used for hiding address information of the first end;

S4232. configuring field values of the target header fields according to the first preset string, the second preset string, the first transaction information, and the relevant information of the first data block, and obtaining a first message header that is determined for the first data block;

wherein the first message header comprises: the first preset string corresponding to the second end, the second preset string, transaction attribute identification of the first transmission transaction, transaction identification of the first transmission transaction, the total number of the data blocks in the first data stream, the block number of the first data block, the total size of the first target header information and the first data block, and annotated information; when the total number is a set value, it indicates that the first data stream is a stream with an unknown number of data blocks.

When used for "obtaining the second preset string corresponding to the first end" in Step S4231, the first control apparatus 31 can be specifically used for any one of the following items:

21) receiving the second preset string corresponding to the first end and is sent by the first end;

22) determining the transaction type of the first transmission transaction corresponding to the first data stream to which the first data block belongs; determining the second preset string that has a correspondence with the transaction type of the first transmission transaction on the basis of the preset correspondence between the transaction type and the second preset string.

For the specific implementation of Steps 21) and 22), see the relevant content in the previous text.

Further, if the first data block is ranked first or last in the first data stream, the first control apparatus 31, when used for implementing Step S42, can further be specifically used for:

determining whether a data header needs to be added to the first data block on the basis of transaction attribute type information of the first transmission transaction in the first transaction information;

if yes, determining one adapted data header format from multiple preset data header formats according to data header usage information in the transaction attribute type information;

determining a data header in the selected data header format for the first data block according to stream information of the first data block.

Under the circumstances provided in Step S4223, i.e., when some header fields in the multiple header fields are the target header fields, said "configuring field values of the target header fields according to at least one of the first transaction information and the relevant information of the data block, and obtaining a message header determined for the first data block" in Step S423 can specifically comprise:

S4231'. configuring field values of the target header fields according to transaction identification of the first transmission transaction in the first transaction information, and obtaining a second message header that is determined for the first data block;

wherein the second message header comprises the transaction identification.

For the specific implementation of Steps S43 and S44, see the relevant content in the other embodiments in the previous text.

Accordingly, the second end 20 can be specifically used for: verifying the first message as received; after the verification is passed, retrieving and caching the first data block from the first message.

Based on the above content relevant to the information that is bound to (i.e., associated with) the preset strings and described in the other embodiments of the present application, it can be learned that the association information associated with the preset strings (such as the second preset string) includes data transmission direction control information. For the specific introduction to the data transmission direction control information, see the relevant content in the previous text. Based on this, the first control apparatus 31, before it is used for "generating a first message to be sent according to the first target header information and the first data block" in Step S43, can further be specifically used for:

- obtaining data transmission direction control information from correlation information associated with the second preset string;
- triggering the operation of Step S43 if the data transmission direction control information is indicative of allowing the control apparatus to forward received data to the second end;
- triggering the operation of Step S43 according to the data type of the first data stream to which the first data block belongs if the data transmission direction control information is indicative of prohibited the control apparatus from forwarding the received data to the second end.

In specific implementation, in the case that the data transmission direction control information is indicative of prohibiting the control apparatus from forwarding the received data to the second end, if it is determined that the data type of the first data stream to which the first data block belongs is a non-request type, such as uploading files, the first data block may not be forwarded to the second end, but the processing such as caching can be carried out. On the contrary, if it is determined that the data type of the first data stream to which the first data block belongs is a request type (such as requesting resources (such as network resources) on the second end), then whether there exist data resources that are compatible with the request parameters is first queried locally on the basis of the request parameters determined by the first data block. If yes, the data resources that are compatible with the request parameters in the inquiry can be directly fed back to the first end; if not, preset request parameters can be obtained from the correlation information associated with the second preset string, and a message (a request message) to be sent can be generated on the basis of the preset request parameters and sent to the second end, so as to obtain corresponding data resources from the second end and feed back the data resources to the first end. Based on this, the first control apparatus 31, when used for triggering the operation of Step S43 according to the data type of the first data stream to which the first data block belongs, can be specifically used for:

- obtaining preset request parameters from the correlation information when the data type is a request type; generating the first message to be sent on the basis of the preset request parameters and the first target header information;
- never performing a sending operation when the data type is a non-request type.

Further, referring to FIGS. 5*b* and 5*c*, the system provided in the present embodiment can further comprise: a second control apparatus 32, which is in communication connection with the second end 20 and the first control apparatus 31, wherein address information of the second end is directed to the second control apparatus;

Accordingly, the first control apparatus 31, when used for "sending the first message to the second end according to the address information of the second end" in Step S44, is specifically used for: sending the first message to the second control apparatus 32 according to the address information of the second end, so that the second control apparatus 32 sends the first message to the second end 29;

The second control apparatus 32 is used for: verifying the first message as received; sending the first message to the second end if the verification is passed and a retrieval request sent by the second end is received; never performing a sending operation if the verification is not passed.

It should be noted that each apparatus or each end in the data transmission system provided in the above embodiment can not only implement the functional steps in the present embodiment, but also realize the relevant content in the other embodiments provided in the present application. For the functional content that can be specifically realized by each apparatus or each end and the corresponding implementation principles, see the corresponding content in the other embodiments of the present application, which will not be repeated herein.

Based on the relevant content of the data transmission system provided in one embodiment of the present application as introduced above, three other embodiments of the present application each also provide a data transmission system, and are specifically put as follows.

Another embodiment of the present application provides a data transmission system, comprising: a target apparatus, a first end, and a first control apparatus; wherein,

- the first end is used for: obtaining a first preset string corresponding to the target apparatus when a first data block needs to be transmitted to the target apparatus; generating a first message to be sent according to the first preset string and the first data block; sending the first message to the first control apparatus; wherein the first preset string is used for hiding address information of the target apparatus;
- the first control apparatus is used for: determining the address information of the target apparatus according to the first preset string obtained from the first message; sending the first message to the target apparatus according to the address information of the target apparatus.

Further, the target apparatus comprises a second end; and, the first control apparatus is specifically used for: determining address information of the second end according to the first preset string; sending the first message to the second end according to the address information of the second end.

Further, the target apparatus further comprises a second control apparatus, which is in communication connection with the second end and the first control apparatus; the address information of the second end is directed to the second control apparatus;

- the first control apparatus is specifically used for sending the first message to the second control apparatus according to the address information of the second end;
- the second control apparatus is used for: verifying the first message as received; after the verification is passed, caching the first message to wait for retrieval by the second end;
- the second end is used for: sending a retrieval request to the second control apparatus; receiving the first message fed back by the second control apparatus in response to the retrieval request.

For the specific introduction to the first end, the first control apparatus, the second control apparatus, and the second end, as well as the functions that can be achieved thereby and the specific implementation of the functions, see the relevant content in the previous text.

For the system architecture of the data transmission system provided in another embodiment of the present application, see the system architecture shown in FIG. 5*d* or FIG. 5*e*. Specifically, as shown in FIG. 5*d* or FIG. 5*e*, the data transmission system provided in the present embodiment comprises: a first end 10, a first control apparatus 31, a second control apparatus 32, and a second end 20; wherein,

- the first end 10 is used for: obtaining a first preset string corresponding to a second end when a first data block needs to be transmitted to a second end; generating a first message to be sent on the basis of the first preset string and the first data block; sending the first message to a first control apparatus; wherein the first preset string is used for hiding address information of the second end;
- the first control apparatus 31 is used for: determining the address information of the second end according to the first preset string obtained from the first message; sending the first message to a second control apparatus according to the address information of the second end;
- the second control apparatus 32 is used for caching the first message as received to await retrieval by the second end;
- the second end 20 is used for: sending a retrieval request to the second control apparatus; receiving the first message fed back by the second control apparatus in response to the retrieval request.

For the specific introduction to the first end 10, the first control apparatus 31, the second control apparatus 32, and the second end 20, as well as the functions that can be achieved thereby and the specific implementation of the functions, see the relevant content in the previous text.

A data transmission system provided in another embodiment of the present application comprises: a first end, a first control apparatus, and a second end;

- the first end is used for: obtaining a first preset string corresponding to a second end and a second preset string corresponding to the first end when a first data block needs to be transmitted to the second end; sending the first preset string, the second preset string, and the first data block to a first control apparatus; wherein the preset strings are used for hiding address information of corresponding ends;
- the first control apparatus is used for: determining first transaction information of a first transmission transaction corresponding to a first data stream to which the first data block belongs; determining first target header information for the first data block on the basis of the first transaction information, the first preset string, and the second preset string; generating a first message to be sent according to the first target header information and the first data block; and sending the first message to the second end according to the address information of the second end as obtained from the first preset string.
- the second end is used for: verifying the first message as received; obtaining and caching the first data from the first message after the verification is passed.

For the specific introduction to the first end, the first control apparatus, the second control apparatus, and the second end, as well as the functions that can be achieved thereby and the specific implementation of the functions, see the relevant content in the previous text.

Based on the system content introduced above in combination with FIGS. 5*a* to 5*c*, an embodiment of the present application also provides a data transmission method, which is specifically put as follows.

Figure 13:
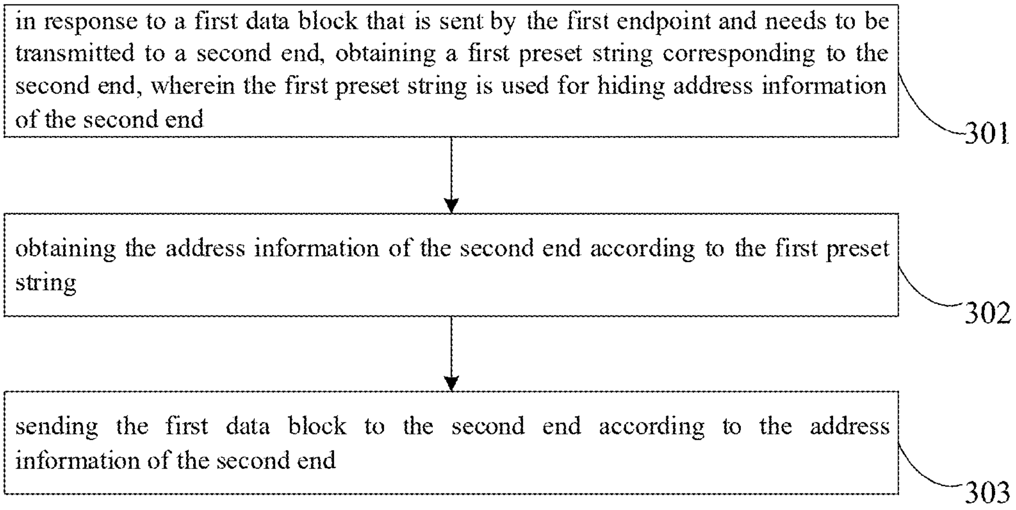

FIG. 13 shows a flow diagram of a data transmission method provided in an embodiment of the present application. The data transmission method is applicable to the control apparatus connected to the first end 10 as shown in FIG. 5*a*, i.e., the first control apparatus 31. The preset information that is set in the first control apparatus 31 in advance includes the configuration file created for the first end 10 as described above, and can further include the configuration file created for the second end 20. For the specific content that can be included in the configuration file, see the relevant content in the other embodiments in the previous text. As shown in FIG. 13, the data transmission method provided in the present embodiment comprises the following steps:

- 301. in response to a first data block that is sent by the first end and needs to be transmitted to a second end, obtaining a first preset string corresponding to the second end, wherein the first preset string is used for hiding address information of the second end;
- 302. obtaining the address information of the second end according to the first preset string;
- 303. sending the first data block to the second end according to the address information of the second end.

In an implementable technical solution, said "obtaining a first preset string corresponding to the second end" in Step 301 can specifically comprise:

- 3011. determining first transaction information of a first transmission transaction corresponding to a first data stream to which the first data block belongs;
- 3012. obtaining the first preset string from transmission transaction attribute information included in the first transaction information.

For the specific description of Steps 3011 to 3012, see the relevant content in the other embodiments in the previous text.

In Step 302, the address information of the second end can be obtained from the association information associated with the first preset string. For the specific introduction to the correlation information associated with the preset strings (such as the first preset string and the second preset string involved in the context), see the relevant content in the other embodiments of the present application.

In an implementable technical solution, as shown in FIG. 5*b* or FIG. 5*c*, said "sending the first data block to the second end according to the address information of the second end" in Step 303 can specifically comprise:

- 3031. determining first target header information for the first data block on the basis of the first transaction information;
- 3032. generating a first message to be sent according to the first target header information and the first data block;
- 3033. sending the first message to the second end according to the address information of the second end;
- wherein the first target header information is used for verifying whether the first message meets requirements, and when it meets the requirements, the second end obtains and caches the first data block from the first message.

In a specifically implementable technical solution, said "determining first target header information for the first data block on the basis of the first transaction information" in Step 3031 can specifically comprise the following steps:

30311. obtaining a header information transmission manner corresponding to data blocks in the first data stream;

30312. determining target header fields for the first data block from multiple header fields included in a preset message header format according to the header information transmission manner and relevant information of the first data block;

30313. configuring field values of the target header fields according to at least one of the first transaction information and the relevant information of the first data block, and obtaining a message header determined for the first data block.

For the relevant introduction to the header information transmission manner in Step 30311, see the relevant content in the other embodiments in the previous text.

In one embodiment, said "determining target header fields for the first data block from multiple header fields included in a preset message header format according to the header information transmission manner and relevant information of the first data block" in Step 30312 can specifically comprise:

303121. determining the ranking of the first data block in the first data stream according to the block number of the first data block as included in the relevant information;

303122. determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;

303123. determining that some header fields in the multiple header fields are the target header fields if the header information transmission manner is the second manner and the data block is not ranked last in the first data stream, or the header information transmission manner is the third manner and the data block is not ranked first in the first data stream.

Under the circumstances provided in Step 303122, i.e., when the multiple header fields are the target header fields, said "configuring field values of the target header fields according to at least one of the first transaction information and the relevant information of the first data block, and obtaining a message header determined for the first data block" in Step 30313 can specifically comprise:

obtaining a second preset string corresponding to the first end, wherein the second preset string is used for hiding address information of the first end;

configuring field values of the target header fields according to the first preset string, the second preset string, the first transaction information, and the relevant information of the first data block and obtaining a first message header determined for the first data block;

wherein the first message header comprises: the first preset string, the second preset string, a transaction attribute identification of the first transmission transaction, a transaction identification of the first transmission transaction, the total size of the first target header information and the first data block, the total number of the data blocks in the first data stream, the block number of the first data block, and annotated information;

when the total number is a set value, it indicates that the first data stream is a stream with an unknown number of data blocks.

Under the circumstances provided in Step 303123, i.e., some header fields in the multiple header fields are the target header fields, said "configuring field values of the target header fields according to at least one of the first transaction information and the relevant information of the first data block, and obtaining a message header determined for the first data block" in Step 30313 can specifically comprise:

configuring field values of the target header fields according to transaction identification of the first transmission transaction in the first transaction information, and obtaining a second message header determined for the first data block;

wherein the second message header comprises the transaction identification.

For the specific implementation of the above steps, see the relevant content in the other embodiments of the present application in the previous text.

In the technical solution provided by the present embodiment, after obtaining the first preset string (used for hiding the address information of the second end) corresponding to the second end in response to the first data block that is sent by the first end and needs to be transmitted to the second end, the address information of the second end can be obtained according to the first preset string, and the first data block is sent to the second end according to the address information of the second end. In the present solution, the preset strings are used to hide the address information of the corresponding ends, so that the data initiating end cannot know the address of the target end, which can protect the address information of the target end; moreover, even if the initiating end is under malicious control, it is impossible to scan or detect other apparatuses in the network, which can effectively prevent malicious attacks.

Further, before executing "generating a first message to be sent according to the first target header information and the first data block" in Step 3032, the method provided in the present embodiment can further comprise the following steps:

S51. obtaining data transmission direction control information from correlation information associated with the second preset string corresponding to the first end;

S52. if the data transmission direction control information is indicative of allowing the control apparatus to forward received data to the second end, then triggering the operation of sending the first data block to the second end according to the address information of the second end;

S53. if the data transmission direction control information is indicative of prohibiting the control apparatus from forwarding the received data to the second end, then according to the data type of the first data stream to which the first data block belongs, triggering the operation of sending the first data block to the second end according to the address information of the second end.

In a specifically implementable technical solution, said "according to the data type of the first data stream to which the first data block belongs, triggering the operation of sending the first data block to the second end according to the address information of the second end" in Step S53 can specifically comprise the following steps:

S531. when the data type is a request type, obtaining preset request parameters from the correlation information, and sending the preset request parameters to the second end according to the address information of the second end;

S532. when the data type is a non-request type, never carrying out a sending treatment.

Further, if the data transmission direction control information is indicative of allowing the control apparatus to forward the received data to the second end, but prohibiting the control apparatus from forwarding the received data sent by the second end, then the method provided in the present embodiment further comprises: when receiving feedback information on the first data block as returned from the second end, never carrying out a treatment of sending the feedback information.

Further, the method provided in the present embodiment can further comprise the following steps:

300*a*: when establishing communication connection with the first end, receiving connection verification information sent by the first end;

300*b*. in response to the connection verification information, feeding a corresponding verification result back to the first end, so that the first end determines whether to establish a communication link with the control apparatus on the basis of the verification result, and sending the first data block through the communication link;

wherein the connection verification information comprises at least one of items as follows: a verification instruction that carries a verification value, and verification data relevant to the apparatus driver of the first control apparatus.

It should be noted that for the content that is not elaborated in the steps of the data transmission method provided in the embodiment of the present application, see the corresponding content in the other embodiments provided in the present application, which will not be repeated herein. Furthermore, in addition to the above steps, the method provided in the embodiment of the present application can also comprise some or all steps in the other embodiments provided in the present application. For details, see the corresponding content of the above embodiments, which will not be repeated herein.

Regarding the data transmission method provided by the present application and described in combination with FIG. 13, supplementary explanations need to be made in several aspects, which are used to enhance the protection and control capabilities of data security at the first end and specifically put as follows.

1) in Terms of Communication Access: Mainly at the Apparatus Driver Level of the Control Apparatus The first data block is one data block in the data stream of the first application on the first end. Furthermore, as shown in FIGS. 6*a* and 6*b*, the existing manner of TCP/IP protocol is not adopted to carry out the communication connection between the first end and the control apparatus in the solution of the present application; instead, the communication is physically realized through hardware connection; for example, USB is used to realize hardware connection between the first end and the control apparatus. Moreover, the apparatus driver of the control apparatus is installed on the first end, and the order of the business logic layer of the first application on the first end is: the first application ↔the operating system of the first end↔the apparatus driver of the control apparatus on the first end↔the hardware structure of the first end (which is a non-TCP/IP protocol hardware interface, such as a USB interface). The hardware interface of the first end is used for connection with a corresponding hardware interface (such as a USB interface) on the control apparatus, and the first end sends data externally through the control apparatus. Moreover, the apparatus driver of the control apparatus on the first end can authenticate the first application to determine whether the function call sent by the first data block is received.

As such, in the above order of the business logic layer, the hardware interface on the first end can hide the first application thereon at the operating system level, so that only the apparatus driver of the control apparatus can directly access the hardware interface on the first end, while applications other than the apparatus driver on the first end cannot directly access the hardware interface (i.e., it can be considered that the hardware interface on the first end is hidden from the applications thereon). In this way, even if a malicious application program is installed on the first end, the malicious application program cannot directly communicate with the outside through the hardware interface thereon to send malicious attack data. Moreover, in the present solution, since non-TCP/IP protocol communication is used at the first end (equivalent to a client) and a network card does not need to be used or is directly disabled (a network card can also be normally used for connection with the network, without affecting other network communication), when the first end is controlled by a malicious application program such as Trojan and virus, the malicious application program does not have a universal interface program that can call TCP/IP protocol (e.g., under the circumstances that the network card is disabled), or cannot be connected to the target apparatus after calling (e.g., under the circumstances that the network cable is not in connection). Furthermore, the hardware interface (for connection with the control apparatus) corresponding to the first end is a non-universal interface program, and cannot be recognized and used by the malicious program since the permissions will be restricted during the call. Even if the malicious program sends data to the control apparatus, the control apparatus will not process the data due to the lack of credentials of an official apparatus driver. Therefore, it is evident that the present solution can prevent the malicious program from sending and receiving data, and attacking other apparatuses. In other words, for the malicious program, the first end is a standalone apparatus that is not connected to the internet, and it cannot conduct communication, send data, or perform remote control.

For example, assuming that the first end (such as a client) communicates with the control apparatus through USB, in the above order of the business layer logic layer of the first application on the first end, the first application must indirectly access the USB interface of the first end through the apparatus driver of the control apparatus on the first end to send data externally. As such, if a certain application A on the first end needs to send data externally, it needs to first access the API (or SDK) interface of the apparatus driver through the operating system of the first end to carry out authentication. For example, if the application authorized to access the same in advance is issued with credential information such as digital certificates or password credentials, and corresponding credential information needs to be attached when the application accesses the apparatus driver, so that the apparatus driver can perform authentication according to the credential information; when the application A passes the authentication by the apparatus driver and it is determined that the function call sent by the data (such as one data block in the data stream of the application A, i.e., the first data block) of the application A can be received, the apparatus driver will directly access the USB interface of the first end and send the data of the application A to the control apparatus through the USB interface of the first end, and the control apparatus will forward the data of the application A to the second end (a server) through the network.

When the application A is malicious application software such as Trojan and virus, firstly, the malicious application software can use a TCP/IP network universal interface program (such as a Socket interface) to carry out network communication, so as to realize malicious operations, such as getting connected to a control end, scanning an apparatus in the network automatically, getting connected to a network apparatus, and sending data; however, since the apparatus driver of the control apparatus is a non-universal interface program, it is naturally impossible to successfully access the apparatus driver to perform malicious operations such as network communication; secondly, even if the application A can access the apparatus driver, the sent data cannot carry valid credentials; at this moment, the application A will not pass the authentication by the apparatus driver, and it is determined that the function call sent by the data of the application A cannot be received, so that the apparatus driver will not further access the hardware interface of the first end to send the data of the application A; thus, in this case, although the first end is controlled by the malicious application A, the malicious attack data initiated by the application A have already been blocked at the stage of reaching the apparatus driver, and cannot reach the USB interface of the first end at all, let alone outflow and further attack other apparatuses.

In summary, it is evident that in the solution of claim 1 of the present application, through the authentication of the application by the first end (specifically, the authentication of the application by the apparatus driver of the control apparatus on the first end), as well as the client authentication (the interface cannot be called, and malicious data cannot be sent) plus the control apparatus authentication (given the distrust of the client, even if the client sends a data block, the data block will not be processed in the case of authentication failure), malicious applications cannot initiate malicious behaviors, such as scanning, detection, or attack, against other apparatuses through the first end. As such, the present solution can enhance the protection and control capabilities of data security.

2) in Terms of Data Transmission: Mainly at the Control Apparatus Level

In spite of the protection and control of data security as described in Item 1), certain factors may still result in sending out the data of the malicious application on the first end. For example, if a counterfeit apparatus driver of the control apparatus is deployed on the first end, due to defects in the authentication function of the counterfeit apparatus driver, there may be a risk that the counterfeit apparatus driver can authenticate malicious applications, thereby calling the hardware interface of the first end to send out the data of the malicious application (or physically, sending malicious data directly to the hardware interface of the control apparatus), i.e., sending the data of the malicious application to the control apparatus, and further causing the control apparatus to forward the data of the malicious application to other apparatuses in the network (the second end) and launching attacks on the other apparatuses.

In response to this, to further enhance the protection and control capabilities of information security, the control apparatus in the solution of the present application does not trust the data sent by the first end (or the hardware interface). Even if the first end sends the first data block to the control apparatus, the control apparatus will still perform further verification on the first data block as received to verify whether the first data block is sent through an official apparatus driver, thereby determining whether the first data block will be sent according to the verification result.

For example, assuming that the control apparatus receives the first data block sent by the first end, the control apparatus can first determine whether the first data block carries valid access credential information (such as a digital signature and a password); if not, it can be directly determined that the first data block is not sent through the official apparatus driver and is malicious data; thus, the first data block can be directly discarded, instead of being forwarded; if yes, the access credential carried by the first data block can be verified to determine whether the carried access credential is issued by an application that is authorized in advance, and further determine whether the first data block is sent through the official apparatus driver according to the verification result, so as to decide whether the first data block will be sent. Specifically, if the access credential carried by the first data block passes the verification, it is determined that the first data block is sent through the official apparatus driver; moreover, the first preset identification corresponding to the second end can be recognized, and the address information of the second end can be obtained; accordingly, the first data block is forwarded to other apparatuses (the second end) in the network according to the address information of the second end; on the contrary, if the access credential carried by the first data block does not pass the verification, it is determined that the first data block is not sent through the official apparatus driver, and is malicious data; alternatively, it is impossible to recognize the first preset identification and obtain the address information of the second end, and the first data block is unknown data; accordingly, the first data block is directly discarded, instead of being forwarded.

The above content of verifying data through the control apparatus is a data security protection solution based on the distrust of the first end (such as a client). In this way, even if the first end sends malicious data to the control apparatus, in the case that the verification of the data fails (is not passed) in the control apparatus, the data will not be forwarded. In other words, malicious data will be blocked from continuing to be sent to other apparatuses at the stage of reaching the control apparatus, and therefore cannot attack the other apparatuses.

Furthermore, in addition to the content described in Items 1) and 2), claim 1 of the present application also retains the point that TCP/IP protocol can continue to be used to realize long-distance data transmission and reduce remote communication costs. The specific implementation is as follows.

Referring to FIG. 6*a* again, when the control apparatus forwards the received data to the second end, the data can still be sent on the basis of TCP/IP protocol, which can reduce remote communication costs and realize long-distance communication. For example, in combination with the content described in Items 1) and 2), the solution provided in the embodiment of the present application is viewed from an overall perspective: the first end (which hides the hardware interface of the first end from the application thereon through the apparatus driver and authenticates the application data), the control apparatus (which is not in communication connection with the first end by using TCP/IP protocol, is in communication connection with the first end by using TCP/IP protocol, and can verify the received data and convert the preset string into the address of the second end), and the second end (which performs long-distance data transmission by using TCP/IP protocol) can effectively solve the problems existing in the use of TCP/IP protocol, continue to leverage the advantages of TCP/IP protocol (such as convenient networking and long-distance transmission) to carry out data transmission, enhance data transmission security, and reduce remote communication costs; moreover, they further effectively overcome the problem that while the usage solution of TCP/IP protocol (and security measures) is abandoned for a long time due to the unreliability thereof (e.g., a standalone computer that is not connected to the network is used, and data transmission can only be performed by offline copying through an optical disk, a USB flash disk, etc.), it is difficult to find an effective alternative usage solution with high security, low costs, and long-distance data transmission needs, and there is a "implementable" technical bias between "not using TCP/IP network" and "low-cost data transmission". To sum up, it is apparent that the present solution has gone beyond people's expectations and produced technical effects that are unexpected and relatively favorable.

Regarding the above supplementary content, some more detailed content (such as some more detailed content about Item 1)) can also be found in the relevant content that appears in the following text.

Based on the above supplementary explanations, in the data transmission method provided by the present application in combination with FIG. 13, the first data block is a data block in the data stream of the first application on the first end, and the order of the business logic layer of the first application is: the first application, the operating system of the first end, the apparatus driver of the control apparatus on the first end, and the hardware interface of the first end; wherein: the hardware interface of the first end is used for communication connection with the hardware interface of the control apparatus, and TCP/IP protocol is not used in the communication connection; the communication connection between the control apparatus and the second end is carried out by using TCP/IP protocol. Further, the method can further comprise the following steps:

F1. verifying the first data block after the first data block is received to determine whether the first data block is data sent by an official apparatus driver;

F2. if yes, sending the first data block;

F3. if not, skipping sending the first data block.

In an implementable technical solution, said "verifying the first data block after the first data block is received to determine whether the first data block is data sent by an official apparatus driver" in Step F1 can specifically comprise:

determining whether a valid access credential is attached to the first data block;

if yes, determining that the first data block is data sent by the official apparatus driver;

if not, determining that the first data block is not data sent by the official apparatus driver;

wherein the access credential includes at least one of the following items: a digital signature, a password, a key, etc.

On the basis of the system content introduced above in combination with FIGS. 5*d* to 5*e*, a data transmission method is also provided in another embodiment of the present application, and it is applicable to the first end 10 shown in FIG. 5*d*. The preset information that is set in the first end in advance includes the abovementioned configuration file created for the first end 10; further, it can also include the configuration file created for the second end 20. For the specific content that can be included in the configuration files, see the relevant content in the other embodiments in the previous text. Specifically, the data transmission method provided in the present embodiment comprises the following steps:

401. obtaining a first preset string corresponding to the second end when a first data block needs to be transmitted to the second end, wherein the first preset string is used for hiding address information of the second end;

402. generating a first message to be sent on the basis of the first preset string and the first data block;

403. sending the first message to the second end through a control apparatus.

For the specific implementation of obtaining a first preset string in Step 401, see the relevant content in the other embodiments in the previous text.

In a specifically implementable technical solution, said "generating a first message to be sent on the basis of the first preset string and the first data block" in Step 402 comprises:

4021. determining first transaction information of a first transmission transaction corresponding to a first data stream to which the first data block belongs;

4022. determining target header information for the first data block on the basis of the first transaction information and the first preset string;

4023. generating a first message according to the first target header information and the first data block;

wherein the first target header information is used for verifying whether the first message meets requirements.

For the specific implementation of Steps 4021-4023, see the relevant content in the other embodiments in the previous text.

In Step 403, the control apparatus can parse the first preset string from the first message as received, then obtain the address information of the second end according to the first preset string, and further send the first message to the second end according to the address information of the second end.

It should be noted that for the content that is not elaborated in the steps of the data transmission method provided in the embodiment of the present application, see the corresponding content in the other embodiments provided in the present application, which will not be repeated herein. Furthermore, in addition to the above steps, the method provided in the embodiment of the present application can also comprise some or all steps in the other embodiments provided in the present application. For details, see the corresponding content of the above embodiments, which will not be repeated herein.

Regarding all the relevant content of the "preset strings" in the context of the present application, It should be added that the preset strings can be combined in multiple forms. For example, different data ends each have corresponding preset strings; referring to "Request Data" in Example 1 in Instance II as provided below, regarding the transmission transaction of "Request Network Resources", the client has a second preset string in correspondence thereto: 0x81 0xa4 0x35 0xe3, and the server has a first preset string in correspondence thereto: 0x47 0xec 0x47 0xf4; the first preset string is different from the second preset string. For another example, different data ends can have a fixed preset string, e.g., regarding the transmission transaction of "Request Network Resources", the preset strings corresponding to the client and the server both can be a third preset string; referring to Example 11 and Example 21 provided in the previous text for the preset string, both the second preset string corresponding to the client and the first preset string corresponding to the server can be the string "0x0A"; although the first preset string corresponding to the server is the same as the second preset string corresponding to the client, the functions thereof are not the same in practice; the first preset string only functions in the communication between the server and the control apparatus connected thereto, whereas the second preset string only functions in the communication between the client and the control apparatus connected thereto. In the two examples provided above for the preset strings, the preset strings have the function of hiding the address information of the corresponding ends. Under the circumstances that the preset strings directly are the real address information of the corresponding ends, different data ends have corresponding preset strings; referring to FIG. 14, the second preset string corresponding to the client can directly be the string "192.###0.1.2: 12345" that represents the real address information of the client, and the first preset string corresponding to the server can directly be the string "192.###0.1.1: 8000" that represents the real address information of the server.

In combination with all the embodiments relevant to "transmission transaction, preset string, and on the basis of a communication protocol with a certain end" provided in the context of the present application, the supplementary explanations that need to be made herein are as follows: the identical parts in the data transmission control (such as data structuring and verification control) that is realized on the basis of the "transmission transaction" from the perspective of the control module on the first end, the second end, or the intermediate apparatus and the data transmission control that is realized on the basis of "transmission transaction, preset string, and on the basis of a communication protocol with a certain end" from the perspective of the control apparatus actually have equivalent implementation principles (e.g., the data structuring implementation principles are equivalent, and the verification implementation principles are equivalent), and can make reference to each other. In other words, the data transmission control function of the control module on the first end, the second end, or the intermediate apparatus can be equivalent to that of the control apparatus, or they are equivalent to some extent.

As can be learned from all the relevant content of implementing the data transmission through the control apparatus as described in the previous text of the present application, to solve the problems in the existing network communication protocols (TCP/IP protocol), network security protection measures, and security protection software, the solution (see FIG. 6*a*) of the present application is based on a combination of software programs (apparatus drivers and API interfaces installed on data ends (such as the first end and the second end)) and hardware (the control apparatus), starts from the physical interface apparatus access manner, data exchange manner, data structuring manner, and physical special control manner among others of the data ends (the first end and the second end), and aims to enhance the protection and control capabilities of information security. Specifically, the data transmission solution provided in the present application can include the following parts:

The first major section: the network access of the data ends (such as the first end and the second end)

Referring to FIG. 6*a*, direct connection with the existing intermediate network apparatuses (such as twisted pair network cards, fiber optic network cards, WiFi network cards, and 4G wireless network cards) is not used in the solution of the present application. Instead, communication connection with the control apparatus is established in such a manner that the data end is physically in hardware connection with the control apparatus and a corresponding driver software program (the apparatus driver of the control apparatus) is installed in the data end; then, communication is carried out as the control apparatus establishes network connection with the target apparatus (such as another control apparatus or another data end). The employment of the access manner has the following benefits.

1) From the perspective of the data end (such as the first end (a client) or the second end (a server)), the data end can be a standalone apparatus without a network card (a network adapter). In addition, malicious programs such as Trojans and viruses cannot receive control instructions, steal files, or initiate behaviors of scanning, detecting, or attacking other apparatuses in the network after controlling the data end. For example, referring to FIG. 6*a*, after the first end is under malicious control, all the data sent by the first end need to be audited by the first control apparatus and follow preset rules; if the data do not meet requirements, the first control apparatus will neither forward the data sent by the first end, nor process data that follow unknown rules. As such, malicious data that a malicious person controls the first end to send will not be sent in the network. As a result, it is difficult for the malicious person to initiate the behaviors of scanning, detecting, or attacking the other apparatuses in the network through the first end.
2) Remote communication between different control apparatuses can still be connected through the existing network technology to reduce the costs of construction and investment. Referring to FIG. 6*a* again, TCP/IP communication protocol can be used in the communication connection between the first control apparatus 31 and the second control apparatus 32, and the network connection is carried out in a wired or wireless manner, such as traditional twisted pair cables, optical fibers, WiFi, cellular networks (3G, 4G, 5G, etc.), satellite communication, and LoRa.
3) The apparatus driver and corresponding API interfaces on the data side can be restricted by modifying permissions of the operating system, which prevents unauthorized applications from accessing them; alternatively, the hiding technology can be used to prevent malicious programs from discovering the apparatus driver or the API. The specific implementation principle is as follows.

Before introducing the specific implementation principle, a brief introduce is given to some relevant background knowledge.

When an application on a data end (such as a client or a server) is in network communication based on an operating system of the data end, the network access permission of the application is generally unrestricted (in exceptional cases, although the application's access to the network can be restricted through antivirus software, software firewalls, etc., the application can access the network through the network interface after bypassing the restriction), and with normal permissions, any application can access the network. Meanwhile, other programs on the data end can monitor the communication process, e.g., the network card data can be monitored by using Wireshark software (an open-source network protocol analyzer). The specific implementation that the application on the data end accesses the network can comprise the following steps:

Step 1: calling a built-in universal network access API interface file of the operating system, such as Socket.h files in Linux, Windows, and MacOS operating systems;

Step 2: creating a network socket through an API interface function, such as a socket( ) function.

Steps 1-2 as mentioned above and Step 3 as described below are common steps for different data ends such as clients and servers.

Step 3: when the data end serves as a client, establishing connection with the server through the API interface function, e.g., using a connect( ) function (which is used to establish connection with a specified socket) to get connected with a specified IP address and a corresponding port number; when the data end serves as a server, listening on the connection through the API function, e.g., using a bind( ) function to bind with numbers and using a listen( ) function to listen on an accessed client; in the presence of client access, using an accept( ) function to accept a client access request;

Step 4: after the connection is successful, using the API interface function to send or receive communication data of the server or the client, e.g., using a write ( ) or send ( ) function to send data to the server or the client, and using a read( ) or recv( ) function to receive data sent by the server or the client.

The business logic of the above application is as follows: Application↔Operating System↔Network Card Driver↔Network Card↔Network Data.

Based on the background knowledge as introduced above, the business logic designed at the driver layer during the implementation of restrictions on the access permission of the application in the present embodiment is: Application↔Operating System↔Apparatus Driver of Control Apparatus↔Control Apparatus↔Network Data. As the control apparatus of the present application has an apparatus driver (an apparatus driver program) in the operating system, on the one hand, authentication can be performed on other programs that access the API interface of the apparatus driver; for example, an authorized application is issued with a digital certificate or a password credential in advance; when the application accesses the apparatus driver, the credential information needs to be attached thereto, and the apparatus driver or the control apparatus will determine whether to receive the call thereof for the function of sending or receiving data; on the other hand, the permission in the operating system can be set for the apparatus driver of the control apparatus, and applications or users without the permission to call cannot call functions; for example, in the Linux system, the permission of the apparatus driver can be set through the chmod command.

During the implementation of hiding the access interface, the business logic at the hardware access layer will be further refined, and is specifically put as follows: Application↔Operating System↔Apparatus Driver for Control Apparatus↔Connection Hardware Interface of Data End↔Connection Hardware Interface of Control Apparatus↔Control Apparatus↔Network Data. The access interface is hidden at the level of the operating system from the data end (such as clients) and the connection hardware interface of the control apparatus, which prevents applications outside the apparatus driver from directly accessing the hardware interface.

Taking the USB interface protocol and the control apparatuses in connection with the data end (the first end (a client) or the second end (a server)) as an example, on the one hand, when the control apparatus is connected to a data end for the first time (or is subjected to sleep reset since it has not been called for a long time), in response to a standard request (requesting an apparatus descriptor, a configuration descriptor, an interface descriptor, an end descriptor, etc., see FIG. 10) sent by the data end for the first time, the control apparatus first returns a universal descriptor relevant to the CDC (Connected Device Configuration) apparatus type to simulate the control apparatus as a common CDC apparatus type. When the apparatus driver verifies and approves (the verification of the special request as shown in FIG. 10) a special request sent by a CDC apparatus according to the preset UID or PID (data in the returned apparatus descriptor), the control apparatus is disconnected and initiates signals that can be enumerated again. When the client sends a standard request for the second time, the real data of 5 descriptors are returned, and when the verification is passed, the access to the control apparatus is completed. On the other hand, referring to the first aspect relevant to restrictions on the access permission as introduced above, if the data sent by the application does not come with a valid credential, the control apparatus will not return and process the sent data. The above CDC apparatus type is a USB apparatus type specifically designed for use in various kinds of communication apparatuses (telecommunications apparatuses and medium-speed network communication apparatuses) as defined by the USB organization.

It should be added that the above two points can exist independently or co-exist.

4) For the data end (such as a client or a server), there is only one communication target, the control apparatus. The network resources and network targets specifically accessed by the data end are determined by the control apparatus through the preset configuration, and the data end cannot intervene. Since important control codes, memory data, or running logic operates independently in the control apparatus, the data end cannot have all the control permissions of the control apparatus. For example, even if a data end is completely controlled by a malicious program, the malicious program cannot gain full control permission of the control apparatus.

5) The relationship between the data end and the control apparatus is that of a host and a slave. The data end is in the host mode, and the control apparatus is in the slave mode. The control apparatus cannot respond without a request actively initiated by the data end, so as to avoid stealing data from the data end as the host when the control apparatus is maliciously controlled.

6) The control apparatus can be a firmware program without an operating system. Theoretically, it cannot be infected with viruses or implanted with trojans to get controlled.

A firmware program is a program written into an EPROM (erasable programmable read-only memory) or EEPROM (electrically erasable programmable read-only memory), and can be understood as a kind of independent software. Under the circumstances that the control apparatus is a firmware program without an operating system, the above-mentioned "first control module 11", "second control module 12", "third control module", "fourth control module", or the like can be understood as the control apparatus.

Specific Implementation Principles or Steps:

1. The Communication Interface and Communication Connection Between the Data End (Such as a Client or a Server) and the Control Apparatus Taking the USB interface and USB protocol as an example, the data end is connected to the control apparatus through a USB data cable (in the case of on-site or near-end access). Wherein, under the USB communication protocol, the data end is in the host mode and the control apparatus is in the slave mode. The control apparatus enables isochronous transmission, interrupt transmission, or batch transmission of one or more control transmission endpoints and one or more IN or OUT endpoints thereon, which is used to accomplish enumeration between the data end and the control apparatus (control the communication handshake of transmission endpoints), and perform data interaction (input and output of IN or OUT endpoints). For the specific implementation of accomplishing the enumeration, see the content relevant to FIG. 10 in the previous text.

2. Data Exchange Between the Data End and the Control Apparatus

From the perspective of the data end, taking the USB protocol as an example:

when a data end needs to send data, it can send OUT token packets, data interaction instructions, and data packets to an OUT endpoint (an output endpoint) of a control apparatus connected thereto;

when a data end receives data, it can send IN token packets to an IN endpoint (an input endpoint) of the control apparatus connected thereto. When the IN endpoint has data, it receives data packets.

It should be added that in one control apparatus, there can be multiple groups of IN/OUT endpoints for high-speed data transmission; for example, there are 5 groups, including 5 IN endpoints and 5 OUT endpoints; alternatively, the number thereof can be asymmetric, such as 3 IN endpoints and 7 OUT endpoints; moreover, there can be IN endpoints alone or OUT endpoints alone for unidirectional data transmission. Which endpoint the data end specifically sends token packets and data interaction instructions among others to can be determined according to the endpoint of the control apparatus bound to the preset string corresponding to the data end.

3. Data Exchange Between a Control Apparatus Connected to a Data End and a Target Apparatus (Such as Another Control Apparatus or Another Data End)

The control apparatus is connected to another control apparatus or another data end (such as servers) through a network interface such as TCP/IP according to the preset configuration (e.g., network configuration: target IP, target port, such electronic credential as access account and access password). In the case of network connection between control apparatuses, between a control apparatus and a server, or between a control apparatus and a client, through the TCP/IP protocol, the deployment cost can be reduced, and the communication distance problem of the USB protocol can also be solved (in the case of far-end access or remote access).

When a data end, such as a client, sends data to an OUT endpoint of a control apparatus connected thereto, the control apparatus forwards the data to a target apparatus (such as a server). When the control apparatus receives the data sent by the server, it places the data in a storage medium (a memory or an external memory) of the control apparatus, and returns the data to the server when the client sends a token packet request through an IN endpoint. In addition, with regard to forwarding data between the server and client herein: firstly, the conversion of raw data does not necessarily occur, and the data can also be processed through encryption, decryption, cropping, addition, or the like; secondly, the data is not necessarily forwarded immediately, but can also be forwarded after manual confirmation or verification through preset scripts, rules, etc.; thirdly, for backup purposes, important data as transmitted can be stored in the control apparatus in case of accidental deletion from the computer host or malicious encryption by ransomware.

The second major section: data interaction between an application on one data end and another application on another data end.

Taking One Data End as a Client and the Other Data End as a Server for Example:

different from the existing TCP/IP transmission protocol and the like, the application communication between the client and the server requires source (IP) address, destination (IP) address, port number, and content data packets (specific data (or data blocks) to be transmitted) in the transmission process. In the present application, a pre-registered service is allowed to proceed (the "communication identification" (i.e., the preset string involved in the previous text) is preset corresponding to the pre-registered service, which includes the ensuing "transmission transactions"), the service information is synchronized to the control apparatus, and then the control apparatus carries out communication according to the preset configuration of the services. The control apparatus can only have client or server functions (as shown in 5*a*, under the circumstances that the client and the server are connected to different control apparatuses, respectively), or have both client and server functions (as shown in 4*a*, under the circumstances that the client and the server are connected to the same control apparatus).

Figure 14:
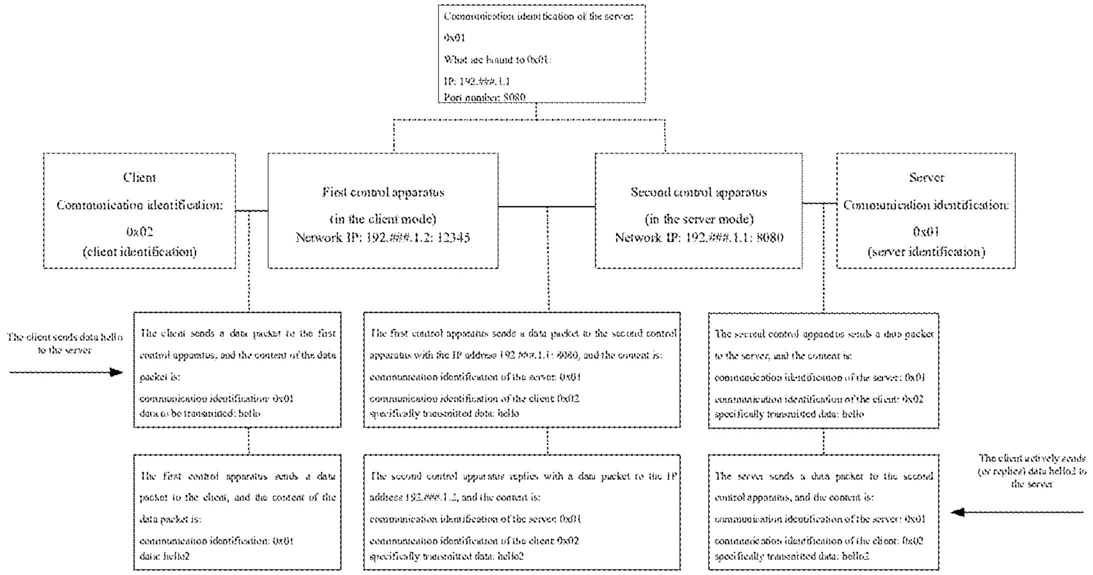
FIG. 14 is a structure diagram of a data transmission system provided in another embodiment of the present application.

For example, referring to FIG. 14, assuming that a service provider has pre-registered Service B (such as a network resource provision service) on the server, wherein Service B is directed to a second control apparatus with a network address of 192.###0.1.1 and a port number 8080, Service B authorizes the access of the first control apparatus, and communication identification 0x01 (which is bound to the address information (192.###0.1.1: 8080) of the server) is preset corresponding to Service B, then:

1. the client sends data; the application on the client only needs to send the communication identification 0x01 corresponding to Service B and the data hello to be sent to the first control apparatus; the first control apparatus recognizes and parses the communication identification 0x01 to end up with the network target address (192.###0.1.1: 8080) and the communication identification 0x02 corresponding to the client; then, the data packet that comprises the communication identification 0x01, the communication identification 0x02, and the data hello is sent to the network target address (which is directed to the second control apparatus connected to the server);
2. after receiving the data sent by the first control apparatus, the second control apparatus waits for the server to read; when the server reads the second control apparatus 22, the data is sent to the server;
3. after processing the received data, the server returns data to the client according to the steps in Items 1 and 2.

There are several benefits as follows in carrying out the data transmission through the above communication identification (i.e., the preset string involved in the previous text).

1) The sender cannot obtain the address of the destination (the receiver).

In the communication process, only the communication identification corresponding to the receiver and the data to be sent are available to the sender. In this way:

firstly, the sender does not know the address of the destination, which protects the address information of the destination;

secondly, the sender can only submit data according to the communication identification corresponding to the destination; the communication identifier can be a random string in multiple bytes (such as a complex random number in 32 bits, 128 bytes, or the like, which is different from the regularity of IP addresses); thus, the sender cannot scan or detect other services on the network, guess the number of network apparatuses, or analyze the network apparatuses.

2) All network services on the network can be managed.

Since services are first registered and then authorized according to the control apparatus, the user role, or the like, the activation and authorization of all the services can be effectively managed. The control apparatus can only have client functions, thereby preventing ordinary clients from enabling service functions and avoiding security risks caused by unauthorized activation of network services. For example, ordinary users with client functions alone unauthorizedly establish FTP, file sharing network services, etc.

3) The transmission direction of data can be controlled.

Network communication is featured with bidirectional transmission, i.e., a network client can receive data packets from a network server, and can also send data packets to the network server; it is the same case with the network server. In some special scenarios, there is no need for bidirectional transmission of data, and only unidirectional transmission of data is required to prevent data leakage. By arranging functions corresponding to the identification, the communication identification can be arranged to only uplink (receive) communication data or only downlink (send) communication data, and the control apparatus only processes data packets that are only uplinked or only downlinked, thereby realizing unidirectional transmission of data.

For the information on how to control the direction of data transmission through the communication identification, see the content relevant to the "data transmission direction control information" as described in the other embodiments in the previous text.

The Specific Implementation Principles or Steps are Put as Follows:

Step 1: creating configuration files (creating configuration files for users with administrative privileges)

Firstly, a configuration file of a data end (such as a client) is generated. The configuration file includes, but is not limited to, the following configuration information: the name of the client (the same client hardware can have different names corresponding to different services), the communication identification corresponding to the client (the same client hardware can have different communication identifications corresponding to different services), the IP of the client allowed to access, the bound control apparatus hardware feature identifier, and what is automatically generated corresponding to the client IP: ① the access port range (the port number during the access of the client, such as 10000 to 10010; specific ports not corresponding to IP are restricted from accessing the server to improve the security; in the case of short connection, multiple client ports are used for data concurrency to increase the concurrency count); ② the communication identification number (the client identification, which is a randomly generated 128-byte random number); ③ electronic credentials such as the account and password for accessing the server, client digital certificates, etc.

Secondly, a configuration file of another data end (such as a server) is generated. The configuration file includes, but is not limited to, the following configuration information: the name of the server, the communication identification (which can be a randomly generated complex random number in 32 bits, 128 bytes, or the like, and can also be a single character) corresponding to the server, the bound control apparatus hardware feature identifier, the IP, port, digital certificate of the server, etc.; electronic credentials such as the IP, account, and password corresponding to the client, the access port range, the client communication identification number, etc.; connection manner: long connection or short connection.

Step 2: distributing the configuration files to a corresponding control apparatus Step 3: the control apparatus synchronizes some parameters of the configuration files to the data ends connected (such as a client or a server) thereto For the specific introduction to the content information that can be specifically included in the configuration files as created above and the distribution of the configuration files, see the relevant content in the other embodiments in the previous text.

Step 4: an application on one data end sends or receives data to or from the corresponding control apparatus.

The application can obtain a registered service list (service name, service identification (i.e., the communication identification configured for the service), etc.) by calling an API interface (which is the API interface of the apparatus driver) for obtain a service list, which interface is installed on the data end;

Further, when the application needs to send data, it can call an API interface for sending data (API parameters include the communication identifier corresponding to the destination and the data to be sent) to send the data to a corresponding control apparatus. The underlying principle (logic) of sending data is to send data to particular OUT endpoints of a corresponding control apparatus. For example, the sent data can include OUT token packets, as well as data packets including communication identifiers and data to be sent.

When an application needs to receive data, it can call an API interface for receiving data (API parameters include communication identifiers of the destination (a server or a client) and data packets of query parameters), and return data in the presence of data in the control apparatus connected to the data end where the application is located. The underlying principle (logic) of receiving data include the two following ways:

Way 1: the data end where the application is located directly and cyclically sends IN token packets to particular IN endpoints of the control apparatus connected thereto to perform inquiry, and returns the data packet in the presence of data in the control apparatus;

Way 2: the data end where the application is located first sends OUT token packets and data packets to particular OUT endpoints of the control apparatus connected thereto (the data packet includes interactive instructions with inquiry or request functions), then cyclically initiates IN token packets to particular IN endpoints of the control apparatus connected thereto to perform inquiry, and returns the data packets in the presence of data in the control apparatus.

Step 5: the control apparatus verifies the data sent by a host of the data end connected thereto.

When a Computer is Connected to the Control Apparatus:

firstly, the data sent by the control apparatus to the data end connected thereto can be verified through access credentials (such as digital signatures) to ensure that they are real data sent by an official driver program;

secondly, whether the communication identifier as sent exists is verified; if yes, a configuration file is matched, and the data is forwarded to a target apparatus according to the configuration file.

Step 6: if one data end is connected to a first control apparatus and the other data end is connected to a second control apparatus, after one data end sends a data packet (including the communication identification corresponding to the other data end and data to be sent) that need to be sent to the other data end to the first control apparatus, the first control apparatus first sends the data packet to the second control apparatus; specifically, the first control apparatus sends the data packet to the IP address and port of the second control apparatus according to the received communication identifier; after receiving the data packet, the second control apparatus can perform data verification according to the preset rules (such as source IP, source port, user, credentials, and digital certificates) in the preset configuration file, and waits for the computer to obtain the data when the verification is passed.

The Third Major Section: Communication Data Structuring in Data Transmission and Exchange The existing transmission protocols such as TCP/IP do not standardize the transmitted data content. Different applications have different communication data structures (or different communication protocols). The communication data structures (or communication protocols) needs to be analyzed one by one to implement protection measures, which results in high costs of the data security protection and difficulty in effective protection. For example:

firstly, when a user (or an application) transmits files through a corresponding data end, it is difficult to detect and intercept executable files (such as .exe executable programs with viruses or trojans) that have been transmitted at the network transmission level in the absence of a standard protocol; in this case, the interception can be carried out only by installing antivirus software on the corresponding data end; however, under the action of the anti-kill technology, the antivirus software may fail to detect and kill them; moreover, it is difficult for an operating system on the data end to restrict the transmission of the executable files, and in most cases of using the data end, there is no need to receive executable program files through network transmission;

secondly, it is difficult to effectively record different operation logs and different communication logs of different applications; the reason is that communication data packets have different structures (protocols) in programs developed by different application vendors, and are generally difficult to fully parse and analyze, and the analysis process generally can rely on the vendor alone; in addition, the analysis can only be carried out after the event (after an incident occurs), which makes it difficult for an administrator or a user to detect problems in normal times;

thirdly, the existing application firewalls, traffic detection apparatuses, or the like cannot work effectively without analyzing the communication data structures (protocols) of different applications; if the protocol of the application is updated (or a new Trojan virus program appears, or the traffic is encrypted), the firewalls may fail not perform effective detection.

As such, the present application imposes data structuring limitations on the communication data, so that only data that meets particular structuring rules will be exchanged in the control apparatus. Therefore, when initiating data transmission, the application needs to call a specified API (or SDK) interface, and only after the API (or driver grogram, or control apparatus, or SDK) structures the data can the transmission be carried out. Through the structured communication data, the control apparatus, or the computer driver program (or API, or SDK), the data transmission intention of the upper layer application can be recognized, so as to achieve measures such as security control and log audit.

In some embodiments of the present application, the "transmission transaction" is used to structure the data to be transmitted. For the specific implementation, see the content relevant to the "target header information" as described in the other embodiments in the previous text. It should be noted that the data structuring can also be implemented in other manners. For example, the data to be transmitted (data blocks in the data stream) can be structured simply on the basis of relevant information of the data stream. Wherein the relevant information of the data stream includes the total number of the data blocks in the data stream, the type of the data stream, the application corresponding to the data stream, the block number of the data block, etc. In the present application, limitations are not imposed upon the manner of structuring data. Preferably, the "transmission transaction" is used to realize the data structuring.

In the present application, the "transmission transaction" is used to structure the data to be transmitted, and in doing so, there are several benefits as follows.

1) The behavior of data transmission is made transparent. Regarding traditional logs (which only record IP, port, URL, and packet size, in general), a large amount of work needs to be carried out to parse communication traffic of different applications, and more often than not, the parsing work can only be completed by system developers. However, in the process of network transmission utilized by the application, the structuring method of the present application can bring transparency to the network traffic through specific operations:

firstly, the control apparatus can concretely record specific operational behaviors of the application, such as specific behaviors (such as file transmission and login operation) of transmission and parameters (such as file name, file type) of specific behaviors;

secondly, the structuring process is developed by an application developer according to specifications of API (or SDK), and the developer generally does not need to participate in the subsequent log audit;

thirdly, the control apparatus can block unauthorized operations; for example, as an ordinary data end does not require an operation of transmitting executable files (such as .exe programs), the operation can be prohibited;

fourthly, the control apparatus does not forward unknown operations (non-registered transmission transactions) or data not in conformity with structuring to prevent malicious programs or other unknown applications from accessing the network or computer.

2) The current network transmission behaviors can be displayed. The control apparatus can display behaviors of the current network transmission traffic to carry out detection. For example, detection apparatuses such as traditional firewalls can only monitor the size of the current transmission traffic, whereas the control apparatus can detect what specific behavior the transmission traffic is performing, e.g., it is transmitting a file named test.mp4.

3) The transmitted data can be preprocessed.

Firstly, manual intervention and control can be carried out. For example, when the transmitted data are an executable program file (such as a .exe program), transmission instructions are not executed automatically, but manual intervention is required. After confirmation in the control apparatus, data transmission can be carried out to prevent the spread of viruses and Trojans or the data leakage of sensitive files.

Secondly, important files can be backed up. For example, when a file is marked as “important” (such as financial statements .xls) in the data structure, the file should be saved and backed up to the control apparatus in the process of transmission to prevent accidental deletion from the data end or encryption by ransomware.

Thirdly, abnormal control can be implemented. For example, if 10 files are transmitted in a short period of time, it is considered that there is an abnormal behavior, and operations such as blocking the transmission, issuing a warning, or making manual confirmation can be taken to prevent malicious programs or operations from stealing data.

4) It is not necessary to decrypt the traffic content. In the case of encrypting the traffic (such as https), application-level firewalls generally cannot function properly, and private keys need to be used for traffic decryption. After structuring, the traffic corresponds to specific API operations on the application, and the operational range thereof is generally limited. Therefore, as long as the data conform to the structuring, there is no need to decrypt the data transmitted from the program. Likewise, as long as the data conform to the structuring, the function of the traffic (transmitted data) can be made clear, thus the specific content of the traffic does not need to be decrypted.

Figure 6C:
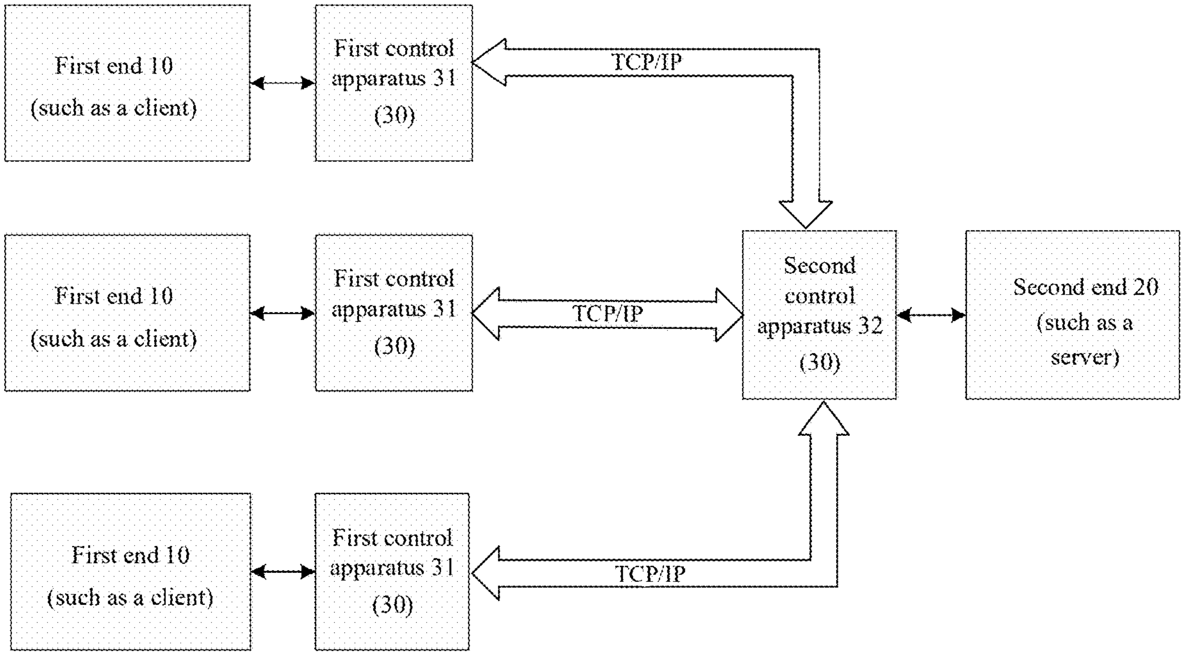
FIG. 6*c* shows an example where one control apparatus can be connected to multiple other control apparatuses as provided in the embodiments of the present application.

It should be added that in the present application, one control apparatus can be connected to multiple data ends, or one control apparatus can be connected to multiple other control apparatuses (as shown in FIG. 6*c*).

In combination with FIG. 5*c* and FIG. 5*d*, taking the first end 10 as a client and the second end 20 as a server for example, several instances are specifically listed to elaborate the technical solution provided in the present application Instance I Step 1. Pre-Configuration Stage: The Control Apparatus is Configured in Advance.

Taking the preset configuration of the first control apparatus as an example, after the first control apparatus is started, it reads the configuration information that needs to be used to establish communication connection with the client. The configuration information can include, but is not limited to, the following content:

① apparatus characteristics of the control apparatus, such as apparatus name, manufacturer ID, and apparatus ID;

② account, password (credential), connection verification information among others that need to be used to establish communication connection;

③ data transmission exchange configuration information, such as relevant public and private keys, and transmission transaction set;

④ descriptor set relevant to the control apparatus, wherein the descriptor set can include, but is not limited to, the following content: apparatus descriptor (such as manufacturer ID, product ID, and apparatus ID); configuration descriptor (such as number of interfaces and current requirements); interface descriptor (which specifies communication protocols, etc.); endpoint descriptors (the configuration information of IN and OUT endpoints, including endpoint number, endpoint type, etc.); string descriptor (such as displayed manufacturer name, apparatus name, and product name).

⑤ data transmission security control information, such as communication identification configuration of both communication parties (such as the second preset string set corresponding to the client, the first preset string set corresponding to the server, and the information (such as corresponding IPs and ports) bound to (or associated with) the preset strings as described in the previous text), prohibited or permitted transmission transactions, and data streams.

For the specific introduction to the above configuration information, see the relevant content described in combination with FIG. 9 in the previous text.

Two points need to be further clarified herein.

1) The implementation of the above preset configuration can be offline configuration (e.g., by using a distributor) or online configuration (e.g., by getting connected to a configuration server and issuing corresponding configuration information to the control apparatus).

2) The above four descriptors (the apparatus descriptor, the configuration descriptor, the interface descriptor, and the endpoint descriptor) are universal standard descriptors in the case of using the USB protocol, and can also be unnecessary. The universal standard serves to enable normal access when a USB apparatus (such as a control apparatus) is inserted into any data end (such as a client or a server) without installing a driver; examples of the USB apparatus include U disks, mice, and keyboards. To hide the control apparatus on the data end, it is also feasible not to follow the data structure of the above four descriptors. Since the descriptors only serve to be read and recognized by the data end (the descriptors are equivalent to configuration files for connection between the data end and the control apparatus on) and function when the data end loads the apparatus driver of a corresponding control apparatus and sends or receives data to or from endpoints of a specified control apparatus, the descriptors have little significance for the control apparatus itself. Since the apparatus driver of the control apparatus needs to be installed in the data end in the present application, the descriptors can be fully customized, or only the most basic ones, the apparatus descriptor and the string descriptor, are available (the minimum level that can be recognized by an operating system), while the other information used for connection of the data end can be synchronized to the data end in advance in other manners. When the control apparatus accesses an unknown computer, the security protection and the hiding function can be performed, so as to reduce the security risk of reverse cracking.

Step 2: Stage of Establishing Communication Connection Between the Data End and the Control Apparatus The communication connection between the data end and the control apparatus can be wired connection, wireless connection, independent expansion card connection based on a motherboard, or integrated connection based on a chip. The wired connection can be made by using USB protocol cables, network twisted pair cables, fiber optic cables, etc. The wireless connection can be made through Bluetooth, WiFi, etc. The connection based on the motherboard can be made through an expansion card apparatus with a PCIE interface, an apparatus with a SATA interface, etc. The manner of integration based on the chip can include SPI interfaces, SDIO interfaces, etc.

Power supply to the control apparatus: a corresponding data end can supply power to the control apparatus; alternatively, an independent power source can also be provided for the control apparatus.

Enablement of the control apparatus: after the control apparatus is powered on, it enables control of transmission endpoints, IN endpoints, or OUT endpoints according to the preset configuration information as read. Wherein there can be multiple groups of IN endpoints or OUT endpoints, or there can be IN endpoints alone or OUT endpoints alone. The endpoints include control transmission, interrupt transmission, batch transmission, isochronous transmission, ultra-high-speed control transmission, ultra-high-speed interrupt transmission, ultra-high-speed batch transmission, and ultra-high-speed isochronous transmission.

The data end starts enumeration to establish communication connection with a corresponding control apparatus. Specifically, after the data end and the control apparatus are powered on, the data end gets connected to the control apparatus and completes the handshake protocol (completes the enumeration). For example, referring to FIG. 5*c*, taking the establishment of communication connection between the client and the first control apparatus and the employment of the USB protocol between the client and the first control apparatus as an example, the specific enumeration process can comprise the following steps.

① The client loads the preset configuration information that is required for connection. For example, searching for characteristic values (such as manufacturer ID, product ID, apparatus ID, and string) of the first control apparatus is loaded; logging in to the account and password (credential) among others of the first control apparatus is loaded; public and private keys relevant to data exchange is loaded. It should be noted that the configuration information can be distributed by a "distributor" (a configuration distributor), and it can also be synchronized by the first control apparatus.

② The client sends interactive instructions to the first control apparatus that matches the characteristic values, obtains descriptors of the first control apparatus, such as apparatus descriptors, configuration descriptors, interface descriptors, endpoint descriptors, string descriptors, or custom descriptors (the control apparatus returns the above descriptors), and judges whether descriptor parameters meet preset requirements.

In addition, in the case that an operating system supports full customization (for example, 5 groups of IN and OUT endpoints are preset, and all relate to batch transmission), test data can also be directly sent to particular endpoint number of the control apparatus (an apparatus with characteristic values). For example, test data packets are sent to Endpoint 1 (an OUT endpoint, batch transmission). When the test data packets meet preset requirements, data packets indicative of success are returned to Endpoint 2 (IN endpoint, batch transmission) of the control apparatus.

It should be noted that in the case of full customization, testing can be preceded by the completion of the connection request verification in Step ③, or "obtaining descriptors of the control apparatus" in Step ② is skipped to proceed directly to Step ③, where the testing is carried out.

③ The client sends connection request data (accounts, passwords (credentials), etc.) to the first control apparatus. After the first control apparatus returns preset verification success data (the control apparatus verifies the request data; the return is successful if the verification is passed; the return fails or no data are returned if the verification is not passed), it is judged that the enumeration is successful. It should be noted that when it comes to sending the connection request data, they are also sent to a particular endpoint of the first control apparatus. For example, data packets with accounts and passwords (credentials) are sent to Endpoint 1 (an OUT endpoint, batch transmission), and data packets indicative of success or failure are returned to Endpoint 2 (IN endpoint, batch transmission).

After data packets indicative of success are returned, the client completes the communication connection with the first control apparatus (or completes enumeration), sends a heartbeat packet to a particular endpoint every 1 second to maintain the connection relationship (an optional step), and awaits data transmission (transmission transaction) in the next step.

Based on the above content, when it comes to loading the preset configuration information required for connection on the client, in the case that the first control apparatus performs synchronization, the working logic (which is conventional logic) of establishing communication connection is as follows:

Client→Reading descriptors (configuration)→First control apparatus→Returning descriptors (configuration)→Client—Sending or receiving data (endpoints and the like) according to configured endpoints→First control apparatus When it comes to loading the preset configuration information required for connection on the client, in the case that the distribution is performed by, e.g., a "distributor", the working logic (which is special logic) of establishing communication connection is as follows:

Client and first control apparatus synchronize configuration information in advance→Client sends or receives data (endpoints and the like) according to configured endpoints-→First control apparatus For the specific implementation of establishing communication connection between the data end and the control apparatus, see the content relevant to FIG. 10.

It should be added that data transmission between the data end and the corresponding control apparatus can also be encrypted and decrypted. Considering that in the process of data transmission and exchange between the data end and the corresponding control apparatus, the transmitted data may be intercepted or tampered with midway. For example, in the process of the control apparatus sending data to the corresponding data end, it may be captured or modified by another program in another data end. For another example, in the process of the data end sending data to the corresponding control apparatus, the data may be captured or modified by an intermediate apparatus. To ensure the data transmission security, encryption can be performed in the process of data transmission between the data end and the corresponding control apparatus to prevent packet capture by other software in the data end or on the communication link. In specific implementation, the data end and corresponding control apparatus can encrypt credentials or decrypt credentials with encryption public keys and secret keys (in the case of asymmetric encryption), or with encryption keys (in the case of symmetric encryption), which are all pre-agreed for communication.

For example, when an application on the data end (or, an apparatus driver, an API interface, or the like on the data end) calls the apparatus driver on the data end according to preset rules issued by a corresponding control apparatus to send data to OUT endpoints of the corresponding control apparatus, the apparatus driver can first encrypt data to be sent with an encryption credential (such as a private key), and then send the data; after receiving the data, the corresponding control apparatus decrypts the data (e.g., by using a public key for decryption). An encryption key can also be set in advance for encryption or decryption (the manner of symmetric encryption). Key exchange algorithms can also be used to exchange secret keys in advance (the manner of key exchange), and then encryption or decryption is carried out according to the secret keys (the manner of symmetric encryption). At the same time, regarding data that have incorrect passwords or are decrypted into those that do not comply with preset rules will not be processed by the control apparatus, so as to prevent other programs on the data end from impersonating the apparatus driver of the control apparatus and sending data to the control apparatus.

For another example, before the control apparatus uses IN ends to send data to a corresponding data end (or, an apparatus driver, an API interface, or the like of the data end), the data can be encrypted with encryption credentials, and then sent; after receiving the corresponding data, the apparatus driver thereon decrypts the received data and sends them to the corresponding application.

The above manners of encryption and decryption include, but are not limited to, symmetric encryption (encryption algorithms such as DES and AES), asymmetric encryption (encryption algorithms such as RSA, DSA, and ECDSA), key exchange algorithms (such as DH algorithm and ECDH algorithm), and commercial cryptographic algorithms (encryption algorithms such as SM1, SM2, SM3, SM4, SM7, and SM9).

Step 3: The Data End Sends Data to a Corresponding Control Apparatus Connected Thereto.

When the data end sends data to a corresponding control apparatus connected thereto, it sends data to OUT endpoints under a corresponding interface of the control apparatus. Taking the communication connection between the data end and the corresponding control apparatus by using USB protocol as an example, the data as sent are OUT token packets and data packets. In specific implementation, the data packets as sent can be of two types as follows:

The first type of data packet includes: a structured header (which includes a structured message header (or, plus a data header)) and data content to be transmitted specifically (such as the first data block of the first data stream as mentioned above), wherein the message header includes a preset string (such as the first preset string corresponding to the receiver and the second preset string corresponding to the sender).

The second type of data packet includes: the second preset string corresponding to the sender, the first preset string corresponding to the receiver, and data content to be transmitted specifically (such as the first data block of the first data stream as mentioned above).

Regarding the second type, the data end does not structure the data content to be transmitted specifically (such as the first data block). The structured processing can be performed by the control apparatus connected thereto, and it may not be done. For example, in the case that the preset strings are used for hiding the address information of corresponding ends as described in the other embodiments of the application in the previous text, it may not be performed. The data length (in bytes) of fields included in the data packet can be customized according to actual situations. Table 6 shows the structure format of the first type of data packet (note: the data packet in this case is the message involved in the previous text (such as Message A1 as shown in FIG. 3a-1)).

TABLE 6

| Structure of a transmitted data packet | | |
|---|---|---|
| Structured message header | Second preset string corresponding to the sender | 32 |
| | First preset string corresponding to the receiver | 32 |
| | Transaction attribute identification of a transmission transaction | 32 |
| | Transaction identification of the transmission transaction | 32 |
| | Data packet size | 16 |
| | Total number of blocks | 16 |
| | Current block number | 16 |
| | Annotated information | 16 |
| Data body | Data header (optional) | |
| | Data buffer | |
| | Data content to be transmitted specifically (such as a first data block) | |

In Table 6, the first preset string and the second preset string are communication identification for both the sender and the receiver. When the sender is a client, the first preset string corresponding to the receiver can be referred to as a service identifier, and the second preset string corresponding to the sender can be referred to as a client identifier. When the sender is a server, the second preset string corresponding to the sender can be referred to as a service identifier, and the first preset string corresponding to the receiver can be referred to as a client identifier.

In some embodiments, the preset strings can be complex random strings in 32 bytes, 8 bytes, or the like, and are used for hiding the address information of the corresponding ends. In this case, taking the sender as a client, the receiver as a server, the second preset string corresponding to the client as 0x5c 0x67 0x55 0xb6, and the first preset string corresponding to the receiver as 0x47 0xec 0x47 0xf4 for example, assuming that the client needs to send the string data "hello" to the server, the sending method can include two methods as follows.

Method 1: the client constructs a data packet (a message) that meets predetermined structural rules for the string data "hello", and the data packet includes the following content:

the second preset string corresponding to the client: 0x5c 0x67 0x55 0xb6 the first preset string corresponding to the server: 0x47 0xec 0x47 0xf4 transaction attribute identification: 0x00 0x00 0x00 0x01//"hello" corresponds to the transaction attribute identification of the transmission transaction, and is used for indicating the transaction attribute information of the transmission transaction (which information has been preset; for the content that can be included in the transaction attribute information, see Table 1b)

transaction ID: 0xa2 0xba 0xc6 0xa1/it is the transaction ID of the transmission transaction corresponding to "hello"

data packet size: 0x00 0xC8/it is the total size of the current data block to be transmitted and the structured header, and the data packet size can also be referred to as data packet length total number of blocks: 0x00 0x01/since "hello" is small in data volume, it does not need to be divided into multiple data blocks to carry out transmission, and the total number of blocks is 1 current block number: 0x00 0x01/the block number of the current data block to be transmitted is 1 annotated information: 0x00 0x00/no information needs to be annotated data to be transmitted specifically: 0x68 0x65 0x6c 0x6c 0x6f//it is the unicode binary encode of the string "hello"

When it comes to sending data, as shown in FIG. 5*d*, the client can specifically send an OUT token packet and the data packet to a particular OUT endpoint of the first control apparatus connected thereto. Wherein the particular OUT endpoint is determined by the client according to the correlation information associated with the second preset string (0x5c 0x67 0x55 0xb6). For example, the endpoint number information bound to the second preset string can be obtained according to the correlation information, so as to determine the particular OUT endpoint according to the endpoint number information.

Method 2: for the string data "hello", the client performs pre-structured construction on a data packet that includes the following content:

the second preset string corresponding to the client: 0x5c 0x67 0x55 0xb6 the first preset string corresponding to the server: 0x47 0xec 0x47 0xf4 data to be transmitted specifically: 0x68 0x65 0x6c 0x6c 0x6f//it is the unicode binary encode of the string "hello"

When it comes to sending data, as shown in FIG. 5*c*, the client can specifically send an OUT token packet and the data packet (i.e., the preset string and the data to be transmitted specifically) to a particular OUT endpoint of the first control apparatus connected thereto.

It should be noted that under the circumstances of Method 2, as shown in FIG. 5*d*, after receiving the data sent by the client, the first control apparatus can obtain the address information of the server according to the first preset string obtained from the received data packet, and directly forward the received data packet to the server according to the address information of the server. Alternatively, the received data packets can be further structured to generate a data packet that meets requirements of predetermined structural rules as shown in Method 1, and the generated data packet that meets the requirements of predetermined structural rules is sent to the server. By using the first control apparatus to generate the data packet that meet the predetermined structural requirements, the preset strings can be further encrypted. For example, what is pre-registered (preset) in the apparatus driver of the control apparatus installed on the client can be a string alias set, in which string aliases are aliases of real preset strings, and are used for hiding the real preset strings; accordingly, for the string data "hello" that needs to be sent to the server, what the client obtains by calling the apparatus driver installed therein are real preset string aliases in respective correspondence to the client and the server, as preset strings in respective correspondence to the client and the server. For example, the preset string corresponding to the client is 0x5c 0x67 0x55 0xb5 (the string alias of the real second preset string "0x5c 0x67 0x55 0xb6"), and the preset string corresponding to the server is 0x47 0xec 0x47 0xf3 (the string alias of the real first preset string "0x47 0xec 0x47 0xf4"); afterwards, according to the preset strings in respective correspondence to the client and the server as obtained above ((non-real) string alias of the real preset strings) and the string data "hello" that needs to be transmitted specifically, a data packet to be sent is generated and sent to the first control apparatus; the first control apparatus parses the received data packet; after parsing the non-real preset strings in respective correspondence to the client and the server, it can convert the non-real preset strings as parsed out in respective correspondence to the client and the server into real preset strings, i.e., the second preset string corresponding to the client: 0x5c 0x67 0x55 0xb6, and the first preset string corresponding to the server: 0x47 0xec 0x47 0xf4, according to the correspondence between the real preset strings preset therein and the string aliases, so as to further enhance the data security.

The correspondence between the real preset strings and the string aliases can be obtained according to correlation information associated with the real preset strings. The correlation information includes string alias information of the real preset strings. For the specific description of the string alias information, see the content relevant to Examples 11 to 13 provided in the other embodiments of the present application in the previous text.

Step 4: The Control Apparatus Sends Data to the Target Apparatus

In the same example given in Step 3, referring to FIG. 5*d* (or FIG. 5*c*), after receiving the data packet sent by the client through a first interface thereof (which is an interface connected to the client), the first control apparatus performs verification (or generates a data packet that meets preset structural rules and requirements after verification) on the basis of the preset configuration (such as data transmission security control information); after the verification is passed, the first preset string (0x47 0xec 0x47 0xf4) is queried according to the preset configuration to obtain correlation information associated with the first preset string, and the communication target (target address information) of a second interface thereof is obtained from the correlation information. For example, under the circumstances that the second interface of the first control apparatus relates to TCP/IP communication, the target address information obtained from the association information of the first preset string (0x47 0xec 0x47 0xf4) can be put as follows: the target IP address is 192.###0.1.1, and the port number is 8080. For example, in the scenario of the data transmission system architecture shown in FIG. 5*d* (or FIG. 5*c*), the target address information can point to the second control apparatus connected to the server; alternatively, in the scenario of the data transmission system architecture shown in FIG. 4*b*, the target address information can directly point to the server.

Further, the first control apparatus can send the data packet generated in Method 1 or 2 in Step 3 to the apparatus corresponding to the target address information according to the target address information.

Step 5: The Target Apparatus Receives Data

When receiving a data packet, the target apparatus can decrypt and verify the data packet according to preset configuration. The content verified by the target apparatus can include, but is not limited to: source IP, source port, communication identification (preset strings) of the sender and the receiver, password and credential information (if necessary), data type, etc. The target apparatus verifies whether they meet the preset configuration. When the verification is passed, under the circumstances that the second control apparatus and the server are respectively a host and a slave in the scenario of the data transmission system architecture shown in FIG. 5*d* (or FIG. 5*c*), then the target apparatus is the second control apparatus, which can cache the received data packet locally and wait for the server connected thereto to request data.

It should be noted that when it comes to verifying a data packet in the communication according to the preset configuration, the control apparatus can intercept or release the data packet according to the verification result. For example, if the type of transmitted files as prohibited (or not permitted (a whitelist system)) by the preset configuration is "exe" executable programs, interception will be carried out when the specifically transmitted data included in the data in the communication are a test1.exe file; on the contrary, when the specifically transmitted data included in the data packet in the communication are a test2.txt file, it will be released.

Further, when obtaining data, the server can actively and cyclically initiate retrieval requests (for the initiating manner, see the content relevant to the two manners of receiving data as involved when introducing "the second major section: data exchange" in the previous text) to the second control apparatus, and when there is an adapted data packet on the second control apparatus, return the data packet to the server. The server parses the received data packet to obtain corresponding data. In the same example of the data packet example given in the present Instance, the data as parsed out can include, but is not limited to: the second preset string corresponding to the client: 0x5c 0x67 0x55 0xb6, the first preset string corresponding to the server: 0x47 0xec 0x47 0xf4, data: 0x68 0x65 0x6c 0x6c 0x6f (the unicode binary encode of the string data "hello").

Instance II

Taking the first end as a client, the second end as a server, and the connection between the ends and the corresponding control apparatuses as USB connection for example, Instance Two will be elaborated below in combination with the data transmission system architecture shown in FIG. 5*d*.

Example 1. Requesting Data: the client initiates a request to the server through the first control apparatus connected thereto, e.g., requesting network resources. Specifically, it requests test.jpg data.

1.1 Preparatory Stage 1.1.1 For "Request Network Resources", the transaction attribute information corresponding to the preset transmission transaction of "Request Network Resources" includes the following content shown in Table 7:

TABLE 71

Transaction attribute information for the transmission transaction of "Request Network Resources"

| Transmission transaction attribute | | Specific example value | Notes of specific values |
|---|---|---|---|
| Transaction attribute name | String | Requesting network media resources | For the convenience of reading and recognition |
| Annotated information | String | Client request | Obtaining multimedia format files such as jpg.png.mp3 |
| Associated preset string | 32 | 0x47 0xec 0x47 0xf4 | The bound first preset string corresponding to the server |
| Transaction attribute identification | 32 | 0x36 0xe1 0x31 0xf2 | Unique identification generated randomly upon creation |
| Transaction usage role | 16 | 0x01 | Situations of role usage of the client |
| Transaction attribute type information | 16 | 0x01 | Uploading transmitted data, while the data stream is a regular data stream |
| First-class code | 16 | 0x00 0x00 | Not classified for now, all are 0x00 |
| Second-class code | 16 | 0x00 0x00 | |
| Third-class code | 16 | 0x00 0x00 | |
| Verification information | String | GET | For judging whether the data header of the specifically transmitted data is the string GET |

1.1.2. The configuration (preset configuration information) synchronously preset in the first control apparatus and the client includes the transaction attribute information of the transmission transaction of "requesting network resources".

For the specific implementation of synchronously presetting the configuration, see the relevant content in the other embodiments of the application in the previous text.

1.2. Operations of the Client 1.2.1. A data packet to be transmitted is constructed for data (request parameters corresponding to requesting network resources) that need to be transmitted to the server. Specifically, when an application (such as a browser application) on the client needs to request test.jpg image data from the server, the application on the client calls the apparatus driver of the first control apparatus installed thereon through a corresponding API interface for the data (request parameters corresponding to requesting network resources) to be transmitted to the server, obtains transaction attribute information of the transmission transaction of "requesting network resources", and uses the transaction attribute information of the transmission transaction of "requesting network resources" to generate a corresponding data packet to be transmitted, which meets requirements of preset structural rules. The generated data packet includes the following content as shown in Table 72.

TABLE 72

| Data packet to be transmitted | | | | |
|---|---|---|---|---|
| Structure of the data packet to be transmitted | | | Specific example values | Notes of specific values |
| Structured message header | Second preset string | 32 | 0x81 0xa4 0x35 0xe3 | Preset string corresponding to the client |
| | First preset string | 32 | 0x47 0xec 0x47 0xf4 | Preset string corresponding to the server |
| | Transaction attribute identification | 32 | 0x36 0xe1 0x31 0xf2 | Correspondingly created transaction of uploading JPG files |
| | Transaction identification | 32 | 0x22 0xC2 0x12 0x6A | Unique identification generated for the transmission transaction |
| | Data packet size | 16 | 0x02 0x00 | 152 bytes |
| | Total number of blocks | 16 | 0x00 0x01 | Only one block is transmitted |
| | Current block number | 16 | 0x00 0x01 | First data block |
| | Annotated information | 16 | 0x00 0x00 | Leave blank for now |
| Data body (including a data header and data to be transmitted specifically) | File stream header length | 32 | 0x00 0x80 | Total length |
| | Data stream information | String | Request test.jpg | String binary data of "request test.jpg" |
| | Data stream: GET test.jpg | | | String binary data of "GET test.jpg" |

For the specific implementation of generating the data packet, see the content relevant to generating the message to be transmitted as introduced in the other embodiments of the present application in the previous text.

1.2.2. The Client Sends a Data Packet to the First Control Apparatus Connected Thereto Upon the completion of constructing the data packet to be transmitted by calling the apparatus driver installed thereon through the corresponding API interface, the client can send an OUT token and the generated data packet to a particular OUT endpoint (such as Endpoint 1 of the first control apparatus) of the first control apparatus according to endpoint number information included in the correlation information associated with the second preset string corresponding to the client.

1.3 Operations of the First Control Apparatus 1.3.1 the First Control Apparatus Verifies the Received Data Packet The verified content includes, but is not limited to: whether the preset strings corresponding to the client and the server in the data packet comply with the preset rules, e.g., whether they have been registered (i.e., whether they are included in the preset configuration); whether the endpoint (Endpoint 1) that sends the data packet complies with the preset rules (e.g., whether it is the endpoint bound to the second preset string corresponding to the client, whether it is a permitted endpoint); whether the transaction attribute in the data packet complies with the preset rules, e.g., whether the transaction attribute identification of the transmission transaction, 0x36 0xe1 0x31 0xf2, have been registered (whether the preset configuration includes the transaction attribute identification), whether the first three bytes of the data stream are GET qualified by the transaction attribute, etc.

At the same time, log storage is performed on relevant identification such as the transaction attribute identification, as well as data such as data stream information and the data stream. Only the control apparatus itself is permitted to be written to the log storage area of the first control apparatus. During the access of the client or other audit apparatuses in connection, log data are in a read-only state to ensure that the log data are not deleted or tampered with.

1.3.2 the First Control Apparatus Sends Network Data to the Second Control Apparatus After the received data packet passes the verification, the first control apparatus determines the target address information (the address information corresponding to the server) according to the first preset string corresponding to the client as obtained from the data packet, and sends the data packet to the second control apparatus according to the preset network configuration (e.g., by using the network configuration of TCP/IP protocol).

1.4 Operations of the Second Control Apparatus 1.4.1 The second control apparatus receives network data sent by the second control apparatus, and decodes and verifies the network data.

The verified content includes, but is not limited to: whether the preset strings corresponding to the client and the server in the received data packet comply with the preset rules, e.g., whether they have been registered (i.e. whether they are included in the preset configuration); whether the network address (such as domain name, IP, or port) for sending the data packet complies with the preset rules of the first preset string (e.g., whether it is an endpoint bound to the second preset string corresponding to the client, whether it is a permitted endpoint); whether the transaction attribute of the transmission transaction in the data packet complies with the preset rules, e.g., whether the transaction attribute identification of the transmission transaction, 0x36 0xe1 0x31 0xf2, has been registered (whether the preset configuration includes the transaction attribute identification), whether the first three bytes of the data stream are GET defined by the transaction attribute, etc.

At the same time, log storage is performed on relevant identifiers such as the transaction attribute identification, as well as data such as data stream information and the data stream. Only the control apparatus itself is permitted to be written to the log storage area of the control apparatus. During the access of the client or other audit apparatuses in connection, log data are in a read-only state to ensure that the log data are not deleted or tampered with.

1.4.2 Caching of the Data Packet

After the received data packet passes the verification, the first control apparatus caches the data packet locally and awaits a request for the data packet from the server in connection.

Upon the request of the server, verification is performed on whether the requested port meets predetermined requirements, etc. If yes, the data packet is sent to the server.

1.5. Operations of the server: the data is read through the corresponding API interface.

After receiving the data packet, the server performs verification according to the preset configuration. The verified content mainly includes, but is not limited to: whether the transaction attribute of the transmission transaction in the data packet complies with the preset rules, e.g., whether the transaction attribute identification 0x36 0xe1 0x31 0xf2 has been registered, whether the first three bytes of the data stream are GET qualified by the transaction attribute, etc. After the verification is passed, the operation content of the data stream "GET test.jpg" is parsed to feed back corresponding data in response to the request of the client, i.e., enter the procedures in Example 2 as given below.

Example 2: data reply: the server replies data to the client through the second control apparatus; specifically, it replies test.jpg file data.

2.1 Preparatory Stage 2.1.1. The server needs to send "test.jpg file data" to the client, and the corresponding transmission transaction can be the preset transmission transaction of "uploading jpg files". The transaction attribute information of the transmission transaction includes the following content as shown in Table 73.

tion service on the client for example, the second preset string (which can also be called service identification or communication identification) corresponding to the client preset for the file interaction service can be: 0x47 0xec 0x47 0xf4.

The transaction attribute identification is unique identification (such as ID value) of the transaction attribute information of the transmission transaction, and is generally a random string. For example, the transaction attribute identification generated for the transmission transaction attribute of the transmission transaction of "uploading jpg files" is 0x36 0xe1 0x31 0xf1;

The transaction attribute usage role refers to the corresponding end role that uses the transaction attribute role, such as the server or the client; alternatively, the more specific role of the client can be a regular member or a premium member of the client, for example. As mentioned above, 0x00 represents the situations of the role usage of the server.

The transaction attribute type is the basic operation type of the transmission transaction. For example, the control transmission transaction is generally relevant to the operation of the application system, e.g., initiating network tests and initiating heartbeat packets; the download transmission transaction includes reading network data resources, etc.; the upload transmission transaction includes sending network data, etc.; the type of the data stream includes a regular data stream or a file data stream, etc. As mentioned above, 0x00 represents uploading transmitted data, and the data stream is a file data stream.

Block coding (a dictionary) relates to first-class codes, second-class codes, and third-class codes, and is used for configuring data transmission operations and the like in different scenarios. As classification is not carried out, all are 0x00.

TABLE 73

Transmission transaction attribute information of the transmission transaction of "uploading jpg files"

| Transmission transaction attribute | | Specific example value | Notes of specific values |
|---|---|---|---|
| Transaction attribute name | String | Uploading jpg files | Displayed name of the transaction |
| Annotated information | String | Uploading files in jpg format | Displayed remarks information of the transaction |
| Associated preset string | 32 | 0x47 0xec 0x47 0xf4 | The bound second preset string corresponding to the client |
| Transaction attribute identification | 32 | 0x36 0xe1 0x31 0xf1 | Transaction identification generated for the established transaction attribute |
| Transaction usage role | 16 | 0x00 | Situations of role usage of the server |
| Transaction attribute type | 16 | 0x00 | Uploading transmitted data, while the data stream is a file data stream |
| First-class code | 16 | 0x00 0x00 | Not classified for now, all are 0x00 |
| Second-class code | 16 | 0x00 0x00 | |
| Third-class code | 16 | 0x00 0x00 | |
| Verification information | String | 0xFF 0xD8 0xFF 0xE0 | For judging whether the data of the message header is 0xFF 0xD8 0xFF 0xE0 |

In Table 73, the transaction attribute name is a displayed string of the attribute name of the transmission transaction, such as "uploading jpg files".

The annotated information is a string of transaction attribute remarks of the transmission transaction. It is annotated as "uploading files in jpg format".

The associated preset string is the second preset string corresponding to the client associated with the transmission transaction. Transactions are specific operations based on services. For example, taking the pre-registered file interac- The verification information of the specific data packet as transmitted (such as regular expressions, data, or file header formats) is used for verifying whether the data format or some data content of the specific data packet meets the requirements of the transmission transaction. For example, when the transmission transaction is sending a file with a file header in jpg format (image), it is determined whether the first four bytes of the file content data are 0xFF 0xD8 0xFF 0xE0, so as to prevent files in non-JPG format (such as exe executable files) from impersonation. When they are set to 0xFF 0xD8 0xFF 0xE0, it is judged that the data of the file header are 0xFF 0xD8 0xFF 0xE0.

For details about the above content, see the relevant content in the other embodiments in the previous text.

It should be noted that the file stream transmission transaction can be of a particular file type (qualified in JPG format), as shown in the above example; it can also be of a generic type, rather than confined to a particular file type; without limitation to a particular file type, restrictions can be preset at the control apparatus, such as restriction that files in the file type of exe is not permitted to be uploaded or downloaded.

2.1.2. The configuration (preset configuration information) synchronously preset in the second control apparatus and the server includes the transaction attribute information of the transmission transaction of "uploading jpg files".

For the specific implementation of synchronously presetting the configuration, see the relevant content in the other embodiments of the application in the previous text.

2.2. Operations of the Server 2.2.1. For the data that needs to be transmitted to the client (uploading test.jpg file data), a data package to be transmitted is constructed. Specifically, taking the client's request for JPG images in Example 1 for example, the server reads the adapted JPG image data in response to the client's request, and obtains the transaction attribute information of the transmission transaction of "uploading jpg files" as shown above by calling the apparatus driver of the second control apparatus installed thereon through a corresponding API interface, and uses the transaction attribute information of the transmission transaction of "uploading jpg files" to generate a corresponding data packet to be transmitted, which meets the requirements of the preset structural rules.

Assuming that the read jpg image data are of 1024 bytes, since the data is relatively large, the read jpg image data need to be divided into blocks. In the case of the arrangement that each block is of 512 bytes, the read jpg image data need to be divided into two blocks to carry out transmission. For the two divided data blocks, the transaction attribute information of the transmission transaction of "uploading jpg files" is used to generate corresponding data packets that meet the requirements of the preset structural rules, respectively. The two generated data packets are shown as below in Table 74 and Table 75.

TABLE 74 the first data packet to be transmitted as generated (referred to as Data Packet 1)

| Structure of transmission packet | | | Specific example values | Notes of specific values |
|---|---|---|---|---|
| Structured message header | Second preset string | 32 | 0x47 0xec 0x47 0xf4 | A preset string corresponding to the client |
| | First preset string | 32 | 0x81 0xa4 0x35 0xe3 | A preset string corresponding to the server |
| | Transaction attribute identification | 32 | 0x36 0xe1 0x31 0xf1 | Correspondingly created transaction attribute of uploading JPG files |
| | Transaction identification | 32 | 0x22 0xC2 0x12 0x6A | Transaction identification generated for the transmission transaction |
| | Data packet size | 16 | 0x02 0x00 | 512 bytes |
| | Total number of blocks | 16 | 0x00 0x02 | Divided into two blocks of data for transmission |
| | Current block number | 16 | 0x00 0x01 | The first block of data |
| | Annotated information | String | 8b1a9953c4611296a8 27abf8c47804d7 | Hash value for data integrity verification of test files, used for verification and audit |
| Data body (including a data header and specific data that needs to be transmitted) | File stream header length | 32 | 0x00 0xA4 | Total length |
| | File size | 32 | 0x04 0x00 | test.jpg in size of 1024 bytes |
| | Sender information | 32 | 0x47 0xec 0x47 0xf4 | One client identifier |
| | Send time | 32 | 0x63 0x14 0xBF 0xE3 | Time stamp: 1662304227 |
| | File attribute | 16 | 0x00 0x00 | Attribute of tagged files |
| | Extension name | 16 | jpg | File suffix |
| | File name | String | test | Filename |
| | test.jpg file data (0th byte to 511st byte) | | | Specific file data (divided according to the size of individual blocks) |

TABLE 75 the second data packet to be transmitted as generated (referred to as Data Packet 2)

| Structure of transmission packet | | | Specific example values | Notes of specific values |
|---|---|---|---|---|
| Structured message header | Second preset string | 32 | 0x47 0xec 0x47 0xf4 | The sender is a server |
| | First preset string | 32 | 0x81 0xa4 0x35 0xe3 | The receiver is a client |
| | Transaction attribute identification | 32 | 0x36 0xe1 0x31 0xf1 | Correspondingly created transaction attribute of uploading JPG files |
| | Transaction identification | 32 | 0x22 0xC2 0x12 0x6A | Transaction identification of the first block |
| | Data packet size | 16 | 0x02 0x00 | 512 bytes |
| | Total number of blocks | 16 | 0x00 0x02 | Divided into two blocks for transmission |
| | Current block number | 16 | 0x00 0x02 | The second block of data |
| | Annotated information | String | 8b1a9953c4611296a8 27abf8c47804d7 | Hash value for data integrity verification of test files, used for verification and audit |
| Data body (including data that needs to be transmitted) | test.jpg file data (512nd byte to 1023rd byte) | | | Specific file data (divided according to the size of individual blocks) |

2.2.2 The server sends a data packet to the second control apparatus connected thereto.

Upon the completion of constructing the data packet to be transmitted by calling the apparatus driver installed thereon through the corresponding API interface, the server can send an OUT token and the generated data packet to a particular OUT endpoint (such as Endpoint 1' of the second control apparatus) of the second control apparatus according to endpoint number information included in the correlation information associated with the first preset string corresponding to the server.

2.3 Operations of the Second Control Apparatus 2.3.1 the Second Control Apparatus Verifies the Received Data Packet The verified content includes, but is not limited to: whether the preset strings corresponding to the client and the server in the data packet comply with the preset rules, e.g., whether they have been registered (i.e., whether they are included in the preset configuration); whether the endpoint (Endpoint 1) that sends the data packet complies with the preset rules (e.g., whether it is the endpoint bound to the first preset string corresponding to the server, whether it is a permitted endpoint); whether the transaction attribute in the data packet complies with the preset rules, e.g., whether the transaction attribute identification of the transmission transaction, 0x36 0xe1 0x31 0xf1, have been registered (whether the preset configuration includes the transaction attribute identification), whether the transmitted file is in jpg format, and whether the file header of jpg is 0xFF 0xD8 0xFF 0xE0 qualified by the transaction attribute, etc.

At the same time, log storage is performed on relevant identifiers such as the transaction attribute identification, as well as data such as the file stream header (file name, file type, etc.). Only the second control apparatus itself is permitted to be written to the log storage area of the second control apparatus. During the access of the server or other audit apparatuses in connection, log data are in a read-only state to ensure that the log data are not deleted or tampered with.

2.3.2 the Second Control Apparatus Sends Network Data to the First Control Apparatus After the received data packet passes the verification, the second control apparatus determines the target address information (the address information corresponding to the client) according to the second preset string corresponding to the server as obtained from the data packet, and sends the data packet to the first control apparatus according to the preset network configuration (e.g., by using the network configuration of TCP/IP protocol).

2.4 Operations of the First Control Apparatus 1.4.1 The first control apparatus receives network data sent by the second control apparatus, and decodes and verifies the network data.

The verified content includes, but is not limited to: whether the preset strings corresponding to the client and the server in the received data packet comply with the preset rules, e.g., whether they have been registered (i.e. whether they are included in the preset configuration); whether the network address (such as domain name, IP, or port) for sending the data packet complies with the preset rules of the second preset string (e.g., whether it is an endpoint bound to the second preset string corresponding to the client, whether it is a permitted endpoint); whether the transaction attribute of the transmission transaction in the data packet complies with the preset rules, e.g., whether the transaction attribute identification of the transmission transaction, 0x36 0xe1 0x31 0xf1, has been registered (whether the preset configuration includes the transaction attribute identification), whether the transmitted file is in jpg format, and whether the file header of jpg is 0xFF 0xD8 0xFF 0xE0 qualified by the transaction attribute, etc.

At the same time, log storage is performed on relevant identifiers such as the transaction attribute identification, as well as data such as such as the file stream header (file name, file type, etc.). Only the first control apparatus itself is permitted to be written to the log storage area of the first control apparatus. During the access of the client or other audit apparatuses in connection, log data are in a read-only state to ensure that the log data are not deleted or tampered with.

2.4.2 Caching of the Data Packet

After the received data packet passes the verification, the first control apparatus caches the data packet locally and awaits a request for the data packet from the client in connection.

Upon the request of the client, verification is performed on whether the requested port meets predetermined requirements, etc. If yes, the data packet is sent to the client.

2.5 Operations of the client: the data is read through corresponding API interfaces.

After receiving the data packet, the client performs verification according to the preset configuration. The verified content mainly includes, but is not limited to: whether the transaction attribute of the transmission transaction in the data packet complies with the preset rules, e.g., whether the transaction attribute identification 0x36 0xe1 0x31 0xf1 has been registered, whether the transmitted file is in jpg format, and whether the file header of jpg is 0xFF 0xD8 0xFF 0xE0 qualified by the transaction attribute, etc. After the verification is passed, the data test.jpg obtained from the data packet are stored, and the file name and the file type can also be arranged independently.

Figure 15A:
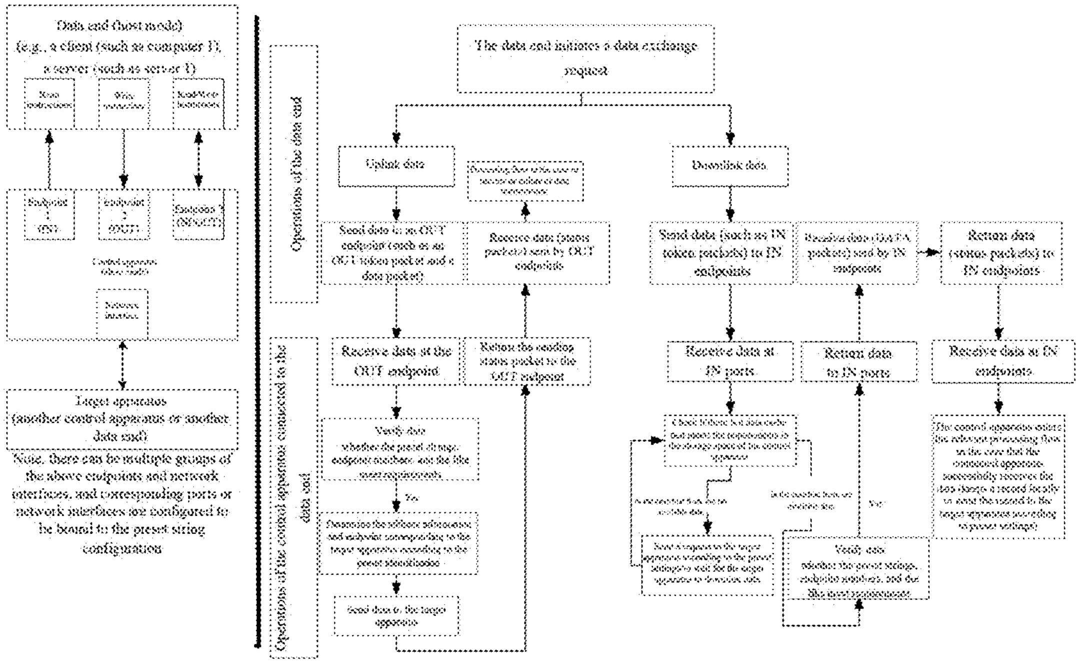
FIG. 15*a* to FIG. 15*c* are principle diagrams of data transmission and exchange provided in the embodiments of the present application.
Figure 15B:
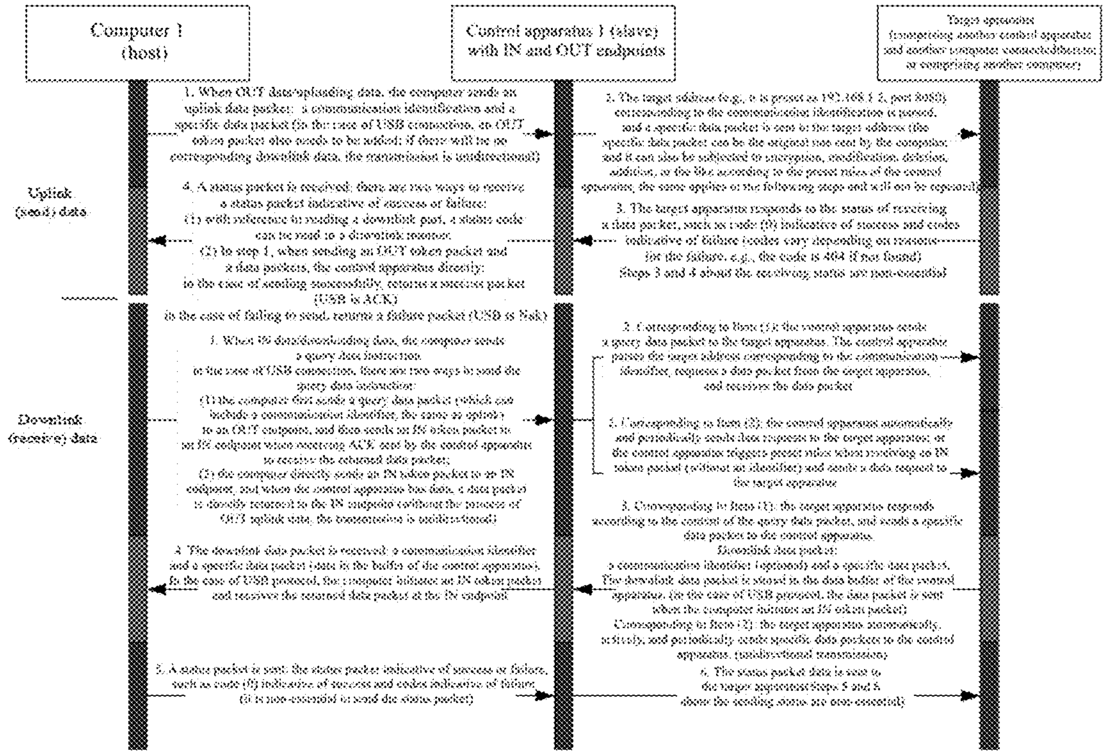
Figure 15C:
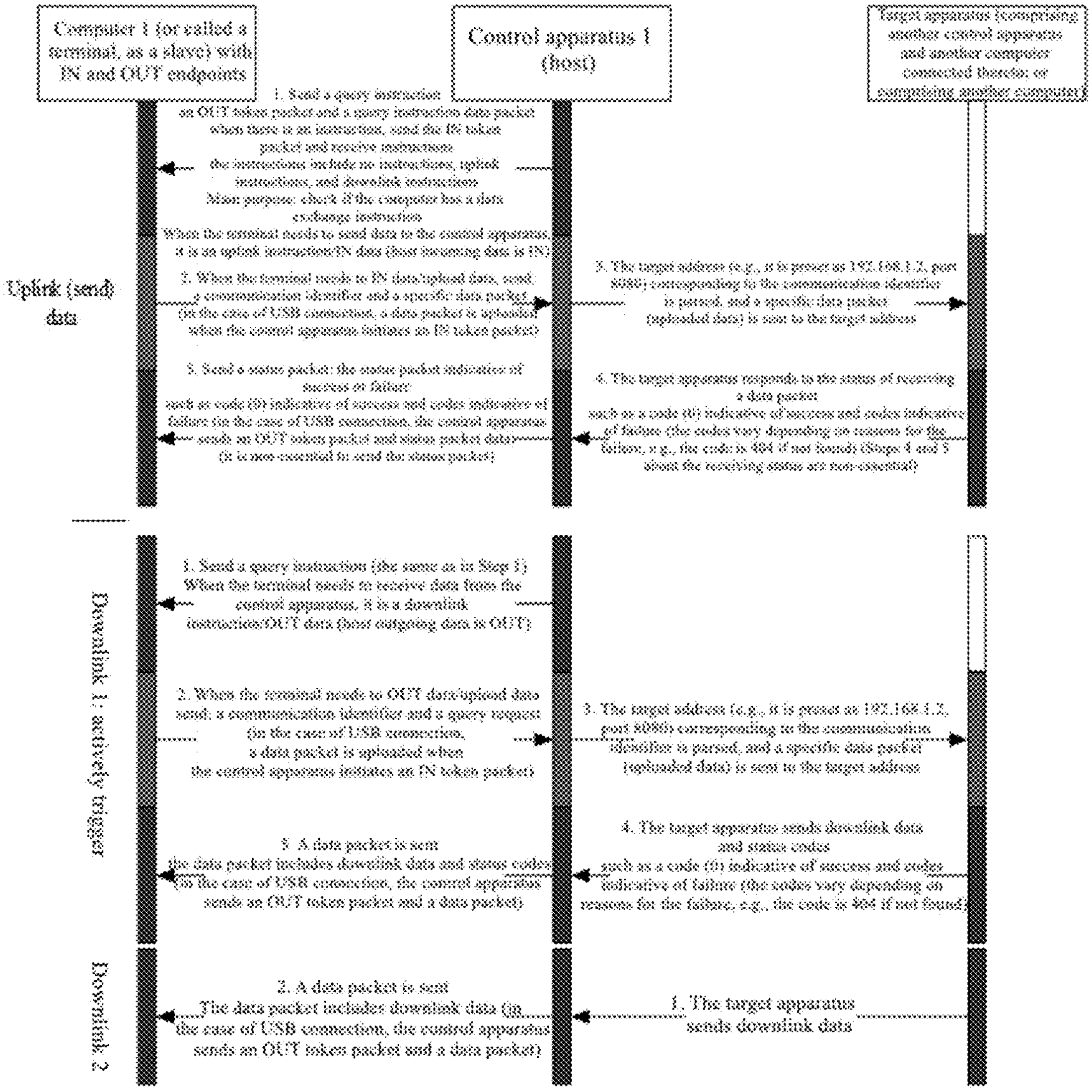

Based on the above content, the present application further briefly illustrates the principle diagram of the data transmission solution provided by the present application in combination with the control apparatus through FIGS. 15*a* to 15*c*. As shown in FIG. 15*a*, the data exchange needs of the data end can generally be divided into two categories: sending data (uplink data) and receiving data (downlink data).

The Specific Implementation of Sending Data Includes the Following Course:

a data end sends data (such as an OUT token and a data packet (including a preset string and data that specifically need to be transmitted)) to an OUT endpoint of a control apparatus connected thereto;

the control apparatus verifies the received data packet and obtains target address information (such as target IP and port) according to a corresponding preset string (a preset string corresponding to a target apparatus (such as Computer 2)) in the data packet; then, it sends the data packet to a target apparatus according to the target address information; afterwards, if a status packet (for representing the reception situation (e.g., the reception is successful or fails) of the data packet) representative of the reception of the data packet as returned by the target apparatus is received, it will be sent to the data end connected thereto through the OUT endpoint thereon;

the data end receives data (the status packet) sent by the control apparatus, and executes the processing flow of succeeding in sending the data or failing to send the data (e.g., making local records according to the preset arrangement or sending records to the target apparatus).

The Specific Implementation of Receiving Data Includes the Following Course:

a data end sends data (such as an IN token packet) to an IN endpoint of a control apparatus connected thereto;

after receiving the data at the IN endpoint thereof, the control apparatus queries whether available data meeting requirements are stored in itself; if not, it sends a request to a target apparatus according to the preset arrangement or waits for the target apparatus to send data; if yes, it returns corresponding data to the data end;

the data end returns a status packet representative of the reception of the data to the control apparatus connected thereto in response to the received data, and the control apparatus executes the processing flow of succeeding in receiving the data or failing to receive the data according to the status packet (e.g., making local records according to the preset arrangement or sending records to the target apparatus).

It should be added that the above status packet can be divided into three types as follows: ACK packets for indicating success in sending or receiving; NAK packets for identifying that the control apparatus is busy or there are no data to process for the moment, and indicating that the data end in connection needs to resend data; STALL packets for representing errors, which generally mean that data are sent to a wrong endpoint, an endpoint is not supportive, or data do not pass the verification, etc. There can be multiple groups of network interfaces of the control apparatus and multiple groups of endpoints thereof. The configuration of binding to corresponding endpoints or network interfaces can be made through preset strings.

FIGS. 15*b* and 15*c* show examples of data transmission and exchange by using a computer apparatus (such as a desktop computer) as the data end. Wherein the target apparatus in the FIGURES can only comprise another computer (referred to as computer 2) in some embodiments, or it can comprise a computer 2 and another control apparatus connected to the computer 2 in other embodiments.

FIG. 15*b* is a principle diagram of data transmission in the case that a computer serves as a host and a control apparatus connected to the computer serves as a slave (corresponding to the master-slave mode shown in FIG. 15*a*). As shown in FIG. 15*b*, the specific course of data transmission is as follows:

if a computer 1 needs to transmit (send) data (i.e., uplink data) to the target apparatus, there can exist the following steps:

Step 11: for the data to be sent, the computer 1 generates a data packet to be sent (i.e., an uplink data packet), which can include the following content: a preset string and data that specifically need to be transmitted, and sends the data packet to the control apparatus 1 connected thereto; it should be noted that in the case of USB protocol connection between the computer 1 and the control apparatus 1, when the data packet is sent to the control apparatus 1, an OUT token packet also needs to be sent at the same time; if there will be no corresponding downlink data in the subsequent course, the sending is of unidirectional transmission;

Step 12: the control apparatus 1 obtains target address information (such as the address information of a computer bound to the preset string corresponding to the computer 2, 192.###0.1.2: 8080) according to the preset string (such as the preset string corresponding to the computer 2), and sends the data packet to the target apparatus according to the obtained target address information; it should be noted that the data packet sent to the target apparatus can be the received original data packet sent by the computer 1, or it can be a new data packet formed by processing (encrypting (using a private key to encrypt the original data packet), modifying certain content in the data packet (e.g., modifying the request parameters included in the data packet when the data packet is a request data packet), deleting certain content from the data packet (e.g., deleting the request parameters included in the data packet to add new preset request parameters when the data packet is a request data packet), compressing data, adding some content to the data packet, etc.) according to the preset configuration of the control apparatus 1;

Step 13: the target apparatus feeds back a status packet representative of the reception of the data packet to the control apparatus 1 in response to the status of receiving the data packet. For example, if a data packet is successfully received, a status packet representative of successful reception can be fed back, and the status packet can include encoded information (such as 0) representative of successful reception; on the contrary, if the reception of the data packet fails, a status packet representative of failure can be fed back, and the status packet includes encoded information representative of reception failure; the encoded information varies depending on different reasons for the reception failure; for example, in the case of failure caused by inability to find, the encoded information can be 404.

Step 14: the control apparatus 1 sends the received status packet fed back by the target apparatus to the computer 1; there are two ways to send the status packet:

Way 1: the control apparatus 1 waits for the computer 1 to actively obtain the status packet; for details, see the relevant content of the computer 1 uplinking (receiving) data as described below, which will not be elaborated herein.

Way 2: the control apparatus 1 provides direct feedback; in the case of sending successfully, the control apparatus 1 directly returns a success packet to the computer 1 (when the computer 1 and the control apparatus 1 are in USB protocol connection with each other, an ACK packet is returned); in the case of failure to send, the control apparatus 1 directly returns a failure packet to the computer 1 (when the computer 1 and the control apparatus 1 are in USB protocol connection with each other, a NAK packet is returned).

It should be added that Steps 13 and 14 are non-essential steps. For example, if the sending from the computer 1 is of unidirectional transmission, then Steps 13 and 14 do not need to be executed.

If the computer 1 needs to download (or query) data (i.e., downlink data), there can exist the following steps:

Step 21: when the computer 1 needs to query/download data, it can send a data query instruction to the control apparatus 1; for example, when the computer 1 and the control apparatus 1 are in USB protocol connection with each other, there are two ways to send a data query instruction:

Way 1: the computer 1 sends a query packet to a particular OUT endpoint of control apparatus 1 (the packet can include a corresponding preset string, i.e., the upstream data as described above); when receiving the ACK packet returned by the control apparatus 1, the computer 1 sends an IN token packet to a particular IN endpoint of the control apparatus 1 to receive adapted data fed back by the control apparatus;

Way 2: the computer 1 directly sends an IN token packet to a particular IN endpoint of the control apparatus 1 (which is unidirectional transmission since there is no OUT course of uplinking data);

Step 22: regarding Way 1, the control apparatus 1 can send a query packet to a target apparatus; specifically, according to target address information obtained from the corresponding preset string (the preset string corresponding to the computer 2), it sends a request packet to the target apparatus; regarding Way 2, the control apparatus 1 can automatically and periodically send data request actions to the target apparatus (which can be performed according to preset request parameters); alternatively, when the IN token packet sent by the computer 1 is received, preset rules can be triggered to send data request actions to the target apparatus;

Step 23: regarding Way 1, the target apparatus sends a data packet that specifically includes adapted data to the control apparatus 1 in response to the received query data packet, wherein the data packet can include, but is not limited to, the following content: a preset string (optional) and data specifically adapted to the request; after the control apparatus 1 receives the data packet fed back by the target apparatus, the data packet can be stored in a data cache area thereof and awaits an active request from the computer 1 for retrieval (e.g., when the computer 1 initiates an IN token packet, the data packet is sent to the computer 1); regarding Way 2, the target apparatus automatically, actively, and periodically sends a data packet that specifically includes adapted data to the control apparatus 1 (unidirectional transmission);

Step 24: the computer 1 receives the data packet; for example, when the computer 1 and the control apparatus 1 are in USB protocol connection with each other, the computer 1 sends an IN token packet to an IN endpoint of the control apparatus and receives the returned data packet at the IN endpoint;

Step 25: the computer 1 returns a status packet to the control apparatus 1, wherein the status packet represents success or failure of reception of the data packet;

Step 26: the control apparatus 1 sends the received status packet to the target apparatus to inform it of the reception status of the data packet.

It should be added that Steps 25 and 26 are non-essential steps.

It should be added that in the context of the present application, the address information of the target apparatus varies depending on the communication protocol or connection manner between the control apparatus 1 and the target apparatus. For example, when TCP/IP protocol is used for communication, the address information of the target apparatus is the domain name, IP, and port. For another example, when LAN, Bluetooth, or LoRa is used for communication, the address information of the target apparatus is the Mac address or host name. For another example, when UCB protocol is used for communication, the address information of the target apparatus is the USB bus address assigned to the host if the control apparatus serves as a host, and it is the endpoint number if the control apparatus serves as a slave. For the specific description of the preset string, see the relevant content in the other embodiments in the previous text.

FIG. 15*c* is a principle diagram of data transmission in the case that a computer serves as a slave and a control apparatus connected to the computer serves as a host. As shown in FIG. 15*c*, the specific course of data transmission is as follows:

if a computer 1 needs to uplink data (e.g., upload data), there can exist the following steps:

Step 31: a control apparatus 1 sends a query instruction to the computer 1;

When the control apparatus 1 and the computer 1 are in USB protocol connection with each other, the control apparatus 1 can send an OUT token packet and a query instruction data packet to the computer 1 to query whether the computer 1 has a data exchange instruction; if yes, it sends an IN token packet to the computer 1 to receive the data exchange instruction;

Step 32: when the computer 1 needs to query/upload data, it sends a preset string and data that specifically need to be transmitted (in the case of USB protocol connection between the computer 1 and the control apparatus 1, the data is uploaded when the control apparatus 1 sends the IN token packet);

Step 33: the control apparatus 1 obtains target address information according to the received preset string, and sends the data (uploads the data) that specifically need to be transmitted to the target apparatus according to the target address information;

Step 34: the target apparatus returns a status packet representative of data reception to the control apparatus 1 on the basis of the situation of data reception;

Step 35: the control apparatus 1 sends the status packet to the computer 1;

if the computer 1 needs to downlink data (receive data), it can be realized in two ways as follows:

Way 1: There can Exist the Following Steps:

Step 41: the control apparatus 1 actively sends a query instruction to the computer 1 (the same as in Step 31) to determine whether the computer 1 needs to receive data; if yes, the step relates to a downlink instruction/OUT data (data out of the host is OUT);

Step 42: when the computer 1 needs to upload data (OUT data), it sends a preset string and a query request (in the case of USB protocol connection between the computer 1 and the control apparatus 1, the data is uploaded when the control apparatus 1 sends the IN token packet);

Step 43: the control apparatus 1 obtains target address information according to the received preset string, and sends the data (the query request) that specifically need to be transmitted to the target apparatus according to the target address information;

Step 44: the target apparatus sends downlink data and status codes to the control apparatus 1 in response to the query request;

Step 45: the control apparatus 1 sends a data packets (including downlink data and status codes) to the computer 1;

Way 2: There can Exist the Following Steps:

Step 51: the target apparatus actively sends downlink data to the control apparatus 1;

Step 52: the control apparatus 1 sends a data packet to the computer 1, wherein the data packet includes downlink data (in the case of USB protocol connection between the computer 1 and the control apparatus 1, the control apparatus 1 sends an OUT token packet and a data packet).

For the content that is not elaborated in the above steps, see the content relevant to FIG. 15*a* in the previous text.

Figure 16:
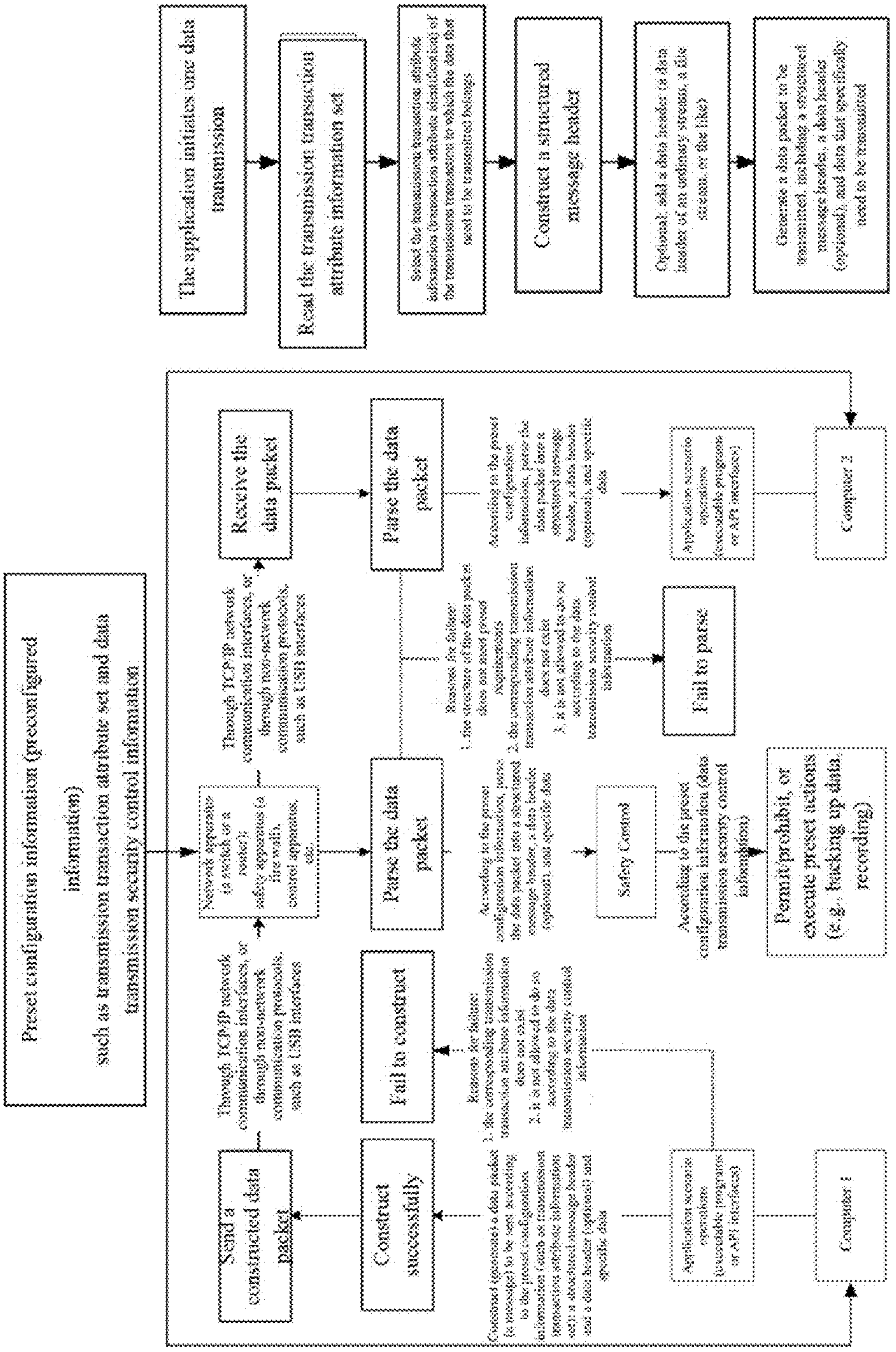
FIG. 16 is a principle diagram of transmission of data that needs to be transmitted on the basis of transmission transaction attribute information (which can be referred to as data structured transmission) as provided in one embodiment of the present application.

FIG. 16 is a principle diagram of generating a data packet to be transmitted (i.e., the message involved in the previous text) for the data that needs to be transmitted and sending the data packet. As shown in FIG. 16, when an application on the computer 1 initiates a data transmission for the specific data that it needs to transmit, it will read a transmission transaction attribute information set from the preset configuration information (preset information), and query the transmission transaction attribute information corresponding to the transmission transaction to which the specific data that needs to be transmitted belong from the transmission transaction attribute information set; then, the queried transmission transaction attribute information is used to generate a structured message header and a structured data header (optional) for the specific data that needs to be transmitted, and a data packet that meets requirements of the preset structural rules is constructed (or generated) according to the generated message header, the generated data header, and the specific data that needs to be transmitted. If the data packet is successfully constructed, the computer 1 sends the data packet to the computer 2 through an intermediate network apparatus (such as a switch and a router firewall), a control apparatus, or the like connected thereto; the computer 2 can parse the received data packet according to the preset configuration information, and obtain the corresponding data if the parsing is successful.

The reasons why the computer 1 fails to construct a data packet to be sent in the above course include, but are not limited to: it cannot query the transmission transaction attribute information corresponding to the transmission transaction to which the specific data that needs to be transmitted belong in the transmission transaction attribute information set; according to the preset data transmission security control information, the specific data that needs to be transmitted are not allowed to be sent, the sending endpoint does not comply with the preset rules, etc. Before forwarding the received data packet to the computer 2, the intermediate network apparatus (such as a switch and a router firewall), the control apparatus, or the like can parse the data packet. If the parsing is successful, they can process the data packet according to the preset configuration information (the data transmission security control information), e.g., releasing the data packet (i.e., allowing to transmit the data packet, forwarding the data packet to the computer 2), blocking (intercepting) the data packet (i.e., prohibiting transmitting the data packet), and performing preset actions (e.g., backing up the data packet, making local records). In the case of failure to par the data packet, the reasons for the failure include, but are not limited to: the structure of the data packet does not meet preset requirements; the transmission transaction attribute information of the transmission transaction to which the specific data that needs to be transmitted belong does not exist in the corresponding data packet; according to the data transmission security control information, the transmission is not allowed.

Figure 17:
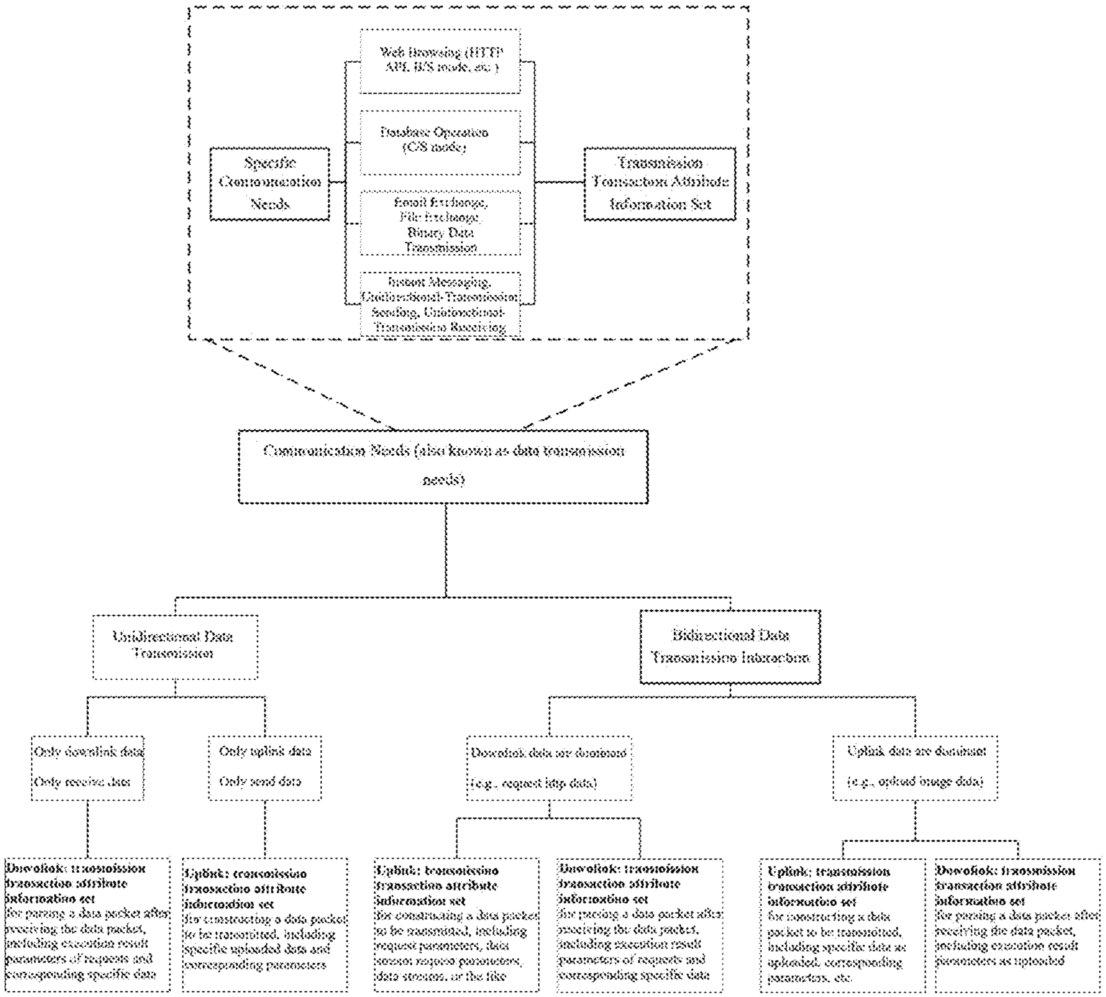
FIG. 17 shows an application example of structured data transmission provided by one embodiment of the present application.

FIG. 17 shows a specific application example of data transmission. As shown in FIG. 17, according to demands of data transmission, data transmission can be divided into unidirectional data transmission and bidirectional data transmission on the basis of the direction of data transmission. The unidirectional data transmission can include downlink data alone (only receiving data) and uplink data alone (only sending data). The bidirectional data transmission and interaction includes uplink and downlink data, and specifically includes bidirectional data transmission and interaction dominated by downlink data (such as requesting Http data) and bidirectional data transmission and interaction dominated by uplink data.

In the case of downlink data alone (i.e., only receiving data), the preset transmission transaction attribute information set is used for parsing a data packet after receiving the data packet. The data packet can include execution result parameters of a request (e.g., the request for reception is successful or fails) and the corresponding specific data (such as the returned data adapted to the request).

In the case of uplink data alone (i.e. only sending data), the preset transmission transaction attribute information set is used for constructing a corresponding data packet to be sent for the data that needs to be transmitted. The data packet can include the uploaded specific data and other corresponding parameters (such as the parameters included in the message header as mentioned above).

In the case of the bidirectional data transmission and interaction dominated by downlink data (such as requesting Http data), when it comes to uplink data, the preset transmission transaction attribute information set is used for constructing a corresponding data packet to be sent for the data that needs to be transmitted. The data packet can include request parameters (such as data stream request parameters or a requested data stream), and can further include other corresponding parameters (such as the parameters included in the message header as mentioned above). When it comes to downlink data, the preset transmission transaction attribute information set is used for parsing a data packet after receiving the data packet. The data packet can include execution result parameters of a request (such as encoded information of a successful or failed request) and the corresponding specific data (such as the returned data adapted to the request).

In the case of the bidirectional data transmission interaction dominated by uplink data (e.g., uploading image data), when it comes to uplink data, the preset transmission transaction attribute information set is used for constructing a corresponding data packet to be sent for the data that needs to be transmitted. The data packet can include uploaded specific data (such as image data) and corresponding parameters (such as the parameters included in the message header as mentioned above). When it comes to downlink data, the preset transmission transaction attribute information set is used for parsing a data packet after receiving the data packet. The data packet can include execution result parameters of the uploading (such as encoded information of uploading image data successfully or failing to upload image data).

It should be added that the above data transmission demand information can include, but is not limited to: web browsing (such as requesting network resources), database operations, e-mail exchange, file exchange, binary data transmission, instant messaging, unidirectional transmission sending, unidirectional transmission receiving, etc.

As shown in FIG. 17, in essence, there are mainly three scenarios of data transmission and interaction in the embodiments of the present application.

Scenario 1: The Data End Uplinks (Sends) Data to the Control Apparatus Connected Thereto The data end can send a data packet (including a preset string and specific data to be transmitted) to an uplink interface (or called an uplink endpoint, an uplink data register, etc., such as the data exchange interface ① shown in FIG. 18*a*) of the control apparatus connected thereto by controlling a hardware interface thereon. Alternatively, a data packet can be sent to the control apparatus only unidirectionally according to the communication capability configured for the preset string (the preset string corresponding to the data end, such as 0x0A), and the control apparatus will not downlink (send) data to the data end. For the specific introduction to the communication capability, see the relevant content in the other embodiments in the previous text.

Scenario 2: The Data End Downlinks (Receives) Data to the Control Apparatus Connected Thereto.

The data end can receive a data packet from a downlink interface (or called a downlink endpoint, a downlink data register, etc.) of the control apparatus connected thereto by controlling a hardware interface thereon. The data packet includes a preset string and specific data (which can be data issued by another data end). Different from sending a data packet, when requesting downlink data, the data end needs to request the same from the target apparatus. The interface of the control apparatus does not necessarily have downlink data. Thus, the data end needs to continuously query and scan the downlink interface of the control apparatus connected thereto through the hardware interface thereon, or wait for the interface to receive interrupt signals of data, or await pushed data, etc. For example, when USB interface protocol is used for connection between the data end and the control apparatus connected thereto, the data end needs to send an IN token packet to an IN endpoint of the control apparatus continuously and actively to request an attempt to read data. For another example, when BLE (Bluetooth Low Energy) Bluetooth interface protocol stack is used for connection between the data end and the control apparatus connected thereto, the characteristic attribute can be set as notify in the service of the Bluetooth protocol, and when the control apparatus has data, it will automatically push the data to the corresponding data end.

Scenario 3: Bidirectional Communication Between the Data End and the Control Apparatus, In combination with Scenario 1 and Scenario 2, the data end can first send a data packet to an uplink interface of the control apparatus connected thereto by controlling a hardware interface thereon; after receiving the data packet, the control apparatus requests and downloads the data from the target apparatus, and then sends (forwards) the same to the hardware interface of the data end.

Regarding the description of the relevant interfaces of the control apparatus in the context of the present application, a supplementary explanation is provided below.

The interface for data transmission and interaction with the corresponding data end on the control apparatus as described in the context of the present application (such as the data exchange interface ① shown in FIG. 18A, which can be referred to as the first interface) can be any type of interface, as long as it can be used to achieve unidirectional or bidirectional data transmission with the corresponding data end.

For example, from the perspective of the physical layer, the interface type can include, but is not limited to: interfaces for wired transmission (such as twisted pair/fiber optic interfaces, USB interfaces), interfaces for wireless transmission (such as interfaces implemented through Bluetooth modules, LoRa modules, WiFi modules, etc.), SoC interfaces (such as SPI and PCI), independent expansion card interfaces on motherboard (such as PCIE and SATA), interfaces for unidirectional transmission (such as unidirectional TX or RX of optical fiber, infrared interfaces, and visible light communication interfaces).

For another example, from the perspective of architecture design, the interface type can include, but is not limited to: master-slave apparatus mode interfaces, client-server mode interfaces, point-to-point mode interfaces (network interfaces), TX-RX (transmit-receive) transceiver mode (uplink and downlink are not on the same line (or the same group of lines, or the same group of differential lines), such as serial communication, fiber optic communication, PCIE interfaces, or unidirectional transmission with only TX or RX) interfaces.

For another example, from the perspective of functions, the interface type can include, but is not limited to: interfaces for bus communication (such as USB, PCI, PCIE, SPI, $I^2C$ interfaces), interfaces for communication of storage apparatuses (such as SATA, IDE, M.2, Emmc, SDIO interfaces), interfaces for audio and video transmission (such as HDMI interfaces), etc. The above USB interfaces are relatively customary interfaces.

For another example, from the perspective of data transmission modes, the interface type can include, but is not limited to: interfaces in the PIO (Programmable Input Output) mode and interfaces in the DMA (Direct Memory Access) mode.

Regarding several main interface types, the implementation of data interaction between the data end and the control apparatus is described below in a brief manner.

Taking the communication scenario: Computer 1↔Hardware Interface of Computer 1↔Hardware Interface of Control apparatus 1↔Control apparatus 2↔Computer 2 as an example 1. The Interface Type is a USB Interface (Wired, Master-Slave Mode)

In this case, USB protocol is used for connection between the computer land the control apparatus 1. The computer 1 can recognize the control apparatus 1 through PID (Product ID), VID (Vendor ID) and the like in apparatus descriptors sent by the control apparatus 1, and complete enumeration with the control apparatus 1. Afterwards, data exchange can be completed through IN and OUT endpoints and token packets. For the specific implementation of enumeration and data interaction, see the relevant content in the other embodiments of the present application in the previous text.

2. The Interface Type is a Bluetooth Interface (Wireless, Master-Slave Mode)

Bluetooth can be divided into two types: Bluetooth Classic and Bluetooth Low Energy, which are completely different in the manner of implementation.

When it comes to Bluetooth Classic, the computer 1 in the master mode and the control apparatus 1 in the slave mode. The first step is to complete the Bluetooth pairing connection between the computer 1 and the control apparatus 1. The pairing manner includes: ① manual pairing: the Bluetooth name of the control apparatus is selected and the pairing code is entered for pairing; ② automatic pairing: the Bluetooth-related parameters (such as Bluetooth apparatus name, Mac address, pairing code) of the control apparatus 1 are obtained through pre-configuration, and the Bluetooth apparatus is automatically scanned for pairing; ③ secure pairing (the security control part): by pre-configuring the relevant Bluetooth parameters that are allowed in connection with the control apparatus 1 (the whitelist mechanism), the computer 1 is only allowed to pair with the control apparatus with the specified Bluetooth name and Mac address, and they can be paired by manually entering the pairing code. The second step is to exchange data. After successful pairing in the first step, the computer 1 sends or receives data to the control apparatus 2.

When it comes to Bluetooth Low Energy, the computer 1 in the client mode and the control apparatus 1 in the server mode. The first step is to connect the computer 1 to the Bluetooth name of the control apparatus 1, and send a pairing code for pairing when the control apparatus 1 receives the connection. Different from Bluetooth Classic, Bluetooth Low Energy has such a pairing manner that the computer 1 is connected first, and then the control apparatus 1 initiates a pairing instruction. Regarding secure pairing (the security control part), the computer 1 is only allowed to pair with the control apparatus with the specified Bluetooth name, Mac address, and UUID, and they can be paired by manually entering the pairing code. The second step is to exchange data. After successful pairing in the first step, the computer 1 sends or receives data to or from endpoints of the control apparatus, with the Bluetooth service of Write Characteristic (Write attribute), Read Characteristic (Read attribute), and Notify Characteristic (Notify attribute). There can be various combinations of services and Characteristics.

It should be noted that in the case of the two interface types as mentioned above, the control apparatus is an external apparatus of the computer, and the form of the control apparatus can be seen in FIG. 7*a* or FIG. 7*b*.

3. The Interface Type is a PCIE Interface (Motherboard Interface, Master-Slave Mode).

In the case of this interface type, the control apparatus is deployed inside the computer and can be in the form of a chip or an expansion card (as shown in FIG. 7*c*). The course of data transmission and interaction between the computer and the control apparatus is as follows.

The first step is that the computer 1 scans an apparatus with a PCIE interface, and makes recognition and connection according to preset characteristic values of the control apparatus PCIE interface, such as VID (Vendor Identification), DID (Device Identification), and SSID (Subsystem Identification).

The second step is to exchange data through a transmitter (TX sending logic) and a receiver (RX receiving logic) of a data lane of the PCIE interface. There can be multiple sets of data lanes. In general, there can be 1, 2, 4, 8, 12, 16, 32 lanes.

In addition to the above interfaces, the main ones can also be SATA interfaces (wired, access in a manner similar to that of hard disks), emmC interfaces (wired, access in a manner similar to that of SD cards), serial communication interfaces (wired, sending data through RX lines and TX lines), fiber optic communication interfaces (wired, optical module, RXTX mode), Ethernet communication interface (wired or wireless, including WIFI), etc. In the present embodiment, limitations are not imposed thereon.

The present application provides some method and system embodiments from the perspective of "the control apparatus controls the data transmission capability (unidirectional transmission, bidirectional transmission) of the corresponding end in a software-defined control manner on the basis of a communication protocol". Before the introduction, some proprietary terms involved in the context of the present application are explained first. In the context of the present application, the "uplink data" refers to sending data (or uploading data), and the "downlink data" refers to receiving data (or downloading data).

Figure 19:
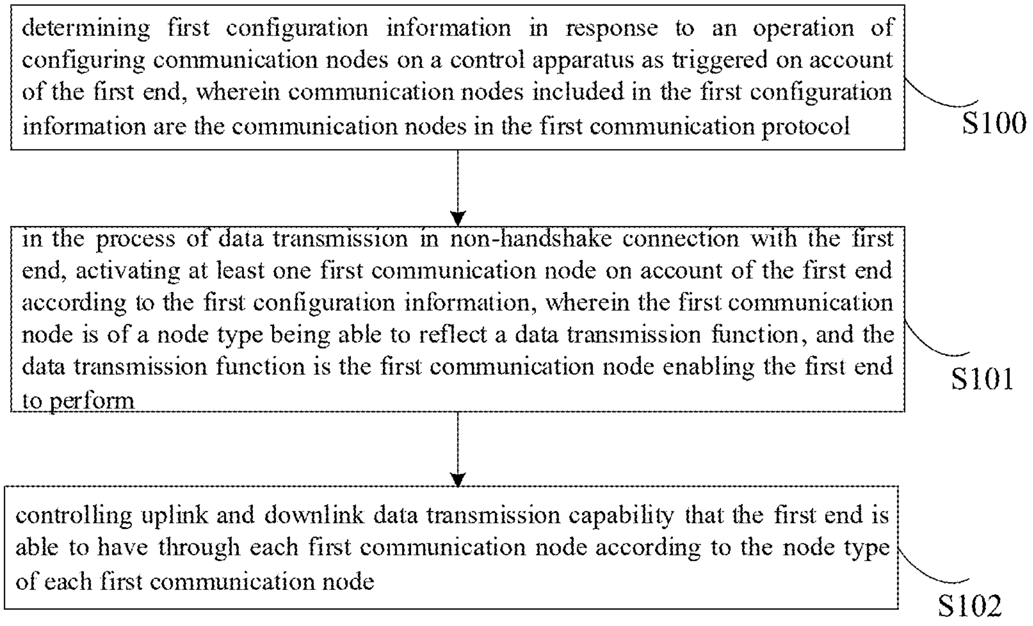
FIG. 19 is a flow diagram of a data transmission control method provided in the embodiments of the present application.

FIG. 19 is a flow diagram of a data transmission control method provided in one embodiment of the present application. The executing subject of the method is a control apparatus connected to the first end on the basis of a first communication protocol, such as the first control apparatus 31 shown in FIGS. 4*a* to 6*a*. Some of multiple communication nodes included in the first communication protocol are unidirectional communication nodes. Specifically, the first communication protocol can be an external wired communication protocol featured with transmission under instructions of signaling, such as USB protocol; USB protocol includes unidirectional communication nodes, such as IN endpoints and OUT endpoints. Alternatively, the first communication protocol can also be a wireless communication protocol, featured with connection in a pairing manner, such as Bluetooth protocol; Bluetooth protocol includes unidirectional communication nodes, such as Characteristic with Read attribute and Characteristic with Write attribute. Alternatively, the first communication protocol can also be a communication protocol, featured with the first end as an internal apparatus, such as PCI or PCIE protocol; the PCI or PCIE protocol includes multiple data lanes (also known as physical links), which include unidirectional communication nodes, such as transmitter data lanes (TX transmission logic) and receiver data lanes (RX reception logic). Before using the control apparatus to control data transmission of the first end, a user can preset some configuration information in the control apparatus, so that the control apparatus calls the same when needed, wherein the preset configuration information in the control apparatus can mainly include: data transmission capability control information of the first end, communication node activation information of the control apparatus, and target end of data transmission. Specifically, the configuration information can include a configuration file created for the first end as described below; further, it can also include a configuration file created for the second end. Taking the configuration file created for the first end as an example, the configuration file can include, but is not limited to, at least one of the following configuration data: data exchange configuration data, data transmission security control information, etc., wherein the data exchange configuration data can include, but is not limited to: transmission transaction attribute information of multiple transmission transactions; correspondence among the transaction type of the transmission transaction, the preset identification corresponding to the first end, and the transaction attribute identification of the transmission transaction, wherein the transaction attribute identification is the unique identification of the transmission transaction attribute information of the corresponding transmission transaction; message header format, multiple data header formats, etc. For the specific introduction to the configuration information embedded in the control apparatus, as well as the detailed description of the form of the control apparatus and the first end, see the relevant content in the other embodiments of the present application in the following text, which will not be elaborated herein.

As shown in FIG. 19, the data transmission control method provided in the present embodiment comprises the following steps:

S100. determining first configuration information in response to an operation of configuring communication nodes on a control apparatus as triggered on account of the first end, wherein communication nodes included in the first configuration information are the communication nodes in the first communication protocol;

S101. in the process of data transmission in non-handshake connection with the first end, activating at least one first communication node on account of the first end according to the first configuration information, wherein the first communication node is of a node type that can reflect a data transmission function, which the first communication node enables the first end to perform;

S102. controlling data transmission capability that the first end can have through each first communication node according to the node type of each first communication node.

In general, in an apparatus that communicates with other ends on the basis of communication protocols such as USB protocol and Bluetooth protocol, such as a USB apparatus based on USB protocol, communication nodes that can be used for communication are subjected to fixed configuration at the factory provisioning stage. Subsequently, the user cannot perform configuration according to his or her own needs, which makes it difficult for the user to enable the USB apparatus to, in addition to the data transmission function limited by the manufacturer, perform other functions on the other ends without changing the physical structure or firmware software of the USB apparatus after purchasing the USB apparatus that leaves the factory.

For example, assuming that the communication node that is subjected to fixed configuration is an OUT endpoint when a USB apparatus leaves the factory, then a certain end in USB connection therewith can only uplink data through the USB apparatus, and cannot downlink data. If the user expects that said certain end simply can downlink data through the USB apparatus, the USB apparatus must be changed in terms of the physical structure or firmware software. For example, by changing the firmware software, all communication nodes of the USB apparatus are configured as IN endpoints.

As can be seen from the above example, since the communication function of the existing USB apparatuses are fixedly arranged when they leave the factory, it is relatively difficult to make further changes to the communication function thereof. If changes are made, it requires significant costs in terms of time, money, manpower, etc. Therefore, it is difficult to flexibly control the data transmission capability that the corresponding end can have according to the actual data transmission control needs through the existing USB apparatuses.

The control apparatus provided in the present embodiment is different from the existing apparatuses that communicate with other ends on the basis of communication protocols such as USB protocol and Bluetooth protocol. After the control apparatus leaves the factory, the user can flexibly configure the activation of the communication nodes (e.g., activating some communication nodes and keeping some communication nodes disabled in the course of data transmission) on the control apparatus and adjust the function (e.g., changing the target end of data transmission) of the communication nodes in a manner such as software-defined control according to his or her data transmission control needs, avoid such problems as high costs of unidirectional transmission apparatuses such as optical gates, and achieve low-cost and flexible security control of data transmission. In specific implementation, the user can create a corresponding configuration file on account of the first end in advance according to needs, and then distribute the configuration file to the control apparatus through offline distribution, network distribution, or the like. The above configuration file includes configuration information of the communication nodes on the control apparatus as configured on account of the first end. For the specific content that can be included in the configuration file created in advance on account of the first end, as well as the specific implementation of distributing the configuration file to the control apparatus through offline distribution, network distribution, or the like, see the relevant content in the other embodiments provided in the present application, which will not be repeated herein. In addition, for the detailed description of the communication nodes, see the relevant content in the other embodiments of the present application, which will not be repeated herein, either.

Based on the above content, said "determining first configuration information in response to an operation of configuring communication nodes on a control apparatus as triggered on account of the first end" in Step S100 can specifically comprise:

S1001. obtaining a configuration file created by a user in advance on account of the first end;

S1002. obtaining the first configuration information from the configuration file.

Wherein said "obtaining a configuration file created by a user in advance on account of the first end" in Step S1001 can be implemented by using any of the following steps:

obtaining the configuration file as imported in response to an importing operation triggered by the user; or receiving the configuration file sent by a configuration data provider.

For the detailed description of the configuration data provider, see the relevant content when the distribution of the corresponding configuration file to the control apparatus through "network distribution" is elaborated in the embodiment of the present application, more specifically, see the content relevant to the configuration server. The first configuration information can include the activation information of the communication nodes on account of the first end, the target end of data transmission through the communication nodes, some other relevant parameters, etc. For the specific content that can be included in the first configuration information, see the relevant content in the other embodiments.

Afterwards, according to the configuration information included in the above configuration file (such as the first configuration information), the control apparatus can activate the communication nodes to carry out data interaction with the first end and realize data transmission control over the first end.

Figure 20:
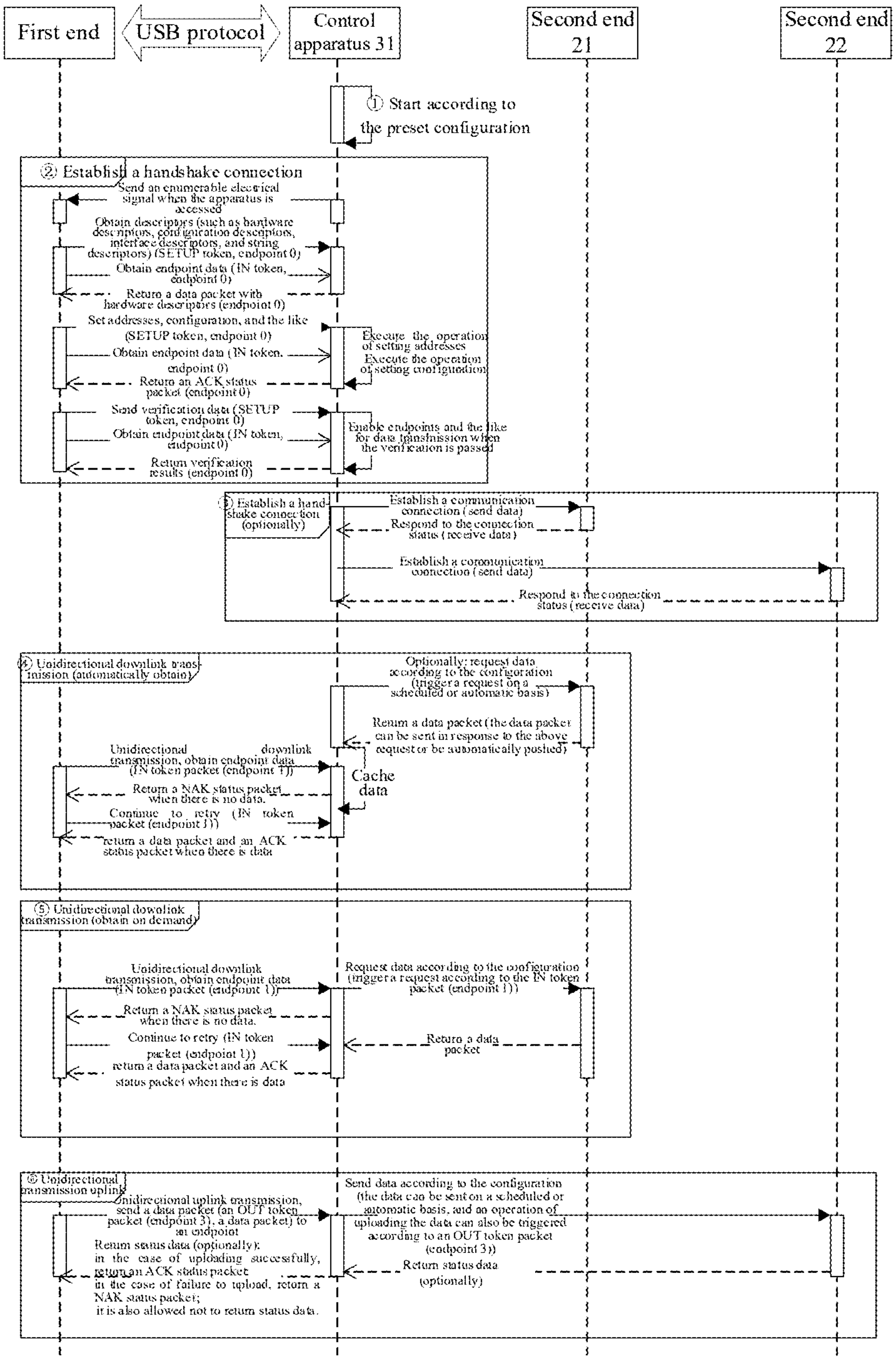
FIG. 20 to FIG. 22 are principle diagrams of data transmission control provided in the embodiments of the present application.

For example, as shown in FIG. 20, the control apparatus 31 is connected to the first end for communication on the basis of a first communication protocol (such as USB protocol and Bluetooth protocol). After the control apparatus 31 is powered on, it will perform activation according to the configuration information included in the configuration file obtained in Step S1001. For example, it will first obtain the communication node activation information (e.g., two endpoints are arranged to be activated, wherein one is an endpoint 0 that needs to be activated by default and the other is an IN endpoint (such as endpoint 1)) arranged on account of the first end from the configuration file, descriptors and verification rules among other that need to be used to establish handshake connection (i.e., communication connection) with the first end, as well as the manner of data transmission to the target end (such as the second end 21 and the second end 22), etc., wherein the manner of data transmission to the target end can be, but is not limited to, SOCKET, HTTP, HTTPS, etc. The above communication node activation information is specifically obtained from the first configuration information included in the configuration file. Afterwards, according to the communication node identification included in the obtained communication node activation information, the default endpoint that must be activated, such as endpoint 0, is activated first to complete the handshake connection by enumerating and interacting with the first end through the endpoint 0. Then, the activation of the corresponding first communication node is completed on account of the first end.

The communication node identification can reflect the communication node number corresponding to the control apparatus and the node type of the communication nodes. For the detailed description of the communication node identification, see the relevant content in the other embodiments. The term "communication node" has different meanings in different communication protocols. In the case that the communication protocol between the first end and the control apparatus 31 is USB protocol, the communication node refers to the endpoints for communication transmission in the USB protocol, such as IN endpoints or OUT endpoints (such as other endpoints except the default endpoint (endpoint 0), which endpoints are unidirectional communication endpoints (referred to as the unidirectional endpoints)) that support unidirectional transmission, and IN/OUT endpoints (such as endpoint 0, which is a bidirectional communication endpoint (referred to as the bidirectional endpoint)) that support bidirectional transmission. In the case that the communication protocol between the first end and the control apparatus 31 is Bluetooth protocol, the communication node refers to characteristics in the Bluetooth protocol, such as Read Characteristic (Characteristic with Read attribute (or permission)) that supports unidirectional transmission, Notify Characteristic (Characteristic with Notify attribute (or permission)), Write Characteristic (Characteristic with Write attribute (or permission)), and Read/Write Characteristic that supports bidirectional transmission. In the case that the communication protocol between the first end and the control apparatus 31 is PCI or PCIE protocol, the communication node can mean that the PCI or PCIE protocol includes multiple data lanes, such as transmitter data lanes (TX transmit logic) and receiver data lanes (RX receive logic).

It should be added that in the USB protocol, different types of communication nodes can also be combined with each other to form an endpoint (a bidirectional endpoint) that supports bidirectional transmission. For example, one N endpoint 1 and one OUT endpoint 1 can be combined with each other to form one bidirectional communication endpoint 1.

In the following text, the technical solution provided in the present embodiment will be elaborated mainly by taking the USB protocol as the communication protocol between the first end and the control apparatus 31 for example.

Taking the USB protocol as the communication protocol between the first end and the control apparatus 31 for example, assuming that the first end is defined to only be able of downlinking data unidirectionally (i.e., downloading, obtaining, and receiving data), a simple instance of the first configuration information can be shown in Table 8.

TABLE 8

| Data transmission capability control information | Other relevant parameters | Communication node activation information of the control apparatus (communication node identification) | Target address of data transmission (the address of the target end) |
|---|---|---|---|
| RXTX: uplink/downlink data | #### | 0x00 (endpoint 0, which must be activated by default, and is an IN/OUT endpoint) used for enumerating course | |
| RX: downlink data unidirectionally | Such as setTime | 0x01 (endpoint 1, an IN endpoint) | Address 21a (the second end 21a) |

Note: regarding the endpoint 0, the target address can be null, and the other relevant parameters can be, but are not limited to, relevant parameters used to determine whether the received instruction sent by the first end meets requirements as described in the other embodiments.

Taking the endpoint 1 in Table 8 as an example, further, the relevant information of the endpoint 1 as included in the first configuration information can be specifically shown in Example 011 as follows:

Example 011

"Note": "the first end (such as a client) downlinks data unidirectionally, i.e., the first end downloads/receives data unidirectionally"
"Communication node identification": "0x01"//it indicates the endpoint with endpoint number 1 (denoted as endpoint 1, an IN endpoint)
"Data transmission capability control information": "RX"
"Target Address": "Address 21 (such as 192.###0.1.1: 8001)"//the target IP address and port number, or domain name and port number, or MAC address of the communication target end (such as a server)
"Submitted parameters": [
{"token": "Control****=###1"
"query": "getDataID=1"//it is a preset query parameter for obtaining data from the server.
"setTime": "1000"//the time of automatically submitting the query parameter, in milliseconds}]

As can be seen, the information configured for (or bound to) the end 1 includes, but is not limited to: target address, submitted parameters, data transmission capability control information, etc. The term "setTime" refers to the timing parameter, based on which the control apparatus is triggered to obtain data from the target end, as described in the following text. For example, "setTime": "1000" means that the control apparatus is set to send one request to the target end indicated by the target address every 1000 milliseconds to obtain data from the target end. For another example, "setTime": "0" means that the control apparatus is set to trigger the execution of obtaining data from the target end indicated by the target address according to the received signaling indicative of obtaining data as sent by the first end, such as an IN token. The detailed description of the signaling is provided in the other embodiments of the present application, and will not be repeated herein.

It should be added that if the communication protocol between the first end and the control apparatus 31 is Bluetooth protocol, when the first end is configured to be able to downlink data unidirectionally through a communication node on the control apparatus, the relevant information configured for the communication node can be the same as in Example 011. The difference only lies in that the communication node identification is in UUID format, e.g., "Communication Node Identification (UUID)": "0x00000001-XXX-XXXX-XXXX-00805F9B34FB"//it represents Characteristic (Read Characteristic) with Characteristic number 1. The representation of UUID is simplified in the relevant tables of the present application.

For the specific content that can be included in the other relevant parameters described in Table 8 and the following tables (such as Tables 9-12b), or more specific elaboration of the information in combination with Example 011 provided in Table 8 and the corresponding examples in the following tables (such as Tables 9-12b), see the relevant in the other embodiments of the present application, e.g., see the relevant content in Examples 11-13 provided in the other embodiments of the present application, which will not be elaborated herein.

After the control apparatus 31 is powered on and finishes reading the configuration information shown in Table 8, the endpoint 0 will be activated first according to the read configuration information. The endpoint 0 is an endpoint that must be activated by the control apparatus 31 by default, and is used for apparatus enumeration and basic control functions of the apparatus to establish handshake connection with the first end, i.e., for data interaction with the first end in the course of the handshake connection. Before finishing the enumeration with the first end, all other endpoints on the control apparatus 31 will not be activated, except the endpoint 0.

For example, with reference to the relevant content of establishing handshake connection between the control apparatus 31 and the first end as shown in FIG. 20, after activating the endpoint 0, the control apparatus 31 sends an enumerable electrical signal to the first end through the endpoint 0, and enters the enumeration procedure of a standard request under USB protocol rules, so as to perform repeated enumeration with the first end and establish handshake connection therewith (i.e., establish communication connection as described in the other embodiments in the context); wherein in the course of enumeration, the requests sent by the first end can include, but are not limited to: requests for obtaining descriptors (such as apparatus descriptors, configuration descriptors, interface descriptors, endpoint descriptors, and string descriptors), setting requests (e.g., setting USB apparatus addresses, setting configuration), and verification requests (e.g., sending passwords for logging on apparatus access control or keys for subsequent data transmission). The control apparatus 31 will respond to the request sent by the first end. When responding to the verification request sent by the first end, it will verify the verification data carried in the verification request. After the verification is passed, an endpoint 1 is activated, and the verification result is returned to the first end through the endpoint 0 to inform the first end that the verification is passed, the activation of the endpoint 1 has been completed, and data can be transmitted to the endpoint 1.

It should be added that in the relevant content of establishing handshake connection between the control apparatus 31 and the first end as shown in FIG. 20, the SETUP token as provided is used for notifying the apparatus that one data packet will be output, and it is only used for control transmission and plays a control role, i.e., notifying the endpoint of the control apparatus that one data packet will be sent soon. For the detailed description of the specific function of the SETUP token, see the existing relevant content.

For the specific implementation of establishing handshake connection between the control apparatus 31 and the first end, see the relevant content in the other embodiments of the present application, which will not be elaborated herein.

It should be added that some of the preceding content involved in establishing handshake connection can be optional. For example, the content relevant to the descriptors is optional, and the descriptors (such as endpoint descriptors) can be preset in the first end. Specifically, they can be preset in the driver software of the control apparatus installed on the first end through the configuration file, so that the first end does not obtain the descriptors by requesting them from the control apparatus. The practice can reduce data interaction in the course of handshake connection and improve the security of handshake connection; moreover, the practice can also prevent software installed on the first end from obtaining endpoint information of the control apparatus by obtaining the descriptors, and further from performing data interaction with other ends directly through the control apparatus without going through the first end (more specifically, the control apparatus driver deployed on the first end). In addition, all data (descriptor set, including endpoint information) required in handshake or data exchange and setting instructions (such as address (USB bus address allocated by the first end) setting instructions or configuration enabling instructions) can be preset separately at the first end and the control apparatus. When it is started (the default endpoint 0 is disabled), the control apparatus is set according to the preset USB bus address, and the transmission endpoint is activated. The first end performs verification and data exchange directly through the transmission endpoint. It is equivalent to skipping the stage of establishing handshake connection in Step 2 of FIG. 20, and disabling the default endpoint 0 (control transmission, bidirectional transmission) to prevent the risk of bidirectional connection (both uplink transmission and downlink transmission exist simultaneously) existing in data transmission.

In addition, in the course of handshake connection, since the control apparatus 31 activates the endpoint 0 (which is a bidirectional endpoint, i.e., an IN/OUT endpoint), the first end is allowed to downlink and uplink data through the endpoint 0. In this case, the first end may send an instruction (or a request) irrelevant to the handshake connection to the endpoint 0, such as a request obtaining instruction or a data sending instruction; as a result, in response to the request obtaining instruction, the control apparatus sends data that are not required in the handshake connection (such as application data from other ends) to the first end, or in response to the data sending instruction, it sends data carried in the instruction to other ends, thereby causing the first end to downlink or uplink data unexpectedly. To solve this problem, instructions, response to which is allowable in the course of handshake connection, can be preset in in the control apparatus 31, so that the control apparatus can only respond to the instructions that meet requirements through the endpoint 0, such as "0.0005XX0000000000" (an address setting instruction, the bytes XX can be changed dynamically), "0x8006000100001200" (an apparatus descriptor obtaining instruction), "0x800600020000900" (a configuration descriptor obtaining instruction 1), "0x800600020002000" (a configuration descriptor obtaining instruction 2). In the course of handshake connection, if the instruction sent by the first end to the endpoint 0 does not meet the requirements, it will be ignored, and there will be no response thereto. Further, the data buffer corresponding to the endpoint 0 can be an independent storage area, and the endpoint 0 does not share the data buffer with other endpoints (such as endpoint 1 and endpoint 2) in the control apparatus 31, in order to avoid uploading non-handshake-connection data (such as application data) of the first end to other ends through the endpoint 0 in the case that the first end is controlled by malicious software and the like, and causing the first end to uplink data unexpectedly. In addition, upon the completion of establishing the handshake connection, the control apparatus can immediately disable the endpoint 0, so that the first end cannot uplink or downlink data to other ends (such as the second end) through the endpoint 0 unexpectedly. Of course, in some other embodiments, the control apparatus 31 may not disable the endpoint 0. Whether to disable the endpoint 0 can be specifically determined according to various factors, such as the node type of at least one first communication node that needs to be activated on account of the first end, and whether the endpoint 0 needs to be used to obtain some parameters (such as the "preset identification of the first end") based on which the first end is controlled to uplink or downlink data. Regarding under what circumstances the endpoint 0 can continue to be enabled or disabled after the handshake connection is completed, it will be detailed below in combination with specific examples in the following text, and will not be elaborated herein.

Based on the above supplementary explanation, the method provided in the present embodiment can further comprise the following steps:

S103. after power-on is monitored, activating a second communication node according to the first configuration information, so as to establish handshake connection with the first end through the second communication node;

S104. in the process of establishing the handshake connection, determining whether an instruction sent by the first end to the second communication node meet requirements;

S105. if yes, responding to the instruction; if not, skipping responding to the instruction;

wherein the second communication node is one communication node that supports bidirectional transmission in the communication connection with the first end, and is used for data interaction with the first end in the course of handshake connection. For example, the second communication node can be the endpoint 0 as mentioned above, and can also be an endpoint (an IN/OUT endpoint, or Read/Write Characteristic) that must be activated by the control apparatus by default.

Further, in the control apparatus, a corresponding data cache area is independently set for the second communication node.

Moreover, the method provided in the present embodiment can further comprise the following steps:

S106. after successful establishment of the handshake connection, triggering execution of "activating at least one first communication node on account of the first end according to the first configuration information" in Step S101, and determining whether to disable the second communication node according to the node type of said at least one first communication node and a determination manner of the target end.

For the specific implementation of "determining whether to disable the second communication node" in Step 106, see the content relevant to the example described below in combination with FIG. 21.

Moreover, "activating at least one first communication node on account of the first end according to the first configuration information" in Step S101 can comprise:

S1011. obtaining the communication node activation information that is set on account of the first end from the first configuration information;

S1012. activating said at least one first communication node according to the communication node identification included in the communication node activation information.

In addition, optionally, after the control apparatus 31 is powered on, if, in addition to the first end, other target ends (such as the second end 21 and the second end 22) are detected, handshake connection can also be established with the target ends. For example, according to the preset configuration, the control apparatus 31 can initiate handshake connection to the target end, e.g., logging in to the target end, or obtaining data transmission credentials such as session information of the target end, wherein the connection between the control apparatus and the target end for data interaction can be long connection (such as SOCKET persistent connection), short connection (such as HTTP), or file exchange (such as FTP), etc., and the session is "session control", and the session information includes the attribute and configuration information among others as required to establish a session with the target end.

It should be added that in addition to setting an independent data buffer for the second communication node, corresponding independent data buffers can also be set for other communication nodes. In other words, in the present embodiment, the communication nodes can be isolated from each other with independent data buffers (not shared with each other). Wherein the independent data buffers can be based on software, such as independent buffers allocated by memory; alternatively, they can also be based on hardware, such as independent buffers of different storage chips.

Through the above content, the control apparatus 31 can control the data transmission capability of the first end on the level of the communication node, wherein the data transmission capability includes at least one of uplink data transmission capability and downlink data transmission capability. For example, if said at least one first communication node is an IN endpoint, since the control apparatus does not activate an OUT endpoint, the first end can only carry out transmission of downlink data to the corresponding target end through the activated IN endpoint on the control apparatus in the course of non-handshake-connection data interaction (such as batch transmission) with the control apparatus, and cannot carry out transmission of uplink data.

As such, assuming that the target communication node is one of said at least one first communication node, "controlling data transmission capability that the first end can have through each first communication node according to the node type of each first communication node" in Step S102 can specifically comprise:

S1021. determining a target end, with which the first end carries out data transmission through the target communication node;

S1022. controlling the first end to be able to uplink data to the target end when the node type of the target communication node is a first type;

S1023. controlling the first end to be able to downlink data to the target end when the node type of the target communication node is a second type.

In specific implementation, in an implementable solution, the target end can be determined according to the one-to-one binding relationship between communication nodes and target addresses, as shown in Table 8, Table 9, Table 10, and Tables 11a-11b, which provide simple examples of the binding relationship between the communication node on the control apparatus and the target address as configured on account of the first end.

TABLE 9

(an example of configuring the first end to only be able to downlink data (i.e., download data or obtain data) unidirectionally)

| Data transmission capability control information of the first end | Other relevant parameters | Communication node activation information of the control apparatus (communication node identification) | Target address of data transmission (the address of the target end) |
|---|---|---|---|
| RX: downlink data unidirectionally | Such as setTime | 0x01 (endpoint 1, an IN endpoint) | Address 21a (the second end 21a) |
| RX: downlink data unidirectionally | Such as setTime | 0x02 (endpoint 2, an IN endpoint) | Address 21b (the second end 21b) |

TABLE 10

(an example of configuring the first end to only be able to uplink data (i.e., send data) unidirectionally)

| Data transmission capability control information of the first end | Other relevant parameters | Communication node activation information of the control apparatus (communication node identification) | Target address of data transmission (the address of the target end) |
|---|---|---|---|
| TX: uplink data unidirectionally | #### | 0x13 (endpoint 3, an OUT endpoint) | Address 22 (the second end 22) |
| TX: uplink data unidirectionally | #### | 0x14 (endpoint 4, an OUT endpoint) | Address 23 (the second end 23) |
| TX: uplink data unidirectionally | #### | 0x15 (endpoint 5, an OUT endpoint) | Address 24 (the second end 24) |

In the case of configuring the first end to only be able to uplink data unidirectionally as shown in Table 10, taking the endpoint 3 in Table 10 as an example, the relevant information configured for the endpoint 3 can be specifically shown in Example 012 as follows.

Example 012

"Note": "The first end uplinks data unidirectionally, i.e., the client sends (uploads) data"
"Communication node identification": "0x13"
"Target address": "192.###0.1.1: 8000"

"Data transmission capability control information": "TX"
"Submitted parameters": [{"token": "Control****=###1"}];

As such, in an implementable solution, "determining a target end, with which the first end carries out data transmission through the target communication node" in Step S1021 can be implemented in the following steps:

S10211. obtain a one-to-one binding relationship between communication nodes and target addresses according to the first configuration information;

S10212. determining a target address that has a binding relationship with the target communication node according to the one-to-one binding relationship between communication nodes and target addresses;

S10213. determining the target end according to the target address that has a binding relationship with the target communication node.

In the structure diagram of the data transmission system as shown in FIG. 3*a*, an example of one-to-one binding between communication nodes and target addresses is illustrated.

Of course, the target end can also be determined in other manners, which will be detailed in the present application.

It should be noted that the target end addresses, i.e., the address 21*a*, the address 21*b*, the address 22, the address 23, and the address 24, can respectively represent different second ends in hardware (e.g., different servers), or different second ends in network services (e.g., the same server but different network services).

According to the content relevant to the endpoints in the USB protocol as elaborated in the other embodiments of the present application, the target communication node is generally a unidirectional communication node. In the case that the target communication node is a unidirectional communication node, the first end only has unidirectional data transmission capability for the target end through the target communication node. For example, if the node type of the target communication node is the first type (such as an OUT endpoint), the first end can only uplink data unidirectionally to the target end, and if the node type of the target communication node is the second type (such as an IN endpoint), the first end can only downlink data unidirectionally to the target end. Of course, in some other embodiments, it is not ruled out that in the control apparatus, in addition to the default communication node (such as the endpoint 0) as a bidirectional communication node other additional communication nodes may also be defined as bidirectional communication nodes that comply with the corresponding communication protocol specifications, i.e., the target communication node may also be a bidirectional communication node (such as an IN/OUT endpoint). In the case that the target communication node is a bidirectional communication node (such as an IN/OUT endpoint, i.e., the node type thereof is the third type), the first end can carry out bidirectional data transmission to the target end through the target communication node, i.e., it can uplink and downlink data. Therefore, Step S102 can further comprise the following steps:

S1024. controlling the first end to be able to uplink and downlink data to the target end when the node type of the target communication node is a third type.

It should be added that if only the default communication node in the control apparatus is a bidirectional communication node and all other additional nodes are unidirectional communication nodes, then two different types of unidirectional communication nodes can be used to control the first end to be able to uplink and downlink data to one target end. For example, as shown in Table 11a, one IN endpoint and one OUT endpoint in the control apparatus are bound to the same target address (e.g., they are bound to the address 22 of the second end 22) on account of the first end, so as to control the first end to be able to simultaneously uplink and downlink data to one corresponding target end.

TABLE 11a (an example of configuring the first end to be able to uplink and downlink data)

| Data transmission capability control information of the first end | Other relevant parameters | Communication node activation information of the control apparatus (communication node identification) | Target address of data transmission (the address of the target end) |
|---|---|---|---|
| RX: downlink data unidirectionally | Such as setTime #### | 0x01 (endpoint 1, an IN endpoint) | Address 22 (the second end 22) |
| TX: uplink data unidirectionally | | 0x13 (endpoint 3, an OUT endpoint) | Address 22 (the second end 22) |

In addition, if only the default communication node in the control apparatus is a bidirectional communication node and all other additional communication nodes are unidirectional communication nodes, the activation of different types of unidirectional communication nodes on the control apparatus can also be configured to control the first end to be able to uplink and downlink data through the control apparatus, wherein the uplink data and the downlink data of the first end correspond to different target ends. For example, as shown in Table 11b, the activation of two different types of endpoints in the control apparatus can be configured on account of the first end: one IN endpoint and one OUT endpoint, wherein the target address bound to the IN endpoint is the address 22, and the target address bound to the OUT endpoint is the address 23, so as to control the first end to simultaneously have different data transmission capabilities for different target ends. For example, the first end can downlink data to the second end 22 and uplink data to the second end 23.

TABLE 11b (an example of configuring the first end to be able to uplink and downlink data)

| Data transmission capability control information of the first end | Other relevant parameters | Communication node activation information of the control apparatus (communication node identification) | Target address of data transmission (the address of the target end) |
|---|---|---|---|
| RX: downlink data unidirectionally<br>TX: uplink data unidirectionally | Such as setTime #### | 0x01<br>(endpoint 1, an IN endpoint)<br>0x13<br>(endpoint 3, an OUT endpoint) | Address 22<br>(the second end 22)<br>Address 23<br>(the second end 23) |

Two examples are provided below to elaborate the specific implementation of the first end uplinking data unidirectionally and downlinking data unidirectionally, respectively.

For example, in the same example given in combination with Table 8 and as shown in FIG. 20 again, assuming that only one endpoint 1 (an IN endpoint) is activated on account of the first end and the target end indicated by the target address bound to the endpoint 1 is the second end 21 after the control apparatus 31 successfully establishes handshake connection with the first end, then the first end can only downlink data unidirectionally to the second end 21 through the control apparatus 31. The specific implementation of downlinking data unidirectionally can include two manners of implementation as follows: downlinking data automatically and unidirectionally and downlinking data unidirectionally according to needs.

Downlinking data automatically means that the control apparatus 31 requests data from the second end 21 automatically, periodically and actively, stores the data returned by the second end 21 in a data cache area corresponding to the endpoint 1, and when push conditions are met, pushes the data returned by the second end 21 to the first end through the endpoint 1, wherein the push conditions can include, but are not limited to, at least one of the following items: push time, data volume greater than a set threshold value, receiving a signaling (such as an IN token packet) indicative of sending data to the first end, etc. For example, in the case that the control apparatus 31 communicates with the first end on the basis of the USB protocol, the control apparatus can passively trigger the push of data to the first end through the endpoint 1 after it is monitored that the endpoint 1 receives the IN token packet sent by the first end.

It should be added that in the case that the control apparatus 31 communicates with the first end on the basis of the Bluetooth protocol, if the only one communication node activated by the control apparatus on account of the first end is Characteristic with Notify attribute, the control apparatus 31 can automatically trigger the real-time or periodic push of data to the first end through Characteristic with Notify attribute at the set push time; alternatively, according to the set push condition that the data volume is greater than a set threshold value, it can automatically trigger the push of data to the first end through Characteristic with Notify attribute when it is determined that the volume of the data received from the second end is greater than the set threshold value.

In the above manner that the control apparatus asynchronously requests data from the second end 21 in advance, the transmission speed of downlinking data from the first end can be improved. The content relevant to "unidirectional transmission downlink (automatic retrieval)" shown in FIG. 20 corresponds to said downlinking data automatically and unidirectionally.

Downlinking data unidirectionally according to needs means that the control apparatus 31 passively requests data from the second end 21 after monitoring the signaling (such as an IN token packet) indicative of obtaining data as sent by the first end to the endpoint 1, stores the data returned by the second end 21 in a data cache area corresponding to the endpoint 1, and when push conditions are met, pushes the data returned by the second end 21 to the first end through the endpoint 1. For example, with reference to the content relevant to "unidirectional transmission downlink (automatic retrieval)" shown in FIG. 20, when the first end needs to obtain data from the second end, it can send an IN token packet to the endpoint 1 of the control apparatus 31, so as to instruct the control apparatus 31 to return the data (such as the resource data required by the application on the first end and stored in the second end) of the second end thereto. At this time, no relevant data are stored in the data cache area corresponding to the endpoint 1. In response to the received IN token packet, the control apparatus 31 can return a corresponding response status packet, such as a NAK packet (without data that can be pushed), to the first end through the endpoint 1, so as to inform it that no data can be pushed at present. Further, the control apparatus 31 will trigger the execution of requesting data from the second end 21, and cache and store the data received from the second end 21. When receiving the IN token packet that the first end continues to retry sending to the endpoint 1 again, it will return the data obtained from the second end 21 and an ACK status packet to the first end.

Whether it is downlinking data automatically and unidirectionally or downlinking data unidirectionally according to needs can be determined according to the setTime parameter in the configuration information. The setTime parameter is the timing parameter that instructs the control apparatus to trigger the retrieval of data from the target end. For the detailed description of setTime, see the relevant content in the other embodiments of the present application, such as the relevant content in Example 12.

It should be added that in the scenario of downlinking data unidirectionally, the control apparatus 31 generates a retrieval request according to the built-in preset request parameters, and sends the retrieval request to the second end to request data from the second end. In addition, in the scenario of downlinking data unidirectionally, due to some factors, the control apparatus may receive data that are not a signaling such as an IN token packet and sent by the first end. For example, the first end may send data that are not a signaling such as an IN token packet through the default communication node (such as the endpoint 0 for controlling transmission, such as handshake connection) on the control apparatus. In this case, if it is monitored that the first end has sent data that are not a signaling such as an IN token packet to the endpoint 1, such as a request data packet containing request parameters, the control apparatus 31 will not forward the received request data packet to the second end 21, but can make a record. For the configuration information set for controlling the first end to only be able to downlink data unidirectionally through the endpoint 1 (an IN endpoint), see the examples provided in the other embodiments in the previous text, such as Example 011.

For another example, in combination with the content relevant to "uplinking data unidirectionally" as shown in Table 10 and FIG. 20, assuming that the communication nodes activated on account of the first end are all OUT endpoints, the first end can only uplink data unidirectionally. Taking the endpoint 3 (which is an OUT endpoint) as the target communication node and the second end 22 as the target end corresponding to the endpoint 3 for example, the first end can uplink data unidirectionally to the second end 22 through the endpoint 3 in the following course: the first end sends to the endpoint 3 of the control apparatus 31 a signaling, such as an OUT token packet, for instructing the control apparatus to receive data and a data packet b (or a message) that needs to be transmitted to the second end 22; in response to the OUT token packet, the control apparatus 31 can directly forward the received data packet b to the second end 22 in real time on the basis of the OUT token packet according to the preset configuration thereof, or it can also temporarily store the data packet b in a data cache area corresponding to the endpoint 3, and when the preset sending conditions are met, trigger the automatic execution of forwarding the data packet b to the second end 22, wherein the preset sending conditions can be, but are not limited to: data storage time is greater than or equal to the set time threshold value, the accumulated data storage volume reaches the set data volume, the set sending time is reached, etc. Further, due to the limitation that the first end can only uplink data unidirectionally, the control apparatus 31 may not return a corresponding response status packet to the first end, such as an ACK packet (successfully sending), a NAK packet (sending failure), or a STALL packet (impossible to determine the sending status), etc.; alternatively, according to security control needs, a corresponding response status packet can also be returned on the basis of whether data are uplinked successfully; alternatively, regardless of whether data are uplinked successfully, the same status packet is always returned, e.g., one of the ACK packet, the NAK packet, and the STALL packet is returned.

For the configuration information set for controlling the first end to only be able to uplink data unidirectionally through the endpoint 3 (an OUT endpoint), see the examples provided in the other embodiments in the previous text, such as Example 012.

Based on the above description, in an implementable solution, "controlling the first end to be able to uplink data to the target end when the node type of the target communication node is a first type" in Step S1022 can specifically include:

S10221. obtaining a timing parameter for triggering data retrieval, which parameter is arranged on account of the target communication node;

S10222. obtaining data from the target end according to the timing parameter, in preparation for sending the data as obtained to the first end.

For the detailed description of the timing parameter, see the content relevant to "setTime" in the embodiments of the present application.

Moreover, "obtaining data from the target end according to the timing parameter, in preparation for sending the data as obtained to the first end" in Step S10222 can be implemented in the following steps:

S102221. if the timing parameter is a first value, periodically obtaining the data from the target end;

S102222. if the timing parameter is a second value, when monitoring a signaling that is sent by the first end to the target communication node and used for indicating that data need to be sent to the first end, obtaining the data from the target end.

The first value can be a non-zero time value, such as 1000 ms. At this time, data retrieval from the target end can be automatically triggered every 1000 ms. The second value can be zero. If the communication protocol between the control apparatus and the first end is USB protocol, the signaling for instructing that data need to be sent to the first end can be an IN token packet. At this time, every time it is monitored that the target communication node receives an IN token packet, data retrieval from the target end can be triggered. For the detailed description of the signaling, see the relevant content in the other embodiments of the present application.

Wherein, before executing Step S102222 of "obtaining the data from the target end", steps can further include:

searching a data cache area corresponding to the target communication node for data relevant to the target end;

if the data is found, sending the found data relevant to the target end to the first end;

if the data is not found, sending a corresponding response status packet (such as a NAK packet) to the target end to inform the first end that there are no adapted data to send, and triggering execution of the step of obtaining data from the target end.

Moreover, "obtaining the data from the target end" in Step S102221 or S102222 can be implemented in the following steps:

G11. obtaining a preset request parameter that is arranged on account of the target communication node;

G12. generating and sending a retrieval request to the target end according to the preset request parameter;

G13. receiving the data returned by the target end in response to the retrieval request, and storing the data in the data cache area corresponding to the target communication node.

The timing parameter, the preset request parameter, and the data transmission capability control information described in the context of the present embodiment can all be obtained from the built-in configuration information of the control apparatus.

The above content mainly describes the implementation of controlling the data transmission capability for the first end from the perspective of the communication nodes alone. Regarding the implementation of control on the level of the communication nodes alone, the communication nodes and the target ends are in a one-to-one relationship, and the first end can only uplink and/or downlink data to/from a single target end through one communication node. To multiplex the communication node and enable such a one-to-many relationship between the communication nodes and the target ends that the first end can uplink and/or downlink data to/from multiple target ends through one communication node, further, the solution provided in the present embodiment can configure a "preset identifications" (or a "preset string") for the first end or the target end, and use the "preset identification" (or "preset string") to solve problems of receiving or sending data from or to multiple target ends by multiplexing the communication nodes under the circumstances of a limited or insufficient number of communication nodes.

The "preset identification" is preset on account of pre-registered services on the first end or the target end. One preset identification corresponds to one pre-registered service, and can be used for hiding the address of a corresponding end or as the address of the corresponding end instead of hiding the address. For details about the preset identification, see the relevant content in the other embodiments of the present application, which will not be elaborated herein. When the user creates a corresponding configuration file on account of the first end, he or she can bind at least one preset identification to one communication node according to his or her own needs. As one preset identification can determine one target address, the problems of receiving or sending data from or to multiple target ends can be solved by multiplexing the communication nodes through the "preset identification". In other words, when creating a configuration file on account of the first end, the user can configure the corresponding information in the following configuration format for the communication nodes that need to be activated in the control apparatus:

"Note": "the data transmission function (such as downlinking data unidirectionally or uplinking data unidirectionally) of the first end"

"Communication node identification": "****"

"Preset identification": "preset identification 1, preset identification 2, . . . "

When configuring a communication node to bind a preset identification thereto, the preset identification of the first end or the preset identification of the target end can be bound to the communication node according to the node type thereof. If the preset identification of the first end is bound thereto, the target address can be obtained from the correlation information associated with the bound preset identification. If the preset identification of the target end is bound thereto, the target address can be directly determined according to the bound preset identification.

For example, if the node type of the communication node is the first type, e.g., the communication node is an OUT endpoint, the communication node can be bound to at least one preset identification of the first end (or, it can also be bound to the preset identification (such as the target address) of the target end). If the node type of the communication node is the second type, e.g., the communication node is an IN endpoint, the communication node can be bound to at least one preset identification (which directly is the target address or a string that has the function of hiding the target address) of the target end. Of course, if the node type of the communication node is the second type, the communication node can also be bound to the preset identification of the first end. In the present embodiment, limitations are not imposed thereon.

Tables 12a and 12b, as well as Tables 13a and 13b, respectively show simple examples of multiplexing the endpoints on the control apparatus through the preset identifications included in the configuration information that are preset on account of the first end.

TABLE 12a (an example of configuring the first end to only be able to downlink data unidirectionally)

| Communication node activation information of the control apparatus (communication node identification) | Preset identification of the target end | Other binding information: Data transmission capability control information | Other binding information: Other relevant parameters |
|---|---|---|---|
| 0x01 (endpoint 1, an IN endpoint) | 0x2B (for hiding the address 21a of the second end 21a) | RX: downlink data unidirectionally | Such as setTime |
| | 0x3B (for hiding the address 21b of the second end 21b) | RX: downlink data unidirectionally | Such as setTime |

TABLE 12b (an example of configuring the first end to only be able to downlink data unidirectionally)

| Communication node activation information of the control apparatus (communication node identification) | Preset identification of the target end | Correlation information associated with the preset identification: Data transmission capability control information | Correlation information associated with the preset identification: Target address of data transmission (the address of the target end) | Correlation information associated with the preset identification: Other relevant parameters |
|---|---|---|---|---|
| 0x01 (endpoint 1, an IN endpoint) | 0x0B | RX: downlink data unidirectionally | Address 21a (the second end 21a) | Such as setTime |
| | 0x1B | RX: downlink data unidirectionally | Address 21b (the second end 21b) | Such as setTime |

For the correlation information that can be specifically associated with the preset identification in Table 12b, see the content relevant to Example 12 provided in the other embodiments of the present application.

Through the configuration shown in Table 12a or Table 12b, when the first end needs to be controlled to be able to downlink data to different target ends, all the endpoints 1 on the control apparatus can be multiplexed.

For example, in combination with Table 12a, when the first end needs to obtain data, it can send an IN token packet to the endpoint 1 of the control apparatus 31, so as to instruct the control apparatus 31 to return the data (such as the resource data required by the application on the first end and stored in the second end) of the second end thereto. At this time, no relevant data are stored in the data cache area corresponding to the endpoint 1. In response to the received IN token packet, the control apparatus 31 can return a corresponding response status packet, such as a NAK packet (without data that can be pushed), to the first end through the endpoint 1, so as to inform it that no data can be pushed at present. Further, the control apparatus 31 will execute the step of determining the corresponding target address according to the preset identification of the target end bound to the endpoint 1. For example, the address 21*a* of the second end 21*a* is determined according to the preset identification 0x2B, and the address 21*b* of the second end 21*b* is determined according to the preset identification 0x3B; then, according to the address 21*a* and the address 21*b*, data are respectively requested from the second ends 21*a* and 21*b*, and the received data respectively returned by the second ends 21*a* and 21*b* are cached and stored; when the IN token packet that the first end continues to retry sending to the endpoint 1 is received again, the data obtained from the second ends 21*a* and 21*b* and an ACK status packet are returned to the first end through the endpoint 1, so that the first end can simultaneously obtain (download) data from different ends through the endpoint 1 alone.

Figure 21:
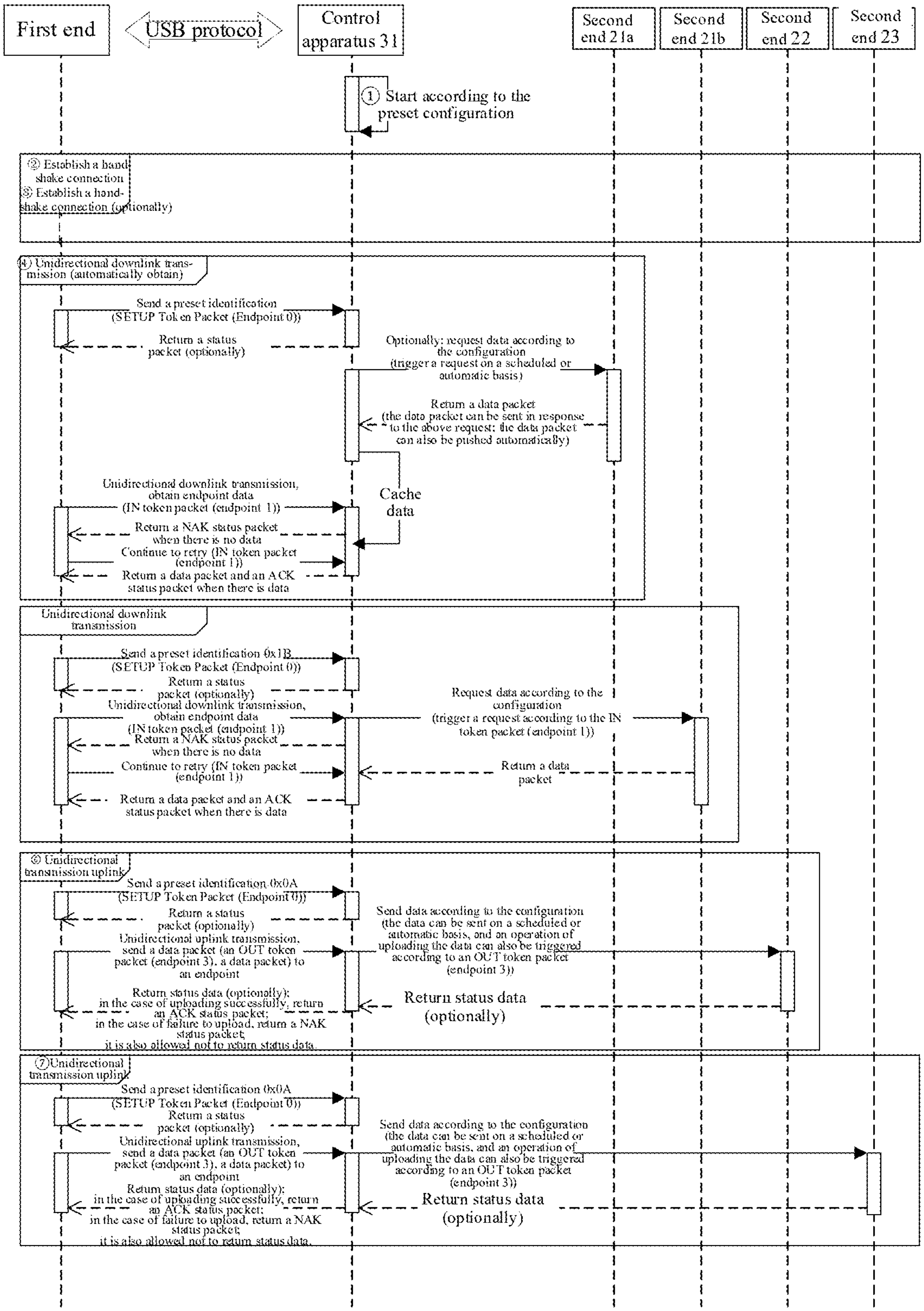

For another example, in combination with FIG. 21 and Table 12b, when the first end needs to obtain data, it can send an IN token packet to the endpoint 1 of the control apparatus 31, so as to instruct the control apparatus 31 to return the data of the second end thereto. At this time, no relevant data are stored in the data cache area corresponding to the endpoint 1. In response to the received IN token packet, the control apparatus 31 can return a corresponding response status packet, such as a NAK packet, to the first end through the endpoint 1, so as to inform it that no data can be pushed at present. Further, the control apparatus 31 will execute the respective configuration (i.e., the associated correlation information) of the preset identifications 0x0B and 0x1B of the first end bound to the endpoint 1, request data respectively from the second end 21*a* indicated by the address 21*a* and the second end 21*b* indicated by the address 21*b*, and cache and store the received data respectively returned by the second end 21*a* and the second end 21*b*; when the IN token packet that the first end continues to retry sending to the endpoint 1 is received again, the data obtained from the second ends 21*a* and 21*b* and an ACK status packet are returned to the first end through the endpoint 1, so that the first end can simultaneously obtain (download) data from different ends through the endpoint 1 alone.

Wherein, in combination with Example 12 provided in the other embodiments of the present application, taking the control apparatus request data from the second end 21*a* indicated by the address 21*a* as an example, the specific requesting course can be as follows: firstly, obtaining the correlation information associated with the preset identification 0x0B, and obtaining the address 21*a* (the target address, such as "192.###0.1.1: 8001"), as well as the parameters (such as "getDataID=1") that need to be submitted for the request, from the correlation information associated with the preset identification 0x0B; then, generating a request data packet according to the parameters that need to be submitted for the request, and sending the request data packet to the second end 21*a* according to the address 21*a*, so as to request data from the second end 21*a*.

It should be added that in the context of the embodiments of the present application, when sending the data returned by the target end such as the second end 1*a* to the first end, the control apparatus can add a preset identification (such as the real address of the target end) corresponding to the target end in the corresponding data packet; afterwards, it sends the data packet to the first end, so that the first end distinguishes which target end the data included in the data packet originate from. Alternatively, the data can be sent directly to the first end without adding the preset identification corresponding to the target end. Based on the data content in the data packet, the first end performs automatic filtering according to the preset configuration (e.g., the second end 21*a* corresponds to HTTP data, the second end 211 corresponds to video stream data, and the second end 211 corresponds to file data), so as to judge which target end the data is from. Of course, the first end can also judge which target end the received data come from in other filtering manners, e.g., it can perform filtering according to the preset identification bound to the endpoint 1.

By using the example of reusing IN endpoints shown in Table 12a or Table 12b above, the problem of the first end downloading data from multiple target ends can be solved in situations where endpoints are limited and few.

TABLE 13a (an example of configuring the first end to only be able to uplink data unidirectionally)

| Communication node activation information of the control apparatus (communication node identification) | Preset identification of the first end | Correlation information associated with the preset identification: Data transmission capability control information | Target address of data transmission (the address of the target end) | Other relevant parameters |
|---|---|---|---|---|
| 0x13 (endpoint 3, an OUT endpoint) | 0x0A | TX: uplink data unidirectionally | Address 22 (the second end 22) | #### |
| | 0x1A | TX: uplink data unidirectionally | Address 23 (the second end 23) | #### |

For the specific correlation information associated with the preset identification in Table 13a, see the relevant content of Example 11 provided in the other embodiments of the present application.

TABLE 13b (an example of configuring the first end to only be able to uplink data unidirectionally)

| Communication node activation information of the control apparatus (communication node identification) | Preset identification of the target end | Other binding information: Data transmission capability control information | Other binding information: Other relevant parameters |
|---|---|---|---|
| 0x13 (endpoint 3, an OUT endpoint) | 0x2A (for hiding the address 22 of the second end 22) | RX: downlink data unidirectionally | #### |
| | 0x3A (for hiding the address 22 of the second end 22) | RX: downlink data unidirectionally | #### |

Through the configuration as shown in Table 13a or Table 13b, when the first end needs to be controlled to uplink data to different target ends, all the OUT endpoints 3 on the control apparatus can be multiplexed.

Figure 23A:
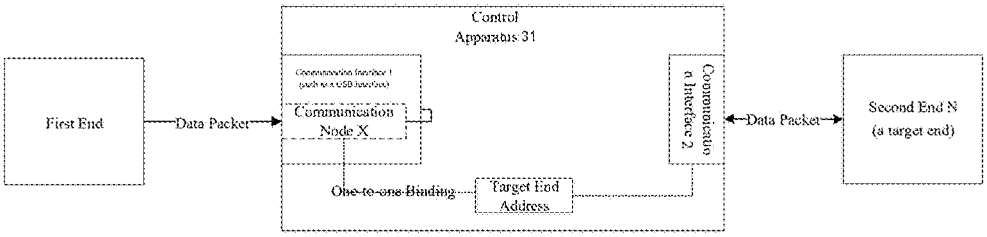
FIGS. 23*a* to 23*d* and FIG. 24 are structure diagrams of data transmission control systems provided in the embodiments of the present application.
Figure 23B:
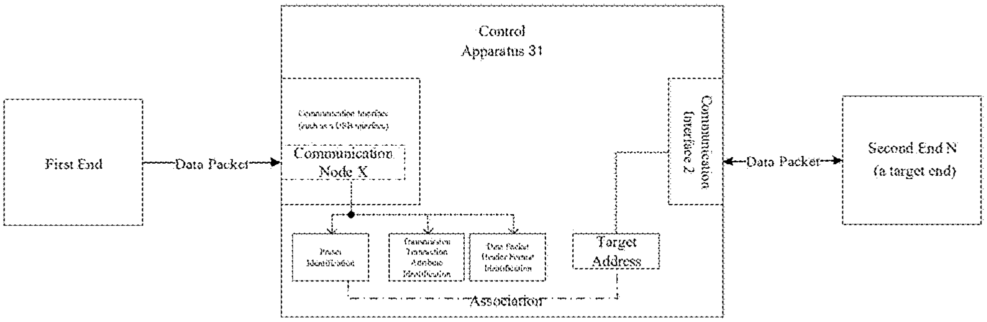

FIG. 23*b* shows an example of the situation that the communication node is bound to the preset identification.

Through the example of multiplexing the OUT endpoint shown in Table 13a or Table 13b, the problem how the first end sends data to multiple target ends in the case of a limited and relatively small number of endpoints can be solved.

For example, in combination with FIG. 21, FIG. 3*b*, and Table 13a, assuming that the first end needs to transmit a data block data1, after sending the data block data1 to the endpoint 3 of the control apparatus 31, the control apparatus 31 can first obtain the correlation information respectively associated with the preset identification 0x0A and the preset identification 0x1A of the first end bound to the endpoint 3 according to the configuration information preset therein; then, it obtains the corresponding target address such as the address 22 from the correlation information associated with the preset identification 0x0A, and obtains the corresponding target address such as the address 23 from the correlation information associated with the preset identification 0x1A; finally, according to the address 22 and the address 23, it sends the data block data1 respectively to the second end 22 indicated by the address 22 and the second end 23 indicated by the address 23, thereby controlling the first end to send the data block data1 to the second end 22 and the second end 23.

For another example, in combination with FIG. 23*b* and Table 13b, assuming that the first end needs to transmit a data block data2, after sending the data block data2 to the endpoint 3 of the control apparatus 31, the control apparatus 31 can directly determine the corresponding target address according to the preset identifications (0x2A, 0x3A) of the target end bound to the endpoint 3, e.g., it determines the address 22 of the second end 22 according to the preset identification 0x2A and the address 23 of the second end 23 according to the preset identification 0x3A; afterwards, according to the address 22 and the address 23, it forwards the received data block data2 to the second end 22 and the second end 23, respectively.

In the solutions shown above in combination with Tables 12a to 13a, the control apparatus requests or sends data from or to the target end according to the preset identification bound to the communication node. As can be seen, the target end of the data transmission communication is directly controlled by the control apparatus through the communication node, and the first end cannot access the preset identification. This practice can effectively protect the privacy of the target end in the unidirectional data transmission. It should be noted that the preset identification is used for indicating the target address. Optionally, in combination with FIG. 23*a*, instead of indicating the target address through the preset identifications, the target address, such as 192.###0.1.1: 8001, is directly bound according to the communication node.

Based on the content relevant to binding the communication node to the preset identification as described above, in another implementable technical solution, "determining a target end, with which the first end carries out data transmission through the target communication node" in Step S1021 can specifically comprise:

S10211'. obtaining a preset identification bound to the target communication node according to the first configuration information;

S10212'. determining the target end according to the preset identification;

S10213'. determining the target end according to the target address;

wherein the preset identification bound to the target communication node is a preset identification of the target end or a preset identification of the first end; if the target communication node is bound to the preset identification of the first end, Step S10212' is implemented in the following steps:

S01. obtaining correlation information associated with the preset identification;

S02. obtaining the target address from the correlation information.

It should be noted that, in the case of using the preset identifications to multiplex the communication nodes to control the first end to send data to multiple target ends as introduced above and below, when sending data that needs be transmitted to the control apparatus, in order to enable the control apparatus to know which target end the received data are specifically sent to, the first end can add at least one of the following items to the data packet containing the data that needs be transmitted: the preset identification and the transaction attribute identification of the transmission action corresponding to the data stream to which the data block that needs to be transmitted belongs, so that after receiving the data packet, the control apparatus can forward the data packet to a corresponding target end according to the preset identification or the transaction attribute identification included therein; wherein the added preset identification can include: the preset identification of the first end and/or the preset identification of the target end. Further, the preset identification, equivalent to the content such as the transaction attribute identification of the transmission transaction and the preset string, has functions of indicating the target end, penetrating the indicator data, or the like. To avoid repetition, the preset identification takes the place of some of them in the expression.

For example, when the first end needs to transmit a data block data1, the first end can determine the corresponding transmission transaction Trans_affairs1 on account of the data stream to which the data block data1 belongs according to the configuration information preset therein, and obtain the transmission transaction attribute information of the transmission transaction Trans_affairs1, thereby obtaining the preset identification of the target end from the transmission transaction attribute information of the transmission transaction Trans_affairs1; further, according to the correspondence between the preset identification of the first end as included in the preset configuration information and the transaction type, the first end can determine the preset identification of the first end, such as the preset identification 0x0A, which has a correspondence with the transaction type of the transmission transaction Trans_affairs1; afterwards, the first end can package the data block data1, the determined preset identification 0x0A of the first end, and/or the preset identification of the target end to form one data packet data_package1 (or a message), and send the data packet to the control apparatus; specifically, according to the binding relationship between the communication node included in the preset configuration information and the preset identification of the first end, the first end sends the data packet data_package1 to the communication node on the control apparatus, such as the endpoint 3 in Table 13a, which node has a binding relationship with the preset identification 0x0A. The control apparatus can determine the target address according to the preset identification included in the data packet data_package1; specifically, for example, it can directly determine the target address according to the preset identification of the target end as included in the data packet data_package1, or it can also obtain the correlation information associated with the preset identification 0x0A according to the preset identification 0x0A of the first end as included in the data_package, and obtain the target address from the correlation information associated with the preset identification 0x0B; then, according to the target address (such as the address 22), the control apparatus forwards the data packet data_package1 to the target end (such as the second end 22) indicated by the target address.

For another example, when the first end needs to transmit a data block data1, after determining the corresponding transmission transaction Trans_affairs1 on account of the data stream to which the data block data1 belongs, the first end can directly generate one data packet data_package2 according to the transaction attribute identification of the transmission transaction Trans-affairs1 and the data block data1, and send the data packet to the control apparatus. In response to the received data packet data_package2, the control apparatus can execute the following operations: parsing the data block data1 and the corresponding transaction attribute identification from the data packet data_package2, then obtaining the corresponding transaction attribute information from the configuration information preset therein according to the parsed transaction attribute identification, further determining the target address according to the preset identification of the target end as included in the transaction attribute information, and forwarding the data block data1 to the target end indicated by the target address. Wherein the first end determines the transaction attribute identification of the transmission transaction Trans_affairs1 by executing the following steps: determining the transaction type of the transmission transaction Trans_affairs1 according to transmission demand information of the data stream to which the data block data1 belongs; determining the transaction attribute identification that has a correspondence with the transaction type of the transmission transaction Trans_affairs1 on the basis of the correspondence between the transaction type and the transaction attribute identification.

Of course, in some other embodiments, when sending data that needs to be transmitted to the target end to the control apparatus, the first end may not add the preset identification and/or the transaction attribute identification in the corresponding data packet. Instead, it directly generates a regular data packet according to the data block that needs to be transmitted and sends the data packet to the control apparatus. On the basis of the data content in the data packet, the control apparatus performs automatic filtering according to the preset configuration (e.g., including data packet identification characteristics, such as particular binary data) to determine the corresponding target end. For example, in combination with Table 13a, after the first end directly packages the data block data1 that needs to be transmitted to form one data packet data_package' and sends the data packet to the endpoint 3 of the control apparatus, the control apparatus can parse the data block data1 from the data packet data_package', then determine the preset identification of the first end, such as the preset identification 0x0A, on account of the data block data1 according to the configuration information preset therein, further obtain the target address (such as the address 22) from the correlation information associated with the preset identification 0x0A, and send the data block data1 to the target end (such as the second end 22) according to the obtained target address. For the specific implementation of determining the preset identification of the first end on account of the data block data1, see the relevant content of the above example, or see the relevant content in the other embodiments of the present application.

Based on the above description, in the present embodiment, the data packets sent by the first end to the control apparatus can be of two types as follows:

- the first type: the data packet includes the specific data content that needs to be transmitted, as well as at least one of the preset identification of the first end, the preset identification of the target end, and the transaction attribute identification.
- the second type: the data packet only includes the specific data content that needs to be transmitted.

Figure 23C:
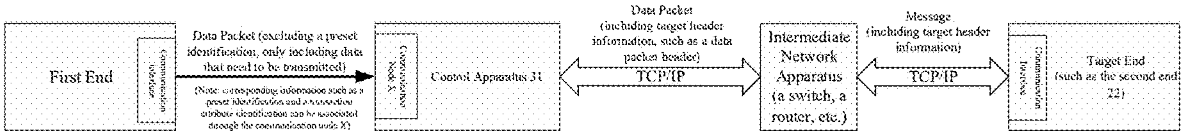
Figure 23D:
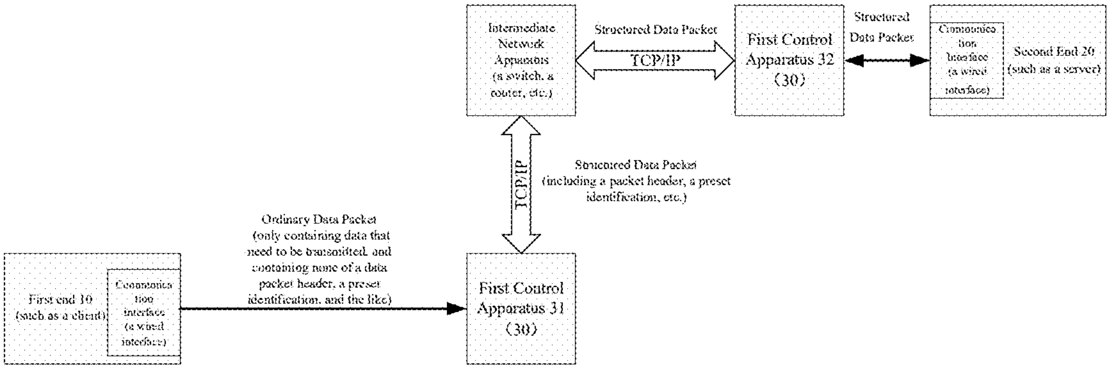

In FIGS. 23*c* and 23*d*, examples of the first end sending a regular data packet to the control apparatus (without adding preset identifications, etc.) are shown.

For incomplete information on the transmission transactions involved in the context of this embodiment, see the relevant content in other embodiments of the context of the present application.

It should be added that, referring to FIG. 3*b*, when configuring the communication node, in addition to binding the preset identification of the first end to the communication node, other information can also be bound, such as at least one of the following pieces of information: the transaction attribute identification and the data packet header format identification. For the detailed description of the data packet header format, see the content relevant to the message header format as described in the other embodiments of the present application, which will not be repeated herein. When monitoring that the corresponding communication node thereon receives the data that are sent by the first end and need to be transmitted, such as the data block data1, the control apparatus can obtain the transaction attribute information and the data packet header format information according to the binding relationship among the preset identification bound to the communication node, the transmission transaction attribute identification, and the data packet header format identification, so as to structure the received data block data1 and generate a structured data packet that meets requirements, and send the structured data packet to the target end. Of course, in the case that the communication node is only bound to the preset identification, the control apparatus can also obtain the transaction attribute information, the data packet header format information, and the like from the configuration information preset therein on account of the received data block, so as to structure the received data block data1. For the specific implementation of generating the structured data packet, see the content relevant to generating the message (such as the first message) as described in the other embodiments of the present application.

In summary, it should be added that the preset identification can be a string (such as a string that has regularity and corresponds to the IP address) corresponding to the address information of a corresponding end, i.e., the preset identification does not have the function of hiding the address information of the corresponding end. Alternatively, in some other embodiments, the preset identification has the function of hiding the address information of the corresponding end. For example, the preset identification is a random string that is generated at random and has no regularity, and the correlation information associated therewith includes the address information of the corresponding end. For the relevant description of the preset identification, see the relevant content in the other embodiments of the present application. The preset identification shown in Tables 12a to 13b can have the function of hiding the address information of the first end. In addition, the correlation information associated with the preset identification is not confined to the content shown in Table 12b or Table 13a. for the specific content that can be included in the correlation information, see the relevant content described in the other embodiments in the context of the present application. Moreover, for the specific implementation of the first end sending data to the control apparatus, the control apparatus sending data to the first end, or the control apparatus forwarding the received data packet sent by the first end to the target end, see the relevant content in the other embodiments of the present application.

In addition, in some other embodiments, before executing unidirectional uplink or downlink of data, the first end can also send the preset identification to the endpoint of the control apparatus, so that the control apparatus can determine the target address according to the received preset identification, thereby determining the target end.

Based on the manner of determining the target end as described above, in another implementable solution, "determining a target end, with which the first end carries out data transmission through the target communication node" in Step S1021 can specifically comprise:

S10211". receiving the preset identification sent by the first end;

S10212". determining the target end according to the preset identification;

Wherein the preset identification is determined by the first end according to the transmission transaction corresponding to the data stream to which the data block that needs to be transmitted belongs; the preset identification is a preset identification corresponding to the first end or a preset identification corresponding to the target end; if the preset identification is the preset identification corresponding to the first end, for the specific implementation of Step S10212", see Steps S01-S02.

In specific implementation, after determining the transmission transaction corresponding to the data stream to which the data block that needs to be transmitted belongs, the first end can continue to determine the preset identification that needs to be sent to the control apparatus by executing the following steps:

according to the correspondence between the preset identification of the first end and the transaction type, determining the preset identification of the first end, which has a correspondence with the transaction type of the transmission transaction; and/or obtaining transaction attribute information of the transmission transaction; obtaining the preset identification of the target end from the transaction attribute information.

For the specific implementation of obtaining transaction attribute information of the transmission transaction, as well as the specific content that can be included in the transaction attribute information, see the relevant content in the other embodiments in the context of the present application.

In Step S10211", when the node type of at least one first communication node activated on account of the first end is the second type, the control apparatus can only send data to the host (the first end) and cannot receive any other types of data sent by the host except the signaling (such as a token packet). For example, at least one first communication node as activated is an IN endpoint; in this case, after the handshake connection between the activated second communication node (such as the endpoint 0) and the first end is completed, the second communication node can be kept in the activated state, and the first end can send a preset identification to the control apparatus through the second communication node.

For example, in combination with Table 12b and with reference to the content relevant to "unidirectional transmission downlink" shown in FIG. 21, taking the first end needing to obtain data from the second end 21 through the endpoint 1 (an IN endpoint) as an example, the first end can first send a SETUP token packet (only used in control transmission to notify the control apparatus that a control transmission is about to begin, which includes the endpoint number of the endpoint 0) to the endpoint 0 of the control apparatus 31; when the endpoint 0 of the control apparatus receives the SETUP token packet, it will then wait to receive the setup information sent by the first end (a host), which information can be the preset identification 0x0B that is sent by the first end and corresponds thereto; further, the control apparatus can obtain the correlation information associated with the preset identification 0x0B from the preset configuration information, and further determine the target end (such as the second end 21$a$), with which the first end intends to perform transmission, according to the target address included in the correlation information. In addition, optionally, after receiving the preset identification 0x0B sent by the first end, the control apparatus can also return a corresponding response status packet to the first end through the endpoint 0. In addition, in the case of closing the endpoint 0 (SETUP) in advance for security reasons, the preset identification data can also be received by activating other OUT endpoints.

Of course, when the node type of said at least one of the first communication nodes is the second type, the second communication node can also be disabled. In addition, in the present embodiment, one communication node can be exclusively configured to serve to determine the communication node adapted to the target end according to the requirement that the control apparatus needs to determine the target end on the basis of the information sent by the first end. For example, one communication node that belongs to the first type (such as an OUT endpoint) or one communication node that belongs to the third type (such as an IN/OUT endpoint) can be configured. When the second end has a need to send a preset identification, the preset identification can be sent to the control apparatus through the communication node that exclusively serves to determine the target end.

Figure 25A:
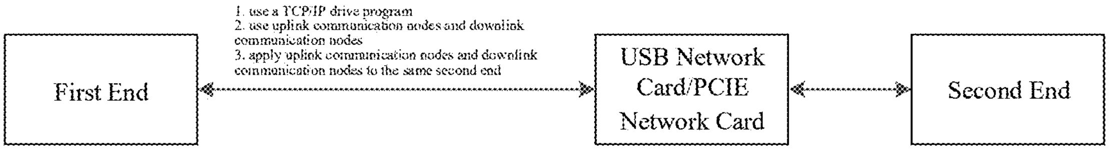
FIG. 25*a* is a diagram of communication between a first end and second end through a network card communication device as provided in the present application.
Figure 25B:
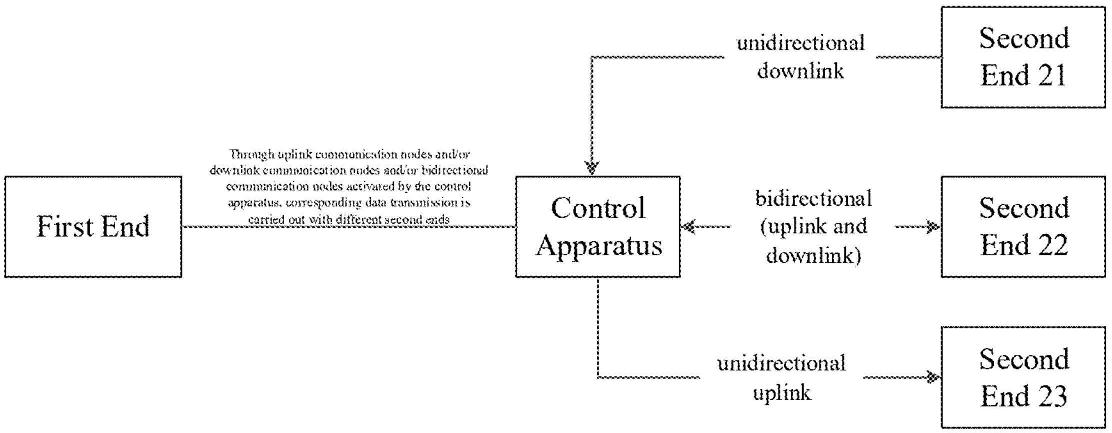
FIG. 25*b* is a diagram of communication between a first end and multiple different second ends through a control apparatus provided in the present application.

In combination with Table 13a, when the node type of said at least one first communication node activated on account of the first end is the first type (e.g., all of them are OUT ends), the control apparatus can receive non-signaling data sent by the first end through the first communication node. As such, in this case, the second communication node can be disabled, and the first end can directly send a corresponding preset identification to the control apparatus through the first communication node. For example, if the first end determines that there is a binding relationship between the preset identification that needs to be sent and the communication node identification Sign1, and the communication node identification Sign1 represents the endpoint 3 (OUT), then the first end can directly send the preset identification to the endpoint 3, so that the control apparatus can determine the target end according to the preset identification received by the endpoint 3 and sent by the first end. Alternatively, if the second communication node is disabled, when the first end has a need to send a preset identification, the preset identification can be sent to the control apparatus through the communication node that is configured to exclusively serve to determine the target end. For details, see the relevant content as described above "when the node type of at least one first communication node is the second type". Of course, under the above circumstances, the second communication node can also continue to be activated, and the first end is configured to send the preset identification to the control apparatus through the second communication node. In the present embodiment, limitations are not imposed thereon. In the content relevant to "unidirectional transmission uplink" as shown in FIG. 25, the second communication node (such as the endpoint 0) remains activated, and the first end sends the preset identification to the control apparatus through the endpoint 0.

For the specific implementation of Steps S10211"-S10212", see the relevant content in the other embodiments in the context of the present application.

Based on the above content, "determining whether to disable the second communication node according to the node type of said at least one first communication node and a determination manner of the target end" in Step S106 can specifically comprise:

- disabling the second communication node or keeping the second communication node activated when the target end makes determination by executing Steps S10211-S10213 or Steps S10211'-S10213' and/or the node type of the target communication node is the first type;
- keeping the second communication node activated when the node type of said at least one communication node is the second type and the target end makes determination by executing Steps S10211"-S10212".

In addition to such information as the target address, the correlation information described in Steps S01-S02 can also include other content, such as the data transmission capability control information and the timing parameter. Based on this, in some embodiments, involved in the context of the present embodiment, the data transmission capability control information that is set for the first end on account of the target communication node, and the timing parameter and the preset request parameters among others that are set to trigger data retrieval on account of the target communication node can all be obtained from the correlation information. Alternatively, in combination with Tables 9-11b, in the case of directly binding the communication node to a corresponding target address and other relevant parameters, involved in the context of the present embodiment, the data transmission capability control information that is set for the first end on account of the target communication node, and the timing parameter and the preset request parameters among others that are set to trigger data retrieval on account of the target communication node can also be directly obtained from the binding information bound to the target communication node; wherein the binding information bound to the target communication node can be obtained from the first configuration information that is determined by executing Step S101.

Figure 22:
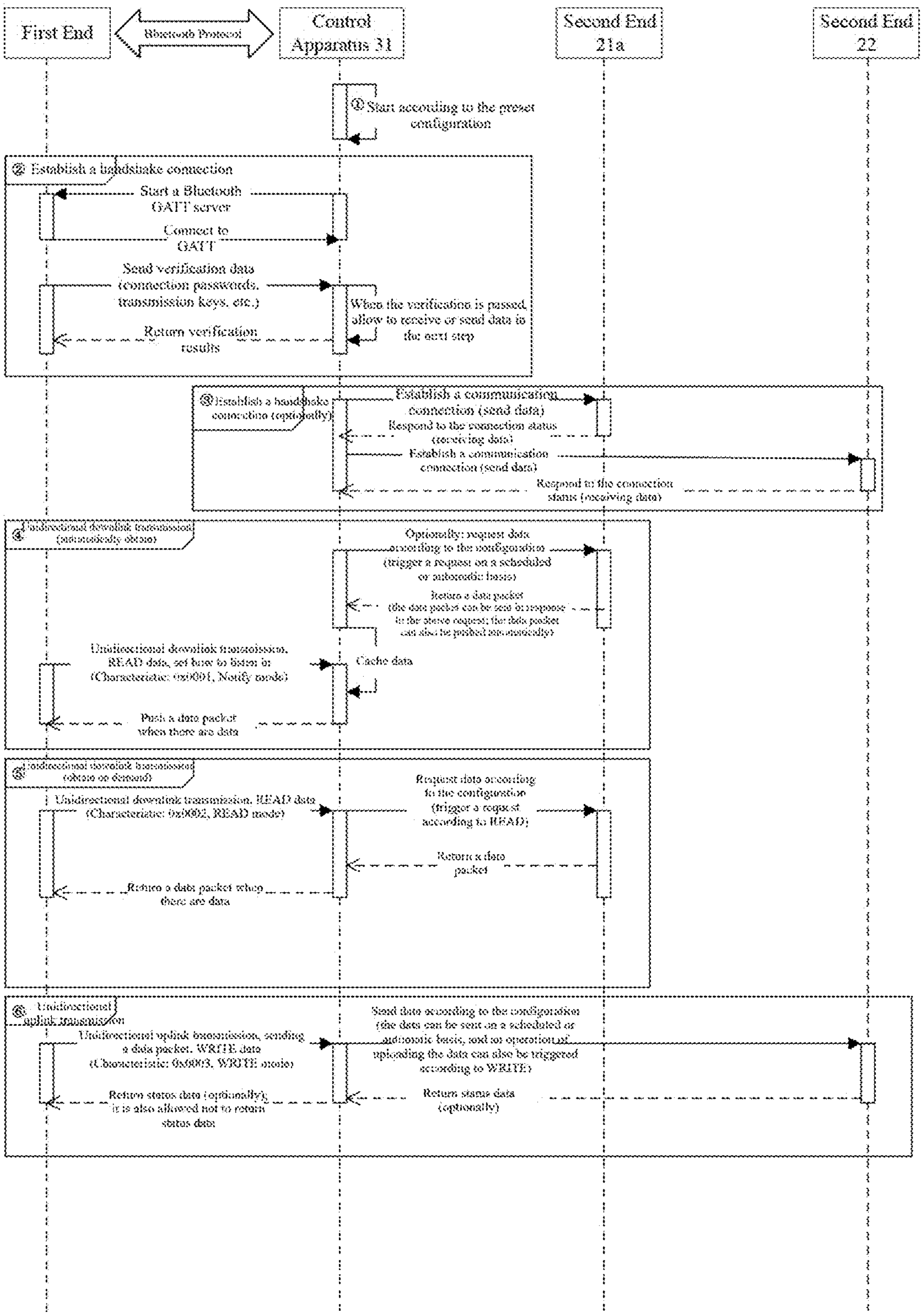

FIG. 22 shows an example of controlling the first end to downlink data (see the content relevant to "unidirectional transmission downlink" shown in the FIGURE) or uplink data (see the content relevant to "unidirectional transmission uplink" shown in the FIGURE) through the corresponding communication node in the case that the Bluetooth protocol is used for communication between the control apparatus and the first end. Corresponding to FIG. 22, for the configuration information that is preset on account of the first end, see the following examples shown in Tables 14a-14c.

TABLE 14a (an example of configuring the first end to be able to uplink and downlink data)

| Data transmission capability control information | Other relevant parameters | Communication node activation information of the control apparatus (communication node identification) | Target address of data transmission (the address of the target end) |
|---|---|---|---|
| RX: downlink data unidirectionally | Such as setTime | UUID: 0x0001 (Read or Notify attribute) | Address 21a (the second end 21a) |
| RX: downlink data unidirectionally | Such as setTime | UUID: 0x0002 (Read Only attribute) | Address 21b (the second end 21b) |

TABLE 14a-continued (an example of configuring the first end to be able to uplink and downlink data)

| Data transmission capability control information | Other relevant parameters | Communication node activation information of the control apparatus (communication node identification) | Target address of data transmission (the address of the target end) |
|---|---|---|---|
| TX: uplink data unidirectionally | #### | UUID: 0x0003 (Write attribute) | Address 22 (the second end 22) |

TABLE 14b (an example of configuring the first end to only be able to downlink data)

| Data transmission capability control information | Other relevant parameters | Communication node activation information of the control apparatus (communication node identification) | Target address of data transmission (the address of the target end) |
|---|---|---|---|
| RX: downlink data unidirectionally | Such as setTime | UUID: 0x0001 (Read or Notify attribute) | Address 21a (the second end 21a) |
| RX: downlink data unidirectionally | Such as setTime | UUID: 0x0002 (Read Only attribute) | Address 21b (the second end 21b) |

TABLE 14c (an example of configuring the first end to only be able to uplink data)

| Data transmission capability control information of the first end | Other relevant parameters | Communication node activation information of the control apparatus (communication node identification) | Target address of data transmission (the address of the target end) |
|---|---|---|---|
| TX: uplink data unidirectionally | #### | UUID: 0x0003 (Write attribute) | Address 22 (the second end 22) |
| TX: uplink data unidirectionally | #### | UUID: 0x0004 (Write attribute) | Address 23 (the second end 23) |

For the implementation of establishing handshake connection between the control apparatus and the first end according to the preset configuration information, as well as establishing telecommunication connection (communication connection) between the control apparatus and the target end (such as the second end 21*a* and the second end 22), see the relevant content in the other embodiments in the context of the present application, which will not be repeated herein. Wherein the manner of data transmission between the control apparatus 31 and the target end can be, but is not limited to, SOCKET, HTTP, HTTPS, etc. In addition, FIG. 22 does not show the content relevant to the second end 23 and the second end 12*b* as provided in Tables 14b and 14c.

In addition, in the case that Bluetooth protocol is used for communication between the control apparatus and the first end, like the example of multiplexing the communication node as described on account of the USB protocol, in the case of a limited and relatively small number of endpoints, the problem how the first end downloads or sends data from or to multiple target ends can be solved through the preset identification by multiplexing the communication node. For details, see the simple examples of the configuration information shown in Tables 15a-15b and Tables 16a-16b.

TABLE 15a (an example of configuring the first end to only be able to uplink data)

| Communication node activation information | | Other binding information | |
|---|---|---|---|
| of the control apparatus (communication node identification) | Preset identification of the target end | Data transmission capability control information | Other relevant parameters |
| UUID: 0x0002 (Characteristic with Read Only attribute) | 0x2B (for hiding the address 21 of the second end 21) | RX: downlink data unidirectionally | Such as setTime |

TABLE 15a-continued (an example of configuring the first end to only be able to uplink data)

| Communication node activation information of the control apparatus (communication node identification) | Preset identification of the target end | Other binding information | |
|---|---|---|---|
| | | Data transmission capability control information | Other relevant parameters |
| | 0x3B (for hiding the address 22' of the second end 22') | RX: downlink data unidirectionally | Such as setTime |

TABLE 15b (an example of configuring the first end to only be able to uplink data)

| Communication node activation information of the control apparatus (communication node identification) | Preset identification of the first end | Correlation information associated with the preset identification | | |
|---|---|---|---|---|
| | | Data transmission capability control information | Target address of data transmission (the address of the target end) | Other relevant parameters |
| UUID: 0x0002 (Characteristic with Read Only attribute) | 0x0B | RX: downlink data unidirectionally | Address 21 (the second end 21) | Such a setTime |
| | 0x1B | RX: downlink data unidirectionally | Address 22' (the second end 22') | Such as setTime |

Through the example of multiplexing the Characteristic with Read attribute as shown in Table 15a or Table 15b, the problem how the first end downloads data from multiple target ends can be solved in the case of a limited and relatively small number of Characteristics.

TABLE 16a (an example of configuring the first end to only be able to uplink data)

| Communication node activation information of the control apparatus (communication node identification) | Preset identification | Correlation information associated with the preset identification | | |
|---|---|---|---|---|
| | | Data transmission capability control information | Target address of data transmission (the address of the target end) | Other relevant parameters |
| UUID: 0x0003 (Characteristic with Write attribute) | 0x0A | TX: uplink data unidirectionally | Address 22 (the second end 22) | #### |
| | 0x1A | TX: uplink data unidirectionally | Address 23 (the second end 23) | #### |

TABLE 16b (an example of configuring the first end to only be able to uplink data)

| Communication node activation information of the control apparatus (communication node identification) | Preset identification of the target end | Other binding information | |
|---|---|---|---|
| | | Data transmission capability control information | Other relevant parameters |
| UUID: 0x0003 (Characteristic with Write attribute) | 0x2A (for hiding the address 22 of the second end 22) | TX: uplink data unidirectionally | #### |
| | 0x3A (for hiding the address 23 of the second end 23) | TX: uplink data unidirectionally | #### |

Through the example of multiplexing the Characteristic with Write attribute as shown in Table 15a or Table 15b, the problem how the first end sends data to multiple target ends can be solved in the case of a limited and relatively small number of Characteristics.

For the specific implementation of how the control apparatus controls the first end to uplink or downlink data through the corresponding communication node on the level of the communication node under the Bluetooth protocol, see the relevant content elaborated by using the USB protocol as an example in the context of the present embodiment. The only difference is that the communication node under the USB protocol is an endpoint (such as an IN endpoint or an OUT endpoint), while the communication node under the Bluetooth protocol is Characteristic, such as Characteristic with Read attribute and Characteristic with Write attribute.

The previous text mainly elaborates on how to control the data transmission capability of the first end on the level of the communication node (similar to the level of the communication link). Considering that simply controlling the data transmission capability of the first end on the level of the communication node may result in control leakage due to some factors, which may lead to uplinking or downlinking data unexpectedly through the communication node. As such, the present embodiment further controls the data transmission capability of the first end on the level of the application in combination with the configured "data transmission capability control information".

In other words, further, "controlling data transmission capability that the first end can have through each first communication node according to the node type of each first communication node" in Step S102 can specifically comprise the following steps:

- S1025. when monitoring that the target communication node receives a data block that is sent by the first end and needs to be transmitted to the target end, obtaining data transmission capability control information that is arranged for the first end on account of the target communication node;
- S1026. determining data communication capability possessed by the first end and indicated by the data transmission capability control information;
- S1027. sending the data block according to the data communication capability possessed by the first end.

In Step S1025, there is a first application on the first end, a first data stream of the first application can include at least one data block, and the above data block can be one of said at least one data block included in the first data stream. The first application can refer to, but is not limited to, a business platform system application, a browser application, a social application, a video application, an office application, etc. Different types of first data streams will be generated in the course of using different first applications. For example, if the first application is a browser application and the browser application needs to obtain resources on the corresponding target end such as the second end 21 shown in FIG. 20, then the first data stream on the first application can be, but is not limited to, a request data stream (such as a request network resource data stream). For the relevant introduction to the applications (such as the first application) and the data streams (such as the first data stream) involved in the present embodiment, see the relevant content in the other embodiments in the previous text.

When sending a data block that needs to be transmitted to the target end to the control apparatus connected thereto, the first end can package the data block into a message and sent the message. In addition to the data block, the message can also include a corresponding preset identification among others. For example, it can include the preset identification of the first end, the preset identification of the second end, and the like. The preset identification is used for hiding the address information of a corresponding end or as the address information of the corresponding end; wherein the preset identification of the first end as included in the message can be determined by the first end according to the transmission transaction corresponding to the data stream (i.e., the first data stream as mentioned above) to which the first data block belongs. Of course, the message may not include a preset identification. After receiving the message sent by the first end, the control apparatus can parse the first data block from the message, and then directly determine the transmission transaction corresponding to the data stream to which the first data block belongs on the basis of the configuration information preset therein, and then determine the corresponding preset identification, such as the preset identification of the first end; on account of this data transmission carried out by the first end, the data transmission capability control information of the first end can be obtained from the correlation information associated with the preset identification of the first end. Alternatively, according to the relevant content in the other embodiments in the previous text of the present application, the preset identification of the first end can also be sent to the control apparatus by the first end before executing the step of sending the data block that needs to be transmitted to the control apparatus. In the present embodiment, limitations are not imposed thereon.

Alternatively, with reference to the configuration information preset in the control apparatus as provided in combination with Tables 8-11b, the control apparatus can also directly obtain the data transmission capability control information bound to the target communication node on account of the first end from the configuration information.

For the specific implementation of how the first end packages the data block into the message and the message includes the corresponding preset identification, see the corresponding content in the other embodiments in the context of the present application, such as the content relevant to the "first message", the "data packet", and the like as described in the other embodiments in the context of the present application, which will not be repeated herein.

In Step S1026-S1027, as can be learned from the content relevant to the "data transmission capability control information" as described in the other embodiments in the context of the present application, the obtained data transmission capability control information can indicate the data communication capability (i.e., uplink and downlink data communication capabilities) of the first end. For example, the first end (more specifically, the corresponding first application on the first end) only has the unidirectional uplink data communication capability (i.e., data transmission communication capability), or the unidirectional downlink data communication capability (i.e., data reception (retrieval) communication capability), or both the uplink data communication capability and the downlink data communication capability for the target end. Only when it is determined that the first end has the uplink data communication capability for the target end (in other words, the first end is allowed to communicate with the target end), will the control apparatus forward the received data block to the target end.

Based on this, in one implementable technical solution, “sending the data block according to the data communication capability possessed by the first end” in Step S1027 can specifically comprise:

S10271. if the first end possesses the uplink data communication capability, sending the data block to the target end;

S10272. if the first end does not possess the uplink data communication capability but possesses the downlink data communication capability, skipping sending the data block.

In Step S10271, if the first end possesses the uplink data communication capability, the data block can be sent to the target end according to the address information of the target end.

In combination with the configuration information preset in the control apparatus as provided in Tables 8-11b, the address information of the target end can be directly obtained from the configuration information.

Alternatively, the preset identification of the target end can be determined first, and the address information of the target end is then determined according to the preset identification of the target end. Wherein the preset identification of the target end can be sent by the first end. Specifically, the first end can obtain the preset identification of the target end from the transaction attribute information of the transmission transaction corresponding to the data stream to which the data block belongs; then, it packages the preset identification of the target end and the data block into a message and send the message to the executing subject in the present embodiment; alternatively, in the case that the message sent by the first end to the executing subject in the present embodiment on account of the data block does not include the preset identification corresponding to the first end, the second end, or the like, the executing subject in the present embodiment can also obtain the transaction attribute information of the transmission transaction corresponding to the data stream to which the data block belongs according to the built-in preset information thereof on the basis of determining the transmission transaction corresponding to the data stream to which the data block belongs, and further obtain the preset identification of the target end from the transaction attribute information. Alternatively, in the case that the first end sends the preset identification in correspondence thereto to the control apparatus before sending the data block that needs to be transmitted to the control apparatus, the control apparatus can also obtain the correlation information associated with the preset identification of the first end from the configuration information according to the received preset identification of the first end, and further obtain the target address, i.e., the address information of the target end, from the correlation information.

For the specific implementation of sending the data block to the target end according to the address information of the target end, see the relevant content in the other embodiments of the present application.

In addition, in the case that the first end possesses the uplink data communication capability, it may not possess the downlink data communication capability or may also have the downlink data communication capability at the same time. If it does not possess the downlink data communication capability, after receiving the feedback information returned by the target end on account of the data block, the executing subject in the present embodiment will not forward the feedback information to the first end. Based on this, Step S10271 can further comprise the following steps:

A01. if the first end possesses the uplink data communication capability but does not possess the downlink data communication capability, then when receiving feedback information returned by the target end on account of the data block, skipping sending the feedback information to the first end;

A02. if the first end possesses the uplink data communication capability and the downlink data communication capability, then when receiving feedback information returned by the target end on account of the data block, sending the feedback information to the first end.

In specific implementation, the feedback information can be returned by the target end after receiving the data block sent by the executing subject in the present embodiment. The feedback information can be: automatically replied data that are preset in the target end on account of the received data, such as “ACK”.

If the feedback information does not need to be sent to the first end, the operation of sending the feedback information to the first end may not be executed, but a log record about the feedback information can be made; if the feedback information needs to be sent to the first end, it can be verified, and if the verification is passed, the feedback information is sent to the first end. Wherein the verification can include, but is not limited to, verifying whether the data format and data content among others of the feedback information meet requirements, whether the feedback information is complete, etc. As such, before “sending the feedback information to the first end” in Step A12, the method provided in the present embodiment can further comprise the following steps:

verifying the feedback information;

after the verification is passed, triggering the step of sending the feedback information to the first end.

In Step 10272, when the first end does not possess the uplink data communication capability but possesses the downlink data communication capability, it indicates that the first end does not possess the communication capability of sending data to the target end. In this case, if the data type of the data stream to which the data block that needs to be transmitted belongs is a request type, the executing subject in the present embodiment can execute a search operation in the data buffer area corresponding to the target communication node according to the request parameters included in the data block; if data that matches the request parameters included in the data block are found, the found data will be sent to the first end; if data that matches the request parameters included in the data block are not found, the control apparatus will send the corresponding preset request parameters therein to the second end, and instead of forwarding the received data block to the target end, but can make a log record about the data block. If the data type of the data stream to which the data block belongs is a non-request type, the executing subject in the present embodiment can only make a log record about the data block and will not send the target end. Therefore, if the first end does not possess the uplink data communication capability but possesses the downlink data communication capability, the method provided in the present embodiment can further comprise the following steps:

A11. determining the data type of the data stream to which the data block belongs;

A12. when the data type is a request type, executing a search operation in a data cache corresponding to the target communication stage according to the request parameters included in the data block, to return adapted data to the first end.

The method provided in the present embodiment is that the control apparatus in communication connection with the first end will first activate at least one first communication node on account of the first end; the first communication node is a communication node in the communication protocol with the first end, and is used for data interaction with the first end in the course of non-handshake connection; the node type of the first communication node can reflect the data transmission function that the first communication node enables the first end to perform; further, the data transmission capability that the first end can have through each first communication node can be controlled according to the node type of each first communication node. Based on the constraints of the communication protocol, the present solution realizes the activation control of the communication nodes on account of the first end by means of software control, thereby realizing the control of the data transmission capability of the first end by virtue of the communication nodes, e.g., controlling the first end to be able to uplink data unidirectionally, downlink data unidirectionally, or uplink and downlink data; the construction is simple, the implementation cost is low, and it is conducive to flexible configuration according to different transmission control demands, without optical gates among others in the existing solutions, in which corresponding physical interfaces need to be further arranged to realize the transmission control according to corresponding needs.

Further, in the case that only one control apparatus is arranged between the first end and the target end (as shown in FIGS. 4*a* to 5*a*), the executing subject in the present embodiment can also be in communication connection with the target end. Specifically, the executing subject in the present embodiment can also be in communication connection with the target end on the basis of a second non-bidirectional communication protocol. For the description of the second non-bidirectional communication protocol, see the content relevant to the first non-bidirectional communication protocol as described in the context of the present embodiment; accordingly, the method provided in the present embodiment can further comprise the following steps:

- S107. determining second configuration information in response to an operation of configuring communication nodes on a control apparatus as triggered on account of the target end, wherein the communication nodes included in the second configuration information are communication nodes in the second communication protocol;
- S108. in the process of data transmission in non-handshake connection with the target end, initiating at least one third communication node for the target end according to the second configuration information, wherein the third communication node is of a node type that can reflect a data transmission function, which the third communication node enables the target end to perform;
- S109. controlling data transmission capability that the target end can have through each third communication node according to the node type of each third communication node.

For the specific implementation of Steps S107-S109, see the specific implementation course of Steps S100-S102 as described above, which will not be repeated herein.

Figure 24:
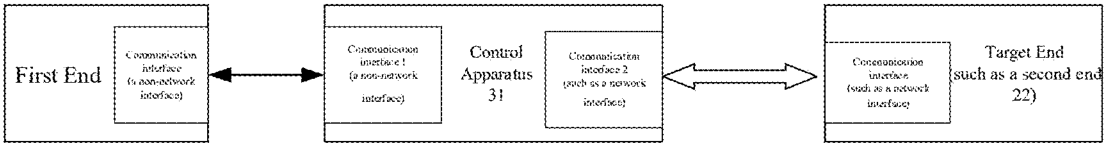

Based on the corresponding content of the data transmission control method provided in the embodiments of the present application, the present application realizes the control of the data transmission capability that the first end can have, such as unidirectional transmission, as the control apparatus realizes the data transmission control of the first end, such as uplinking data or downlinking data, on the basis of the communication protocol; the user can customize the communication nodes that can be activated on the control apparatus on account of the first end according to the transmission control needs of the first end, so that the control apparatus enables corresponding communication nodes according to user needs to perform corresponding data transmission control. For example, in combination with FIG. 24, the control apparatus 31 is in communication connection with to the first end on the basis of a non-bidirectional communication protocol (such as a non-TCP/IP protocol), such as USB protocol and Bluetooth protocol, and can enable communication nodes (such as zero, one or more OUT endpoints) of the first type according to needs to perform uplink data transmission control on the first end (i.e., control the first end to send data unidirectionally to a corresponding target end; specifically, the control apparatus receives data from the first end and send the data unidirectionally to a responding target end), or it enables communication nodes (such as zero, one or more IN ends) of the second type according to needs to perform downlink data transmission control on the first end (i.e., control the first end to obtain data unidirectionally from a corresponding target end; specifically, the control apparatus 31 receives data from the target end and sends the data unidirectionally to the first end). In FIG. 24, as the control apparatus 31 is in communication connection with the first end on the basis of USB protocol (wired communication), the communication interface 1 (a USB interface) of the control apparatus is based on the USB slave mode; according to the configuration information preset therein, the corresponding endpoints in the communication interface 1 can be enabled; specifically, the endpoints in the communication interface 1 can include: IN endpoints (communication nodes of the second type) for sending data to the first end; OUT endpoints (communication nodes of the first type) for receiving data sent by the first end. Moreover, as the control apparatus 31 is in communication connection with the first end on the basis of Bluetooth protocol (wired communication), the communication interface 1 of the control apparatus is a Bluetooth interface, which is based on the BLE-SSERVER mode; according to the configuration information preset in the control apparatus, the enabled communication nodes can be Characteristics in the communication interface 1 (i.e., GATT service); specifically, Characteristics in the GATT service can include: Characteristic with Read attribute (the second type of communication nodes) for sending data to the first end; Characteristic with Notify attribute (communication nodes of the second type) for sending (pushing) data to the first end; Characteristic with Write attribute (communication nodes of the first type) for receiving data sent by the first end.

Wherein one control apparatus can have multiple communication interfaces of the same or different types, such as USB interfaces and Bluetooth interfaces. The communication interfaces can enable corresponding communication endpoints on the basis of the configuration file preset in the control apparatus to control the data transmission capability of the first end.

The data transmission control solution provided in the present embodiment can be summarized as follows.

1. At least one communication node (either communication nodes of the first type or communication nodes of the second type) is enabled according to needs to realize the control of the data transmission capability of the first end, such as uplinking data unidirectionally or downlinking data unidirectionally. For example, one communication node a1 of the second type (such as an IN endpoint) is enabled; the communication endpoint a1 corresponds to a target end b1; when data (such as file data) of the target end b1 (or an application c1 on the target end) is received, the data is sent to the first end through the communication endpoint a1; as such, the first end finishes downlinking data once. For another example, one communication node a2 of the first type (such as an OUT endpoint) is enabled; the communication node a2 corresponds to a target end b2; when data sent by the first end through the communication node a2 is received, the data is forwarded to the target end b2; as such, the first end finishes uplinking data once.

The advantages of doing so are put as follows: in the course of realizing unidirectional data transmission control over the first end, the first end can only communicate with the corresponding target end through the enabled communication node, and cannot change the target address of data transmission; the first end cannot realize data transmission through a non-enabled communication node.

2. By enabling multiple communication nodes of the same type (or transmission direction) according to different applications and target ends among others on the first end, it can be realized that the first end simultaneously performs uplink data transmission or downlink data transmission on multiple target ends, thereby forming separate links on account of the applications or the target ends on the first end. For example, two communication nodes (such as IN endpoints) of the second type are enabled simultaneously; specifically, on account of an application 1 and an application 2 on the first end, a communication node a1_1 and a communication node a1_2 are enabled, respectively; the communication node a1_1 corresponds to a target end b1_1; when data is received from the target end b11, the data is sent to the application 1 on the first end through the communication node a11; the communication node a1_2 corresponds to a target end b1_2; when data is received from the target end b1_2, the data is sent to the application 2 on the first end through the communication node a1_2.

The advantages of doing so are put as follows: one control apparatus can simultaneously perform unidirectional transmission control over multiple applications or multiple target ends on the first end; the communication node and the target ends form separate unidirectional communication links, thereby avoiding data interference or leakage in the presence of a single communication node and multiple target ends; different target ends can be distinguished only by binding them to communication node identifications.

3. According to needs of different applications and different target end apparatuses on the first end, multiple communication nodes of different types (or transmission directions) can be enabled simultaneously (communication nodes of the first type and communication nodes of the second type coexist). For example, two communication nodes of the first type and two communication nodes of the second type can be enabled simultaneously.

The advantages of doing so are put as follows: one control apparatus can simultaneously perform unidirectional transmission control over multiple applications or target ends, and can meet the needs of multiple target ends in different transmission directions.

It should be added that "enable" mentioned in the above content can be understood as "activate" in the context of the present application.

In summary, compared with the existing solution, the technical solution of data transmission control provided in the present application will be further elaborated in the following points.

1) Most of the existing apparatuses can only activate bidirectional communication nodes (such as ports in TCP and UDP protocols) on the basis of the protocols as used, to realize bidirectional (uplink and downlink) data transmission. For example, the second end is a server; after a port corresponding to a port number on the server is activated, the first end conducts bidirectional data transmission communication with the server through the port corresponding to the port number. Moreover, the protocols used by the existing apparatuses do not have a unidirectional communication node function for configuring unidirectional transmission. For example, the protocols used by the existing apparatuses only support the user configuration port number, and cannot further configure the port corresponding to the port number as a communication node that can only uplink or downlink data; at the factory provisioning stage, the activation and communication functions of ports on an apparatus are often subjected to fixed configuration, and the ports are often fixedly configured as bidirectional transmission communication nodes (i.e., fixedly configured to have bidirectional communication capabilities); the user cannot configure activation and communication capabilities of the ports according to his or her actual needs.

The solution provided in the present application is different. The communication protocol of the control apparatus supports flexible configuration to enable communication nodes with different target ends and in different transmission directions. Upon configuration, bidirectional communication nodes and unidirectional communication nodes (uplink communication nodes (only able to uplink data) and/or downlink communication nodes (are only able to downlink data) can be enabled at the same time for communication with the same target end. Alternatively, unidirectional uplink communication nodes alone and/or downlink communication nodes alone are included for communicating with one target end or communicating with multiple (or different) target ends simultaneously, wherein multiple target ends can have different data ends with different communication needs. For example, referring to FIG. 25B, assuming that the communication protocol of the control apparatus is configured to include bidirectional communication nodes (corresponding to the second end 22), unidirectional downlink communication nodes (corresponding to the second end 21), and unidirectional uplink communication nodes (corresponding to the second end 23), then the first end can simultaneously realize unidirectional downlink data transmission with the second end 21, bidirectional data transmission with the second end 22 (including uplink and downlink data), and unidirectional uplink data transmission with the second end 23 through the bidirectional communication nodes, the unidirectional downlink communication nodes, and the unidirectional uplink communication nodes of the control apparatus, respectively.

2) The existing USB apparatuses, e.g., near-field communication apparatuses such as USB portable hard drives, basically only support near communication by using USB. The control apparatus in the present application is different from the existing near-field communication apparatuses, such as USB portable hard drives, and the communication also supports remote communication by using TCP/IP, in addition to near communication (realized by using USB and the like). Wherein the target end of the remote communication, as described in Item 1), can be different second ends. Moreover, for different second ends, communication in different directions can be realized, e.g., bidirectional (uplink and downlink) communication for some second ends, only uplink communication for some second ends, or only downlink communication for other second ends. In addition, data transmission in different data exchange manners can also be realized in the course of communication with different second ends. For the specific implementation of data transmission in different data exchange manners, see the content relevant to FIG. 2*b* in the other embodiments of the present application.

It should be added that although the existing USB apparatuses (as well as optical module network cards) are also hardware with the unidirectional transmission protocol function, they only serve as an intermediate link in communication, the network is still used for direct communication connection thereof with the first end, and bidirectional communication nodes are activated for network communication. For example, referring to FIG. 25A, both uplink communication nodes and downlink communication nodes are activated, and both communicate with the same second end (the target end). In addition, although USB network cards (i.e., those with USB interfaces), U-disks, hard drives (based on SATA protocol) and the like all have unidirectional communication nodes, in order that the first end can exchange data (such as at least one or more network service data read/write, U-disk storage chip read/write, hard disk data read/write) with the same second end, according to the fixed configuration, both uplink communication nodes and downlink communication nodes are activated simultaneously, and communicate with the same second end (the target end). In the solution of the present application, different communication nodes, such as uplink communication nodes or downlink communication nodes, can communicate with different particular second ends, but the particular second ends can also downlink or uplink data from or to other ends (data ends different from the first end). For example, assuming that the first end communicates with the second end through a downlink communication node activated on the control apparatus, in this case, the first end can only download data from the second end; in other words, the second end can only send data to the first end; however, this does not affect the normal communication between the second end and other ends except the first end to transmit data; if the second end is also in network connection with the third end, the second end will downlink and/or uplink data from or to the third end.

3) In the existing communication apparatuses with USB network cards, the USB network cards thereof will be recognized as network cards (wired network cards, wireless network cards, or the like) by the operating system driver on the first end, that is, first end (a TCP/IP network driver, which has communication properties and does not restrict port data transmission and reception)→USB interface apparatus (which cannot be configured, and automatically activates endpoints that satisfy bidirectional transmission)→second end. The solution provided in the present application is: first end (which can only send data to or receive data from particular communication nodes activated by the control apparatus)→control apparatus (which activates communication nodes in particular transmission directions according to the configuration)→second end. That is to say, in the solution of the present application, the control apparatus cannot exchange data with the second end without activating particular transmission nodes, regardless of whether the first end has a driver or whether the driver is official.

Taking the communication connection between the control apparatus 31 and the first end based on Bluetooth protocol in combination with FIG. 24 as an example, a few examples are provided as follows.

Example 1: in the case of configuring the first end to only possess the downlink data transmission capability, controlling the first end to only be able to downlink data (obtain data) can be done as follows.

The control apparatus 31 only enables Characteristic with Read or Notify attribute according to the preset configuration information.

The first end can only request Read data through the enabled Characteristic or wait for Notify to push data. Since Write is not available to Characteristics, and data packets cannot be sent to the control apparatus 31.

In addition, there can be multiple groups of enabled Characteristics with Read or Notify attribute. Which target address (or target end) the data of Read or Notify comes from is unknown to the first end. Moreover, the first end cannot receive data from sources beyond the preset arrangement.

Example 2: in the case of configuring the first end to only possess the uplink data transmission capability, controlling the first end to only be able to uplink data (send data) can be done as follows.

The control apparatus 31 only enables Characteristic with Write attribute according to the preset configuration information.

The first end can only send data to the control apparatus through the enabled CharacteristicWrite. Since Read is not available to Characteristics, and the control apparatus 31 cannot receive data.

In addition, there can be multiple groups of enabled Characteristics with Write attribute. Write data sends the real target address, which can be hidden in the preset arrangement and is unknown to the first end. Moreover, the first end cannot send data to a target address beyond the preset arrangement. Of course, the target address may not be hidden.

Example 3: in the case of configuring the first end to possess the uplink and downlink data transmission capabilities, controlling the first end to be able to uplink data (send data) and downlink data (receive data) can be done as follows.

The control apparatus 31 enables corresponding Characteristic with Read or Notify attribute, as well as Characteristic with Write attribute according to the preset configuration information, in order to control the first end to uplink and/or downlink data through the enabled Characteristics. For the specific implementation, see the relevant content in Example 1 and Example 2. The above enabled Characteristics can correspond to different target addresses, and the control apparatus 31 can simultaneously control the first end to send data to multiple target addresses or receive data from multiple target addresses through the enabled Characteristics.

Example 4: in the case of configuring the first end to possess the downlink data transmission capability and be able to downlink data to multiple target ends through one communication node, controlling the first end to be able to downlink data can be done as follows.

The control apparatus 31 enables one corresponding Characteristic with Read attribute according to the preset configuration information, wherein on account of the first end, the Characteristic with Read attribute is bound to multiple preset identifications, and one preset identification is associated with one target address.

Afterwards, the control apparatus can determine multiple target addresses according to the multiple preset identifications bound to the Characteristic with Read attribute, and request data from target ends indicated by each of the multiple target addresses, so as to send the data returned by the multiple target ends to the first end, so that the first end obtains data from multiple target ends.

Example 5: in the case of configuring the first end to possess the uplink data transmission capability and be able to uplink data to multiple target ends through one communication node, controlling the first end to uplink data can be done as follows.

The control apparatus 31 enables a corresponding Characteristic with Write attribute according to the preset configuration information, wherein on account of the first end, the Characteristic with Write attribute is bound to multiple preset identifications, and one preset identification is associated with one target address.

Afterwards, after receiving the data sent by the first end, the control apparatus can determine multiple target addresses according to the multiple preset identifications bound to the Characteristic of Read attribute, and forward the data received from the first end to the target ends indicated by each of the multiple target addresses, so that the first end can send data to multiple target ends.

In addition, in combination with FIG. 24, the control apparatus 31 can also be in communication connection with the first end on the basis of PCIE protocol. In this case, the control apparatus can be deployed inside the first end apparatus, can have a structural form of a chip or an expansion card (as shown in FIG. 7*c*), and is connected to the first end by using the PCIE protocol. The control apparatus 31 enables corresponding transmitter data lanes (TX transmission logic) and/or receiver data lanes (RX reception logic) in multiple data lanes of the PCIE protocol according to the preset configuration information, so as to realize unidirectional uplink or downlink data transmission, or bidirectional data (uplink and downlink data) transmission.

Wherein the transmitter data lanes are data links of the sending end, and the receiver data lanes are data links of the receiving end. The sending end and the receiving end of the data lanes are equivalent to the IN endpoint and OUT endpoint in the above USB protocol, or Characteristic with Read attribute and Characteristic with Write attribute in the above Bluetooth protocol. For the specific implementation manners of the data paths (e.g., binding the relevant content such as the corresponding target end, preset identification, preset string, and transmission transaction), see the relevant embodiments of the present application, which will not be repeated herein.

It should be added that in addition to the aforementioned protocols, the communication connection between the control apparatus and the first end can also be realized through either protocols relevant to interfaces such as SATA interfaces (access in a manner similar to that of hard disks), emmC interfaces (access in a manner similar to that of SD cards), serial communication interfaces (wired, sending data through RX lines and TX lines), fiber optic communication interfaces (wired, optical module, RXTX mode), and Ethernet communication interface (wired or wireless, including WIFI) or custom protocols. The unidirectional communication nodes such as RX and TX included in the above protocols are equivalent to the IN endpoint and OUT endpoint of the USB protocol, or Characteristic with Read attribute and Characteristic with Write attribute of the Bluetooth protocol in the examples of the present application. In the present application, limitations are not imposed thereon.

Based on the content relevant to the data transmission control method provided in the present application as elaborated above, the present application further provides the following data transmission control systems corresponding to the data transmission control method.

A data transmission control system is provided in one embodiment of the present application. For the system structure, see the system structures shown in FIGS. 4*a* to 6*c*, as well as FIGS. 23*a* to 23*d*. Specifically, the data transmission control system provided in the embodiment of the present application comprises:

a first end;

a first control apparatus in communication connection with the first end on the basis of a first communication protocol, which has multiple communication nodes, including some unidirectional communication nodes, wherein the first control apparatus is used for: determining first configuration information in response to an operation of configuring communication nodes on a control apparatus as triggered on account of the first end, wherein communication nodes included in the first configuration information are the communication nodes in the first communication protocol; in the process of data transmission in non-handshake connection with the first end, activating at least one first communication node on account of the first end according to the first configuration information, wherein the first communication node is of a node type that can reflect a data transmission function, which the first communication node enables the first end to perform; controlling data transmission capability that the first end can have through each first communication node according to the node type of each first communication node.

Further, the first control apparatus is further used for: after power-on is monitored, activating a second communication node according to the first configuration information, so as to establish handshake connection with the first end through the second communication node; in the process of establishing the handshake connection, determining whether an instruction sent by the first end to the second communication node meet requirements; if yes, responding to the instruction; if not, skipping responding to the instruction.

Further, the system provided in the present embodiment can further comprise:

a second control apparatus, which is in communication connection with the first control apparatus and the second end, and used for: receiving data sent by the first control apparatus; verifying the data as received; sending the data to the second end after the verification is passed.

In specific implementation, the verification can include, but is not limited to: whether the data format, data content, and the like of the verified data meet requirements, whether the data is complete, etc. For the specifically verified content of the data, see the relevant content in the other embodiments of the present application.

Further, the second control apparatus is in communication connection with the second end on the basis of a second communication protocol, which has multiple communication nodes, including some unidirectional communication nodes; moreover, the second control apparatus is further used for: determining second configuration information in response to an operation of configuring communication nodes on the second control apparatus as triggered on account of the second end, wherein the communication nodes included in the second configuration information are communication nodes in the second communication protocol; in the process of data transmission in non-handshake connection with the target end, activating at least one third communication node on account of the second end according to the second configuration information, wherein the third communication node is of a node type that can reflect a data transmission function, which the third communication node enables the second end to perform; controlling data transmission capability that the second end can have through each third communication node according to the node type of each third communication node.

It should be noted that each apparatus and/or each end in the data transmission control system provided in the above embodiment can not only implement the functional steps in the present embodiment, but also realize the relevant content in the other embodiments provided in the present application. For the functional content that can be specifically realized by each apparatus and/or each end and the corresponding implementation principles, see the corresponding content in the other embodiments of the present application, which will not be repeated herein.

A data transmission control system is further provided in another embodiment of the present application. For the system structure, see the system structures shown in FIGS. 5*b* to 6*c* and FIG. 23*d*. Specifically, the data transmission control system provided in the embodiment of the present application comprises:

- a first end;
- a first control apparatus in communication connection with the first end on the basis of a first communication protocol, which has multiple communication nodes, including some unidirectional communication nodes, wherein the first control apparatus is used for: determining first configuration information in response to an operation of configuring communication nodes on a control apparatus as triggered on account of the first end, wherein communication nodes included in the first configuration information are the communication nodes in the first communication protocol; in the process of data transmission in non-handshake connection with the first end, activating at least one first communication node on account of the first end according to the first configuration information, wherein the first communication node is of a node type that can reflect a data transmission function, which the first communication node enables the first end to perform; controlling data transmission capability that the first end can have through each first communication node according to the node type of each first communication node;
- a second control apparatus, which is in communication connection with the first control apparatus and the second end, and used for: verifying data sent by the first control apparatus when the data is received; sending the data to the second end after the verification is passed;
- the second end, which is used for receiving the data sent by the second control apparatus.

It should be noted that each apparatus and/or each end in the data transmission control system provided in the above embodiment can not only implement the functional steps in the present embodiment, but also realize the relevant content in the other embodiments provided in the present application. For the functional content that can be specifically realized by each apparatus and/or each end and the corresponding implementation principles, see the corresponding content in the other embodiments of the present application, which will not be repeated herein.

Figure 18A:
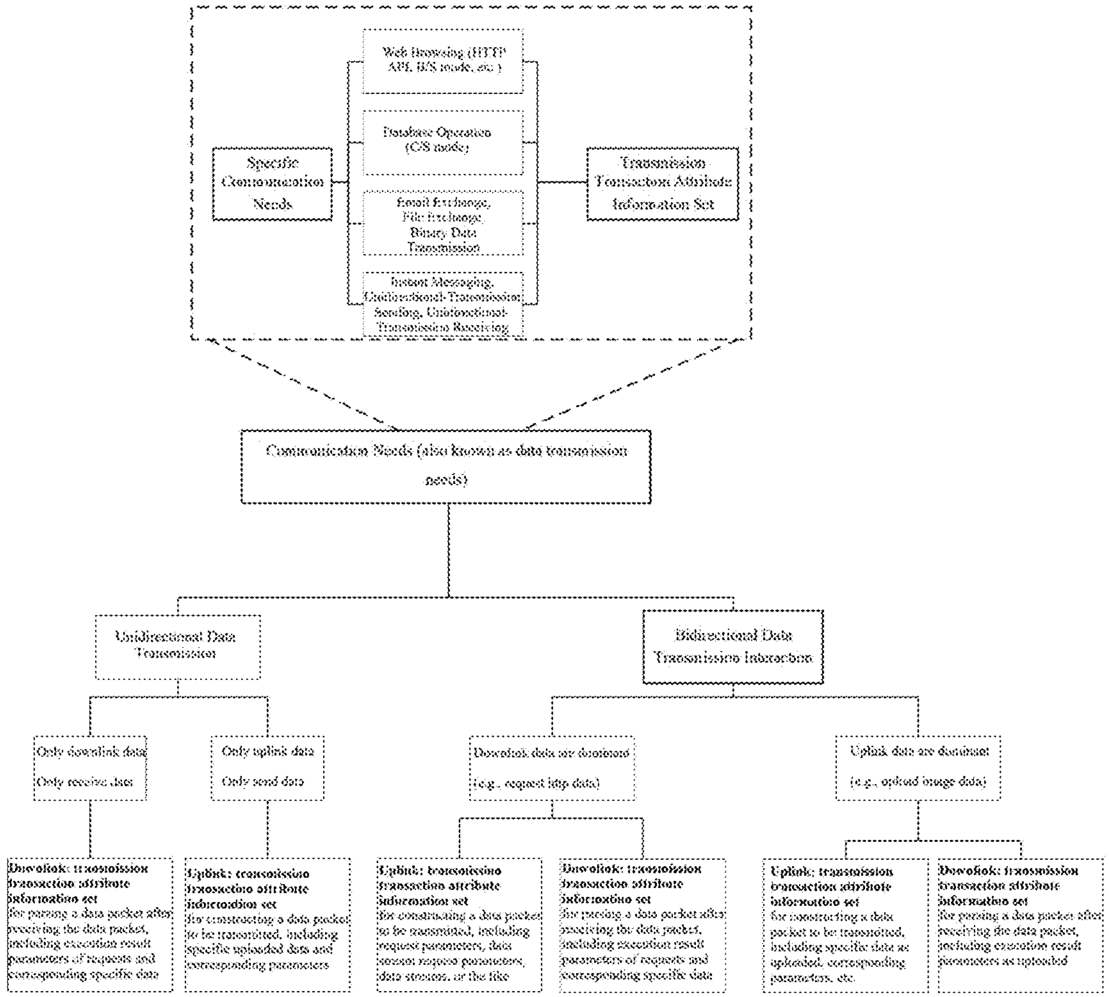
FIG. 18*a* is a structure diagram of a control apparatus provided in one embodiment of the present application.

FIG. 18*a* is a structure diagram of a control apparatus. As shown in FIG. 18*a*, the control apparatus 30 can comprise:

- a configuration file receiving module, which is used for, e.g., when a distributor in which configuration files are stored accesses an interface (i.e., a configuration file receiving interface as described below) of the control apparatus, sending feature identifiers, such as apparatus identification of the control apparatus or user identification of a user who uses the control apparatus, to the distributor so that the distributor returns an adapted configuration file to the control apparatus according to the feature identifiers as received; and, it is further used for receiving and verifying configuration file data sent by the distributor, and after verification is passed, registering the configuration file data on the control apparatus and a data end (such as a computer) (specifically an apparatus driver of the control apparatus as installed in the data end) connected to the control apparatus. Wherein, the data end can send interactive instructions with set values to query whether there is an updated configuration file; the configuration file includes content relevant to service configuration and communication transactions. For the specific content that can be included in the configuration file, see the relevant content in the other embodiments in the previous text.
- a configuration file receiving interface, which can multiplex a data exchange interface ① or a data exchange interface ② as described below;
- a data structuring module, which is used for: receiving data from the data exchange interface ①, and structuring the data to generate structured data (i.e., the message involved in the previous text) that meet requirements of preset structural rules; and, parsing the data, such as deserialization, when receiving the data from the data exchange interface ②; wherein the data exchange interface ① is a first interface for connection with one data end (such as a sender or a client), such as a USB interface for process communication on the control apparatus, and the data exchange interface ② is a second interface for connection with a target apparatus (such as another control apparatus or another data end (a receiver, such as a server)), such as a network interface (such as an Ethernet interface) for remote communication on the control apparatus;
- a data verification module, which is used for verifying whether data received from or sent to the data exchange interface ① and the data exchange interface ② meets standards of preset configuration files;
- a data exchange module, which is used for sending data (such as received data sent by a data end connected to the control apparatus) to a remote target apparatus (such as another control apparatus or another data end) or receive data sent by the remote target apparatus according to correlation information associated with a configuration file (specifically a preset string (i.e., the service identification in the FIGURE) corresponding to another data end) on account of the data exchange interface ②; and, receiving a first signaling (such as an OUT token packet) and a data packet to be transmitted specifically (such as a regular data packet or structured data) sent by a data end connected to the control apparatus on account of the data exchange interface ①; and when receiving a second signaling (such as an IN token packet) sent by the data end connected to the control apparatus, sending an adapted data packet to the data end connected thereto;

a memory, which is used for storing at least one of items as follows: readable instructions (computer instructions), which are to be called and executed by a processor of the control apparatus; configuration file data, backup data, etc.; wherein the memory can be implemented by any type of volatile or non-volatile storage apparatus or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical;

a processor, which is a central control component controlling the operation of other functional modules/devices in the control apparatus 30, and can be, but is not limited to, a central processing unit (CPU).

In addition to the above functional modules/devices, the control apparatus 30 can also comprise other modules, such as an encryption and decryption module for encrypting and/or decrypting data.

Figure 18B:
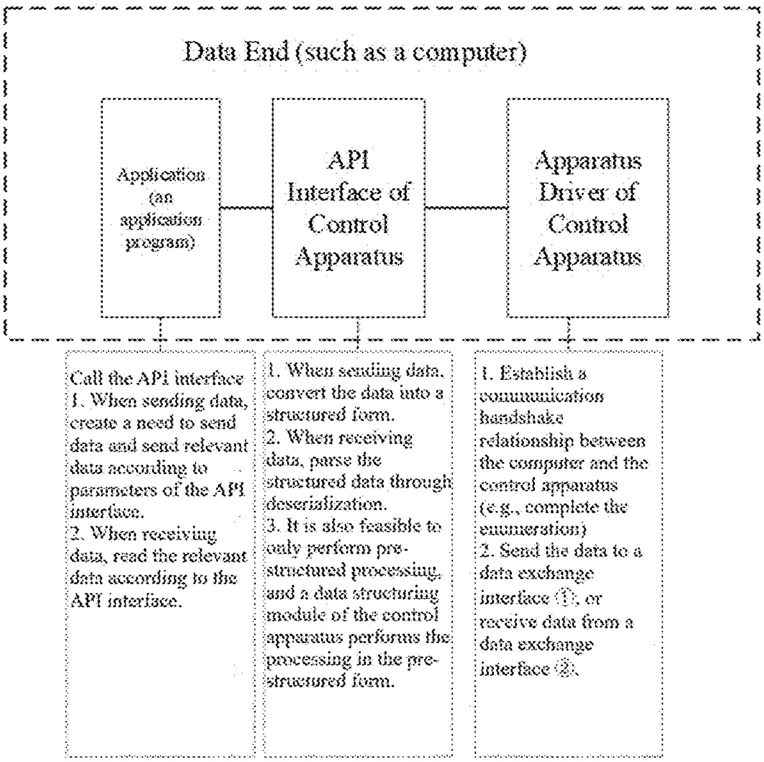
FIG. 18*b* is a structure diagram of a data end connected to a control apparatus as provided in an embodiment of the present application.

FIG. 18*b* is a structure diagram of a data end connected to a control apparatus. In addition to applications (such as browser applications and social applications), an API interface and an apparatus driver of the control apparatus are also installed on the data end.

The applications send or receive data by calling the API interface. Specifically, when data need to be sent, demand information (i.e., the data transmission demand information involved in the previous text) on sending the data is created, and corresponding data are sent according to API interface parameters; when data need to be received, relevant data are read according to the API interface parameters.

The API interface of the control apparatus is used for: when sending data, converting the data to be sent into structured data that comply with the preset structural rules, or only pre-structuring the data to be sent, followed by treatment with the data structuring module of the control apparatus to convert the data into structured data that comply with preset structural rules. Moreover, it is further used for, when receiving the data, parsing the structured data as received, such as deserialization.

The apparatus driver of the control apparatus is used for establishing communication connection (or communication handshake relationship, e.g., completing the enumeration flow shown in FIG. 10) between a data end and a corresponding control apparatus. Moreover, it can further be used for sending data to the data exchange interface ① of the control apparatus shown in FIG. 18*a*, or receiving data from the data exchange interface ②.

Regarding all the preceding content of the present application, it should be noted that the "endpoint" of the control apparatus as involved in the preceding content and the relevant embodiments is described from the perspective of USB protocol as the transmission protocol, and in scenarios of other transmission protocols, the "endpoint" can also be understood as a "port". "Port" and "endpoint" are just different expressions of an interface for data transmission between apparatuses or applications in scenarios of different transmission protocols.

Figure 26:
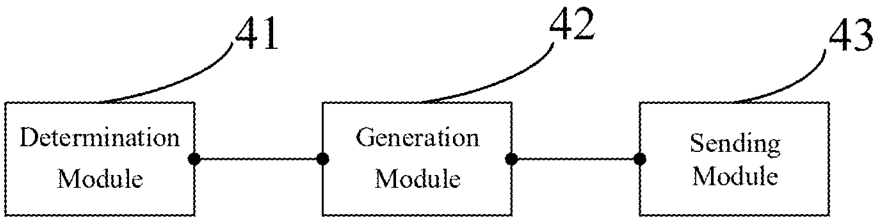
FIGS. 26 and 27 are structure diagrams of data transmission devices provided in the embodiments of the present application.

FIG. 26 shows a structure diagram of a data transmission device provided in one embodiment of the present application. The data transmission device is deployed on a first end, specifically on a first control module inside a first application on the first end. For the specific introduction to the first control module, see the relevant content in the other embodiments in the previous text. As shown in FIG. 26, the data transmission device provided in the present embodiment comprises: a determination module 41, a generation module 42, and a sending module 43; wherein:

the determination module 41 is used for determining first transaction information of a first transmission transaction corresponding to a first data stream of the first application;

the determination module 41 is further used for, when a first data block of the first data stream needs to be transmitted to a second end, determining first target header information for the first data block on the basis of the first transaction information;

the generation module 42 is used for generating a first message to be sent according to the first data block and the first target header information;

the sending module 43 is used for sending the first message to the second end;

the first target header information is used for verifying whether the first message meets requirements.

Further, when used for determining first target header information for the first data block on the basis of the first transaction information, the determination module 41 is specifically used for: obtaining a header information transmission manner corresponding to data blocks in the first data stream; determining target header fields for the first data block from multiple header fields as included in a preset message header format according to the header information transmission manner and relevant information of the first data block; configuring field values of the target header fields according to at least one of the first transaction information and the relevant information of the first data block, and obtaining a message header that is determined for the first data block.

Further, when used for determining target header fields for the first data block from multiple header fields as included in a preset message header format according to the header information transmission manner and relevant information of the first data block, the determination module 41 is specifically used for:

determining the ranking of the first data block in the first data stream according to the block number of the first data block as included in the relevant information;

determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream;

determining that some header fields in the multiple header fields are the target header fields if the header information transmission manner is a second manner and the data block is not ranked last in the first data stream, or the header information transmission manner is the third manner and the data block is not ranked first in the first data stream.

Further, under the circumstances that the multiple header fields are the target header fields, when used for configuring field values of the target header fields according to at least one of the first transaction information and the relevant information of the first data block and obtaining a message header that is determined for the first data block, the determination module 41 is specifically used for:

determining address information of the first end for the first transmission transaction;

configuring field values of the target header fields according to the address information of the first end, the first transaction information, and the relevant information of the first data block, and obtaining a first message header that is determined for the first data block;

wherein the first message header comprises: the address information of the first end, the address information of the second end, transaction attribute identification of the first transmission transaction, transaction identification of the first transmission transaction, the total number of the data blocks in the first data stream, the block number of the first data block, the total size of the first target header information and the first data block, and annotated information;

when the total number is a set value, it indicates that the first data stream is a stream with an unknown number of data blocks.

Further, when used for determining address information of the first end for the first transmission transaction, the determination module 41 is specifically used for: obtaining a first correspondence between the address information of the first end and transaction type; determining the address information of the first end that has a correspondence with the transaction type of the first transmission transaction on the basis of the first correspondence.

Further, under the circumstances that the first data block is ranked first or last in the first data stream, when used for determining first target header information for the first data block on the basis of the first transaction information, the determination module 41 is further specifically used for: determining whether a data header needs to be added to the first data block according to transmission transaction attribute information of the first transmission transaction in the first transaction information; if yes, determining a data header for the first data block according to stream information of the first data stream; wherein the data header is adapted to the first data stream and meets preset data header format requirements.

Further, when used for determining a data header for the first data block according to stream information of the first data stream, the determination module 41 is specifically used for: selecting one data header format that is adaptable from multiple preset data header formats on the basis of data header usage information included in the transmission transaction attribute information; generating the data header in the data header format as selected according to the stream information of the first data stream.

Further, under the circumstances that some header fields in the multiple header fields are the target header fields, when used for configuring field values of the target header fields according to at least one of the first transaction information and the relevant information of the first data block and obtaining a message header determined for the first data block, the determination module 41 is specifically used for: configuring field values of the target header fields according to transaction identification of the first transmission transaction in the first transaction information, and obtaining a second message header that is determined for the first data block; wherein the second message header comprises the transaction identification.

Further, when used for determining first transaction information of a first transmission transaction corresponding to a first data stream of the first application, the determination module 41 is specifically used for: generating transaction identification for the first transmission transaction; obtaining transmission transaction attribute information of the first transmission transaction.

Further, when used for obtaining transmission transaction attribute information of the first transmission transaction, the determination module 41 is specifically used for: determining transaction attribute identification of the first transmission transaction; inquiring the transmission transaction attribute information of the first transmission transaction from multiple pieces of preset transmission transaction attribute information on the basis of the transaction attribute identification.

Further, when used for determining transaction attribute identification of the first transmission transaction, the determination module 41 is specifically used for: determining the transaction type of the first transmission transaction according to transmission demand information of the first data stream; determining the transaction attribute identification that has a correspondence with the transaction type of the first transmission transaction on the basis of a second correspondence between the transaction type and the transaction attribute identification.

Further, when used for sending the first message to the second end, the sending module 43 is specifically for:

sending the first message to a second control module, verifying the first target header information included in a second message through the second control module, and when it is verified that the first message meets the requirements, sending the first message to the second end, wherein the second control module is a module that is external to the first application on the first end.

Further, the device provided in the present embodiment further comprises a receiving module for receiving a second message sent by the second end; wherein the second message is generated according to a second data block and second target header information, which is determined for the second data block of a second data stream by a third control module on the second end according to second transaction information of a second transmission transaction corresponding to the second data stream of a second application on the second end; the second target header information is used for verifying whether the second message meets the requirements;

the third control module is located inside or outside the second application.

It should be noted that the data transmission device provided in the above embodiment can implement the technical solution described in the data transmission method embodiment shown in FIG. 11*a*. For the specific implementation principles of the above modules or units, see the corresponding content in the data transmission method embodiment shown in FIG. 11*a*, which will not be repeated herein.

Another embodiment of the present application also provides a structure diagram of a data transmission device. The data transmission device is deployed on a first end, specifically on a second control module external to a first application on the first end. For the specific introduction to the second control module, see the relevant content in the other embodiments in the previous text. The structure of the data transmission device is similar to that of the data transmission device shown in FIG. 26. Specifically, the data transmission device provided in the present embodiment comprises: a determination module, a generation module, and a sending module; wherein:

the determination module is used for: determining first transaction information of a first transmission transaction to which the first data block belongs in response to a first data block sent by the application to be transmitted to the second end; and, determining first target header information for the first data block on the basis of the first transaction information;

the generation module is used for generating a message to be sent according to the first data block and the first target header information;

the sending module is used for sending the first message to the second end;

wherein the first target header information is used for verifying whether the first message meets requirements.

Further, when used for determining first target header information for the first data block on the basis of the first transaction information, the determination module is specifically used for: obtaining a header information transmission manner corresponding to data blocks in the first data stream to which the first data block belongs; determining target header fields for the first data block from multiple header fields included in a preset message header format according to the header information transmission manner and relevant information of the first data block; configuring field values of the target header fields according to at least one of the first transaction information and the relevant information of the first data block, and obtaining the message header that is determined for the first data block.

Further, when used for determining target header fields for the first data block from multiple header fields included in a preset message header format according to the header information transmission manner and relevant information of the first data block, the determination module is specifically used for: determining the ranking of the first data block in the first data stream according to the block number of the first data block as included in the relevant information; determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream; determining that some header fields in the multiple header fields are the target header fields if the header information transmission manner is the second manner and the data block is not ranked last in the first data stream, or the header information transmission manner is the third manner and the data block is not ranked first in the first data stream.

Further, under the circumstances that the multiple header fields are the target header fields, when used for configuring field values of the target header fields according to at least one of the first transaction information and the relevant information of the first data block and obtaining the message header that is determined for the first data block, the determination module is specifically used for:

determining a second preset string corresponding to the first end for the first transmission transaction;

configuring field values of the target header fields according to the second preset string, the first transaction information, and the relevant information of the first data block, and obtaining a first message header that is determined for the first data block;

wherein the first message header comprises: a first preset string corresponding to the second end, the second preset string, transaction attribute identification of the first transmission transaction, transaction identification of the first transmission transaction, the total number of the data blocks in the first data stream, the block number of the first data block, the total size of the first target header information and the first data block, and annotated information;

when the total number is a set value, it indicates that the first data stream is a stream with an unknown number of data blocks; preset strings are address information of corresponding ends, or the preset strings are used for hiding the address information of the corresponding ends.

Further, under the circumstances that the preset strings are used for hiding the address information of the corresponding ends, when used for sending the first message to the second end, the sending module is specifically used for: obtaining the first preset string corresponding to the second end from transmission transaction attribute information of the first transmission transaction as included in the first transaction information; obtaining the address information of the second end according to the first preset string; sending the first message to the second end according to the address information of the second end.

Further, when used for sending the first message to the second end according to the address information of the second end, the sending module is specifically used for: sending the first message to an intermediate network apparatus according to the address information of the second end, so as to send the first message to the second end through the intermediate network apparatus; wherein the intermediate network apparatus executes any one of steps as follows before sending the first message to the second end: verifying the first target header information included in the first message; generating log information of the first transmission transaction according to the first message.

Further, under the circumstances that some header fields in the multiple header fields are the target header fields, when used for configuring field values of the target header fields according to at least one of the first transaction information and the relevant information of the first data block and obtaining the message header that is determined for the first data block, the determination module is specifically used for: configuring field values of the target header fields according to transaction identification of the first transmission transaction in the first transaction information, and obtaining a second message header that is determined for the first data block, wherein the second message header comprises the transaction identification.

Further, when used for the determination module is specifically used for: generating transaction identification for the first transmission transaction; receiving the first data block sent by the first control module in the first application, as well as a transaction attribute identification of the first transmission transaction to which the first data block belongs; inquiring transmission transaction attribute information of the first transmission transaction from multiple pieces of preset transmission transaction attribute information on the basis of the transaction attribute identification.

Further, the device provided in the present embodiment further comprises a receiving module, which is used for: receiving a second message sent by the second end, wherein the second message is generated according to a second data block and second target header information, which is determined for the second data block of a second data stream by a third control module on the second end according to second transaction information of a second transmission transaction corresponding to the second data stream of a second application on the second end; the second target header information is used for verifying whether the second message meets the requirements; the third control module is located inside or outside the second application.

It should be noted that the data transmission device provided in the above embodiment can implement the technical solution described in the data transmission method embodiment shown in FIG. 11*b*. For the specific implementation principles of the above modules or units, see the corresponding content in the data transmission method embodiment shown in FIG. 11*b*, which will not be repeated herein.

Another embodiment of the present application also provides a data transmission device. The data transmission device is deployed on an intermediate network apparatus, specifically on a fourth control module on the intermediate network equipment. For the specific introduction to the fourth control module, see the relevant content in the other embodiments mentioned in the previous text. The structure of the data transmission device is similar to that of the data transmission device shown in FIG. 26. Specifically, the data transmission device provided in the present embodiment comprises: a determination module, a generation module, and a sending module; wherein:

the determination module is used for: determining first transaction information of a first transmission transaction to which a first data block belongs in response to the first data block that is sent by a first end and needs to be transmitted to a second end; and, determining first target header information for the first data block on the basis of the first transaction information;

the generation module is used for generating a first message to be sent according to the first data block and the first target header information;

the sending module is used for sending the first message to the second end;

wherein the first target header information is used for verifying whether the first message meets requirements.

Further, when used for determining first target header information for the first data block on the basis of the first transaction information, the determination module is specifically used for: obtaining a header information transmission manner corresponding to data blocks in the first data stream to which the first data block belongs; determining target header fields for the first data block from multiple header fields included in a preset message header format according to the header information transmission manner and relevant information of the first data block; configuring field values of the target header fields according to at least one of the first transaction information and the relevant information of the first data block, and obtaining a message header that is determined for the first data block.

Further, when used for determining target header fields for the first data block from multiple header fields included in a preset message header format according to the header information transmission manner and relevant information of the first data block, the determination module is specifically used for: determining the ranking of the first data block in the first data stream according to the block number of the first data block as included in the relevant information; determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream; determining that some header fields in the multiple header fields are the target header fields if the header information transmission manner is the second manner and the data block is not ranked last in the first data stream, or the header information transmission manner is the third manner and the data block is not ranked first in the first data stream.

Further, when the multiple header fields are the target header fields, the determination module is used for: determining a second preset string corresponding to the first end for the first transmission transaction; configuring field values of the target header fields according to the second preset string, the first transaction information, and the relevant information of the first data block, and obtaining a first message header that is determined for the first data block; wherein: the first message header comprises: a first preset string in correspond to the second end, the second preset string, transaction attribute identification of the first transmission transaction, transaction identification of the first transmission transaction, the total number of the data blocks in the first data stream, the block number of the first data block, the total size of the first target header information and the first data block, and annotated information; when the total number is a set value, it indicates that the first data stream is a stream with an unknown number of data blocks; preset strings are address information of corresponding ends, or the preset strings are used for hiding the address information of the corresponding ends.

Further, under the circumstances that the preset strings are used for hiding the address information of the corresponding ends, when used for sending the first message to the second end, the sending module is specifically used for: obtaining the first preset string corresponding to the second end from transmission transaction attribute information of the first transmission transaction as included in the first transaction information; obtaining the address information of the second end according to the first preset string; sending the first message to the second end according to the address information of the second end.

Further, under the circumstances that some header fields in the multiple header fields are the target header fields, when used for configuring field values of the target header fields according to at least one of the first transaction information and the relevant information of the first data block and obtaining a message header that is determined for the first data block, the determination module is used for: configuring field values of the target header fields according to transaction identification of the first transmission transaction in the first transaction information, and obtaining a second message header that is determined for the first data block, wherein the second message header comprises the transaction identification.

Further, when used for determining first transaction information of a first transmission transaction to which a first data block belongs in response to the first data block that is sent by a first end and needs to be transmitted to a second end, the determination module is specifically used for: generating transaction identification for the first transmission transaction; receiving the first data block sent by a first control module in a first application on the first end or by a second control module external to the first application on the first end, as well as transaction attribute identification of the first transmission transaction to which the first data block belongs; inquiring transmission transaction attribute information of the first transmission transaction from multiple pieces of preset transmission transaction attribute information on the basis of the transaction attribute identification Further, the device provided in the present embodiment further comprises a receiving module, which is used for: receiving a second data block that is sent by the second end and needs to be transmitted to the first end, and determining second transaction information of a second transmission transaction to which the second data block belongs; determining second target header information for the second data block on the basis of the second transaction information; generating a second message to be sent according to the second data block and the second target header information; sending the second message to the first end; wherein the second target header information is used for verifying whether the second message meets the requirements.

It should be noted that the data transmission device provided in the above embodiment can implement the technical solution described in the data transmission method embodiment shown in FIG. 12. For the specific implementation principles of the above modules or units, see the corresponding content in the data transmission method embodiment shown in FIG. 12, which will not be repeated herein.

Another embodiment of the present application also provides a data transmission device. The data transmission device is deployed on a control apparatus connected to the first end. The data transmission device comprises:

a receiving module, which is used for receiving a first data block in a first data stream that is sent by the first end and needs to be transmitted to a second end;

a determination module, which is used for: determining first transaction information of a first transmission transaction corresponding to the first data stream; and, determining first target header information for the first data block on the basis of the first transaction information;

a generation module, which is used for generating a first message to be sent according to the first data block and the first target header information;

a sending module, which is used for sending the first message to the second end;

wherein the first target header information is used for verifying whether the first message meets requirements.

It should be noted that the data transmission devices provided in the above embodiments of the present application can respectively implement the above technical solutions described in the corresponding data transmission method embodiments provided in the present application. Therefore, the modules or units in the data transmission devices provided in the above embodiments of the present application can also implement other relevant steps, in addition to the above steps. For the specific steps and principles that can be implemented by the above modules or units, see the corresponding data transmission method embodiments, which will not be repeated herein.

Figure 27:
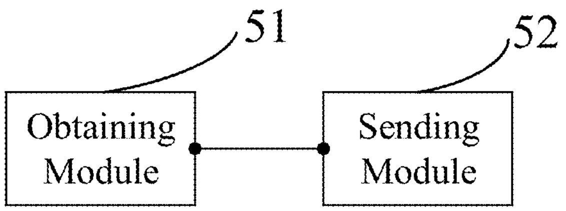

FIG. 27 is a structure diagram of a data transmission device provided in an embodiment of the present application. The data transmission device is deployed on a control apparatus connected to the first end. For the specific introduction to the control apparatus, see the relevant content in the other embodiments in the previous text. As shown in FIG. 27, the data transmission device provided in the present embodiment comprises: an obtaining module 51 and a sending module 52; wherein:

the obtaining module 51 is used for obtaining a first preset string corresponding to the second end in response to a first data block that is sent by the first end and needs to be transmitted to a second end, wherein the first preset string is used for hiding address information of the second end;

the obtaining module 51 is further used for obtaining the address information of the second end according to the first preset string;

the sending module 52 is used for sending the first data block to the second end according to the address information of the second end.

Further, when used for obtaining a first preset string corresponding to the second end, the obtaining module 51 is specifically used for: determine first transaction information of a first transmission transaction corresponding to a first data stream to which the first data block belongs; obtaining a first preset string corresponding to the second end from transmission transaction attribute information included in the first transaction information.

Further, when used for sending the first data block to the second end according to the address information of the second end, the sending module 52 is specifically used for: determining first target header information for the first data on the basis of the first transaction information; generating a first message to be sent according to the first target header information and the first data block; sending the first message to the second end according to the address information of the second end; wherein the first target header information is used for verifying whether the first message meets requirements, and if yes, the second end retrieves and caches the first data from the first message.

Further, when used for determining first target header information for the first data block on the basis of the first transaction information, the sending module 52 is specifically used for: obtaining a header information transmission manner corresponding to data blocks in the first data stream; determining target header fields for the first data block from multiple header fields included in a preset message header format according to the header information transmission manner and relevant information of the first data block; configuring field values of the target header fields according to at least one of the first transaction information and the relevant information of the first data block, and obtaining a message header that is determined for the first data block.

When used for determining target header fields for the first data block from multiple header fields included in a preset message header format according to the header information transmission manner and relevant information of the first data block, the sending module 52 is specifically used for: determining the ranking of the first data block in the first data stream according to the block number of the first data block as included in the relevant information; determining that the multiple header fields are the target header fields if the header information transmission manner is a first manner, or the header information transmission manner is a second manner and the first data block is ranked last in the first data stream, or the header information transmission manner is a third manner and the first data block is ranked first in the first data stream; determining that some header fields in the multiple header fields are the target header fields if the header information transmission manner is a second manner and the data block is not ranked last in the first data stream, or the header information transmission manner is the third manner and the data block is not ranked first in the first data stream.

Further, under the circumstances that the multiple header fields are the target header fields, when used for configuring field values of the target header fields according to at least one of the first transaction information and the relevant information of the first data block and obtaining a message header that is determined for the first data block, the sending module 52 is specifically used for: obtaining a second preset string corresponding to the first end, wherein the second preset string is used for hiding address information of the first end; configuring field values of the target header fields according to the first preset string, the second preset string, the first transaction information, and the relevant information of the first data block, and obtaining a first message header that is determined for the first data block; wherein the first message header comprises: the first preset string, the second preset string, transaction attribute identification of the first transmission transaction, transaction identification of the first transmission transaction, the total size of the first target header information and the first data block, the total number of the data blocks in the first data stream, the block number of the first data block, and annotated information; when the total number is a set value, it indicates that the first data stream is a stream with an unknown number of data blocks.

Further, under the circumstances that some header fields in the multiple message fields are the target header fields, when used for configuring field values of the target header fields according to at least one of the first transaction information and the relevant information of the first data block and obtaining a message header that is determined for the first data block, the sending module 52 is specifically used for: configuring field values of the target header fields according to transaction identification of the first transmission transaction in the first transaction information, and obtaining a second message header that is determined for the first data block, wherein the second message header comprises the transaction identification.

Further, the obtaining module 51 can further be used for: obtaining data transmission direction control information from associated information associated with the second preset string.

The data transmission device provided in the present embodiment further comprises a triggering module, which is used for:

- if the data transmission direction control information is indicative of allowing the control apparatus to forward received data to the second end, then triggering the operation of sending the first data block to the second end according to the address information of the second end;
- if the data transmission direction control information is indicative of prohibiting the control apparatus from forwarding the received data to the second end, then triggering the operation of sending the first data block to the second end according to the address information of the second end on the basis of the data type of the first data stream to which the first data block belongs.

Further, when used for triggering the operation of sending the first data block to the second end according to the address information of the second end on the basis of the data type of the first data stream to which the first data block belongs, the triggering module is specifically used for: when the data type is a request type, obtaining preset request parameters from the associated information, and sending the preset request parameters to the second end according to the address information of the second end; when the data type is a non-request type, skipping the sending.

Further, if the data transmission direction control information is indicative of allowing the control apparatus to forward the received data to the second end, but prohibiting the control apparatus from forwarding the received data sent by the second end, then the data transmission device provided in the present embodiment further comprises a processing module, which is used for: when receiving feedback information on the first data block from the second end, skipping sending the feedback information.

Further, the data transmission device provided in the present embodiment further comprises:

- a receiving module, which is used for receiving connection verification information sent by the first end when communication connection is established with the first end;
- feeding back a verification result to the first end in response to the connection verification information, so that the first end determines whether a communication link is established with the control apparatus on the basis of the verification result to send the first data block through the communication link;
- wherein the connection verification information comprises at least one of items as follows: verification instructions that carry verification values, and verification data relevant to an apparatus driver of a first control apparatus.

It should be noted that the data transmission device provided in the above embodiment can implement the technical solution described in the data transmission method embodiment shown in FIG. 13. For the specific implementation principles of the above modules or units, see the corresponding content in the data transmission method embodiment shown in FIG. 13, which will not be repeated herein.

There exists a structure diagram of a data transmission device provided in another embodiment of the present application. The data transmission device is deployed on the first end. For the specific introduction to the first end, see the relevant content in the other embodiments in the previous text. Specifically, the data transmission device comprises: an obtaining module, a generation module, and a sending module; wherein:

- the obtaining module is used for obtaining a first preset string corresponding to the second end when a first data block needs to be transmitted to a second end, wherein the first preset string is used for hiding address information of the second end;
- the generation module is used for generating a first message to be sent on the basis of the first preset string and the first data block;
- the sending module is used for sending the first message to the second end through a control apparatus.

It should be noted that the data transmission device provided in the above embodiment can implement the technical solution described in the data transmission method provided in the second method embodiment of the present application. As such, in addition to the above steps, the above modules or units can also implement other relevant steps. For the specific implementable steps and the implementation principles, see the relevant content in the other embodiments of the present application, which will not be repeated herein.

An embodiment of the present application further provides a first end. For the structure of the first end, see the first end 10 shown in FIG. 3*b*. Specifically, the first end comprises:

a first application installed on the first end;

a first control module, which is located inside the first application and used for implementing the data transmission method that is relevant to FIG. 11*a* and provided in the embodiment of the present application.

Another embodiment of the present application also provides a first end. For the structure of the first end, see the first end 10 shown in FIG. 3*c*. Specifically, the first end comprises:

a first application that is installed on the first end;

a second control module, which is external to the first application and used for implementing the data transmission method that is relevant to FIG. 11*b* and provided in the embodiment of the present application.

For the specific description of the first end provided in the two embodiments of the present application, see the relevant content in the other embodiments of the present application in the previous text, which will not be repeated herein.

Another embodiment of the present application further provides an intermediate network apparatus, which comprises: a fourth control module and a memory, wherein the memory is used for storing one or more computer programs; the fourth control module is used for executing said one or more computer programs to implement the data transmission method that is relevant to FIG. 12 and provided in the embodiment of the present application.

Figure 28:
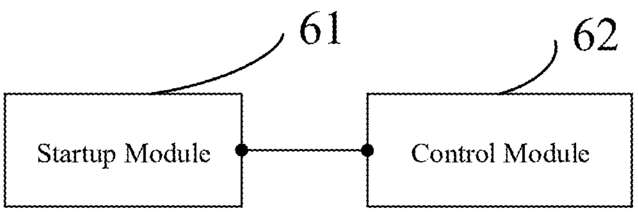
FIG. 28 is a structure diagram of a data transmission control device provided in one embodiment of the present application.

FIG. 28 is a structure diagram of a data transmission control apparatus provided in an embodiment of the present application. The data transmission device is deployed on a control apparatus in communication connection with a first end on the basis of a first communication protocol. Some of multiple communication nodes included in the first communication protocol are unidirectional communication nodes. For the specific introduction to the control apparatus and the first communication protocol, see the relevant content in the other embodiments in the previous text. As shown in FIG. 28, the data transmission control apparatus provided in the present embodiment comprises a startup module 61 and a control module 62; wherein:

the startup module 61 is used for: determining first configuration information in response to an operation of configuring communication nodes on the control apparatus as triggered by the first end, wherein communication nodes included in the first configuration information are the communication nodes in the first communication protocol; in the process of data transmission in non-handshake connection with the first end, activating at least one first communication node for the first end according to the first configuration information, wherein the first communication node is of a node type that can reflect a data transmission function, which the first communication node enables the first end to perform;

the control module 62 is used for controlling the data transmission capability that the first end can have through each first communication node according to the node type of each first communication node;

Further, a target communication node is one communication node among said at least one first communication node; and when used for controlling the data transmission capability that the first end can have through the target communication node according to the node type of the target communication node, the control module 61 can be specifically used for: determining a target end, with which the first end carries out data transmission through the target communication node; controlling the first end to be able to uplink data to the target end when the node type of the target communication node is a first type; controlling the first end to be able to downlink data to the target end when the node type of the target communication node is a second type; controlling the first end to be able to uplink and downlink data to the target end when the node type of the target communication node is a third type.

Further, the device provided in the present embodiment can further comprise:

a monitoring and obtaining module, which is used for obtaining data transmission capability control information arranged for the first end and directed to the target communication node when monitoring that the target communication node receives a data block that is sent by the first end and needs to be transmitted to the target end;

a determination module, which is used for determining data communication capability possessed by the first end and indicated by the data transmission capability control information;

a sending processing module, which is used for executing a processing operation of sending the data block according to the data communication capability that the first end possesses, wherein the data communication capability comprises at least one of uplink data communication capability and downlink data communication capability.

Further, when used for executing a processing operation of sending the data block according to the data communication capability that the first end possesses, the sending processing module is specifically used for: if the first end possesses the uplink data communication capability, sending the data block to the target end; if the first end does not possess the uplink data communication capability but possesses the downlink data communication capability, skipping sending the data block.

Further, the sending processing module is further used for: if the first end does not possess the uplink data communication capability but possesses the downlink data communication capability, determining data type of a data stream to which the data block belongs; when the data type is request type, executing a search operation in a data cache area corresponding to the target communication node according to request parameters included in the data block, so as to return adapted data for the first end;

and, the sending processing module is further used for: if the first end possesses the uplink data communication capability but does not possess the downlink data communication capability, skipping sending the feedback information when feedback information returned by the target end for the data block is received.

Further, when used for controlling the first end to be able to downlink data when the node type of the target communication node is the second type, the control module 62 can be specifically used for: obtaining a timing parameter arranged to triggering data acquisition for the target communication node; obtaining data from the target end according to the timing parameter, in preparation for sending the data as obtained to the first end.

Further, when used for obtaining data from the target end according to the timing parameter, the control module 62 can be specifically used for: if the timing parameter is a first value, periodically obtaining the data from the target end; if the timing parameter is a second value, when a signaling that is sent by the first end to the target communication node and used for indicating that data need to be sent to the first end is monitored, obtaining the data from the target end.

Further, when used for obtaining data from the target end, the control module 62 can be specifically used for: obtaining a preset request parameter set for the target communication node; generating and sending an acquisition request to the target end according to the preset request parameter; receiving the data returned by the target end in response to the acquisition request and storing the data in a data cache area corresponding to the target communication node.

Further, when used for determining a target end, with which the first end carries out data transmission through the target communication node, the control module 62 can be specifically used for:

determining a target address corresponding to the target communication node;

determining the target end according to the target address;

wherein the target address corresponding to the target communication node is determined by any one of means as follow:

determining the target address that has a binding relationship with the target communication node according to one-to-one binding relationship between communication nodes included in the first configuration information and target addresses; or determining preset identification for the target communication node, and determining the target address according to the preset identification, wherein the preset identification is either preset identification corresponding to the first end or preset identification corresponding to the target end, and is used for hiding addresses of corresponding ends or as the addresses of the corresponding ends.

Further, when used for determining preset identification for the target communication node, the control module 62 can be specifically used for:

obtaining the preset identification bound to the target communication node according to the first configuration information; or receiving the preset identification sent by the first end, wherein the preset identification is determined by the first end according to a transmission transaction corresponding to a data stream to which a data block that needs to be transmitted belongs.

Further, if the preset identification is preset identification corresponding to the first end, when used for determining the target address according to the preset identification, the control module 62 can be specifically used for: obtaining association information associated with the preset identification; obtaining the target address from the associated information.

Further, the communication protocol with the first end further comprises a second communication node for data exchange with the first end in the process of handshake connection; and, the startup module 61 is further used for: after power-on is monitored, activating a second communication node according to the first configuration information, so as to establish a handshake connection with the first end through the second communication node; in the process of establishing the handshake connection, determining whether an instruction sent by the first end to the second communication node meet requirements; responding to the instruction if the requirements are met; skipping responding to the instruction if the requirements are not met.

Further, in the control apparatus, a data cache area is independently arranged for the second communication node; and, the device provided in the present embodiment further comprises a triggering and determining module, which is used for: after the handshake connection is established successfully, triggering execution of said activating at least one first communication node for the first end according to the first configuration information, and determining whether to shut down the second communication node according to the node type of said at least one first communication node and the determination manner of the target end.

Further, the first non-bidirectional communication protocol is any one of the following protocols: an external wired communication protocol that instructs transmission via a signaling, and a wireless communication protocol connected in a pairing manner.

Further, the control apparatus is further in communication connection with the target end on the basis of a second communication protocol, which has multiple communication nodes, including some unidirectional communication nodes; and, the startup module 61 is further used for: determining second configuration information in response to an operation of configuring communication nodes on a control apparatus as triggered for the target end, wherein the communication nodes included in the second configuration information are communication nodes in the second communication protocol; in the process of data transmission in non-handshake connection with the target end, activating at least one third communication node for the target end according to the second configuration information, wherein the node type of the third communication node can reflect the data transmission function that the third communication node enables the target end to perform; the control module 62 is further used for controlling the data transmission capability that the target end can have through each third communication node according to the node type of each third communication node.

It should be noted that the data transmission control apparatus provided in the above embodiment can implement the technical solution of the data transmission control method embodiment provided in the present application. As such, in addition to the above steps, the above modules or units can also implement other relevant steps. Specifically, for the implementable steps and the implementation principles, see the relevant content in the other embodiments of the present application, which will not be repeated herein.

Figure 29:
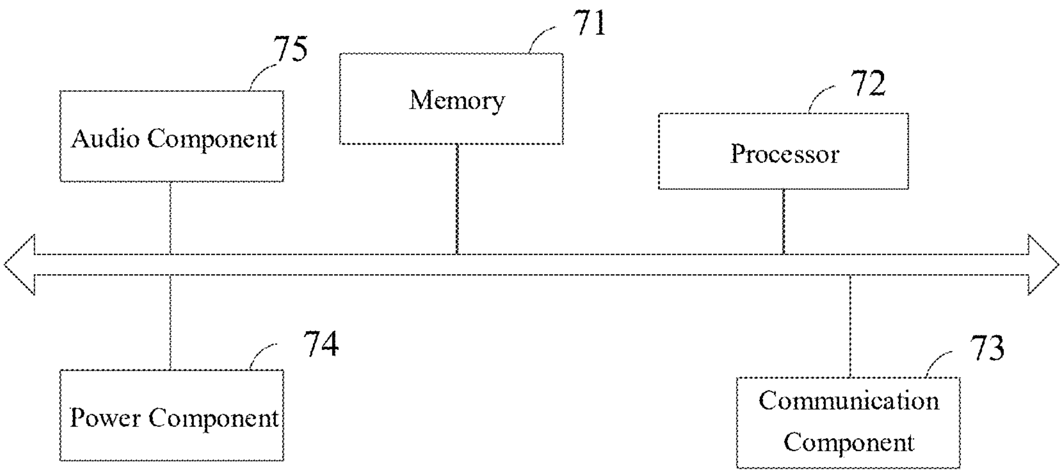
FIG. 29 is a structure diagram of a control apparatus provided in another embodiment of the present application.

FIG. 29 is a structure diagram of a control apparatus provided in an embodiment of the present application. The control apparatus comprises a processor 72 and a memory 71. Wherein: the memory 71 is used for storing one or more computer instructions; the processor 72, coupled to the memory 71, is used for executing said one or more computer instructions (such as a computer instruction that implements data storage logic) to implement the steps (such as the steps in the data transmission methods and the data transmission control methods among others, which are relevant to FIGS. 11*a* to 13 and FIG. 19; the relevant methods and steps can be implemented independently or in combination) in the data transmission methods provided in the present application.

The memory 71 can be implemented by any type of volatile or non-volatile storage apparatus or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk, or an optical disk.

Further, as shown in FIG. 29, the control apparatus further comprises a communication component 73, a power component 74, and an audio component 75 among others. FIG. 29 only shows some assemblies in a schematic way, which does not mean that the control apparatus only comprises the components shown in FIG. 29.

For the functional parts that the control apparatus specifically comprises, see the content relevant to FIG. 18A and/or FIGS. 7*a* to 7*c* as described in the other embodiments of the present application, which will not be repeated herein.

An embodiment of the present application further provides a first end, which comprises a processor and a memory. Wherein: the memory is used for storing one or more computer instructions; the processor, coupled with the memory, is used for executing said one or more computer instructions (such as a computer instruction that implements data storage logic) to implement the steps in the data transmission methods provided in the embodiments of the present application.

For the specific introduction to the memory, see the relevant content in the other embodiments in the previous text.

Furthermore, in additional to the memory and the processor, the first end can also comprise other components, such as a communication component, a display, and an audio component; herein, limitations are not imposed thereon.

An embodiment of the present application further provides a computer program product (shown in none of the Figures in the drawings). The computer program product comprises computer programs or instructions that enable a processor to implement the steps in the above method embodiments when executed by the processor.

Accordingly, an embodiment of the present application further provides a computer-readable storage medium, in which computer programs are stored, and the computer programs can implement the method steps or functions provided in the above embodiments when executed by a computer.

The device embodiments as described above are merely illustrative, wherein the units described as separate parts may or may not be physically separated, and the parts displayed as units may or may not be physical units, that is, they can be located in one place or distributed on multiple network units. To achieve the purpose of the solution in the present embodiment, some or all modules can be selected according to actual needs, which can be understood and implemented by those skilled in the art without creative efforts.

Through the description of the above manners of implementation, those skilled in the art can clearly understand that each manner of implementation can be implemented by means of software combined with a necessary general hardware platform, and of course, they can also be implemented through hardware. Based on the understanding, the above technical solutions in essence, or parts thereof that contribute to the prior art, can be reflected in the form of software products, which can be stored in computer-readable storage media such as ROM/RAM, magnetic disks, and optical disks, include several instructions to enable one computer apparatus (which can be a personal computer, a server, or a network apparatus) to execute the methods described in the embodiments or in parts of the embodiments.

Finally, it should be noted that in some flows described in the specification, claims, and drawings of the present application, multiple operations appear in a specific order, and these operations may not be executed in the same order as they appear in the present text, or they can be executed in parallel. The serial number of the operations such as 101 and 102 is only used to distinguish different operations from each other, and the serial number per se does not represent any execution order. In addition, these flows can include more or fewer operations, and these operations can be executed in order or in parallel. It should be noted that the terms such as "first" and "second" in the present text serve to distinguish different messages, different apparatuses, different modules, and the like, and neither represent the order or impose limitation that "first" and "second" are different types. The term "or/and" in the present application only serves to describe the association relationship between associated objects, and indicates that there can exist three types of relationships. For example, A or/and B indicates three situations: there can exist A alone; there can exist A and B simultaneously; there can exist B alone; the mark "/" in the present application generally indicates that there is an "or" relationship between the associated objects. It should also be noted that the terms "comprise", "include", or any other variation thereof means non-exclusive inclusion, so that a commodity or system that comprises a series of elements comprises not only these elements, but also other elements that are not explicitly listed or elements that are inherent to the commodity or system. Without further limitations, an element limited by the statement "comprise one . . . " does not exclude the existence of other identical elements in the commodity or system that comprise the element. In addition, the exemplary TCP/IP protocol is a protocol family, including ARP, IP, TCP, UDP among others relevant to the Open System Interconnection Reference Model (OSI), as well as HTTP, FTP, SMTP, TELNET, HTTP, POP3 among others at the application layer; the relevant interfaces or protocols such as USB, Bluetooth, PCIE, SATA, SPI, and SDIO are only examples, rather than limitations, and can be replaced with interfaces or protocols such as serial communication (such as RS-232, RS-422, and RS-485), UART, and CAN according to actual needs, and they can also be replaced with custom interfaces or protocols; the relevant data types are only examples, rather than limitations, such as "16 bit", "32-bit", and "String"; the relevant field content and data header content among others are only examples, rather than limitations, such as "first-class code field", "verification information", "ordinary data header", "file data header", and "email data header", and they can be subject to customized addition or deletion according to actual needs. In addition, the above embodiments are only some embodiments of the present application, not all embodiments thereof. Based on the above embodiments in the present application, all other embodiments that those skilled in the art obtain without creative labor fall within the scope of protection of the present application. Furthermore, the above embodiments are only used to illustrate the technical solutions of the present application, rather than limit them; although the present application has been described in detail with reference to the above embodiments, those skilled in the art should understand that they can still modify the technical solutions described in the above embodiments, or make equivalent substitution for some technical features; these modifications or substitutions do not deviate the essence of corresponding technical solutions from the spirit and scope of the embodiments of the present application.

What is claimed is:

1. A data transmission control method, applicable to a control apparatus in communication connection with a first end based on a first communication protocol, wherein the first communication protocol has multiple communication nodes, including some unidirectional communication nodes, the method comprising:

determining first configuration information in response to an operation of configuring communication nodes on the control apparatus as triggered on account of the first end, wherein communication nodes included in the first configuration information are the communication nodes in the first communication protocol;

in the process of data transmission in non-handshake connection with the first end, activating at least one first communication node on account of the first end according to the first configuration information, wherein the first communication node is of a node type being able to reflect a data transmission function enabled for the first end; and controlling uplink and/or downlink data transmission capability that the first end is able to have through each first communication node according to the node type of each first communication node;

wherein:

a target communication node is one communication node among said at least one first communication node;

controlling the data transmission capability that the first end is able to have through the target communication node according to the node type of the target communication node comprises:

determining a target end with which the first end carries out data transmission through the target communication node;

controlling the first end to be able to uplink data to the target end when the node type of the target communication node is a first type;

controlling the first end to be able to downlink data to the target end when the node type of the target communication node is a second type; and controlling the first end to be able to uplink and downlink data to the target end when the node type of the target communication node is a third type; and determining a target end with which the first end carries out data transmission through the target communication node, comprises:

determining a target address corresponding to the target communication node; and determining the target end according to the target address, wherein the target address corresponding to the target communication node is determined in one of the following ways:

determining the target address that has a binding relationship with the target communication node according to one-to-one binding relationships between communication nodes included in the first configuration information and target addresses; or determining a preset identification on account of the target communication node, and determining the target address according to the preset identification, wherein the preset identification is either a preset identification corresponding to the first end or a preset identification corresponding to the target end, and is used for hiding an address of a corresponding end or as the address of the corresponding end.

2. The method according to claim 1, further comprising:

when monitoring that the target communication node receives a data block that is sent by the first end and needs to be transmitted to the target end, obtaining data transmission capability control information that is arranged for the first end on account of the target communication node;

determining data communication capability possessed by the first end and indicated by the data transmission capability control information; and sending the data block according to the data communication capability possessed by the first end;

wherein the data communication capability comprises at least one of uplink data communication capability and downlink data communication capability.

3. The method according to claim 2, wherein the sending the data block according to the data communication capability possessed by the first end comprises:

if the first end possesses the uplink data communication capability, sending the data block to the target end; and if the first end does not possess the uplink data communication capability but possesses the downlink data communication capability, skipping sending the data block.

4. The method according to claim 2, wherein;

if the first end does not possess the uplink data communication capability but possesses the downlink data communication capability, the method further comprises:

determining a data type of a data stream to which the data block belongs; and when the data type is a request type, searching a data cache area corresponding to the target communication node according to request parameters included in the data block to return adapted data for the first end; and if the first end possesses the uplink data communication capability but does not possess the downlink data communication capability, the method further comprises:

when receiving feedback information returned by the target end on account of the data block, skipping sending the feedback information.

5. The method according to claim 1, wherein the controlling the first end to be able to downlink data to the target end when the node type of the target communication node is a second type comprises:

obtaining a timing parameter for triggering data retrieval, wherein the timing parameter is arranged on account of the target communication node; and obtaining data from the target end according to the timing parameter, in preparation for sending the data as obtained to the first end.

6. The method according to claim 5, wherein the obtaining data from the target end according to the timing parameter comprises:

if the timing parameter is a first value, periodically obtaining the data from the target end; and if the timing parameter is a second value, when monitoring a signaling that is sent by the first end to the target communication node and used for indicating that data need to be sent to the first end, obtaining the data from the target end.

7. The method according to claim 5, wherein the obtaining the data from the target end comprises:

obtaining a preset request parameter that is arranged on account of the target communication node;

generating and sending a retrieval request to the target end according to the preset request parameter; and receiving the data returned by the target end in response to the retrieval request, and storing the data in the data cache area corresponding to the target communication node.

8. The method according to claim 1, wherein the determining a preset identification on account of the target communication node comprises:

obtaining the preset identification bound to the target communication node according to the first configuration information; or receiving the preset identification sent by the first end, wherein the preset identification is determined by the first end according to a transmission transaction corresponding to a data stream to which a data block that needs to be transmitted belongs.

9. The method according to claim 1, wherein if the preset identification is a preset identification corresponding to the first end, then said determining the target address according to the preset identification comprises:

obtaining association information of the preset identification; and obtaining the target address from the associated information.

10. The method according to claim 1, further comprising:

after power-on is monitored, activating a second communication node according to the first configuration information, so as to establish handshake connection with the first end through the second communication node; and in the process of establishing the handshake connection, determining whether an instruction sent by the first end to the second communication node meets requirements and, in response thereto:

if yes, responding to the instruction; and if not, skipping responding to the instruction.

11. The method according to claim 10, wherein:

in the control apparatus, a data cache area is independently arranged for the second communication node; and the method further comprises:

after successful establishment of the handshake connection, triggering execution of said activating at least one first communication node on account of the first end according to the first configuration information, and determining whether to disable the second communication node according to the node type of said at least one first communication node and a determination manner of the target end.

12. The method according to claim 10, further comprising:

in the process of establishing the handshake connection with the first end, receiving connection verification information sent by the first end; and feeding back a corresponding verification result to the first end on account of the connection verification information, so that the first end determines whether the verification is passed based on the verification result, and if yes, indicating that the handshake connection between the control apparatus and the first end is successful;

wherein the connection verification information comprises at least one of items as follows:

a verification instruction carrying a verification value, or verification data relevant to an apparatus driver of the control apparatus.

13. The method according to claim 1, wherein the first communication protocol is any one of communication protocols as follows:

an external wired communication protocol that instructs transmission via a signaling, and a wireless communication protocol for connection by pairing.

14. The method according to claim 1, wherein:

the control apparatus is further in communication connection with the target end based on a second communication protocol, wherein the second communication protocol has multiple communication nodes, including some unidirectional communication nodes; and the method further comprises:

determining second configuration information in response to an operation of configuring communication nodes on a control apparatus as triggered on account of the target end, wherein the communication nodes included in the second configuration information are communication nodes in the second communication protocol;

in the process of data transmission in non-handshake connection with the target end, activating at least one third communication node for the target end according to the second configuration information, wherein the third communication node is of a node type being able to reflect a data transmission function enabled for the target end and controlling uplink and/or downlink data transmission capability that the target end is able to have through each third communication node according to the node type of each third communication node.

15. A data transmission control system, comprising:

a first end; and a first control apparatus in communication connection with the first end based on a first communication protocol, wherein the first communication protocol has multiple communication nodes, including some unidirectional communication nodes, wherein the first control apparatus is used for implementing the method according to claim 1.

16. The system according to claim 15, wherein, the first control apparatus is further used for:

after power-on is monitored, activating a second communication node according to the first configuration information, so as to establish handshake connection with the first terminal through the second communication node;

in the process of establishing the handshake connection, determining whether an instruction sent by the first terminal to the second communication node meets requirements and, in response thereto:

if yes, responding to the instruction; and if not, skipping responding to the instruction.

17. The system according to claim 15, further comprising:

a second end; and a second control apparatus, wherein the second control apparatus is in communication connection with the first control apparatus and the second end, and is used for:

receiving data sent by the first control apparatus;

verifying the data as received; and sending the data to the second end after the verification is passed.

18. The system according to claim 17, wherein;

the second control apparatus is in communication connection with the second terminal based on a second communication protocol;

the second communication protocol has multiple communication nodes, including some unidirectional communication nodes; and the second control apparatus is further used for:

determining second configuration information in response to an operation of configuring communication nodes on the second control apparatus as triggered on account of the second terminal, wherein the communication nodes included in the second configuration information are communication nodes in the second communication protocol;

in the process of data transmission in non-handshake connection with the second end, activating at least one third communication node on account of the second end according to the second configuration information, wherein the third communication node is of a node type being able to reflect a data transmission function enabled for the second end; and controlling uplink and/or downlink data transmission capability that the second end is able to have through each third communication node according to the node type of each third communication node.

19. A data transmission control system, comprising:

a first end;

a second end;

a first control apparatus in communication connection with the first end through a first communication protocol, wherein:

the first communication protocol has multiple communication nodes, including some unidirectional communication nodes; and the first control apparatus is used for:

determining first configuration information in response to an operation of configuring communication nodes on a control apparatus as triggered on account of the first end, wherein communication nodes included in the first configuration information are the communication nodes in the first communication protocol;

in the process of data transmission in non-handshake connection with the first end, activating at least one first communication node on account of the first end according to the first configuration information, wherein the first communication node is of a node type being able to reflect a data transmission function enabled for the first end; and controlling uplink and/or downlink data transmission capability that the first end is able to have through each first communication node according to the node type of each first communication node;

a second control apparatus, wherein the second control apparatus is in communication connection with the first control apparatus and the second end, and is used for:

verifying data sent by the first control apparatus when the data is received; and sending the data to the second end after the verification is passed;

wherein:

the second end is used for receiving the data sent by the second control apparatus;

a target communication node is one communication node among said at least one first communication node;

the first control apparatus is used for:

determining a target end with which the first end carries out data transmission through the target communication node;

controlling the first end to be able to uplink data to the target end when the node type of the target communication node is a first type;

controlling the first end to be able to downlink data to the target end when the node type of the target communication node is a second type;

controlling the first end to be able to uplink and downlink data to the target end when the node type of the target communication node is a third type;

determining a target address corresponding to the target communication node; and determining the target end according to the target address; and the target address corresponding to the target communication node is determined in one of the following ways:

determining the target address that has a binding relationship with the target communication node according to one-to-one binding relationships between communication nodes included in the first configuration information and target addresses; or determining a preset identification on account of the target communication node, and determining the target address according to the preset identification, wherein the preset identification is either a preset identification corresponding to the first end or a preset identification corresponding to the target end, and is used for hiding an address of a corresponding end or as the address of the corresponding end.

20. A control apparatus, comprising a memory and a processor, wherein:

the memory is used for storing computer programs;

the processor, coupled with the memory, is configured to execute the computer programs stored in the memory to cause the control apparatus:

determine first configuration information in response to an operation of configuring communication nodes on the control apparatus as triggered on account of the first end, wherein communication nodes included in the first configuration information are the communication nodes in the first communication protocol;

in the process of data transmission in non-handshake connection with the first end, activate at least one first communication node on account of the first end according to the first configuration information, wherein the first communication node is of a node type being able to reflect a data transmission function enabled for the first end; and control uplink and/or downlink data transmission capability that the first end is able to have through each first communication node according to the node type of each first communication node;

a target communication node is one communication node among said at least one first communication node;

the processor is further configured to:

determine a target end with which the first end carries out data transmission through the target communication node;

control the first end to be able to uplink data to the target end when the node type of the target communication node is a first type;

control the first end to be able to downlink data to the target end when the node type of the target communication node is a second type;

control the first end to be able to uplink and downlink data to the target end when the node type of the target communication node is a third type;

determine a target address corresponding to the target communication node; and determine the target end according to the target address; and the processor is further configured to determine a target address corresponding to the target communication node in one of the following ways:

determine the target address that has a binding relationship with the target communication node according to one-to-one binding relationships between communication nodes included in the first configuration information and target addresses; or determine a preset identification on account of the target communication node, and determine the target address according to the preset identification, wherein the preset identification is either a preset identification corresponding to the first end or a preset identification corresponding to the target end, and is used for hiding an address of a corresponding end or as the address of the corresponding end.

21. A non-transitory computer-readable storage medium, comprising computer programs or instructions, wherein when the computer programs or instructions are executed by a processor, steps in the data transmission control method according to claim 1 are implemented.

22. The control apparatus according to claim 20, wherein the processor is further configured to:

when monitoring that the target communication node receives a data block that is sent by the first end and needs to be transmitted to the target end, obtain data transmission capability control information that is arranged for the first end on account of the target communication node;

determine data communication capability possessed by the first end and indicated by the data transmission capability control information; and send the data block according to the data communication capability possessed by the first end;

wherein the data communication capability comprises at least one of uplink data communication capability and downlink data communication capability.

23. The control apparatus according to claim 22, wherein the processor is further configured to:

if the first end possesses the uplink data communication capability, send the data block to the target end; and if the first end does not possess the uplink data communication capability but possesses the downlink data communication capability, skip sending the data block.

24. The control apparatus according to claim 22, wherein:

if the first end does not possess the uplink data communication capability but possesses the downlink data communication capability, the processor is further configured to:

determine data type of a data stream to which the data block belongs; and when the data type is a request type, search a data cache area corresponding to the target communication node according to request parameters included in the data block to return adapted data for the first end; and, if the first end possesses the uplink data communication capability but does not possess the downlink data communication capability, the processor is further configured to:

when receiving feedback information returned by the target end on account of the data block, skip sending the feedback information.

25. The control apparatus according to claim 20, wherein, when the node type of the target communication node is a second type, the processor is further configured to:

obtain a timing parameter for triggering data retrieval, wherein the timing parameter is arranged on account of the target communication node; and obtain data from the target end according to the timing parameter, in preparation for sending the data as obtained to the first end.

26. The control apparatus according to claim 25, wherein the processor is further configured to:

if the timing parameter is a first value, periodically obtain the data from the target end; and if the timing parameter is a second value, when monitoring a signaling that is sent by the first end to the target communication node and used for indicating that data need to be sent to the first end, obtain the data from the target end.

27. The control apparatus according to claim 25, wherein the processor is further configured to:

obtain a preset request parameter that is arranged on account of the target communication node;

generate and send a retrieval request to the target end according to the preset request parameter; and receive the data returned by the target end in response to the retrieval request, and store the data in the data cache area corresponding to the target communication node.

28. The control apparatus according to claim 20, wherein the processor is configured to:

obtain the preset identification bound to the target communication node according to the first configuration information; or receive the preset identification sent by the first end, wherein the preset identification is determined by the first end according to a transmission transaction corresponding to a data stream to which a data block that needs to be transmitted belongs.

29. The control apparatus according to claim 20, wherein if the preset identification is a preset identification corresponding to the first end, the processor is configured to:

obtain association information of the preset identification; and obtain the target address from the associated information.

30. The control apparatus according to claim 20, wherein the processor is further configured to:

after power-on is monitored, activate a second communication node according to the first configuration information, so as to establish handshake connection with the first end through the second communication node; and in the process of establishing the handshake connection, determine whether an instruction sent by the first end to the second communication node meets requirements and, in response thereto:

if yes, respond to the instruction; and if not, skip responding to the instruction.

31. The control apparatus according to claim 30, wherein;

in the control apparatus, a data cache area is independently arranged for the second communication node; and the processor is further configured to:

after successful establishment of the handshake connection, trigger execution of said activating at least one first communication node on account of the first end according to the first configuration information, and determine whether to disable the second communication node according to the node type of said at least one first communication node and a determination manner of the target end.

32. The control apparatus according to claim 30, wherein the processor is further configured to:

in the process of establishing the handshake connection with the first end, receive connection verification information sent by the first end;

feed back a corresponding verification result to the first end on account of the connection verification information, so that the first end determines whether the verification is passed based on the verification result, and if yes, indicate that the handshake connection between the control apparatus and the first end is successful; and wherein the connection verification information comprises at least one of items as follows:

a verification instruction carrying a verification value, or verification data relevant to an apparatus driver of the control apparatus.

33. The control apparatus according to claim 20, wherein the first communication protocol is any one of communication protocols as follows:

an external wired communication protocol that instructs transmission via a signaling, and a wireless communication protocol for connection by pairing.

34. The control apparatus according to claim 20, wherein:

the control apparatus is further in communication connection with the target end based on a second communication protocol, and the second communication protocol has multiple communication nodes, including some unidirectional communication nodes; and the processor is further configured to:

determine second configuration information in response to an operation of configuring communication nodes on a control apparatus as triggered on account of the target end, wherein the communication nodes included in the second configuration information are communication nodes in the second communication protocol;

in the process of data transmission in non-handshake connection with the target end, activate at least one third communication node for the target end according to the second configuration information, wherein the third communication node is of a node type being able to reflect a data transmission function enabled for the target end; and control uplink and/or downlink data transmission capability that the target end is able to have through each third communication node according to the node type of each third communication node.

* * * * *